United States Patent [19]

Methvin et al.

[11] Patent Number: 5,073,864
[45] Date of Patent: Dec. 17, 1991

[54] PARALLEL STRING PROCESSOR AND METHOD FOR A MINICOMPUTER

[75] Inventors: David H. Methvin, Boulder, Colo.; Chong S. Un, Anaheim, Calif.

[73] Assignee: Davin Computer Corporation, Irvine, Calif.

[21] Appl. No.: 478,844

[22] Filed: Feb. 12, 1990

Related U.S. Application Data

[63] Continuation-in-part of Ser. No. 267,460, Nov. 4, 1988, abandoned, which is a continuation-in-part of Ser. No. 262,225, Oct. 21, 1988, Pat. No. 4,896,133, which is a continuation of Ser. No. 88,421, Aug. 20, 1987, abandoned, which is a continuation-in-part of Ser. No. 12,834, Feb. 10, 1987, abandoned.

[51] Int. Cl.$^5$ .............. G06F 7/00; G06F 15/00; G06F 7/02; G05B 1/00
[52] U.S. Cl. .............. 364/715.11; 340/146.2
[58] Field of Search .............. 340/146.2; 364/715.09–715.11

[56] References Cited

U.S. PATENT DOCUMENTS

| | | | |
|---|---|---|---|
| 3,609,703 | 9/1971 | Peacock | 340/172.5 |
| 3,784,980 | 1/1974 | Geesen | 340/146.2 |
| 4,032,885 | 6/1977 | Roth | 340/146.1 |
| 4,053,871 | 10/1977 | Vidalin et al. | 340/146.2 |
| 4,097,844 | 6/1978 | Moyer | 340/146.2 |
| 4,101,903 | 7/1978 | Slay | 340/146.3 |
| 4,119,946 | 10/1978 | Taylor | 364/748 |
| 4,205,302 | 5/1980 | Godo | 340/146.2 |
| 4,334,284 | 6/1982 | Wong | 364/715 |
| 4,383,304 | 5/1983 | Hirashima | 364/900 |
| 4,414,677 | 11/1983 | Ive et al. | 375/116 |
| 4,443,860 | 4/1984 | Vidalin | 364/900 |
| 4,467,444 | 8/1984 | Harmon, Jr. et al. | 340/146.2 |
| 4,524,345 | 6/1985 | Sybel et al. | 340/146.2 |
| 4,550,436 | 10/1985 | Freeman et al. | 382/34 |
| 4,560,974 | 12/1985 | Coleman et al. | 340/146.2 |
| 4,631,696 | 12/1986 | Sakamoto | 364/748 |
| 4,639,886 | 1/1987 | Hashimoto | 364/736 |
| 4,857,882 | 8/1989 | Wagner et al. | 340/146.2 |
| 4,896,133 | 1/1990 | Methvin et al. | 340/146.2 |

OTHER PUBLICATIONS

Maria T. Padilla, "Methvin is again up to BAT", *The Orange County Register*, Feb. 20, 1987, pp. C1, C10.
Tom Manuel, "The Frantic Search for More Speed", *Electronics*, vol. 60, No. 18, Sep. 3, 1987, pp. 59–62.
John Gosch, "Europe Bets on Standards to get More Performance", *Electronics*, vol. 60, No. 18, Sep. 3, 1987, pp. 62–63.

(List continued on next page.)

*Primary Examiner*—Dale M. Shaw
*Attorney, Agent, or Firm*—Knobbe, Martens, Olson & Bear

[57] ABSTRACT

A processor is disclosed for use in a computer system for comparing a number of bytes simultaneously in order to locate a control character in a string of data. The processor includes a register for holding the data bytes, a register for storing the control characters, a comparison circuit for simultaneously comparing the bytes of the first register with the bytes of the second register, and a circuit for generating indicator bits when a match has been found between the two registers. Microcode instructions cause the system to branch to a predetermined memory location when the control character has been located and to branch to a second predetermined memory location when no control character is found in the data string. The parallel string processor includes a circuit which finds the indicator bits generated from the circuit which have a predetermined characteristic and thus identifies the position of a particular byte (e.g., control character) in the data word that has the selected predetermined characteristic. A number of different operations can be performed based upon the output of the circuit to accomplish in one instruction operations that previously required a large number of instruments.

34 Claims, 23 Drawing Sheets

OTHER PUBLICATIONS

Bill Joy, "It's no Contest: RISC has won", *Electronics*, vol. 60, No. 18, Sep. 3, 1987, p. 64.

Phillips W. Smith, "CISC can Still Deliver the Goods", *Electronics*, vol. 60, No. 18, Sep. 3, 1987, p. 65.

Tom Manuel, "Getting Mainframe Power out of a CISC Supermicro", *Electronics*, vol. 60, No. 18, Sep. 3, 1987, pp. 66-68.

Tom Manuel, "Racing to Fill 'The 15-To-60-MIPS Gap'", *Electronics*, vol. 60, No. 18, Sep. 3, 1987, p. 69.

Jonah McLeod, "RISC to Help Ridge Move up into Supermint Camp", *Electronics*, vol. 60, No. 18, Sep. 3, 1987, pp. 70-71.

"Why Sun Designed its own RISC Chip", *Electronics*, vol. 60, No. 18, Sep. 3, 1987, pp. 72-73.

Larry Waller, "Methvin's CISC Blowout: A 64-Bit--Word Supermini!", *Electronics*, vol. 60, No. 18, Sep. 3, 1987, pp. 73-74.

Ray Weiss, "Another Challenge to Orthodoxy—Methvin Develops 64-Bit Mini", *Electronic Engineering Times*, Sep. 21, 1987, pp. 47-48.

*BAT 6420 Reference Manual*, Publication No. EOD 40-06420-002, Davin Computer Corporation, Oct. 1987.

"PAL® (Programmable Array Logic) Device HAL® (Hard Array Logic) Devices", Monolithic Memories, pp. 5-17-5-20, 5-22, 5-26, 5-39, 5-46, 5-65, 5-68, 5-86.

J. E. Gersbach, "Algebraic/Logical Shift Matrix", IBM Technical Disclosure Bulletin, vol. 23, No. 1, Jun. 1980, pp. 120-122.

"Types SN54LS381A, SN54LS382, SN54S381, SN74LS381A, SN74LS382, SN74S381 Arithmetic Logic Units/Function Generators", *Texas Instruments*, D2430, Jan. 1981, Revised Dec. 1983, pp. 3-10-37-3-1041.

```
80   LD    RA    CHAR1  (*LOAD REGISTER A WITH FIRST CHARACTER*)
82   LD    RB    DATA1  (*LOAD REGISTER B WITH INPUT STRING DATA*)
84   EXNOR RB    RA     (*COMPARE INPUT STRING TO FIRST CHARACTER*)
86   BAH         400    (*BRANCH IF ANY BYTES ARE EQUAL TO FIRST
                         CHARACTER*)
88   LD    RA    CHAR2  (*LOAD REGISTER A WITH SECOND CHARACTER*)
90   EXNOR RB    RC     (*COMPARE INPUT STRING TO SECOND CHARACTER*)
92   BAH         400    (*BRANCH IF ANY BYTES ARE EQUAL TO SECOND
                         CHARACTER*)
94   ST    RB    BUF1   (*STORE INPUT STRING IN BUFFER*)
96   JMP         80     (*LOOP TO GET NEXT INPUT STRING AND
                         COMPARE*)
```

Fig. 4

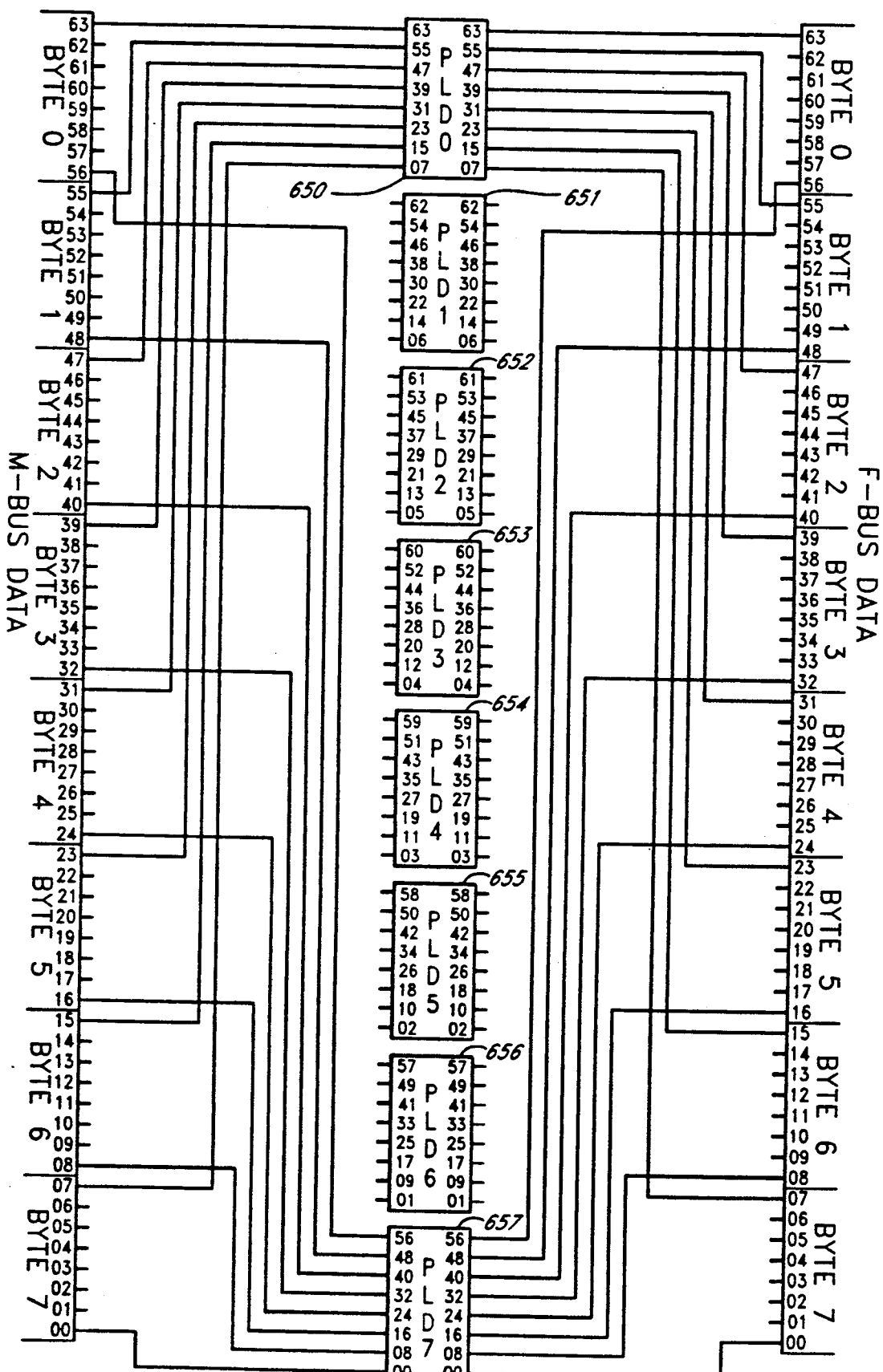
FIG. 19 ROTATE/REPLICATE CIRCUIT

RESULT OF CLRDFFH INSTRUCTION

RESULT OF CLRDTFH INSTRUCTION

RESULT OF CLRDFH INSTRUCTION

RESULT OF CLRDFFM INSTRUCTION

RESULT OF CLRDTFM INSTRUCTION

RESULT OF CLRDFM INSTRUCTION

FIG. 30

| INPUT FROM PROM | PATTERN GENERATOR DATA | | | | PATTERN OUTPUT | |
|---|---|---|---|---|---|---|
| | CLRDFFH CLRDFFM | CLRDFH CLRDFM | CLRDTFH CLRDTFM | CLRFH | CLRFM |
| 0 | FF | 80 | 80 | 80 | 7F |
| 1 | 7F | 40 | C0 | 40 | BF |
| 2 | 3F | 20 | E0 | 20 | DF |
| 3 | 1F | 10 | F0 | 10 | EF |
| 4 | 0F | 08 | F8 | 08 | F7 |
| 5 | 07 | 04 | FC | 04 | FB |
| 6 | 03 | 02 | FE | 02 | FD |
| 7 | 01 | 01 | FF | 01 | FE |
| 8 | 00 | 00 | 00 | 00 | FF |

FIG. 34

PARALLEL STRING PROCESSOR AND METHOD FOR A MINICOMPUTER

RELATED APPLICATIONS

This application is a continuation in part of abandoned U.S. patent application Ser. No. 267,460, filed on Nov. 4, 1988, which is a continuation in part of U.S. patent application Ser. No. 262,225, filed on Oct. 21, 1988, now U.S. Pat. No. 4,896,133 which issued on Jan. 23, 1990, which is a continuation of abandoned U.S. patent application Ser. No. 088,421, filed on Aug. 20, 1987, which was a continuation-in-part of abandoned U.S. patent application Ser. No. 012,834, filed on Feb. 10, 1987.

NOTICE REGARDING COPYRIGHTED SUBJECT MATTER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to computer systems for processing strings of data, and also to a parallel string processor for a minicomputer and a method of searching strings of bits and bytes for the presence of a desired keyword.

Prior art computers and microprocessors process data strings one byte at a time. One of the most frequently occurring processing tasks is to attempt to locate one or more control characters in a data string. Prior art systems compare the data one byte at a time to the control or reference characters which are loaded into a CPU (central processing unit) register After a byte is compared, the data string is rotated one byte so that the next byte in the data string is compared, continuing until all bytes are compared.

The foregoing is a time-consuming procedure and utilizes a substantial amount of computer time as numerous repetitions of the comparison process are required to check each byte sequentially in order to determine whether it contains the reference character. For example, there may be only one "carriage return" (CR) character found per 80-character line, but all 80 characters must be compared one at a time. If a data string has 512 bytes, and each byte is separately compared to the control character, the comparison must be executed 512 times. Thus, a need exists for reducing the amount of time required to compare strings of data and find control characters embedded in the strings.

Eight bytes of data are simultaneously compared. Thus, the number of comparisons necessary is reduced by a factor of 8 relative to a single byte comparison, resulting in a substantial reduction of processing time. Since the comparison procedure is commonly executed numerous times in any given program, a significant saving in processing time may be achieved by this simultaneous comparison of a number of bytes.

In other computer applications it is desirable to have the capability to search long strings of bytes for the presence of a selected pattern of bytes. One such application that is relatively well known is used in the word processing context. This application allows one to search a portion of text for a particular word or phrase. For example, one may want to find each occurrence of the word "country" within a particular document so that the word "county" can be substituted therefor. Alternatively, one may want to find each occurrence of "county" so that it can be replaced with the proper spelling "county." These are known as search and replace operations. Search and replace operations are also used in connection with automatic spelling check programs that are offered by many commercially available word processing programs.

In word processing programs and other programs in which words and letters are used, each letter of the alphabet as well as each symbol such as an asterisk or hyphen is represented as a unique string of eight 1 or 0 logic bits, also known as a byte. In order to determine whether two byte strings represent the same word, the corresponding bits in each byte are compared to determine whether they are the same. If all of the bits in the two byte strings are identical, the two byte strings represent the same word.

A portion of text can be thought of and is represented as a long, continuous string of bytes, one byte for each letter appearing in the portion of text. To determine whether a particular word, or "keyword," appears in a portion of text, current string processors typically, starting at the beginning of the byte string that represents the portion of text, or the "character string," compare the first byte of the keyword with the first byte of the character string. If these two bytes match (the first letter of the keyword matches the first letter in the portion of text), then the processor compares the second byte in the keyword to the second byte in the character string. If these two bytes match, then the processor compares the next pair of bytes in the two strings, and so on. If all of the respective bytes in the two strings match, the processor has found an occurrence of the keyword in the portion of text.

However, the keyword does not usually appear as the first word in the portion of text being searched. Consequently, one of the bytes of the keyword will not match one of the bytes in the character string (the keyword is not the first word in the portion of text). In this case, the character string is shifted one byte relative to the keyword so that the first byte of the keyword is compared to the second byte of the character string. If these two bytes match, then the second byte of the keyword is compared to the third byte of the character string, and so on. If one of the pairs of bytes do not match, then the character string is again shifted one byte relative to the keyword so that the first byte of the keyword is now compared to the third byte of the character string. This general process repeats, usually until all occurrences of the keyword in the portion of text have been found.

As an example, let the keyword be the word "the" and the character string be "that time is the essence." Initially, as described above and set forth below, the byte representing the "t" in "the" will be compared to the byte representing the "t" in "that":

| Data String: | that time is the essence |
|---|---|
| Keyword: | the |

This comparison will yield a match, and so the byte representing the "h" in "the" will be compared with the byte representing the "h" in "that." These bytes will also match, and so the byte representing the "e" in "the" will be compared to the byte representing the "a" in "that." These bytes will not match, and so the character string will be shifted one byte with respect to the keyword so that the first byte of "the" will be compared with the second byte in the character string. The relative position of the keyword and the character string are set forth below, and the "3" above the letter "t" in the word "that" is the number of comparisons that were required to determine whether or not there was a match.

| Comparisons: | 3 |
|---|---|
| Data String: | that time is the essence |
| Keyword: | the |

Only one comparison will be needed at this point to determine that the keyword is not present at this portion of the character string, and the character string will be shifted again:

| Comparisons: | 31 |
|---|---|
| Data String: | that time is the essence |
| Keyword: | the |

This process will continue to repeat until the match is found, at which point the character string will have been shifted to the position set forth below:

| Comparisons: | 31121211111114 |
|---|---|
| Data String: | that time is the essence |
| Keyword: | the |

Note that this particular example required 21 comparisons to find the keyword "the" in the character string "that time is the essence." In particular, four comparisons were required even where the keyword matched the same word in the character string (the blank space required one comparison).

In other computer applications it is desirable to test bit patterns for the presence of a particular bit string. Examples of such applications are encryption and decryption algorithms used to scramble and unscramble binary information to protect it from unauthorized reception. Such algorithms are often used in the intelligence field to protect highly classified information from being intercepted and used by foreign countries having adverse interests. These algorithms are also used by corporations to safeguard their valuable commercial information and trade secrets.

In general, these encryption and decryption algorithms may perform similar search and replace operations as described above in connection with word processing programs. In addition, it would be desirable to be able to perform operations on strings of binary information that are not an integral number of bytes long, for example, a string of five bits. Processors such as those described above in connection with word processing programs do not even have this capability since they shift strings of eight bits, or one byte, at a time. Even if such processors had the capability to shift strings of data one bit at a time, their use as described above on strings of bits would be even slower due to the large number of comparisons that would be necessary. As an example, assume that the bit string "11001110011011" is to be searched for the presence of the keyword "1101." Initially, as described above, the first bit of the keyword would be compared to the first bit in the bit string as set forth below:

| Bit String: | 11001110011011 |
|---|---|
| Keyword: | 1101 |

The processor would need to make four comparisons before it could determine that the four bits in the keyword do not match the first four bits in the bit string. Again, as described above, the processor would then shift the bit string relative to the keyword string as set forth below and compare the respective bits again:

| Comparisons: | 4 |
|---|---|
| Bit String: | 11001110011011 |
| Keyword: | 1101 |

Again, the "4" above the first "1" in the bit string means that four comparisons were required in order to determine that the keyword did not match. After the keyword was shifted as shown above, two comparisons would be required to test the next portion of the bit string. As shown below, 22 comparisons would be needed to find the portion of the bit string that matched the keyword.

| Comparisons: | 4211242114 |
|---|---|
| Bit String: | 11001110011011 |
| Key Word: | 1101 |

A greater number of comparisons are required overall in bit searching than are required in byte or character searching since it is more likely that a pair of bits each having one of two possible values will match than a pair of letters each having one of 26 possible values. Thus, a processor performing operations on bit strings in this manner would have an unduly large amount of computing overhead.

SUMMARY OF THE INVENTION

The present invention comprises a portion of a computer system for comparing a number of bytes simultaneously. The parallel processor of the present invention includes a first register for receiving bytes of data, a second register for storing a number of copies of a byte representing a selectable control or reference character and a comparison circuit for simultaneously comparing the data in the two registers to determine whether any of the bytes in the first register are equal to the bytes representing the control character in the second register, and generating control bits which are in a first state if the corresponding byte in the first register is equal to the control character in the second register, and in a second state when the corresponding byte in the first register is not equal to the control character in said second register.

The parallel byte processor has the ability to branch to a predetermined memory location if any of the byte pairs being simultaneously compared are equal. If any byte of data in the first register is equal to the bytes comprising the control characters in the second register, the microcode instruction branches or proceeds to a predetermined memory location.

If no control character is located in the data in the first register, the instruction branches or proceeds to a second predetermined memory location. Thus, a number of bytes may be moved and checked for control characters with a single instruction, thereby substantially reducing the processing time. In an exemplary embodiment of the present invention, eight bytes of data are simultaneously compared.

Another aspect of the invention is directed towards a novel parallel bit and byte string processor for a minicomputer. In its byte mode, the processor stores a portion of a string of bytes that is to be tested for the presence of a desired keyword in a first register location and stores the keyword in a second register location. Instead of testing the portion of the byte string one byte at a time, the processor simultaneously tests each byte in the keyword with a respective byte in the byte string. Thus, only a single comparison is required to determine whether the keyword is present in any portion of the byte string. If the keyword is not present in the portion of the byte string tested, then the processor shifts the byte string with respect to the keyword and then makes a single comparison of the keyword with the new portion of the byte string. This single-compare-and-test process continues until either the keyword is found or the end of the byte string is reached. As a result of simultaneously testing each byte in the keyword with a respective byte in the byte string, the processing time is kept to an absolute minimum.

In its bit mode of operation, the processor stores a portion of a bit string that is to be tested for the presence of a desired string of bytes in a first register location and the desired keyword in a second register location. The processor simultaneously tests each bit in the keyword with a respective bit in the bit string. As a result of this simultaneous testing, only one comparison is needed to determine whether the keyword is present in the portion of the bit string being tested. If the keyword is not present, the bit string is shifted one bit relative to the keyword and a single comparison of the keyword with the new portion of the bit string is made. This process continues until the keyword is found or until the end of the bit string is reached. Because each bit in the keyword is simultaneously tested with a respective bit in the bit string, only a single comparison is required to determine whether the keyword matches a portion of the bit string, and as a result, processing time is minimized.

Another feature of the invention is the capability of the processor to automatically function either as a parallel bit processor or as a parallel byte processor. When the processor is given a first control signal, the processor functions as a parallel byte processor, and when the processor is given a second control signal, the processor functions as a parallel bit processor. As a result, two separate processors are not required, thus resulting in cost saving that a separate processor would otherwise entail.

Another aspect of the present invention is a set of novel instructions that are particularly useful for testing the outputs of byte comparisons. One such instruction finds the location of the first byte (i.e., most significant) in a first data word that is identical to the corresponding byte in a second data word. A similar instruction finds the location of the first byte in the first data word that does not match the corresponding byte in the second data word. A third instruction finds the first byte in the first data word that matches the corresponding byte in the second data word so long as the matching byte is less significant than a byte in the first data word that does not match the corresponding byte in the second data word. A fourth instruction finds the first byte in the first data word that does not match the corresponding byte in the second data word so long as the matching byte is less significant than a byte in the first data word that matches the corresponding byte in the second data word. The processor includes novel circuitry to implement these instructions.

In particularly preferred embodiments, the processor includes a replication instruction and associated circuitry that duplicates a single input byte into all the bytes of a multiple byte data word. The replication instruction is particularly useful for comparing an input data string to a predetermined control character or other delimiter. An improved replication circuit operates on data words in memory and replicates one or more bytes in selected positions in a memory word or two memory words.

A switch on first hit and a switch on first miss instruction provide the capability to branch to a selected location based upon the location of the first hit or the location of the first miss.

A set of instructions are included that clear selected portions of a data word based upon the location of a first hit or the location of a first miss.

A pair of instructions are included to clear a hit register that determines the first hit or the first miss so that processing can occur on additional bytes in a data word associated with the data in the hit register.

These and other objects, features, and advantages of this invention will be apparent in view of the following detailed description of several preferred embodiments, which are explained with reference to the figures, a brief description of which is provided below.

BRIEF DESCRIPTION OF THE DRAWINGS

FIG. 4 is a representative instruction sequence of the parallel byte comparison processor;

FIG. 19 illustrates a detailed block diagram of the rotate/replicate circuit showing the interconnections of the bits to the programmable logic devices;

FIGS. 23a and 23b illustrates a first register containing a portion of an input data stream and a second register containing replicated copies of a character representing a space;

FIG. 24 illustrates the first register of FIG. 23 showing the effect of the Clear Data From First Hit instruction on the data in the first register;

FIG. 25 illustrates the first register of FIG. 23 showing the effect of the Clear Data To First Hit instruction on the data in the first register;

FIG. 26 illustrates the first register of FIG. 23 showing the effect of the Clear Data First Hit instruction on the data in the first register;

FIGS. 27a and 27b illustrate a first register containing a portion of an input data stream and a second register containing replicated copies of a character representing a space;

FIG. 28 illustrates the first register of FIG. 27 showing the effect of the Clear Data From First Miss instruction on the data in the first register;

FIG. 29 illustrates the first register of FIG. 27 showing the effect of the Clear Data To First Miss instruction on the data in the first register;

FIG. 30 illustrates the first register of FIG. 27 showing the effect of the Clear Data First Miss instruction on the data in the first register;

FIG. 34 illustrates the data pattern within the pattern generator of FIG. 33.

DETAILED DESCRIPTION OF SEVERAL PREFERRED EMBODIMENTS

Figure 1:
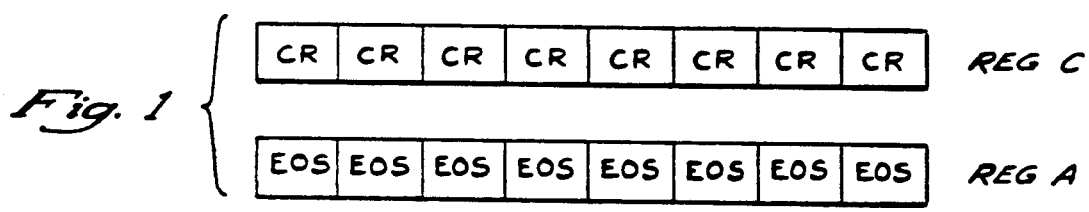
FIGS. 1 and 2 are block diagrams of two registers of the parallel byte comparison processor.
Figure 2:
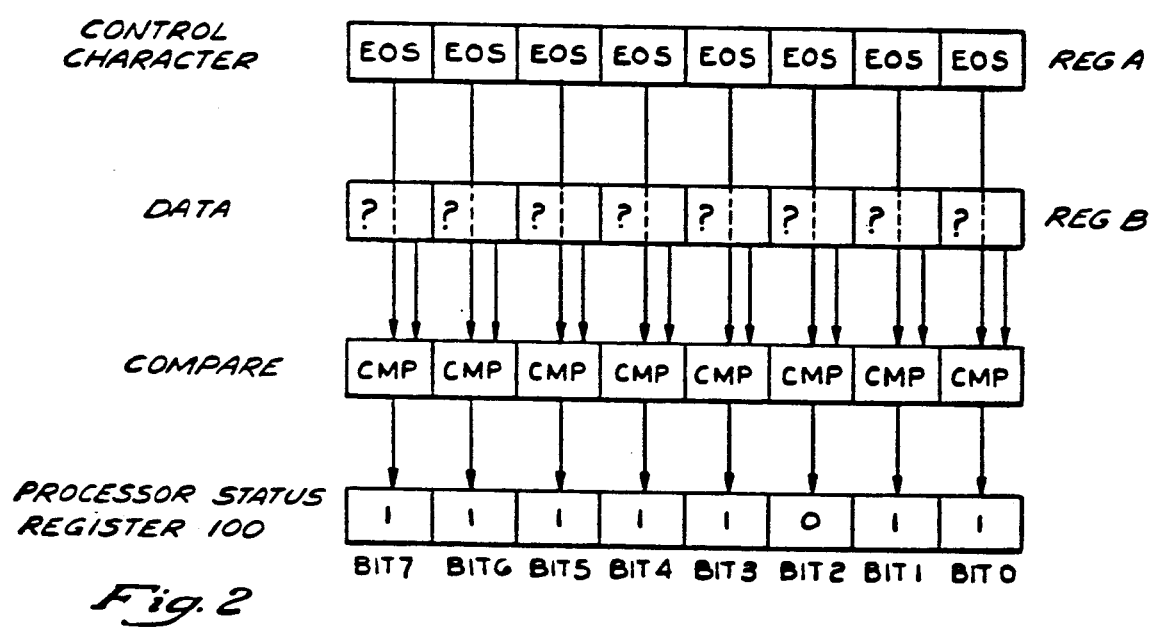

Referring to FIG. 1, a selected control character, such as "EOS" (end of sector), is loaded into a Register A. Referring to FIG. 2, an 8-byte (64-bit) data string is loaded into a Register B and compared to the "EOS" reference characters in Register A in order to determine whether there are any "EOS" characters in any byte of the data string in the Register A. The results of the comparison, whether any particular byte of Register A matches the corresponding byte in Register B, is stored in a Processor Status Register 100 (also referred to as the "hit register").

It will be appreciated that with the present invention, any number of bytes may be simultaneously compared, the number depending on the particular computer system utilized. In the preferred embodiment discussed herein, the computer is a 64-bit machine; therefore, 8 bytes are simultaneously compared to determine whether they contain a control character.

Figure 3:
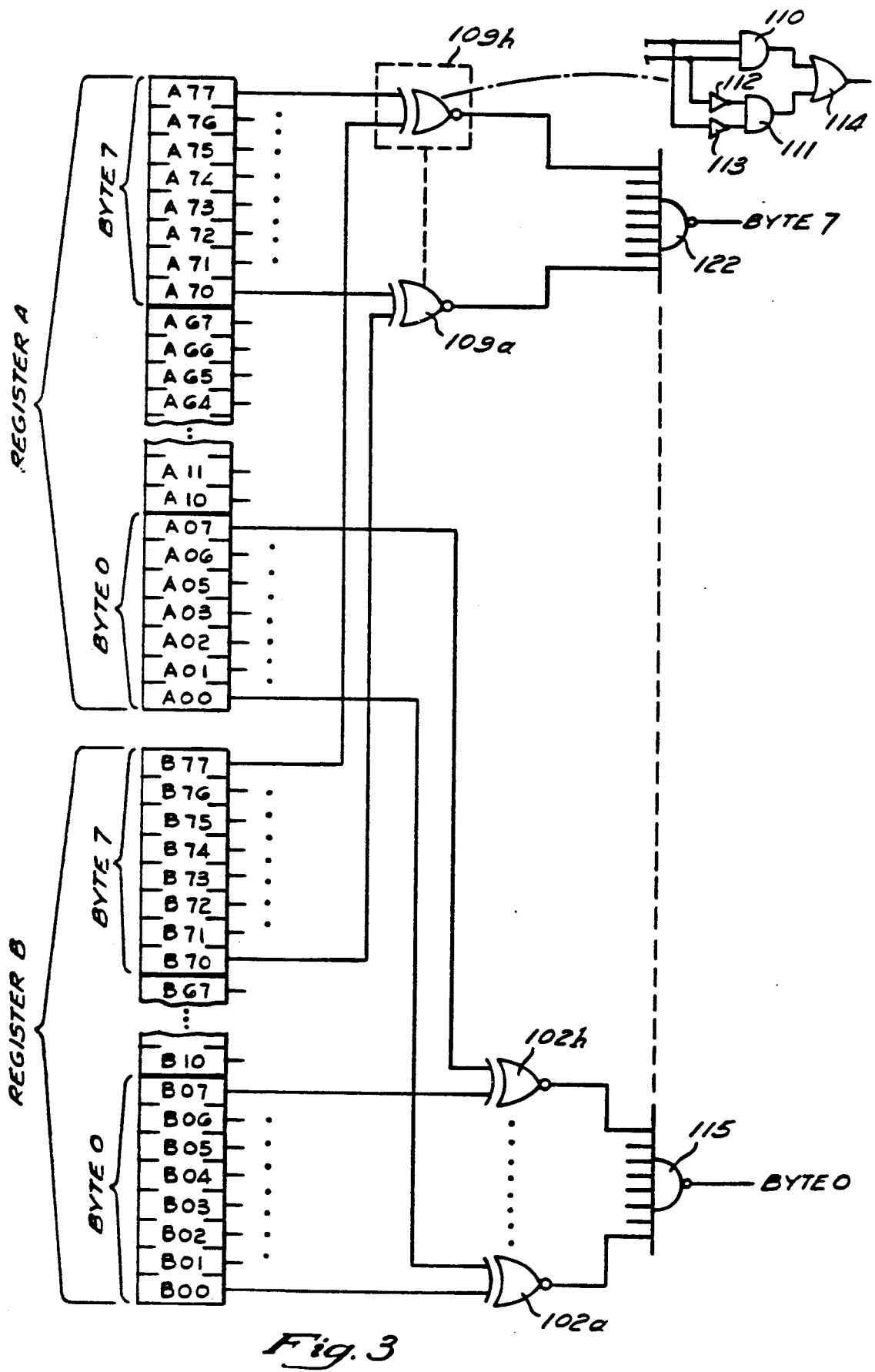
FIG. 3 is a circuit diagram of the comparison circuit of the parallel byte comparison processor.
Figure 5:
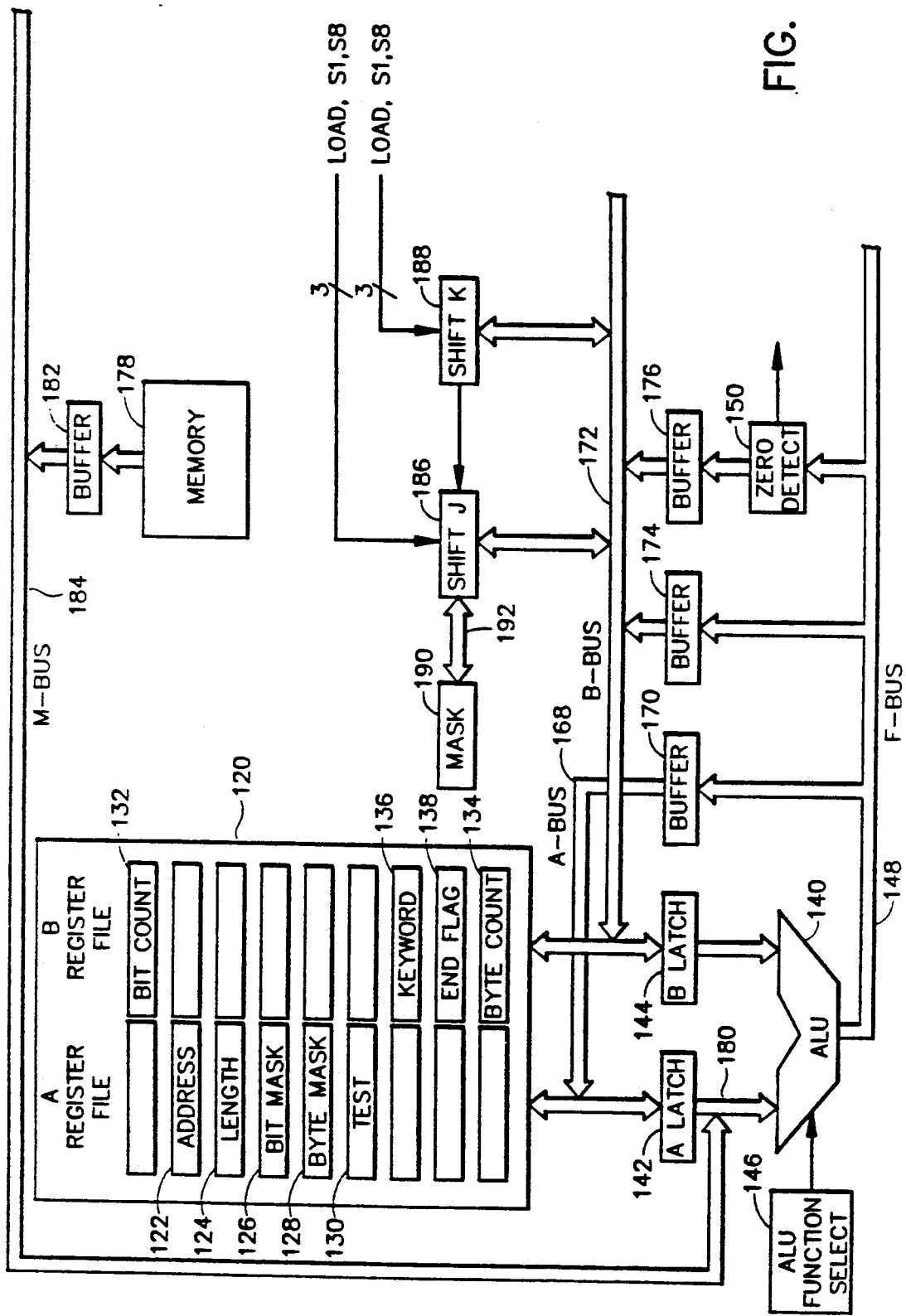
FIG. 5 is a schematic circuit diagram of a parallel string processor in accordance with the invention.

Each bit in the data string in the Register B is compared to the bits comprising the control characters in Register A. This is shown in more detail in FIG. 3, wherein each bit of each byte 0-7 in the Register B is compared with the corresponding bit of each corresponding control character byte 0-7 in the Register A, utilizing "exclusive-NOR" circuits 102-109, one "exclusive-NOR" circuit associated with each bit pair. It should be understood, however, that FIG. 3 is a functional diagram to illustrate the invention. In the actual embodiment, an arithmetic logic unit (ALU) is utilized to perform the exclusive-OR function as shown in FIG. 5 and discussed in further detail hereinafter. In FIG. 3, only the exclusive-NOR circuits 102a and 102h corresponding to byte 0, bit 0 (the least significant bit) and byte 0, bit 7 respectively, and 109a and 109h corresponding to byte 7, bits 0 and 7, respectively are shown. It should be understood, however, that there are 64 such exclusive-NOR circuits. In addition, only the portions of Registers A and B containing bytes 0 and 7, corresponding to the least significant bytes and most significant bytes, respectively, are shown in FIG. 3. The designations within Registers A and B denote the register, the byte number and the bit within the bytes. For example, "A67" refers to bit 7 of byte 6 of the Register A.

The components of the exclusive-NOR circuit 109 are also shown in FIG. 3 as comprising first and second AND gates 110 and 111, first and second inverters 112 and 113, and OR gate 114. The bit pairs, for example, A77 and B77, are input to the AND gate 110. The bits A77 and B77 are also inverted by inverters 112 and 113, respectively, and are input into the second AND gate 111 of the exclusive-NOR circuit. The output of the first AND gate 110 and the output of the second AND gate 111 are input to the OR gate 114. The output of each OR gate is provided as an input to one of eight 8-input NAND gates 115-122 (the NAND gates 116-121 are not shown). There is one 8-input NAND gate for each byte being compared. The output of any of the 8-input NAND gates 204-210 will be low or logical "0" only when all eight bits being compared are equal and thus will indicate that the particular byte pair is equal to each other (e.g., when all the bits A00-A07 of the Register A are equal to the corresponding bits B00-B07 of the Register B, the output of the 8-input NAND gate 115 will be low).

The output of NAND gates 115-122 are stored in the Processor Status Register 100 or "hit" register (FIG. 2). An instruction (BAH) causes the system to branch or proceed to a predetermined memory location when any of the bits in the Processor Status Register 100 indicate that any of the eight bytes being compared are equal. Alternatively, if there are no bits in the Processor Status Register 100, indicating that no byte pairs match and no control character was found, the system proceeds to execute the instruction found in the next sequential memory location in the control memory of the processor. If a hit occurs, the location of the particular bytes which do match can be determined by looking at which bits of the Processor Status Register 100 indicate a match.

For example, if byte 2 of the Register A is equal to byte 2 of the Register B, bit 2 in the Processor Status Register 100 will be zero, indicating that the byte 2 pair matches.

FIG. 4 shows a representative instruction sequence. The left column corresponds to the line number in the control program of the processor. The instruction at line 80 causes the control character being compared to be loaded into the Register A. The instruction at line 82 causes the loading of Register B with the first eight bytes of data (data word 1, indicated as "DATA1" in FIG. 4). The instruction at line 84 performs the multibyte "exclusive-NOR" operation of the present invention on the data in the Register B and the Register A. The instruction at line 86 causes the system to branch to a memory location 400 if any of the bits in the Processor Status Register 100 (FIG. 2) are zero indicating that a match was found between the Registers A and B. At memory location 400, which is executed if a hit is found, is the beginning of a routine which examines the bits of the Processor Status Register 100 to determine the location of the characters within data word 1 which match the control character "EOS" for example.

Then at line 88, Register A is loaded with a second control character and at line 90 the exclusive-NOR operation is performed to determine whether the second control character is present in any of the eight bytes of data in DATA1. If the second control character is found in DATA1, then at line 92 the program branches to memory location 400.

When there are no control characters found in the data, the instruction at line 94 is executed and the data in Register B is stored in a buffer. Thereafter, the system proceeds to execute the instruction at line 80 and the process described above repeats. Thus, eight bytes are checked for two different control characters with only two compare cycles in contrast to the 16 compare cycles required in prior art machines.

A "branch on no-hits" may be utilized as an alternative to the "branch on any hit" instruction, which branches to a memory location if none of the bytes in the data word contain the control character.

When the data is checked for more than one set of characters, the Register A may be reloaded with the characters for each compare sequence. However, to increase the execution speed, reloading the register may be avoided by various methods known to those skilled in the art. An n-to-1 multiplexer may be substituted for the Register A, where n is the number of character sets to be searched for in the data. For example, if the data is to be searched for two sets of characters, "EOS" and "CR," a 2-to-1 multiplexer may be utilized, with the registers containing "EOS" and "CR" serving as input to the multiplexer.

In the preferred embodiment, the architecture of the CPU permits the selection of the desired register for input to the exclusive-NOR circuit. Instructions cause the CPU to route the contents of the selected register to the exclusive-NOR circuit. Alternatively, tri-state devices may be utilized.

In the actual embodiment, an arithmetic logic unit (ALU) 140 is utilized to perform the exclusive-OR function. Referring to FIG. 5, the End of Sector (EOS) or other control characters are loaded into the A register file. The data which is to be searched for the End of Sector flag is loaded in register B via the B bus 172. The EOS flag is input to the ALU 140 through the A latch 142 and the data to be compared to determine whether it contains "EOS" characters is input to the ALU 140 through B latch 144. The ALU 140 compares each bit of input from the A register to the corresponding bit of input from the B register. For each matching bit pair, the ALU 140 will generate a zero on the respective output line. The output of the ALU 140 is input to the zero detect circuit 150 (which comprises 8-input NOR gates) via the F bus 148. The zero detect circuit 150 determines whether all of the bits within a byte are zero. If all of the bits within a particular byte are zero, a one is generated by the zero detect circuit 150 indicating that a particular byte from the A register matches the byte from the B register. The foregoing embodiment utilizes inverse logic from the illustrative circuit shown in FIG. 3. In the circuit shown in FIG. 3, a zero is generated when the byte pairs match.

A parallel string processor in accordance with another aspect of the invention is shown in FIG. 5. The processor includes a dual register file 120 comprising an A register file and a B register file. Although only nine registers are shown in each register file, each register file 120 includes 1024 registers, and may include more if desired. In this embodiment, the processor of FIG. 5 is for a 64-bit minicomputer, and so each of the registers in the A and B register files is 64 bits, or eight bytes, wide. The A register file is shown to include an address register 122, a length register 124, a bit mask register 126, a byte mask register 128, and a test register 130. The address register 122 is used to store the address of a data string, either a bit string or a character string, that is to be searched by the processor for a particular keyword. The length register 124 is used to store the length of the portion of the data string that remains to be tested. The bit mask register 126 is used to store a desired pattern of bits that is used to mask the keyword. For example, the bit mask register 126 might be used to ignore capital letters so that the processor would consider the letter "a" to be equivalent to the letter "A." The byte mask register 128 contains a desired pattern of bytes used to mask the keyword. For example, the byte mask register 128 might be used to ignore the second letter of a word so that the processor would equate the word "string" with "spring." The test register 130 contains the desired keyword after it has been masked with the desired byte mask.

The B register file contains a bit count register 132 and a byte count register 134 which, as is explained in more detail hereinafter, determine when the next portion of the data string being tested for the presence of the keyword needs to be fetched from memory. A keyword register 136 contains the binary data string corresponding to the desired keyword, and the end-of-string (END) flag register 138 contains a flag that indicates whether or not a data string has been completely searched for the presence of a desired keyword.

The A and B register files are connected to an arithmetic logic unit (ALU) 140 through an A latch 142 and a B latch 144, respectively. The ALU 140 is a conventional arithmetic logic unit, which in this embodiment may include SN54LS381A ('381), SN54LS382 ('382), or similar integrated circuit chips commercially available from Texas Instruments of Dallas, Texas. The arithmetic logic unit 140 performs various operations on the data supplied to its dual data inputs, depending upon the combination of binary signals supplied to its control inputs by an ALU function select circuit 146. For example, when the ALU 140 receives a particular combination of control inputs, the ALU 140 adds its two data inputs. In response to a different combination of its control inputs, the ALU 140 performs an exclusive-or operation on its data inputs.

The A and B register files are designed so that at any time, the binary information stored in each register is equal to the binary information stored in its adjacent register so that the A register file is a copy of the B register file, and vice-versa. This register organization speeds up the operation of the processor. In order to perform an operation on two operands, one operand must be transmitted to the A latch 142 and the other to the B latch 144. If there were only an A register file, the processor would require an extra cycle to perform any given ALU operation.

Figure 7:
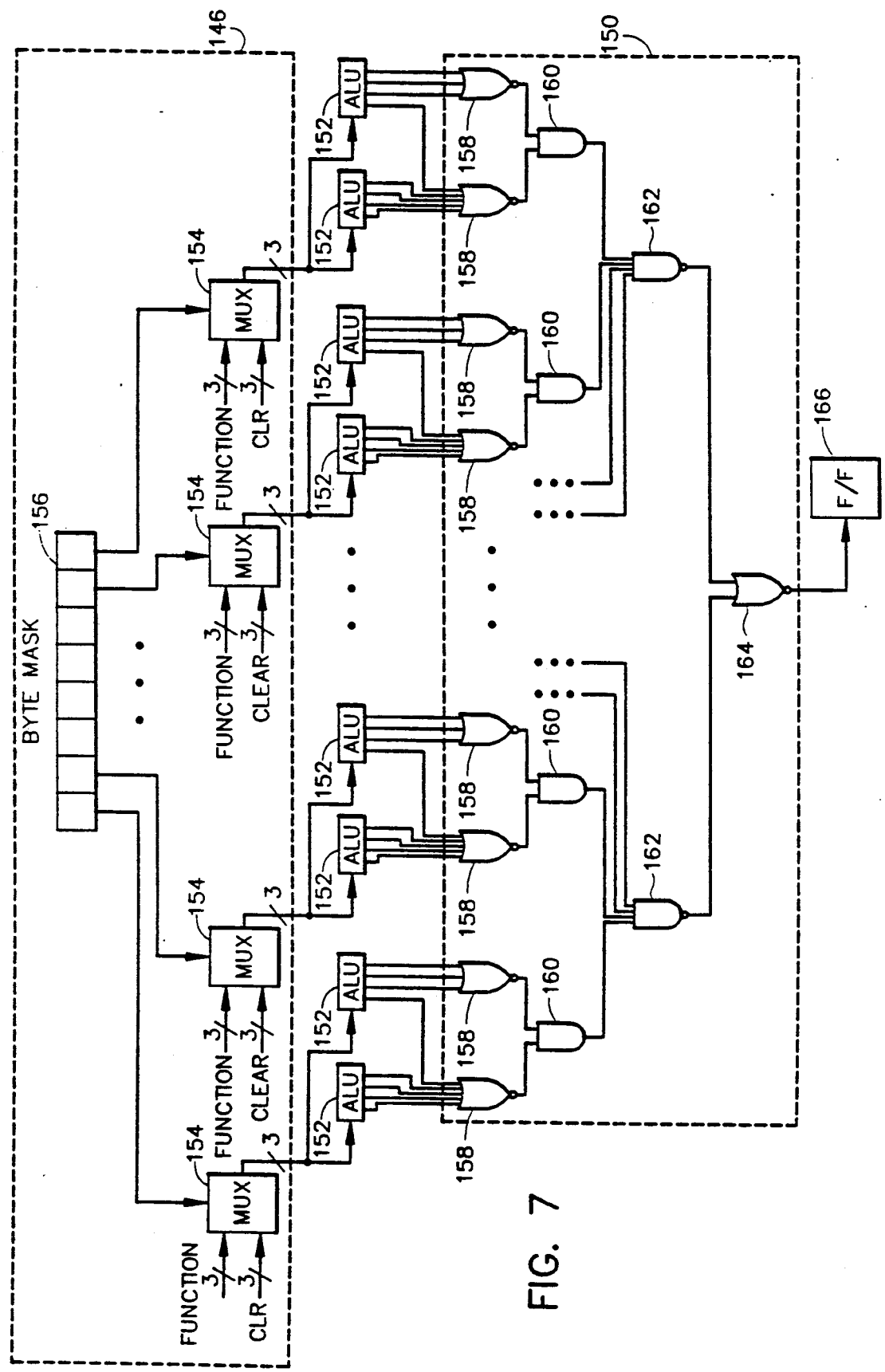
FIG. 7 is a detailed circuit diagram of a portion of the parallel string processor of FIG. 5.

The output of the ALU 140 is connected via an 64-bit-wide F-bus 148 to a zero-detect circuit 150 which detects when all the outputs of the ALU 140 are zero. The ALU 140, ALU function select circuit 146, and zero detect circuit 150 are shown in detail in FIG. 7. The ALU function select circuit 146 is shown functionally (in dotted lines) for purposes of explaining the invention. In reality, the function select circuit 146 is implemented with programmable array logic integrated circuits commercially available from Monolithic Memories, Inc. of Santa Clara, California, that are programmed with many equations that do not facilitate explanation. These equations are, however, included in this specification as Appendix 1, and they completely describe the actual embodiment of the ALU function select circuit 146.

The ALU comprises 16 separate, 4-bit '381 integrated circuit chips 152. For purposes of clarity, the data inputs of the ALU chips 152 that are connected to the A and B latches 142, 144 have been omitted from FIG. 7, and only the outputs of the chips 152 are shown. Each pair of the chips 152 is connected to a respective multiplexer 154 which supplies the control inputs for the chips 152. Each of the multiplexers 154 either supplies a desired 3-bit FUNCTION signal or a 3-bit CLEAR signal to the control inputs of the pair of chips 152 to which it is connected, depending upon the value of its address signal sent from a register 156 which stores the 8 bits of the byte mask. As explained above, the byte mask causes the processor to ignore certain bytes in the data string being searched so that, for example, the processor would equate the keyword "string" with the word "spring" in the data string, in which case the second bit of the byte mask would be set to logic "1" so that the "p" in "spring" is ignored. Similarly, if it were desired that the fourth letter of a word were to be ignored, the fourth bit of the byte mask would be set to logic "1." The multiplexers 154 either supply a specified FUNCTION signal or a CLEAR signal to the chips 152, depending upon whether the value of the particular bit of the byte mask in the register 156 is logic "1" or "0." If the bit in the byte mask is logic "0," the desired 3-bit FUNCTION signal is transmitted, and if the bit in the byte mask is logic "1," the 3-bit CLEAR signal is sent, which causes the outputs of the ALU chips 152 to which it is connected to be forced to logic "0."

The zero detect circuit 150 comprises 16 NOR gates 158 connected to receive the outputs of the ALU chips 152. The outputs of the NOR gates 158 are connected to eight AND gates 160, which in turn are connected to a pair of NAND gates 162 which are connected to a NOR gate 164. If all outputs of the ALU chips 152 are logic "0," then it can be seen that the outputs of the NOR gates 158 will be forced to logic "1," which forces the outputs of the AND gates 160 to logic "1," the NAND gates 162 to logic "0," and the NOR gate 164 to logic "1." Thus, the output of the NOR gate 164 will be logic "1" only when all the outputs of the ALU chips 152 are logic "0." As set forth below, when the keyword matches a portion of the data string to which it is being compared using the exclusive-or function, all the ALU chip outputs will be logic "0," so that in essence a logic "1" output of the NOR gate signals a match. This logic "1" output is supplied to a flip-flop 166 which can then be checked to determine that there was a match.

The particular logic gates used in the zero detect circuit 150 are not important to the invention since other circuits could be easily designed to detect that all outputs of the ALU chips were logic "0," such as, for example, a single 64-bit NOR gate.

Referring now to FIG. 5, the F-bus 148 is connected to an A-bus 168 via a buffer 170 and a B-bus 172 via another buffer 174. The zero-detect circuit 150 is coupled to the B-bus 172 through a buffer 176. A memory 178 is connected to the bus 180 that connects the output of the A latch 142 to the ALU 140 through a buffer 182 connected to an M-bus 184. Because this embodiment is for a 64-bit minicomputer, the A-bus 168, the B-bus 172, and the M-bus 184 are also 64 bits wide. A pair of serially connected -64-bit shift registers, comprising a J shift register 186 and a K shift register 188, are connected to the B-bus 172. A mask register 190 is connected to the J shift register 186 via a mask bus 192. As is explained in more detail below, these shift registers are used to store portions of the data string to be tested for the presence of a desired keyword.

A trio of control signals is supplied to each of the two shift registers 186, 188. A LOAD signal causes the register to which it is attached to be parallel-loaded with a portion of a data string. The data is loaded into the registers 186, 188 from the memory 178 through a data route consisting of the ALU 140, the F-bus 148, the buffer 174, and the B-bus 172. A second signal S1 causes its respective shift register to be shifted left one bit, and a third signal S8 causes its respective shift register to be shifted left eight bits, or one byte.

Figure 6:
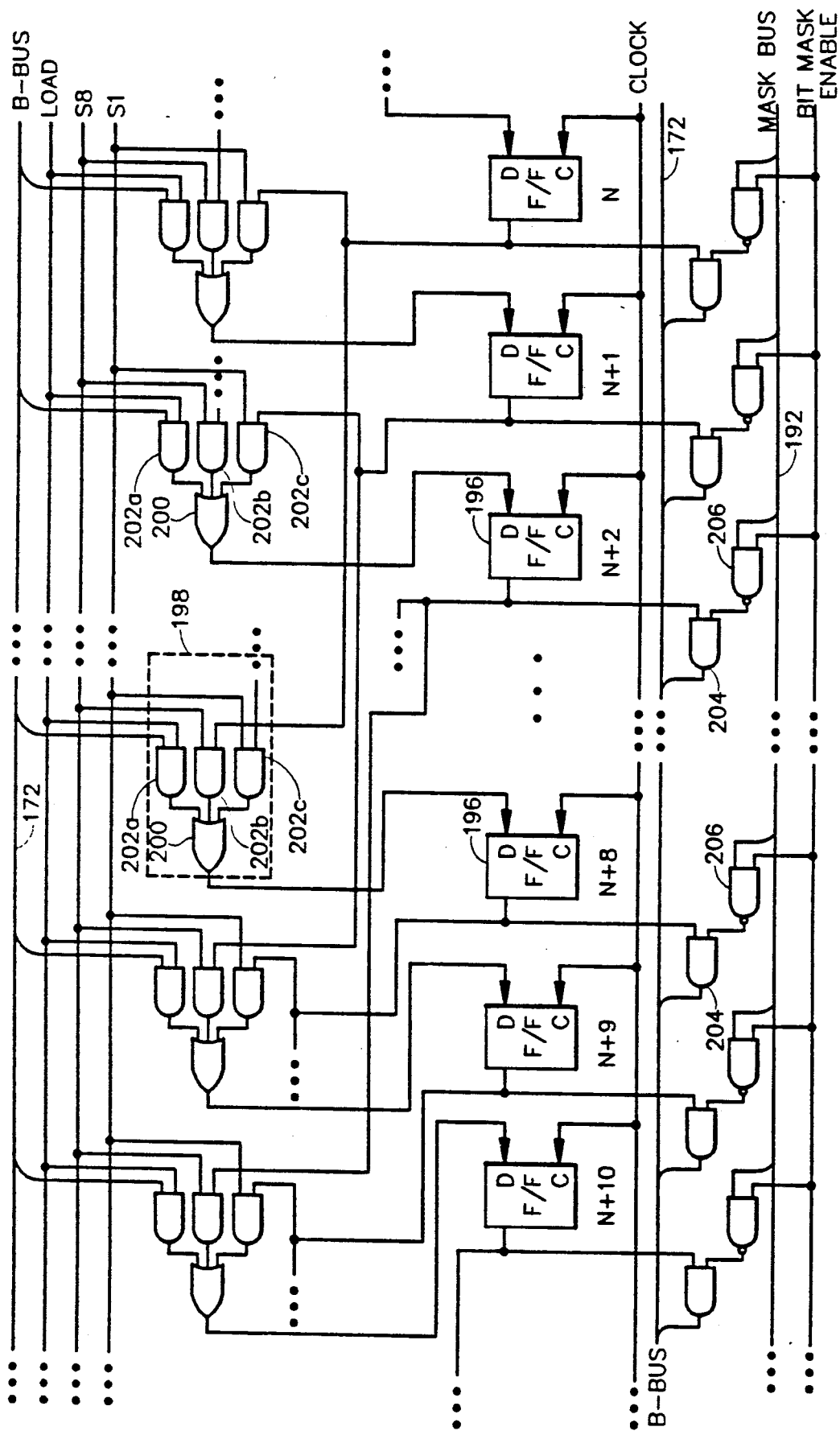
FIG. 6 is a detailed circuit diagram of a portion of one embodiment of a shift register in accordance with the invention.

FIG. 6 is a portion of a substantially functional equivalent of the J shift register 186 used for purposes of explaining the invention. The actual embodiment of the J and K shift registers 186, 188 comprises specially programmed conventional programmable array logic integrated circuits commercially available from Monolithic Memories, Inc. of Santa Clara, California, and the equations used to program these integrated circuits are included in this specification as Appendix 2 and completely describe the actual embodiment of the J and K shift registers 186, 188.

Referring now to FIG. 6, a portion of the J shift register 186 consisting of logic gates and flip-flops 196 is shown. Although only six flip-flops 196 are shown, the J shift register 186 is 64 bits wide and thus includes 64 serially connected flip-flops 196. In FIG. 6 the flip-flops 196 are numerically ordered, with the rightmost flip-flop being the Nth flip-flop, the flip-flop to the left of the Nth flip-flop being the (N+1)st flip-flop, etc. Each of the flip-flops 196 has a data input D connected to the output of a logic circuit 198 and a clock input C connected to receive a CLOCK signal that controls the speed of operation of the shift registers 186, 188.

The logic circuits 198 control the loading and shifting operations of the flip-flops 196 Each of the logic circuits 198 comprises a three-input OR gate 200 and three two-input AND gates 202. One of the AND gates 202a has a first input connected to one of the 64 lines of the B-bus 172 and has its second input connected to the LOAD signal. This AND gate 202a in each of the logic circuits 198 causes the flip-flop to which it is connected to be loaded with the binary value of the B-bus 172 when the LOAD signal is activated, which occurs when the LOAD signal is logic "1." In this state, the output of the AND gate 202a, which equals the binary value of the B-bus input, is supplied to its respective flip-flop 196 through its OR gate 200. The outputs of the other two AND gates 202b, 202c do not interfere with this loading process since the S1 and S8 signals are forced to logic "0" when the LOAD signal is activated.

After a portion of a data string is loaded into the flip-flops 196 of the shift registers 186, 188, the portion is periodically shifted either one bit or eight bits at a time, depending on whether the processor is performing a bit-by-bit comparison or a byte-by-byte comparison. If bit comparisons are being performed, the S1 signal is activated to logic "1" while the LOAD and S8 signals remain at logic "0." Each AND gate 202c to which the S1 signal is supplied has its other input connected to the output of the first upstream flip-flop, "upstream" meaning the direction from which data is being shifted. In FIG. 6, data is being shifted from right to left, and thus with respect to any particular flip-flop or other circuit element, the first "upstream" flip-flop is the first flip-flop to the right of the circuit element and the first "downstream" flip-flop is the first flip-flop to the left of the circuit element. Thus, when the S1 signal is activated, the output of the AND gate 202c to which it is connected is equal to the output of the upstream flip-flop. Since the output of the AND gate 202c is passed through its respective OR gate 200 to the input of the downstream flip-flop, the activation of the S1 signal causes the shift registers 186, 188 to perform a one-bit logical left shift on the portion of the data string stored therein.

The activation of the S8 signal causes an eight-bit, or one-byte, logical left shift to be performed by the shift registers 186, 188. Each AND gate 202b to which the S8 signal is connected has its other input connected to the output of the eighth upstream flip-flop so that when the S8 signal is logic "1," the output of each of the flip-flops 196 is passed to the eighth respective downstream flip-flop so that the portion of the data string is shifted eight bits to the left.

Another portion of the J shift register 186 performs a bit mask operation so that any desired bits of the string being searched may be ignored. For example, as described above, it might be desirable to ignore capital letters so that the processor would consider the letter "a" to be equivalent to the letter "A." To this end, the output of each of the flip-flops 196 is supplied to one input of a two-input AND gate 204 having its other input connected to receive the output of a NAND gate 206. One input of the NAND gate 206 is connected to receive a respective bit of the bit mask from the mask register 190 connected to the J shift register 186 via the mask bus 192. The NAND gate 206 is also connected to receive a BIT MASK ENABLE signal that selectively activates or deactivates the bit mask operation. In particular, when the BIT MASK ENABLE signal is logic "0," the outputs of all of the NAND gates 206 are forced to logic "1" so that the outputs of the AND gates 204 equal the output of the flip-flops to which they are connected and are not affected by the outputs of the NAND gates 206. However, when the BIT MASK ENABLE signal is logic "1" and the corresponding mask input bit is also logic "1," the output of the NAND gate 106 is forced to logic "0," and as a result, the output of the AND gate 204 is also forced to logic "0." This operation thus causes logic "0"s to be placed in each bit of the data string which is to be ignored by the processor. As is described in more detail below, each of these logic "0"s causes a forced match when the masked portion of the data string is compared to the keyword string by the processor. Finally, the output of each of the AND gates 204 is connected to the B-bus 172 so that the masked or unmasked portion of the data string stored in the shift registers may be supplied to the ALU 140 for comparison to the keyword string.

The particular logic used for the masking functions is not important, and alternative logic could be used. For example, selected bits in a bit string could be masked off if the corresponding bits in the bit mask were logic "0" instead of logic "1" if the NAND gates 206 were replaced with OR gates, in which case the bit mask enable signal would be activated when logic "0" instead of logic "1."

The functional circuit diagram of the K shift register 188 is substantially identical to the diagram of the J shift register 186 shown in FIG. 6, except that the AND gates 204 and the NAND gates 206 used in connection with the bit mask and the BIT MASK ENABLE signal are not required since only the output of the J shift 186 register is sent to the ALU 140 for comparison to the keyword, as is explained in more detail below.

In its byte mode of operation, the processor compares a selected string of bytes to determine the presence of a selected keyword. Both the byte string and the keyword are selectable by the user of the processor. The basic process by which the processor tests for the presence of a selected keyword string within a selected data string includes initially loading the J and K shift registers 186, 188 with the first portion of the data string to be tested. Then, the entire contents of the J shift register 186 are simultaneously compared with the keyword stored in the test register 130. If there is a match, the presence of a match is indicated by the processor. Then, the contents of the J and K registers 186, 188 are shifted left one byte and the contents of the J register 186 are again compared with the contents of the test register 130. Any match is indicated, and the process is repeated Periodically, the K register 188 will become empty since its contents are gradually shifted into the J register 186, and so the K register will be periodically reloaded with the next portion of the data string to be tested. In this manner, the entire keyword is simultaneously compared with a corresponding portion of the data string. This process reduces the number of comparisons required as shown by the example shown below, in which the keyword is "the," the data string is "that time is the essence," and each number above the data string represents the number of comparisons that were required to determine whether or not the keyword matched that particular portion of the data string:

| Comparisons: | 1111111111111 |
| --- | --- |
| Data String: | that time is the essence |
| Keyword: | the |

Note that this particular example required 14 comparisons to find the keyword "the" in the character string "that time is the essence" in contrast to the 21 comparisons that were required by a conventional data string processor as shown above. This reduction results from the entire keyword simultaneously being compared with a portion of the data string, instead of being compared one byte at a time.

Figure 8:
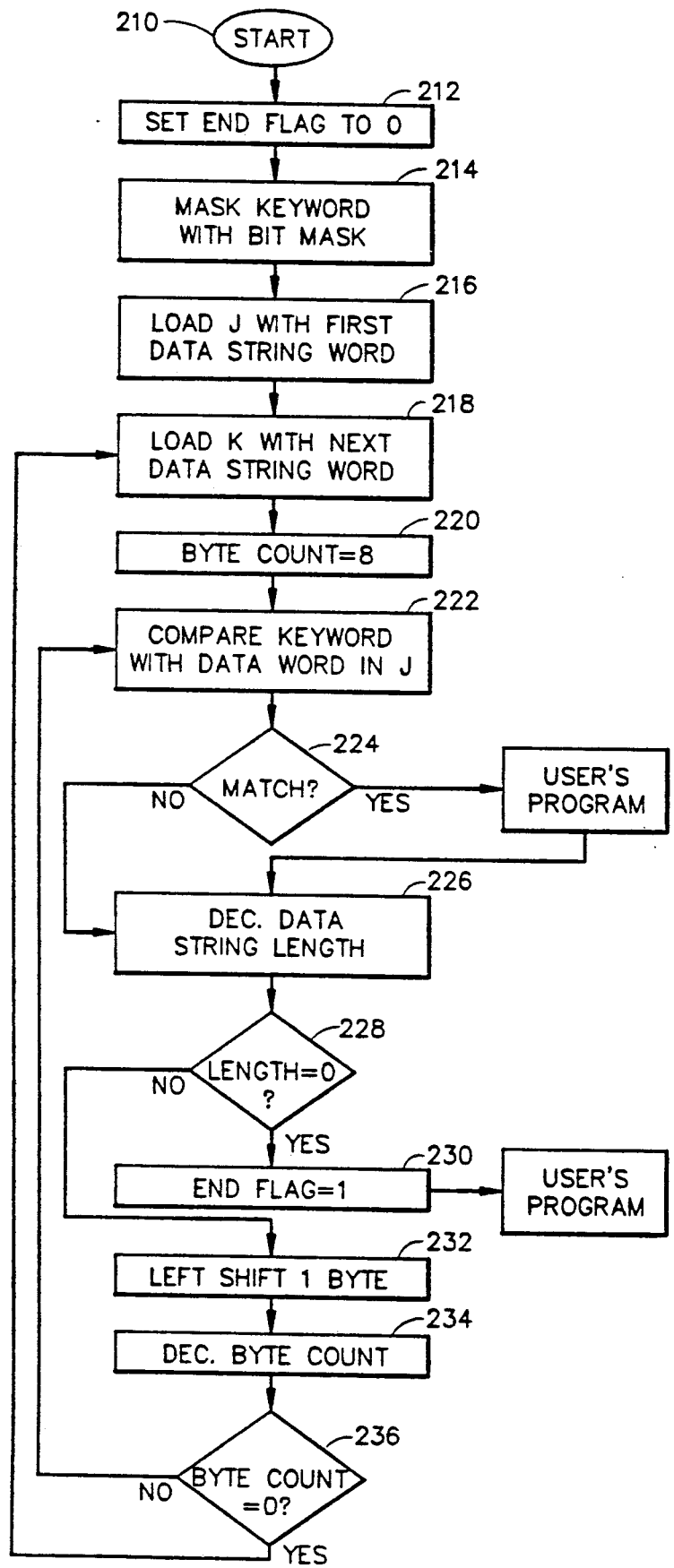
FIG. 8 is a detailed flowchart of the operation of the parallel processor of FIG. 5 in its byte mode of operation.

The detailed operation of the byte mode of the processor is explained with reference FIG. 8 and Table 1. FIG. 8 is a flowchart of the microcode that controls the operation of the processor shown in FIG. 5, and Table 1 includes a software program that is substantially functionally equivalent to the microcode actually used. The operation is explained with reference to Table 1 and not the actual microcode used because the actual microcode would be incomprehensible since it is merely a collection of "1"s and "0"s.

At the start of the byte operation of the processor indicated by the start step 210 of FIG. 8, the binary representation of the keyword is stored in the keyword register 136 in the B register file and the binary representation of the data string is stored in the memory 178. Also, the desired bit mask is stored in the bit mask register 126 and in the mask register 190, the desired byte mask is stored in the byte mask register 128 and in the register 156, the address of the byte string in memory 178 to be searched is stored in the address register 122, and the length in bytes of the byte string being searched is stored in the length register 124.

The value of the end-of-string (END) flag indicates whether or not the data string has been completely searched for the presence of the keyword. At step 212 of FIG. 8, the value of the END flag is reset to indicate that the end of the string has not yet been reached. Then, at step 214, the keyword is masked with the bit mask to ensure that the processor ignores any bits in any desired byte as selected by the user. This step is carried out by instructions 2-5 of Table 1. Instructions 2 and 3 supply the bit mask to one data input of the ALU 140 and the keyword to the other data input. Instruction 4 causes the appropriate control signal to be supplied to

TABLE 1

| 1 | | MOV | #0, ENDFLAG | ;reset end-of-string flag to 0 |
| --- | --- | --- | --- | --- |
| 2 | | MOV | BITMASK, A | ;mask keyword with bit mask |
| 3 | | MOV | KEYWORD, B | |
| 4 | | AND | A, B | |
| 5 | | MOV | ALU, TEST | ;put masked keyword in test register |
| 6 | | MOV | @ ADDRESS, J | ;load J with first 8 bytes of data string |
| 7 | LOADK: | MOV | ADDRESS, A | |
| 8 | | MOV | #8, B | ;increment address to get next 8 bytes |
| 9 | | ADD | A,B | of data string and then load in K |
| 10 | | MOV | ALU, ADDRESS | |
| 11 | | MOV | @ ADDRESS, K | |
| 12 | | MOV | #8, BYTECOUNT | ;K now contains 8 bytes |
| 13 | COMPARE: | MOV | TEST, A | ;compare masked keyword with J |
| 14 | | MOV | J,B | |
| 15 | | XOR | A,B | |
| 16 | | MOV | ALU,ZD | ;zero output? |
| 17 | | BNZ | NOMATCH | |
| 18 | MATCH: | JMP | USERPROGRAM | |
| 19 | | RET | | |
| 20 | NOMATCH: | MOV | #1, B | ;decrement length of data string tested |
| 21 | | MOV | LENGTH, A | by 1 byte |
| 22 | | SUB | A, B | |
| 23 | | MOV | ALU, LENGTH | |
| 24 | | MOV | ALU, ZD | |
| 25 | | BNZ | NEXT | ;data string completely tested? |
| 26 | EOS: | MOV | #1, ENDFLAG | ;set end-of-data-string flag to 1 |
| 27 | | END | | |
| 28 | NEXT: | LLS | BYTE | ;left-shift J, K by 1 byte |
| 29 | | MOV | #1, B | ;decrement # of bytes in K by 1 |
| 30 | | MOV | BYTECOUNT, A | |
| 31 | | SUB | A, B | |
| 32 | | MOV | ALU, ZD | ;if no bytes left in K, get next 8 bytes |
| 33 | | BZ | LOADK | of data string to load in K |
| 34 | | MOV | ALU, BYTECOUNT | |
| 35 | | BR | COMPARE | ;test for match again |

© DAVIN COMPUTER CORP. 1987 the ALU so that its two data inputs are logically "anded" together, and the ALU output, which is the value of the masked keyword, is stored in the test register 130 in the A register file via a data path consisting of the F-bus 148, the F-A bus buffer 170, and the A-bus 168. Thus, any bits of the keyword which are to be ignored by the processor are masked to logic "0," and these masked zero bits will force a match with the corresponding bit position in the data string during subsequent comparisons as is explained in more detail below.

Next, at step 216, the J shift register 186 is loaded with the first word of the data string to be tested, "word" meaning a block of binary data eight bytes long to correspond to the eight-byte width of the J shift register 186. The step 216 is accomplished by instruction 6 in Table 1 which moves the contents of the memory at the address where the data string is stored to the J shift register 186 through a path including the memory buffer 182, the M-bus 184, the ALU 140, the F-bus 148, the F-to-B buffer 174, and the B-bus 172. Next, at step 218, the next word, or eight bytes, of the data string are loaded into the K shift register 188 from the memory 178 in a similar manner by instructions 7-11. Specifically, instructions 7-10 cause the address to be incremented by eight so that the incremented address will point to the next eight bytes of the data string in memory 178. Then instruction 11 causes the next eight bytes to be fetched from memory 178 and put into the K shift register 188 via the same data path as described in connection with the loading of the J shift register 186.

When the K shift register 188 has just been loaded, at step 220 and by instruction 12, the numeric value eight is stored in the byte count register 134 since there are now eight bytes of string data in the K register 188. Because the contents of the K register 188 are periodically shifted left into the J shift register 186, it is important to know how many bytes of the data string are left in the K register 188 so that the processor will know when to reload the K register with the next portion of the data string.

Next, at step 222, the masked keyword stored in the test register 130 is compared to the portion of the data string stored in the J register 186. This step is implemented by the instructions 13-16 of Table 1. Specifically, instruction 13 causes the masked keyword stored in the test register 130 to be sent to the A latch 142. Then, instruction 14 causes the contents of the J shift register 186 to be moved to the B latch 144 via the B-bus 172. If the BIT MASK ENABLE signal is logic "1," then the contents of the J register 186 are logically "anded" with the bit mask by the AND gates 204 prior to being sent to the B latch 144. At instruction 15, the binary value of the masked keyword is compared to the binary value of the masked portion of the data string by providing the ALU FUNCTION signal with the binary values that cause the ALU 140 to perform a bit-by-bit logical "exclusive-or" of its two data inputs. The logical exclusive-or operation, which is conventional and well known, is a sum modulo 2 operation. Thus, a bit-by-bit logical exclusive-or provides a logic "0" output if its two bit inputs are both logic "1" or logic "0," and hence match, and a logic "1" output if its two bit inputs are different. As a result, for each byte of the data string that matches the corresponding byte in the keyword, a logic "0" will be produced in the corresponding byte position.

After the keyword is compared with the portion of the data word in the J register 186, upon a match at step 224 the processor proceeds to the user's program so that the user program may perform its programmed function, for example, replace the keyword that was located with a different word, whereupon the user program returns control to the processor so that any other occurrences of the keyword can be found. The existence of a match is determined by the zero detect circuit at instruction 16. Instruction 16 causes the contents of the ALU 140 to be sent to the zero detect circuit 150. As mentioned above, for each byte position of the ALU 140 in which there was a match, the ALU output will be zero. Consequently, at instruction 17, the zero detect circuit 150 tests each byte of the ALU to determine whether all bytes are zero, in which case all unmasked bytes of the keyword match all unmasked bytes of the data string portion. When the masked bytes are compared by the ALU 140 during its exclusive-or operation, the ALU output corresponding to each masked byte is forced to logic "0," which is the same logical output that the ALU provides in case of a match. Thus, each logic "1" bit in the byte mask forces a match in its corresponding byte position in the keyword Upon a match, instruction 18 will cause a return to the user's program, and the user program will return control to the processor at instruction 19. If there is no match, instruction 17 will cause instructions 18 and 19 to be skipped.

At step 226, the length of the data string will be decremented by one byte since one byte has just been tested and thus there is one less byte in the data string that needs to be tested. This step is implemented by instructions 20-23. Instruction 20 causes the number one to be moved to the B latch 144, and instruction 21 causes the current data string length to be sent to the A latch 142. Instruction 22 causes the ALU 140 to subtract one from the current length, and the new length is stored in the length register 124 by instruction 23.

Next, at step 228, the new data string length stored in the length register 124 is tested to determine whether all of the bytes in the data string have already been compared to the keyword, which will be the case if the numeric value of the length is zero. This is accomplished at instruction 24 which sends the output of the ALU 140 to the zero detect circuit 150. If the value of length is zero, then step 230 is executed, causing the END flag to be set to logic "1" to indicate that the end of the string has been reached, and control is returned to the user's program. This is accomplished by instructions 26 and 27.

If the value of length is nonzero and the data string has not been completely tested, the program branches to step 232 at which the contents of the J and K registers 186, 188 are shifted left by one byte. This is accomplished by instruction 28, which causes a logic "1" S8 signal to be sent to the shift registers 186, 188 so that their contents are shifted left one byte as explained above. The contents of the byte count register 134 are then decremented by one at step 234 to indicate that there is one less byte in the K shift register 188 since it has just shifted one of its bytes into the J shift register. This step is accomplished by instructions 29-31.

Next, at step 236, the numeric value of byte count is tested to determine if it is zero, in which case the next eight bytes of the data string need to be moved from the memory 178 into to K shift register 188, and so the program branches back to step 218 so that the K shift register 188 is reloaded. If the byte count is nonzero, the shift register 188 does not need to be reloaded, and the program branches to step 222 so that the current portion of the data string in the J register 186 may be compared to the masked keyword. Step 236 is executed by instructions 32-35. Instruction 32 causes the contents of the ALU 140 to be sent to the zero detect circuit 150. If the zero detect circuit 150 detects a zero, instruction 33 causes a branch to instruction 7. Instruction 34 saves the decremented value of the byte count if it is nonzero, and instruction 35 causes a branch back to instruction 13.

The bit mode of operation of the processor is generally similar to its byte mode of operation. In its bit mode of operation, the processor compares a selected string of bits to determine the presence of a selected keyword. Both the bit string and the keyword are selectable by the user of the processor. The basic process by which the processor tests for the presence of a selected keyword within a selected bit string includes initially loading the J and K shift registers 186, 188 with the first portion of the bit string to be tested. Then, the entire contents of the J shift register 186 are simultaneously compared with the keyword stored in the test register 130. If there is a match, the presence of a match is indicated by the processor. Then, the contents of the J and K registers 186, 188 are shifted left one bit and the contents of the J register 186 are again compared with the contents of the test register. Any match is indicated, and the process is repeated. Periodically, the K register 188 will become empty since its contents are gradually shifted into the J register 186, and so the K register 188 will be periodically reloaded with the next portion of the bit string to be tested. In this manner, the entire keyword is simultaneously compared with a corresponding portion of the bit string. This process reduces the number of comparisons required as shown by the example shown below, in which the keyword is "1101," the bit string is "11001110011011," and each number above the bit string represents the number of comparisons that were required to determine whether or not the keyword matched that particular portion of the bit string:

| Comparisons: | 1111111111 |
|---|---|
| Bit String: | 11001110011011 |
| Keyword: | 1101 |

Note that this particular example required only 10 comparisons to find the keyword "1101" in the bit string "11001110011011" in contrast to the 22 comparisons that were required by a conventional bit string processor as shown above. This reduction results from the entire keyword simultaneously being compared with a portion of the bit string, instead of being compared one bit at a time.

Figure 9:
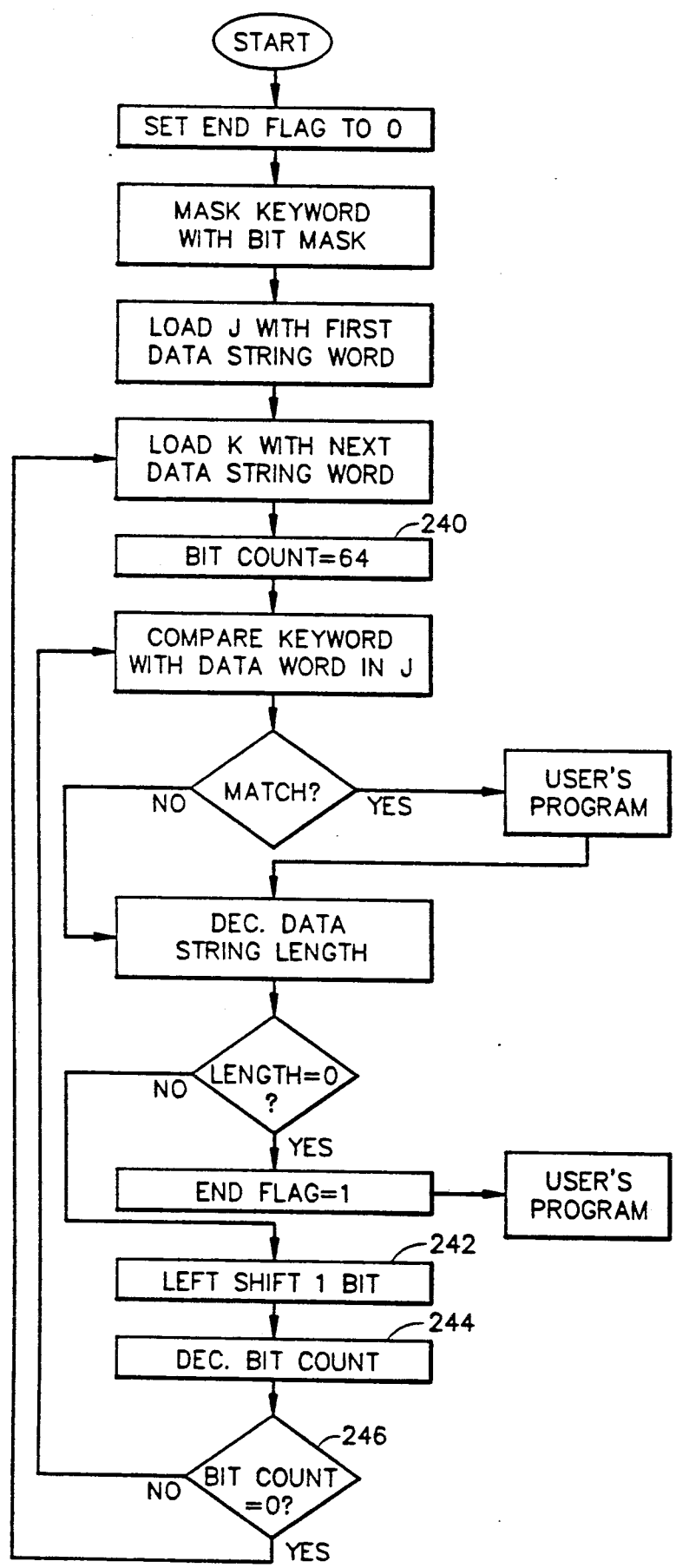
FIG. 9 is a detailed flowchart of the operation of the parallel processor of FIG. 5 in its bit mode of operation.

The detailed operation of the bit mode of the processor is very similar to the byte mode, and can be understood with reference to FIG. 9 and Table 2 set forth below. FIG. 9, which is a flowchart of the microcode that controls the operation of the processor, is very similar to the flowchart of FIG. 8, except that in a number of instances different operations are executed since the processor is in its bit mode of operation and not its byte mode. Likewise, the software implementation set forth in Table 2 is very similar to that of Table 1, so that only the differences need be explained to provide a clear understanding of the detailed operation of the bit mode of operation.

TABLE 2

| | | | | |
|---|---|---|---|---|
| 1 | | MOV | #0, ENDFLAG | ;reset end-of-string flag to 0 |
| 2 | | MOV | BITMASK, A | ;mask keyword with bit mask |
| 3 | | MOV | KEYWORD, B | |
| 4 | | AND | A, B | |
| 5 | | MOV | ALU, TEST | ;put masked keyword in test register |
| 6 | | MOV | @ ADDRESS, J | ;load J with first 64 bits of data string |
| 7 | LOADK: | MOV | ADDRESS, A | |
| 8 | | MOV | #8, B | ;increment address by 8 to get next 64 bits of data |
| 9 | | ADD | A,B | string and then load in K |
| 10 | | MOV | ALU, ADDRESS | |
| 11 | | MOV | @ ADDRESS, K | |
| 12 | | MOV | #64, BITCOUNT | ;K now contains 64 bits |
| 13 | COMPARE: | MOV | TEST, A | ;compare masked keyboard with J |
| 14 | | MOV | J,B | |
| 15 | | XOR | A,B | |
| 16 | | MOV | ALU,ZD | ;zero output? |
| 17 | | BNZ | NOMATCH | |
| 18 | MATCH: | JMP | USERPROGRAM | |
| 19 | | RET | | |
| 20 | NOMATCH: | MOV | #1, B | ;decrement length of data string tested by 1 bit |
| 21 | | MOV | LENGTH, A | |
| 22 | | SUB | A, B | |
| 23 | | MOV | ALU, LENGTH | |
| 24 | | MOV | ALU, ZD | |
| 25 | | BNZ | NEXT | ;data string completely tested? |
| 26 | EOS: | MOV | #1, ENDFLAG | ;set end-of-data-string flag to 1 |
| 27 | | END | | |
| 28 | NEXT: | LLS | BIT | ;left-shift J, K by 1 bit |
| 29 | | MOV | #1, B | ;decrement # of bits |

TABLE 2-continued

| | | | |
|---|---|---|---|
| 30 | MOV | BITCOUNT, A | in K by 1 |
| 31 | SUB | A, B | |
| 32 | MOV | ALU, ZD | ;if no bits left in K, get next 64 bits of data string to load in K |
| 33 | BZ | LOADK | |
| 34 | MOV | ALU, BITCOUNT | |
| 35 | BR | COMPARE | ;test for match again |

© DAVIN COMPUTER CORP. 1987

In particular, at step 240 in FIG. 9 and instruction 12 in Table 2, the contents of the bit count register 132 are set to 64 since the K shift register 188 will be shifted one bit at a time and 64 bits are initially loaded into the K register 188. At step 242 and instruction 28, the contents of the J and K shift registers 186, 188 are shifted left one bit instead of byte. At step 244 and instructions 29-31, the contents of the bit count register 132 instead of the byte count register 34 are decremented by one. Finally, at step 246 and instructions 32-35, the conditional branch occurs when the value of the bit count register 132 has reached zero, and not the byte count register 134.

The two modes of operation just described are invoked by a user by including appropriate software instructions in the user's program. Specifically, the byte mode of operation is invoked by the instruction "SCANS" and the bit mode of operation is invoked by the instruction "BITSCAN."

Description of Branch Instructions that Utilize Parallel Byte Checking

The above-described branch on any hit (BAH) instruction is particularly advantageous in determining when an input character string contains the byte or bytes in the keyword. Thus, by using the BAH instruction, the software can branch to a location to further process the input string. One of the first items of information that is desirable to determine related to the input string is the location of the first byte that matches the corresponding byte of the keyword. For example, many programs parse input data by searching for certain delimiters (e.g., a space, a comma, a period, a or the like). When a delimiter is found, the software will cause the input data up to the delimiter to be in accordance with a predetermined rule. Thereafter, the data following the delimiter may be evaluated according to a separate rule. Thus, it is important to know where the delimiter is located in the input string. The conventional manner of finding delimiters is to take the input string and search through it on a character-by-character basis (i.e., a byte-by-byte basis) until the delimiter is found. As set forth above, the parallel byte comparison operation of the present invention substantially reduces the amount of time required by identifying the multiple byte portion of the input string where the byte is located so that the byte-by-byte comparison need only be performed on that portion of the input string where the byte is located. Nevertheless, in a 64-bit computer having word lengths of eight bytes, each of the eight bytes would have to be compared to find the particular byte where the delimiter is located. A further improvement of the present invention comprises four instructions to greatly improve the efficiency of locating the precise byte where the delimiter is located or to find the first byte following the delimiter.

The first instruction to improve the efficiency of the byte location operations is a "find first hit" (FFH) instruction. The FFH instruction operates upon the hit register portion of the processor status register 100 of FIG. 2 to identify the first byte in the input data string that is equal to the byte or bytes to which the input data string is being compared. For example, in the case where a single character (such as a control character or a delimiter) is reproduced in all eight bytes of a 64-bit word, and the input data string is being compared to the single character, the FFH instruction will generate an output code that identifies the location of the first byte that is equal to the single character. As a specific example, assume that the ASCII character code for a space (i.e., the hexadecimal value $20_{16}$) is reproduced in all eight bytes of the register A of FIG. 2 as follows:

REGISTER A: 2020202020202020 and the following eight-byte portion of an input string, corresponding to "time is ", is loaded into the register B of FIG. 2:

REGISTER B: 74696D6520697320

With this input data portion, after performing the exclusive-OR instruction described above, the eight-bit hit register portion of the processor status register 100 of FIG. 2 will comprise the following bits:

Hit Register: 1 1 1 1 0 1 1 0

It should be recalled that in accordance with the convention chosen herein, a zero in the hit register portion of the processor status register 100 corresponds to a byte where the input data string matches the comparison byte and a one in the hit register portion of the processor status register 100 corresponds to a byte where the input data string does not match the comparison byte. Thus, there are two zeros in the hit register portion of the processor status register corresponding to the two spaces in the input data string.

Given the foregoing example, the FFH instruction causes a location value of "4" to be generated to indicate that byte 4 of the current portion of the input data string in the register B is the first byte that matches the corresponding byte of the register A. In the preferred embodiment of the present invention, the bytes are numbered from left to right rather than right to left. Thus, "byte 0" refers to the most significant (i.e., leftmost) byte and "byte 7" refers to the least significant (i.e., rightmost) byte in a 64-bit word. It should be noted that this convention is different from the labelling of the bits in which "bit 0" refers to the least significant bit and "bit 63" refers to the most significant bit. This convention also differs from the byte numbering convention illustrated in FIG. 3 which refers to the byte number within the register. The choice of conventions relates to the particular application. In the description of the find instructions, the leftmost byte corresponds to the first data received in a string or a string portion and is thus identified as byte 0 since the following bytes are referenced to the first byte.

In the preferred embodiment of the present invention, the value of 4 is stored in a selected register where it is available for subsequent instructions to operate upon the value. For example, the preferred format of the FFH instruction is as follows:

FFH Rxx where Rxx designates a particular register in the computer. As a specific example, the instruction

FFH R27 when operating on the string example and character example set forth above, will cause the value of 4 to be generated and stored in the register 27 of the computer, where the register 27 is the destination for a particular register in the A or B register file of FIG. 5.

From the foregoing, it can be seen that when the leftmost (most significant) byte of data in the register B matches the corresponding byte in the register A, a location value of 0 is generated; when the next most significant byte matches a location value of 1 is generated; and so on. Thus, when the rightmost (least significant) bytes matches, a location value of 7 is generated. If none of the bytes compare, then a location value of 8 is generated to indicate that none of the bytes compared. Thus, a four-bit location value or code provides all the information necessary to determine whether there is a hit, and, if there is a hit, the location of the first hit.

The next novel instruction that is used in conjunction with the hit register portion of the processor status register 100 is a "find first miss" (FFM) instruction. The FFM instruction is similar to the FFH instruction; however, as its name implies, it identifies the location of the first byte in the input data string that is not equal to the byte or bytes to which the input data string is being compared. The FFM instruction has utility, for example, in finding the first non-blank character in an input line. As a specific example, assume once again that the register A of FIG. 2 is loaded with eight bytes of data representing eight spaces, as follows:

REGISTER A: 2020202020202020

The following eight-byte portion of an input string, corresponding to "ABC ", is loaded into the register B of FIG. 2:

REGISTER B: 2020202020414243

With this input data portion, the pertinent eight-bit hit register portion of the processor status register 100 of FIG. 2 will comprise the following bits:

Hit Register: 0 0 0 0 0 1 1 1 where a zero again represents a hit and a one represents a miss. Thus, the location value generated by the FFM instruction will be a "5" to indicate that the first miss is in byte 5.

As with the FFH instruction, the FFM instruction includes a register identifier to designate the register where the location value identifying the byte location of the first miss is to be stored. For example, the instruction:

FFM R23 causes the location value 5 to be stored in the register 23 for the example presented above. Again, a location value between 0 and 7 designates the location of the first miss. A location value of 8 indicates that there were no misses.

The present invention also includes a "find first miss after first hit" (FFMAFH) instruction that is useful for finding the beginnings or words in a text stream and other similar operations. For example, using the space character as an example, it is often desirable to skip to the next space character to find the end of a word and then skip over the next space character or characters to find the beginning of the next word. The FFMAFH instruction performs this operation as a single instruction. This can be understood by referring again to the original example wherein the register A is loaded with eight space characters as follows:

REGISTER A: 2020202020202020

The register B is again loaded with the string portion corresponding to "time is ", as follows:

REGISTER B: 0 74696D6520697320

With this input data portion, the pertinent eight-bit hit register portion of the processor status register 100 of FIG. 2 will again comprise the following bits:

Hit Register: 1 1 1 1 0 1 1 0

Unlike the FFH hit instruction which generated a location value of 4 corresponding to the zero which indicates the byte where the first space character is located, the FFMAFH instruction causes a location value of 5 to be generated which is the first miss (i.e., first non-blank character) after the first hit. Thus, with the location value generated by the FFMAFH instruction, a text processing program can immediately go to the beginning of the next word without having to methodically search each of the eight bytes in the string portion to find the first blank character and then find the first non-blank character that follows the first blank character.

As with the previous instructions, the full FFMAFH instruction format specifies the register into which the generated value is to be stored as follows:

FFMAFH Rxx where Rxx is one of the registers in the register file, as discussed above. A location value between 0 and 7 identifies the location of the first miss after the first hit. A location value of 8 indicates that there was no first miss after a first hit.

A similar instruction to the FFMAFH instruction is a "find first hit after first miss" (FFHAFM) instruction. Unlike the FFMAFH instruction, the FFHAFM instruction looks for the first miss in the input string portion and then finds the first hit thereafter. Using the space character as an example, a text processor can advantageously use this instruction to skip from the end of one word to the end of the next word. For example, all eight bytes of the register A is again filled with data representing the blank character as follows:

REGISTER A: 2020202020202020

The register B is loaded with an eight-byte portion of an input data string having the characters is the as follows:

REGISTER B: 2069732074686520

With the foregoing data in the register A and the register B, the hit register portion of the processor status register 100 will comprise the following bits:

Hit Register: 0 1 1 0 1 1 1 0

The FFHAFM instruction will cause a value of 3 to be generated indicating the first hit (byte 3) after the first miss (byte 1) in the eight-byte portion of the data string.

As before, the FFHAFM instruction has the format:

FFHAFM Rxx where Rxx designates a particular register into which the generated value will be loaded. A location value between 0 and 7 identifies the location of the first hit after the first miss. A location value of 8 indicates that there was no first hit after a first miss.

The foregoing find instructions also operate with string portions greater than a byte. For example, in some applications, it is desirable to determine whether a sixteen-bit portion of an input data string is equal to another sixteen-bit data string. In such applications, the find instructions operate on a sixteen-bit (i.e., double byte) basis. For example, assume that the register A is loaded with the following data:
REGISTER A: FE3CFE3CFE3CFE3C
Further assume that the register B is loaded with the following data:
REGISTER B: FE78BC3CFE3C8D56
The hit register portion of the processor status register 100 will comprise the following eight bits:
Hit Register: 0 1 1 0 0 0 1 1

Although there a four bytes with hits, only one sixteen-bit portion of the input data string matches the sixteen-bit pattern in the register A. Thus, the FFH instruction will cause a location value of 4 to be generated to indicate that the sixteen-bit portion that compared starts in byte 4 of the input data string. When the FFH instruction is operating on a double-byte basis, the single byte compares of byte 0 and 3 do not cause a location value to be output. For example, the two compares in a row on bytes 3 and 4 will not cause a location value to be generated because the two bytes are in separate sixteen-bit groups. Since the FFH instruction operates on two-byte boundaries, the four possible location value outputs are 0, 2, 4 and 6 when a hit occurs and a value of 8 when no hit occurs.

The find instructions also operate on a half-word (four-byte) basis by comparing 32 bits in the comparison register with 32 bits of the input data string. For example, assume that the register A is loaded with the following string:
REGISTER A: 1234567812345678
Further assume that the input data string is loaded into the register B as follows:
REGISTER B: 1234567A12345678
The hit register portion of the processor status register 100 will comprise the following bits:
Hit register: 0 0 0 1 0 0 0 0
The FFH instruction will generate a location value of 4 to indicate that the second 32-bit half-word matches the comparison string. The two possible location value outputs when a hit occurs are 0 and 4 which are the two half-word boundaries. As before, a location value output of 8 indicates that no hit occurred for the two half-words.

The FFH instruction also operates on a full word basis. When operating on a full word basis, the location value generated by the instruction will either be a 0 to indicate that the entire word matched beginning in byte 0 or an 8 to indicate that the word did not match.

The FFM instruction operates in a similar manner to the FFH instruction on multiple byte lengths.

The FFMAFH and FFHAFM instructions operate on the double-byte length in a manner similar to the operation on a single byte. However, it should be understood that the first miss after a first hit or the first hit after a first miss can only occur in bytes 2, 4 or 6. Thus, the only valid location values generated by these instructions when operating on double-byte lengths are 2, 4, 6 and 8. With respect to half-words, the only valid location value outputs are 4 and 8, since the first hit or miss after the first miss or hit respectively must necessarily occur in the second half-word beginning in byte 4 or not occur at all. With respect to full word operations, the FFMAFH and FFHAFM instructions always generate a location value of 8 since there can be no miss after a full word hit or a hit after a full word miss.

Figure 10:
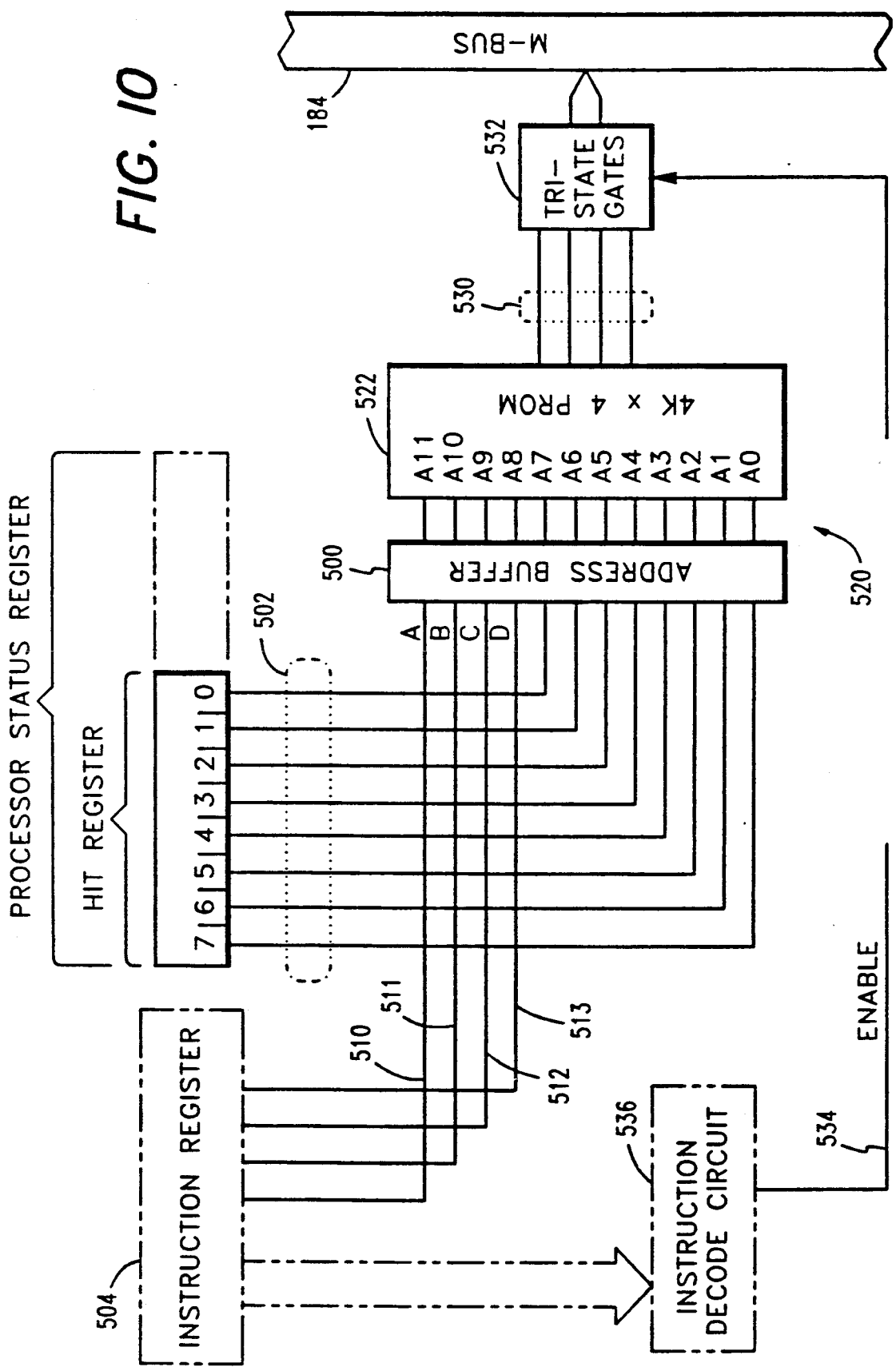
FIG. 10 is a block diagram illustrating the circuitry to implement instructions to find specific occurrences of hits and misses in the hit register.

The foregoing find instructions are implemented as single cycle instructions in the present invention in accordance with the block diagram of FIG. 10. For simplification only the pertinent portions of the overall processor are shown. In particular, the processor status register 100 is shown along with a portion of the M-bus 184. The present invention further includes an address buffer circuit 500 that receives the eight bits from the hit register portion of the processor status register 100 via an eight-bit bus 502. (Although described above only with respect to the hit register portion, it should be understood that the processor status register 100 includes other status bits such as a carry bit, an overflow bit, a zero bit and a sign bit, that are conventionally available from the arithmetic logic unit of a processor.) The address buffer 500 further receives four bits from an instruction register 504 (shown in phantom) that latches the operation code data from an instruction memory (not shown) and holds it throughout an instruction cycle. The four bits from the instruction register 504 are labelled as A, B, C and D and are provided as inputs to the address buffer on respective lines 510, 511, 512 and 513. The output of the address buffer 500 comprises twelve bits on an address bus 520 that is provided to the address inputs of a PROM (programmable read only memory) 522. In the preferred embodiment described herein, the PROM 522 is a 4096 word by 4-bit PROM. It can thus be seen that the address input to the PROM 522 comprises eight bits from the hit register portion of the processor status register 100 and four bits from the instruction register 504. Preferably, the least significant eight address bits applied to the PROM 522 comprise the hit register bits and the most significant four bits comprise the four bits from the instruction register 504. Also preferably, the eight bits from the hit register portion of the processor status register 100 are interchanged so that the least significant bit (bit 0) of the hit register is connected to address bit 7 of the PROM 522, bit 1 of the hit register is connected to address bit 6 of the PROM 522, and so on such that bit 7 of the hit register is connected to address bit 0 of the PROM 522. The interconnection of the hit register bits to the address bits of the PROM 522 is a matter of convenience in programming the PROM 522. It should be understood that the particular selection of address bits can be varied so long as the PROM 522 is programmed with the correct data for each address.

The PROM 522 provides four output data bits on a four-bit PROM output bus 530. The PROM output bus 522 is provided as an input to a set of tri-state gates 532. The tri-state gates 532 have outputs that are connected to the M-bus 184. The tri-state gates 532 are enabled via an enable line 534 during the execution of the selected find instruction so that the output bits from the PROM 522 are enabled onto the M-bus 184. The enable line 534 is connected to an output of an instruction decode circuit 536 (shown in phantom) which receives instruction data from the instruction register 504 and provides a plurality of decoded instruction outputs, one of which is the output on the enable line 534. The enable output on the line 534 is activated when the operation code corresponding to the find instructions is decoded by the instruction decode circuit 536.

The data on the M-bus 184 is transferred to a selected register via the buffer 170 and the A-bus 168 or via the buffer 174 and the B-bus 172 in a conventional manner in accordance with the destination register portion of the find instruction, as discussed above.

The four most significant address bits to the PROM 522 from the instruction register 502 are responsive to the particular find instruction and to the data length of the compares, as discussed above. Bits A and B, the two most significant pair of bits from the instruction register 502, define the particular find instruction as follows:

| Bit A | Bit B | Instruction |
|-------|-------|-------------|
| 0 | 0 | FFH |
| 0 | 1 | FFM |
| 1 | 0 | FFMAFH |
| 1 | 1 | FFHAFM |

The second pair of bits from the instruction register, bits C and D, define the groupings of the data strings for finding the hits or the misses as follows:

| Bit C | Bit D | Group Length |
|-------|-------|--------------|
| 0 | 0 | One Byte |
| 0 | 1 | Two Bytes |
| 1 | 0 | Four Bytes (half word) |
| 1 | 1 | Eight Bytes (full word) |

Thus, the entire memory area of the PROM 522 can be considered as being divided into four major groups with the addresses 000-3FF (hexadecimal) defining the memory locations for the FFH instruction, the addresses 400-7FF defining the memory locations for the FFM instruction, the addresses 800-BFF defining the memory locations for the FFMAFH instruction, and the addresses C00-FFF defining the memory locations for the FFHAFM instruction. Within each group of memory locations, the bits C and D define the memory locations for the various byte groupings. For example, for the FFH instruction, the memory locations 000-0FF define the memory locations for the single byte FFH instruction, the memory locations 100-1FF define the memory locations for the two byte FFH instructions, the memory locations 200-2FF define the memory locations for the half word (four byte) FFH instructions, and the memory locations 300-3FF define the memory locations for the full word instructions. Similar groupings are provided for each of the FFM, FFMAFH and FFHAFM instructions.

As can be seen from the foregoing, each of the four byte groupings for each of the four instructions comprises 256 memory locations. The 256 memory locations correspond to each of the 256 possible combinations of the eight bits from the hit register as provided by the eight least significant address bits to the PROM 522. Thus, the PROM 522 provides a unique four-bit output for each combination of data from the hit register for each byte grouping for each of the four instructions. The data programmed into the PROM 522 can be readily determined in accordance with the above-described rules for generating the location values for each instruction and each byte grouping. For convenience, Appendix 3 provides a data listing for the 4096 addresses of the PROM 522 programmed in accordance with the above-described rules. In order to more clearly understand the PROM programming and the data conventions, a portion of the PROM listing for the addresses 000-00F for the single byte FFH instruction is shown below:

| Hex Addr. | Inst. Bits | Hit Reg. Bits | Output Code |
|-----------|------------|---------------|-------------|
| 000 | 0000 | 00000000 | 0 |
| 001 | 0000 | 00000001 | 1 |
| 002 | 0000 | 00000010 | 0 |
| 003 | 0000 | 00000011 | 2 |
| 004 | 0000 | 00000100 | 0 |
| 005 | 0000 | 00000101 | 1 |
| 006 | 0000 | 00000110 | 0 |
| 007 | 0000 | 00000111 | 3 |
| 008 | 0000 | 00001000 | 0 |
| 009 | 0000 | 00001001 | 1 |
| 00A | 0000 | 00001010 | 0 |
| 00B | 0000 | 00001011 | 2 |
| 00C | 0000 | 00001100 | 0 |
| 00D | 0000 | 00001101 | 1 |
| 00E | 0000 | 00001110 | 0 |
| 00F | 0000 | 00001111 | 4 |

For compactness, only the hexadecimal codes for the addresses are shown in Appendix 3. However, the conversion from the hexadecimal codes to the individual bits is readily accomplished, as illustrated above.

Before discussing the PROM programming in detail, it should be again noted that the hit register bits have been reversed in the PROM addresses set forth above so that the least significant bit of the PROM address corresponds to the most significant bit of the hit register. Furthermore, it is again noted that a hit is represented in the foregoing hit register bits as a zero. Thus, address 000 above corresponds to all eight bytes of the two eight byte data strings being equal. On the other hand, address 00F corresponds to the least significant four bytes being equal (as represented by the zeros) and the four most significant bytes not being equal. Similarly, the address 001 corresponds to the most significant byte not being equal and the seven least significant bytes being equal. Thus, for example, it can be seen that the address 007 produces an location value output of "3" to indicate that byte 3 of the input string is the first byte to be equal to the corresponding byte in the comparison string.

A similar listing for the first sixteen addresses for the single byte FFM instruction is set forth below:

| Hex Addr. | Inst. Bits | Hit Reg. Bits | Output Code |
|-----------|------------|---------------|-------------|
| 400 | 0100 | 00000000 | 8 |
| 401 | 0100 | 00000001 | 0 |
| 402 | 0100 | 00000010 | 1 |
| 403 | 0100 | 00000011 | 0 |
| 404 | 0100 | 00000100 | 2 |
| 405 | 0100 | 00000101 | 0 |
| 406 | 0100 | 00000110 | 1 |
| 407 | 0100 | 00000111 | 0 |
| 408 | 0100 | 00001000 | 3 |
| 409 | 0100 | 00001001 | 0 |
| 40A | 0100 | 00001010 | 1 |
| 40B | 0100 | 00001011 | 0 |
| 40C | 0100 | 00001100 | 2 |
| 40D | 0100 | 00001101 | 0 |
| 40E | 0100 | 00001110 | 1 |
| 40F | 0100 | 00001111 | 0 |

It should be noted that the location value output corresponding to the address 400 is an 8 to indicate that there were no misses. The location value outputs for the other addresses indicate the location of the first one counting from the right, thus corresponding to the first byte of the input string that is not equal to the corresponding byte of the comparison string.

As set forth above, the remaining programming of the PROM 522 can be determined in accordance with the above-described rules and can be verified in Appendix 3.

Since the PROM 522 is responsive to the change in the input addresses in accordance with the instruction in the instruction register 502 and in accordance with the hit register portion of the processor status register 100, the data output from the PROM 522 can readily be provided in a single instruction cycle. Thus, it can be seen that a single find instruction quickly identifies a particular byte in an input string compared to the many instructions required in a conventional processor.

Although described above in connection with a 64-bit processor, it should be understood that the find instructions can be used with processors having more or fewer bits per word with suitable alterations in the circuitry to accommodate the different numbers of bits.

Description of Replicate Instruction

As set forth above, many of the operations performed with the above-described parallel byte processor utilize a repeated character in all eight bytes of a particular register. Although there are known apparatuses and methods for duplicating the data in all eight bytes, such as using shift and OR instructions, the present invention provides a novel replicate instruction that inserts the same data in all eight bytes in a single instruction cycle.

Figure 11:
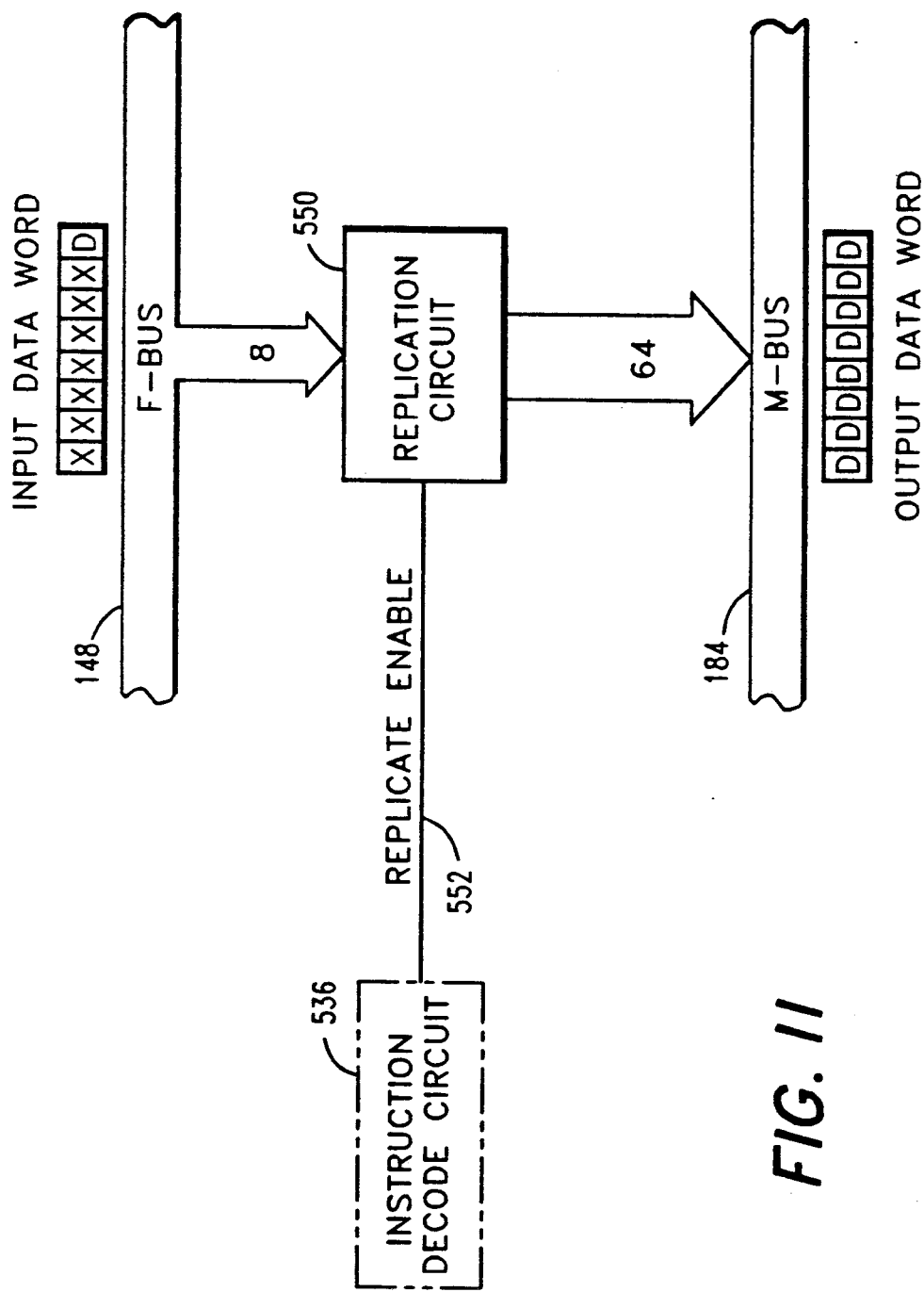
FIG. 11 is a block diagram illustrating the operation of circuitry to implement a replicate instruction to cause the data in one byte to be replicated in all the bytes of a data word.

The novel apparatus for replicating a single byte of data into all eight bytes of the 64-bit word is illustrated in FIG. 11. The replication apparatus comprises a replication circuit 550 that has an input connected to receive eight bits (one byte) of data from the F-bus 148 and that generates 64 bits (eight bytes) of data as an output to the M-bus 184. Preferably, the eight bits of input data from the F-bus 148 comprise the eight least significant bits of the F-bus 148 and thus comprise the eight least significant bits of the selected source that is enabled onto the F-bus 148. For example, the data on the F-bus 148 can advantageously be the output of one of the registers in the A register file or the B register file gated through the ALU 140 of FIG. 5, or alternatively, can be data from the M-bus 184. The 64 bits of output data generated by the replicate circuit 550 are gated onto the M-bus 184 in response to an active signal on an enable line 552, which is connected to an output of the instruction decode circuit 536 (shown in phantom). The instruction decode circuit 536 decodes the instruction data from the instruction register 504 (FIG. 10) and enables the enable line 552 whenever the operation code for the replicate instruction appears in the instruction register 504. Preferably, as illustrated in FIG. 12, the output circuits of the replicate circuit 550 are tri-state output circuits that enable data onto the M-bus 184 whenever the enable line 552 is active.

The operation of the replicate circuit is illustrated pictorially in FIG. 11, wherein a first data word (i.e., eight bytes) on the F-bus 148 is illustrated as having the seven most significant bytes as X's, which designate don't cares in conventional terminology, and having a D in the least significant byte to illustrate the data to be replicated. The output data provided by the replicate circuit 550 onto the M-bus 184 is shown as an eight-byte output data word having a D in each of the eight bytes to indicate that the data byte D has been replicated in all eight bytes. Since the data has been gated onto the M-bus 184, the data can be transferred to a register in the A register file or the B register file in a conventional manner.

Figure 12:
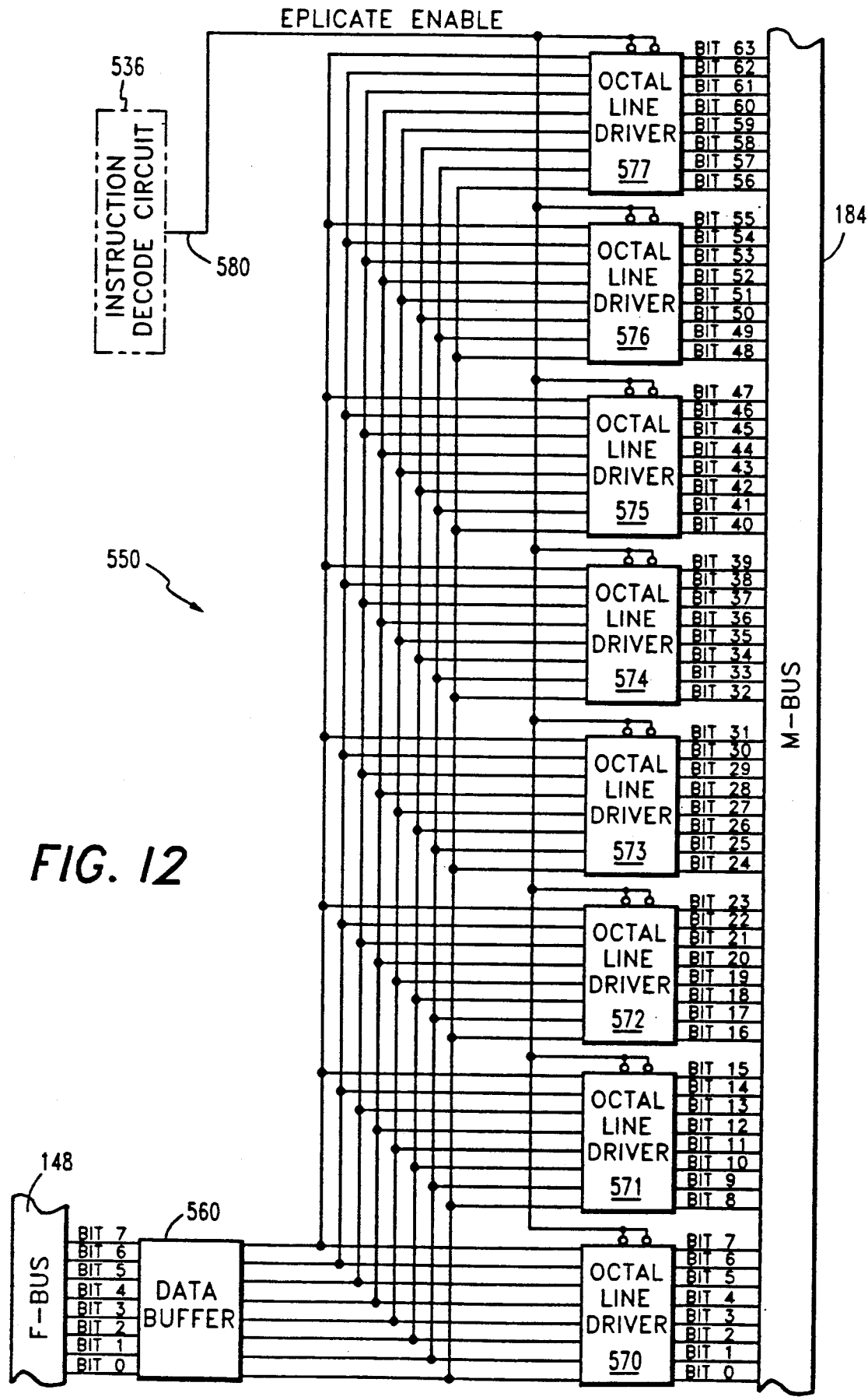
FIG. 12 is a logic diagram of the replication circuit of FIG. 11 showing a particular implementation of the replication circuit.

FIG. 12 illustrates a preferred implementation of the replicate circuit 550. As illustrated, the replicate circuit 550 comprises an eight-bit data buffer 560 that receives the eight bits of data from the eight least significant bits (i.e., bits 0-7) of the F-bus 148 and provides eight buffered output bits. The buffered output bits are provided as inputs to eight sets of tri-state bus drivers 570-577. Each set of tri-state bus drivers 570-577 comprises eight bus driver gates. For example, the tri-state bus drivers 570-577 are advantageously SN74LS244 octal line drivers, available from Texas Instruments Incorporated, or an equivalent circuit. As illustrated, each octal line driver 570-577 receives all eight of the buffered output bits from the data buffer 560. Each octal line driver 570-577 provides one of the eight output bytes of the replicate circuit 550. Thus, the eight bits of each octal line driver 570-577 are connected to a respective eight-bit segment of the M-bus 184. For example, the eight outputs of the octal line driver 570 are connected to bits 0-7 of the M-bus 184, the eight outputs of the octal line driver 571 are connected to bits 8-15 of the M-bus 184, and so on, such that the eight outputs of the octal line driver 577 are connected to bits 56-63 of the M-bus 184.

Each of the octal line drivers has a pair of enable inputs, which, when activated by a logic 0 signal, enable the data inputs onto the respective data outputs. The enable inputs of each octal line driver 570-577 are connected to a replicate enable line 580, which is connected to the output of the instruction decode circuit 536 (shown in phantom). Thus, when the instruction decode circuit 536 decodes the replicate instruction and activates the replicate enable line 580, the eight bits of data input to the data buffer 560 are replicated in the eight output bytes of the M-bus 184, as discussed above in connection with FIG. 11. Since there is relatively little propagation delay through the data buffer 560 and the line drivers 570-577, the replicate instruction is easily accomplished in a single processor instruction cycle.

Description of A Preferred Embodiment of a Rotate/Replicate Circuit

The above-described replicate circuit operates on the least significant eight bits (i.e., the least significant byte) of data on the F bus to reproduce the byte in all eight byte locations of the target register. Although an extremely useful instruction, the limitation to the least significant byte of the F bus requires that a desired byte to be replicated be located in the least significant byte position of the source. In many cases, this may require that a data word be loaded from memory, rotated and placed on the F bus before the desired byte is in the least significant byte position. Alternatively, a separate data word for each byte pattern may be stored in memory with only the least significant byte of the data word comprising significant data. The improved rotate/replicate circuit described hereinafter allows a single 64-bit memory data word to store eight distinct bytes (e.g., eight control characters), and, in one instruction, a selected one of the bytes in the memory word is replicated and transferred to target register. In addition, the rotate/replicate circuit provides the option of working on a two-byte (double byte) basis, four-byte basis (half-word) and eight-byte basis (full word). In the present embodiment, the eight-byte operation rotates the bytes only; however, when the present invention is expanded to a 128-bit word or greater, the eight-byte operation will also provide the replicate function.

Figure 13:
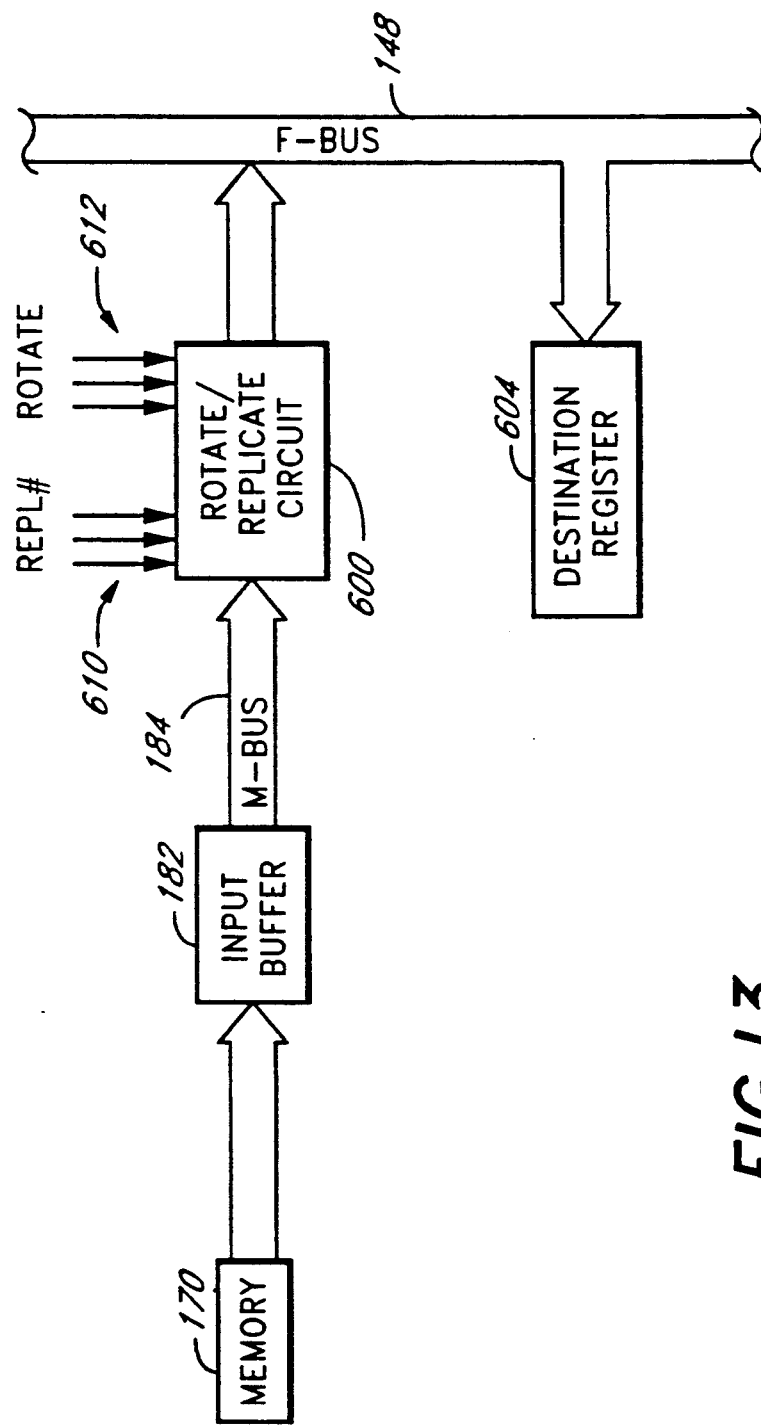
FIG. 13 is a block diagram of an rotate/replicate circuit of the present invention that implements the load/replicate instruction.

FIG. 13 is a block diagram of an exemplary rotate/replicate circuit 600 as embodied in the processor of the present invention. As illustrated in FIG. 13, the rotate/replicate circuit 600 is positioned to receive data from the memory 178 via the input buffer 182 and the M-bus 184. The rotate/replicate circuit 600 takes the 64 bits of input data on the M-bus 184 and provides 64 bits of output data on the F-bus 148. The data is routed from the F-bus 148 to a selected destination register, represented by a register 604.

The format of an exemplary load replicate instruction that is advantageously used with the rotate/replicate circuit of FIG. 13 has the following format:
LDR.x MEM Ri
where "LDR" specifies the load replicate instruction. The letter "x" following the period represents a selected letter in the instruction format that specifies the number of bytes to be replicated, as determined by a first three-bit control input 610 (labelled "REPL#") to the rotate/replicate circuit 600. In particular, if the letter is a B (i.e., LDR.B), a single byte will be replicated eight times. If the letter is a D (i.e., LDR.D), then two bytes will be replicated four times. If the letter is an H (i.e., LDR.H), then a half-word (four bytes) will be replicated two times. If the letter is a W, then a full word will be replicated once. The "MEM" portion of the instruction is the address of the data word containing the byte or bytes to be replicated, and also specifies the particular starting byte within that data word. Thus, "MEM" also determines the bytes by which to rotate the input data word to the right before replicating if the starting byte is not on a word boundary. The amount of rotation is determined by a second three-bit control input 612 (labelled as "ROTATE") to the rotate/replicate circuit 600. The "Ri" portion of the instruction format identifies the destination register of the replicated bytes.

Figure 14:
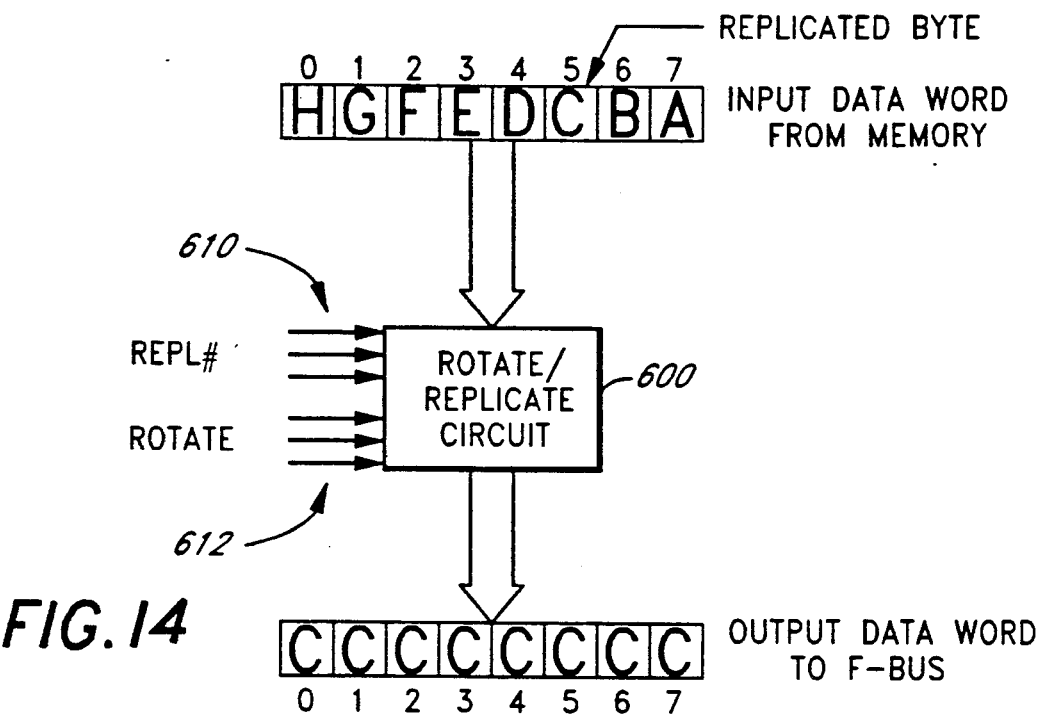
FIG. 14 illustrates the operation of the rotate/replicate circuit for a single byte.

As illustrated in FIG. 14, the rotate/replicate circuit 600 can operate as a one-to-eight multiplexer which can select any one of the eight input bytes and replicate it in the eight output bytes. For example, byte 5 of an input data word from memory having the character "C" stored therein is replicated in the eight bytes of the output data word provided to the F-bus. It should be noted that the most significant byte is designated as byte 0 and the least significant byte is designated as byte 7 (i.e., bytes are numbered from left to right). On the other hand, the most significant bit of a data word is designated as bit 63 and the least significant bit is designated as bit 0 or 00 (i.e., the bits are numbered from right to left).

Figure 15:
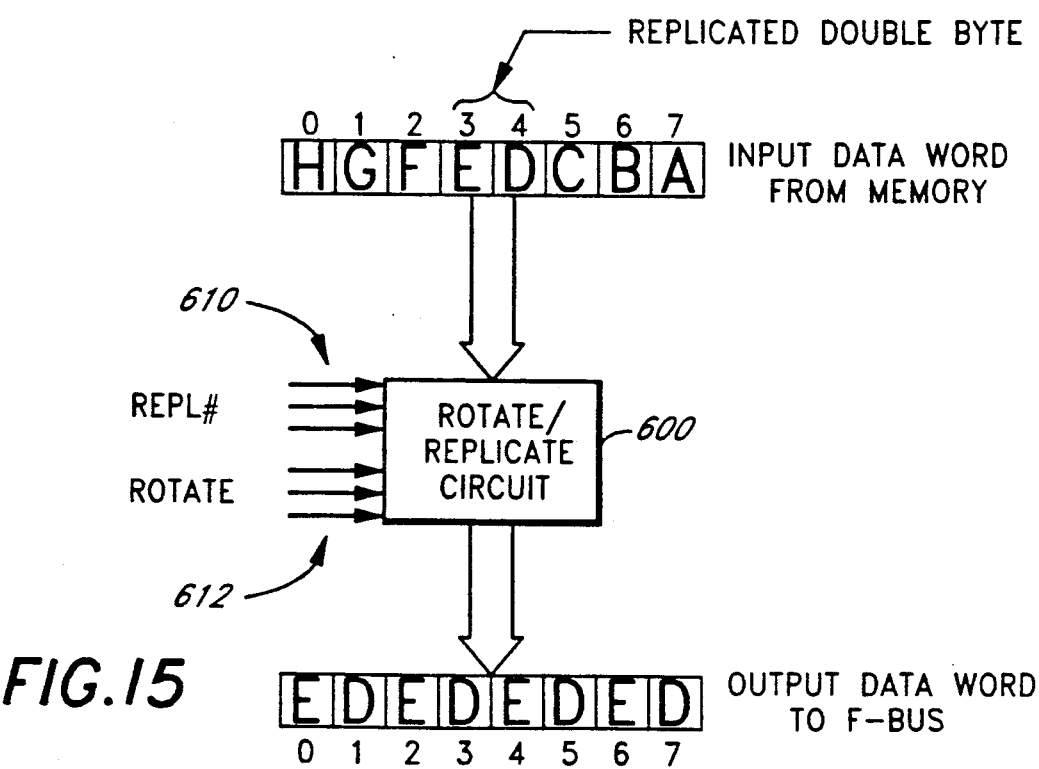
FIG. 15 illustrates the operation of the rotate/replicate circuit for a double byte.

As illustrated in FIG. 15, the rotate/replicate circuit 600 can operate as a one-to-four (or two-to-eight) multiplexer which can select any two of the eight input bytes (e.g, bytes 3 and 4 containing the characters "ED") and replicate the two bytes in the eight output bytes.

Figure 16:
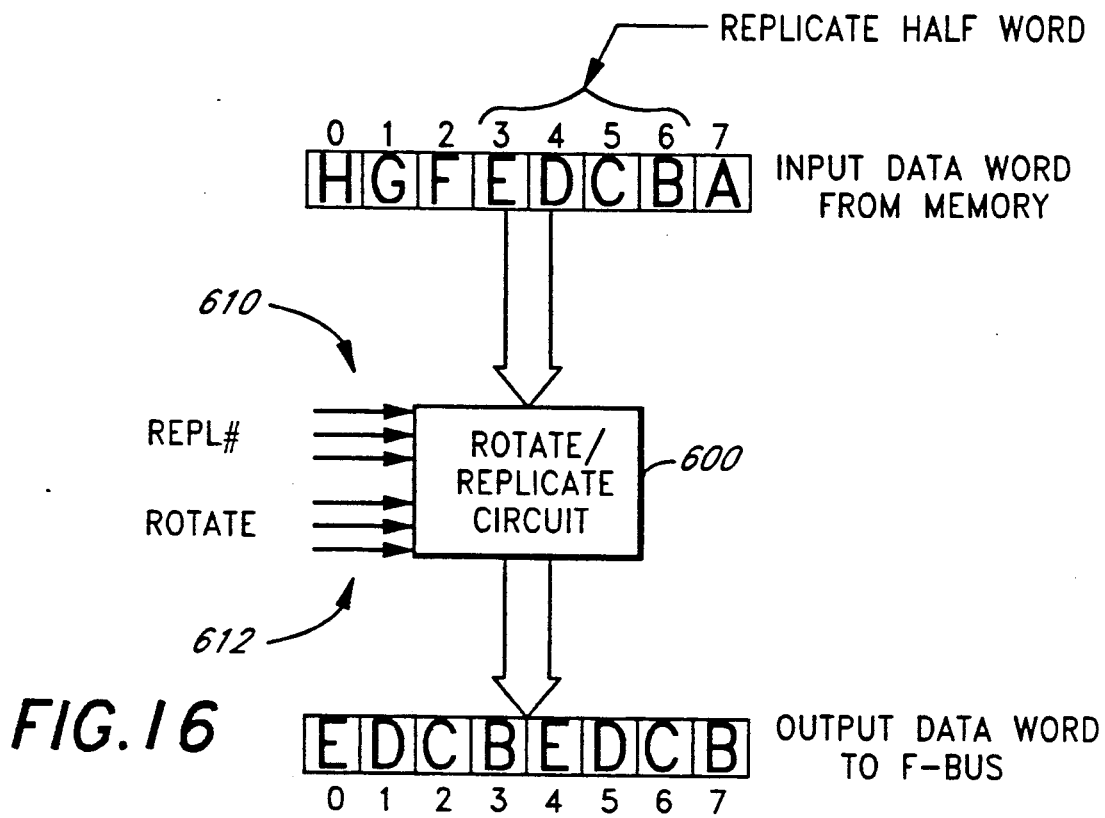
FIG. 16 illustrates the operation of the rotate/replicate circuit for a half-word.

As illustrated in FIG. 16, the rotate/replicate circuit 600 can operate as a one-to-two (four-to-eight) multiplexer which can select any four bytes (e.g., bytes 3, 4, 5 and 6 containing the characters "EDCB") and replicate the four bytes in the eight output bytes.

Figure 17:
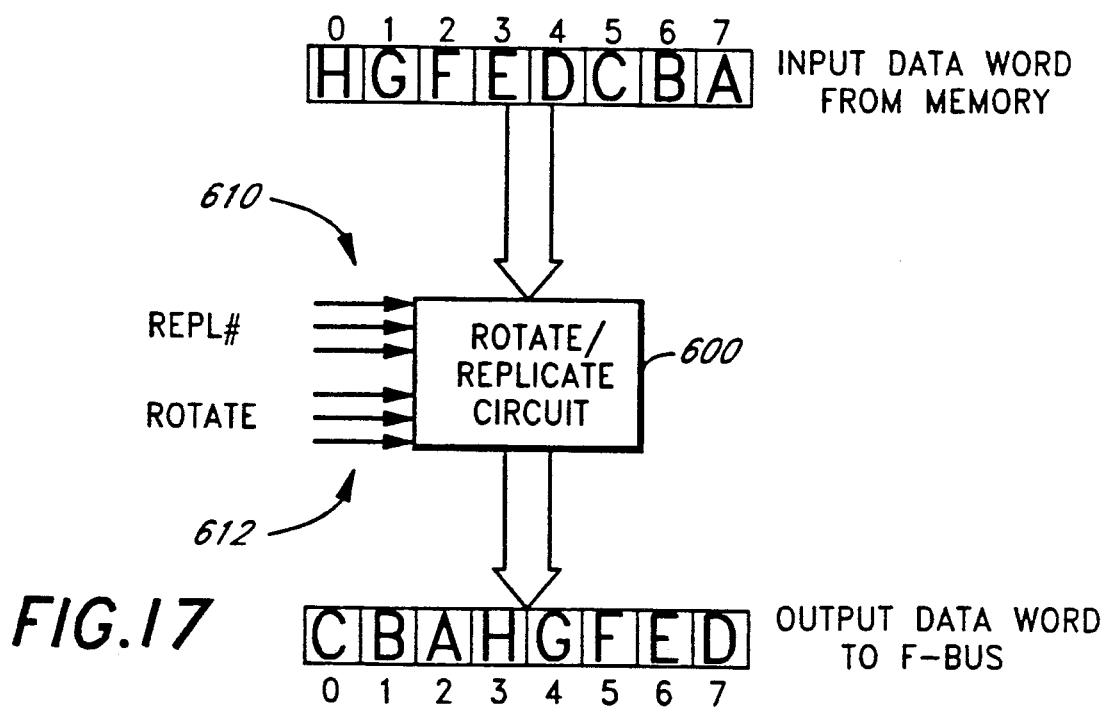
FIG. 17 illustrates the operation of the rotate/replicate circuit for a three-byte rotation.

Finally, as illustrated by a three-byte rotation to the right in FIG. 17, the rotate/replicate circuit 600 can operate as a rotation circuit by which it can rotate the eight input bytes by 1, 2, 3, 4, 5, 6 or 7 bytes. The number of bytes to replicate is specified by the first three-bit REPL# control input 610 into the rotate/replicate circuit 600. In the present embodiment only five of the code combinations are specified for no replication, single-byte replication, two-byte replication, four-byte replication and eight-byte replication (again more meaningful when the word length is increased). The location of the first byte position of the byte or bytes to replicate is specified by the second three-bit ROTATE control input 612 to the rotate/replicate circuit 600. For example, a ROTATE control input of 000 specifies a rotation of zero bytes so that the least significant byte (byte 7) is the least significant replicated byte; a ROTATE control input of 001 specifies a rotation of one byte to the right so that the next least significant byte (byte 6) is the least significant byte of the replicated word, and so on, such that a ROTATE control input of 111 specifies a rotation of seven bytes to the right so that the most significant byte (byte 0) is in the least significant byte of the replicated word. If the first three-bit control input 610 specifies no replication, then the second three-bit control input 612 operates to specify the number of bytes to rotate.

Figure 18:
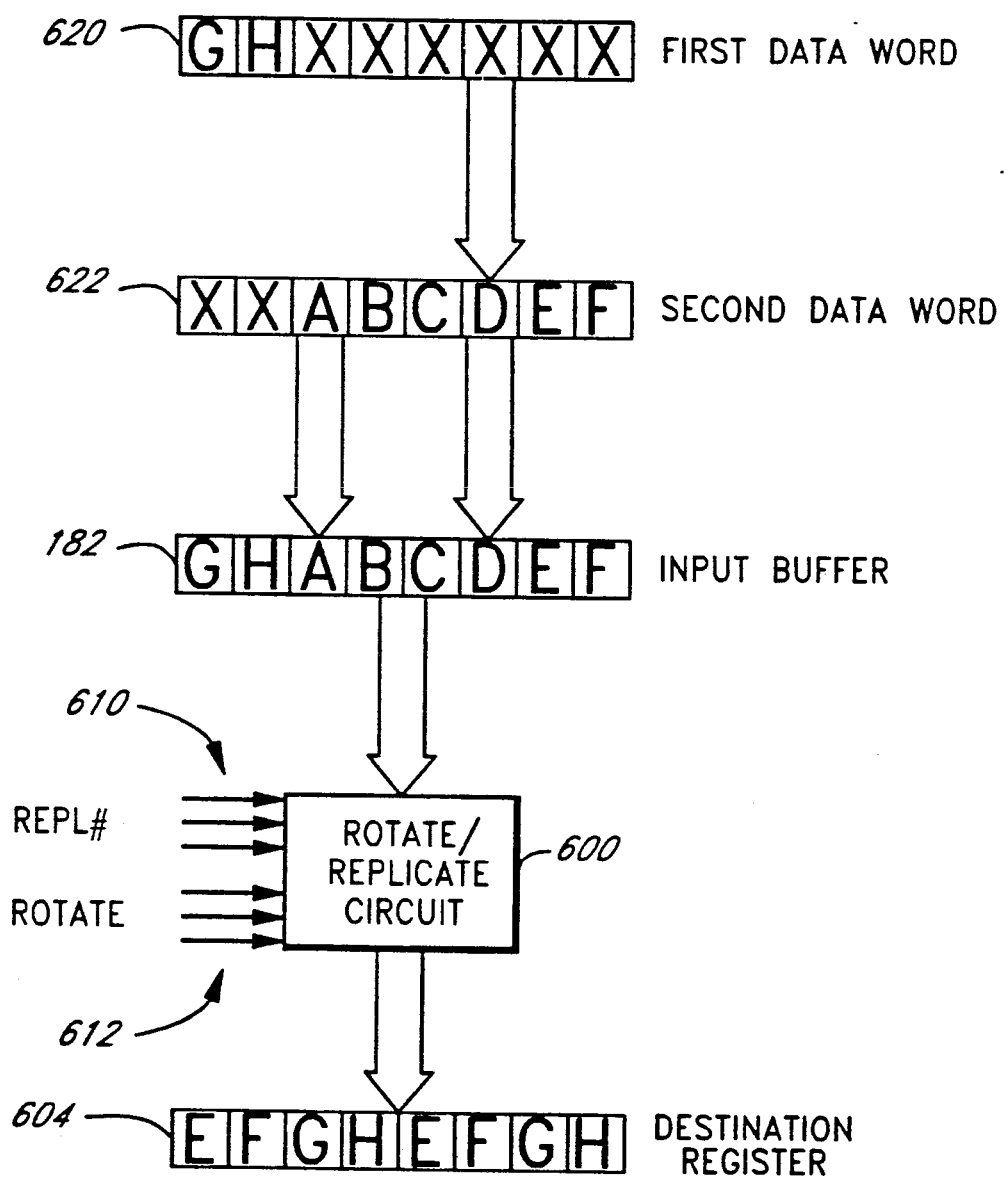
FIG. 18 illustrates the operation of the rotate/replicate circuit on eight bytes of data across a data word boundary.

It should be noted that the replicate instruction operates on byte boundaries irrespective of whether it is replicating a single byte, two bytes, four bytes or eight bytes. If the replicate instruction specifies that two or more bytes are replicated and that the first byte is located such that one or more of the additional bytes are located in a second data word in memory, the two data words are fetched in sequence from memory and formed into a single data word in the input buffer 182. This is illustrated, for example, in FIG. 18 wherein a first data word 620, comprising bytes identified as G and H, and a second data word 622, comprising bytes identified as A, B, D, E, and F, are stored in the input buffer 182, as shown. Then, for example if a four-byte replicate instruction specifies byte H of the first data word as the starting position, the rotate/replicate circuit will generate two four-byte data patterns of E, F, G, H and load the two patterns into the destination register 604 as the pattern E, F, G, H, E, F, G, H, as shown.

A preferred embodiment of the rotate/replicate circuit 600 is illustrated in FIG. 19. As illustrated, the rotate/replicate circuit 600 for the 64-bit embodiment of the present invention comprises eight programmable logic devices (PLDs) 650, 651, 652, 653, 654, 655, 656, and 657. Each PLD 650-657 has eight inputs and eight outputs. Each input is connected to a selected bit of the M-bus 184, and each output is connected to a selected bit of the F-bus 148. The first PLD 650 controls the data applied to the most significant bits of each output byte (i.e., bit 63 in byte 0, bit 55 in byte 1, bit 47 in byte 2, bit 39 in byte 3, bit 31 in byte 4, bit 23 in byte 5, bit 15 in byte 6, and bit 07 in byte 7). Similarly, the second PLD 651 controls the next most significant bit in each output byte, and so on, such that the seventh PLD 657 controls the least significant bit of each byte (e.g., bit 56 in byte 0, bit 48 in byte 1, bit 40 in byte 2, bit 32 in byte 3, bit 24 in byte 4, bit 16 in byte 5, bit 08 in byte 6, and bit 00 in byte 7). The bits are controlled in these groupings so that each PLD can advantageously be constructed identically, thus reducing the number of different parts to design and manufacture for the rotate/replicate circuit 600. It should be understood from the foregoing description of the rotate replicate circuit that each output byte provided to the F-bus 148 can receive the data from any of the eight input bytes on the M-bus 184 depending upon which byte or bytes are selected to be replicated. Thus, each bit of each output byte must have a selectable path to the bit of corresponding significance in each input byte on the M-bus 184. For example, the most significant bit 63 of byte 0 must have a selectable path to the most significant bit 55 of byte 1, the most significant bit 47 of byte 2, and so on. However, each bit within a particular output byte will have the same byte as its source so that the byte source selection for the bit of a particular byte in the first PLD 350 will be the same as the byte source selection for the bit of that particular byte in the second PLD 351 and so on. For example, if the source for bit 63 is the third byte of the M-bus 184, then the source for bits 62, 61, 60, 59, 58, 57 and 56 is also the third byte of the M-bus 184.

In FIG. 19, only the connections to and from the most significant PLD 350 and the least significant PD 357 are shown. The remaining interconnections can be determined from the bit numbering within the PLDs 351, 352, 353, 354, 355 and 356.

With the foregoing guidelines, the following equations for the least significant PLD 357 can be defined, wherein ROTATE is the value of the three-bit control input 612 that determines then umber of bytes to rotate to the right, as discussed above. REPL indicates that there is to be replication and DLB defines a replication length of one byte, DLDB defines a replication length of two bytes, DLHW defines a replication length of four bytes and DLW defines a replication length of eight bytes (redundant for the presently defined 64-bit data word). $\overline{REPL}$ indicates that there is to be no replication (rotation only). DOUT(x) is the input data bit to the PLD 350 and DOUT(x) is the output data bit for the PLD 357.

The equation for generating output bit 00 from the PLD 357 is as follows:

| DOUT(00) = | |
| --- | --- |
| (ROTATE EQ 0) × | [($\overline{REPL}$ × DIN(00)) |
| | + (REPL × DLB × DIN(00)) |
| | + (REPL × DLDB × DIN(00)) |
| | + (REPL × DLHW × DIN(00)) |
| | + (REPL × DLW × DIN(00))] |
| + (ROTATE EQ 1) × | [($\overline{REPL}$ × DIN(08)) |
| | + (REPL × DLB × DIN(08)) |
| | + (REPL × DLDB × DIN(08)) |
| | + (REPL × DLHW × DIN(08)) |
| | + (REPL × DLW × DIN(08))] |
| + (ROTATE EQ 2) × | [($\overline{REPL}$ × DIN(16)) |
| | + (REPL × DLB × DIN(16)) |
| | + (REPL × DLDB × DIN(16)) |
| | + (REPL × DLHW × DIN(16)) |
| | + (REPL × DLW × DIN(16))] |
| + (ROTATE EQ 3) × | [($\overline{REPL}$ × DIN(24)) |
| | + (REPL × DLB × DIN(24)) |
| | + (REPL × DLDB × DIN(24)) |
| | + (REPL × DLHW × DIN(24)) |
| | + (REPL × DLW × DIN(24))] |
| + (ROTATE EQ 4) × | [($\overline{REPL}$ × DIN(32)) |
| | + (REPL × DLB × DIN(32)) |
| | + (REPL × DLDB × DIN(32)) |
| | + (REPL × DLHW × DIN(32)) |
| | + (REPL × DLW × DIN(32))] |
| + (ROTATE EQ 5) × | [($\overline{REPL}$ × DIN(40)) |
| | + (REPL × DLB × DIN(40)) |
| | + (REPL × DLDB × DIN(40)) |
| | + (REPL × DLHW × DIN(40)) |
| | + (REPL × DLW × DIN(40))] |
| + (ROTATE EQ 6) × | [($\overline{REPL}$ × DIN(48)) |
| | + (REPL × DLB × DIN(48)) |
| | + (REPL × DLDB × DIN(48)) |
| | + (REPL × DLHW × DIN(48)) |
| | + (REPL × DLW × DIN(48))] |
| + (ROTATE EQ 7) × | [($\overline{REPL}$ × DIN(56)) |
| | + (REPL × DLB × DIN(56)) |
| | + (REPL × DLDB × DIN(56)) |
| | + (REPL × DLHW × DIN(56)) |
| | + (REPL × DLW × DIN(56))] |

The equation for generating output bit 08 from the PLD 357 is as follows:

| DOUT(08) = | |
| --- | --- |
| (ROTATE EQ 0) × | [($\overline{REPL}$ × DIN(08)) |
| | + (REPL × DLB × DIN(00)) |
| | + (REPL × DLDB × DIN(08)) |
| | + (REPL × DLHW × DIN(08)) |
| | + (REPL × DLW × DIN(08))] |
| + (ROTATE EQ 1) × | [($\overline{REPL}$ × DIN(16)) |
| | + (REPL × DLB × DIN(08)) |
| | + (REPL × DLDB × DIN(16)) |
| | + (REPL × DLHW × DIN(16)) |
| | + (REPL × DLW × DIN(16))] |
| + (ROTATE EQ 2) × | [($\overline{REPL}$ × DIN(24)) |
| | + (REPL × DLB × DIN(16)) |
| | + (REPL × DLDB × DIN(24)) |
| | + (REPL × DLHW × DIN(24)) |
| | + (REPL × DLW × DIN(24))] |
| + (ROTATE EQ 3) × | [($\overline{REPL}$ × DIN(32)) |
| | + (REPL × DLB × DIN(24)) |
| | + (REPL × DLDB × DIN(32)) |
| | + (REPL × DLHW × DIN(32)) |
| | + (REPL × DLW × DIN(32))] |
| + (ROTATE EQ 4) × | [($\overline{REPL}$ × DIN(40)) |
| | + (REPL × DLB × DIN(32)) |
| | + (REPL × DLDB × DIN(40)) |
| | + (REPL × DLHW × DIN(40)) |
| | + (REPL × DLW × DIN(40))] |
| + (ROTATE EQ 5) × | [($\overline{REPL}$ × DIN(48)) |
| | + (REPL × DLB × DIN(40)) |
| | + (REPL × DLDB × DIN(48)) |
| | + (REPL × DLHW × DIN(48)) |
| | + (REPL × DLW × DIN(48))] |
| + (ROTATE EQ 6) × | [($\overline{REPL}$ × DIN(56)) |
| | + (REPL × DLB × DIN(48)) |
| | + (REPL × DLDB × DIN(56)) |
| | + (REPL × DLHW × DIN(56)) |
| | + (REPL × DLW × DIN(56))] |
| + (ROTATE EQ 7) × | [($\overline{REPL}$ × DIN(00)) |
| | + (REPL × DLB × DIN(56)) |
| | + (REPL × DLDB × DIN(00)) |
| | + (REPL × DLHW × DIN(00)) |
| | + (REPL × DLW × DIN(00))] |

The equation for generating output bit 16 from the PLD 357 is as follows:

| DOUT(16) = | |
| --- | --- |
| (ROTATE EQ 0) × | [($\overline{REPL}$ × DIN(16)) |
| | + (REPL × DLB × DIN(00)) |
| | + (REPL × DLDB × DIN(00)) |
| | + (REPL × DLHW × DIN(16)) |
| | + (REPL × DLW × DIN(16))] |
| + (ROTATE EQ 1) × | [($\overline{REPL}$ × DIN(24)) |
| | + (REPL × DLB × DIN(08)) |
| | + (REPL × DLDB × DIN(08)) |
| | + (REPL × DLHW × DIN(24)) |
| | + (REPL × DLW × DIN(24))] |

-continued

```
+ (ROTATE EQ 2) ×    [(REPL × DIN(32))
                     + (REPL × DLB × DIN(16))
                     + (REPL × DLDB × DIN(16))
                     + (REPL × DLHW × DIN(32))
                     + (REPL × DLW × DIN(32))]

+ (ROTATE EQ 3) ×    [(REPL × DIN(40))
                     + (REPL × DLB × DIN(24))
                     + (REPL × DLDB × DIN(24))
                     + (REPL × DLHW × DIN(40))
                     + (REPL × DLW × DIN(40))]

+ (ROTATE EQ 4) ×    [(REPL × DIN(48))
                     + (REPL × DLB × DIN(32))
                     + (REPL × DLDB × DIN(32))
                     + (REPL × DLHW × DIN(48))
                     + (REPL × DLW × DIN(48))]

+ (ROTATE EQ 5) ×    [(REPL × DIN(56))
                     + (REPL × DLB × DIN(40))
                     + (REPL × DLDB × DIN(40))
                     + (REPL × DLHW × DIN(56))
                     + (REPL × DLW × DIN(56))]

+ (ROTATE EQ 6) ×    [(REPL × DIN(00))
                     + (REPL × DLB × DIN(48))
                     + (REPL × DLDB × DIN(48))
                     + (REPL × DLHW × DIN(00))
                     + (REPL × DLW × DIN(00))]

+ (ROTATE EQ 7) ×    [(REPL × DIN(08))
                     + (REPL × DLB × DIN(56))
                     + (REPL × DLDB × DIN(56))
                     + (REPL × DLHW × DIN(08))
                     + (REPL × DLW × DIN(08))]
```

The equation for generating output bit 24 from the PLD 357 is as follows:

```
DOUT(24) =
(ROTATE EQ 0) ×      [(REPL × DIN(24))
                     + (REPL × DLB × DIN(00))
                     + (REPL × DLDB × DIN(08))
                     + (REPL × DLHW × DIN(24))
                     + (REPL × DLW × DIN(24))]

+ (ROTATE EQ 1) ×    [(REPL × DIN(32))
                     + (REPL × DLB × DIN(08))
                     + (REPL × DLDB × DIN(16))
                     + (REPL × DLHW × DIN(32))
                     + (REPL × DLW × DIN(32))]

+ (ROTATE EQ 2) ×    [(REPL × DIN(40))
                     + (REPL × DLB × DIN(16))
                     + (REPL × DLDB × DIN(24))
                     + (REPL × DLHW × DIN(40))
                     + (REPL × DLW × DIN(40))]

+ (ROTATE EQ 3) ×    [(REPL × DIN(48))
                     + (REPL × DLB × DIN(24))
                     + (REPL × DLDB × DIN(32))
                     + (REPL × DLHW × DIN(48))
                     + (REPL × DLW × DIN(48))]

+ (ROTATE EQ 4) ×    [(REPL × DIN(56))
                     + (REPL × DLB × DIN(32))
                     + (REPL × DLDB × DIN(40))
                     + (REPL × DLHW × DIN(56))
                     + (REPL × DLW × DIN(56))]

+ (ROTATE EQ 5) ×    [(REPL × DIN(00))
                     + (REPL × DLB × DIN(40))
                     + (REPL × DLDB × DIN(48))
                     + (REPL × DLHW × DIN(00))
                     + (REPL × DLW × DIN(00))]

+ (ROTATE EQ 6) ×    [(REPL × DIN(08))
                     + (REPL × DLB × DIN(48))
                     + (REPL × DLDB × DIN(56))
                     + (REPL × DLHW × DIN(08))
                     + (REPL × DLW × DIN(08))]

+ (ROTATE EQ 7) ×    [(REPL × DIN(16))
                     + (REPL × DLB × DIN(56))
                     + (REPL × DLDB × DIN(00))
                     + (REPL × DLHW × DIN(16))
                     + (REPL × DLW × DIN(16))]
```

The equation for generating output bit 32 from the PLD 357 is as follows:

```
DOUT(32) =
(ROTATE EQ 0) ×      [(REPL × DIN(32))
                     + (REPL × DLB × DIN(00))
                     + (REPL × DLDB × DIN(00))
                     + (REPL × DLHW × DIN(00))
                     + (REPL × DLW × DIN(32))]

+ (ROTATE EQ 1) ×    [(REPL × DIN(40))
                     + (REPL × DLB × DIN(08))
                     + (REPL × DLDB × DIN(08))
                     + (REPL × DLHW × DIN(08))
                     + (REPL × DLW × DIN(40))]

+ (ROTATE EQ 2) ×    [(REPL × DIN(48))
                     + (REPL × DLB × DIN(16))
                     + (REPL × DLDB × DIN(16))
                     + (REPL × DLHW × DIN(16))
                     + (REPL × DLW × DIN(48))]

+ (ROTATE EQ 3) ×    [(REPL × DIN(56))
                     + (REPL × DLB × DIN(24))
                     + (REPL × DLDB × DIN(24))
                     + (REPL × DLHW × DIN(24))
                     + (REPL × DLW × DIN(56))]

+ (ROTATE EQ 4) ×    [(REPL × DIN(00))
                     + (REPL × DLB × DIN(32))
                     + (REPL × DLDB × DIN(32))
                     + (REPL × DLHW × DIN(32))
                     + (REPL × DLW × DIN(00))]

+ (ROTATE EQ 5) ×    [(REPL × DIN(08))
                     + (REPL × DLB × DIN(40))
                     + (REPL × DLDB × DIN(40))
                     + (REPL × DLHW × DIN(40))
                     + (REPL × DLW × DIN(08))]

+ (ROTATE EQ 6) ×    [(REPL × DIN(16))
                     + (REPL × DLB × DIN(48))
                     + (REPL × DLDB × DIN(48))
                     + (REPL × DLHW × DIN(48))
                     + (REPL × DLW × DIN(16))]

+ (ROTATE EQ 7) ×    [(REPL × DIN(24))
                     + (REPL × DLB × DIN(56))
                     + (REPL × DLDB × DIN(56))
                     + (REPL × DLHW × DIN(56))
                     + (REPL × DLW × DIN(24))]
```

The equation for generating output bit 40 from the PLD 357 is as follows:

```
DOUT(40) =
(ROTATE EQ 0) ×      [(REPL × DIN(40))
                     + (REPL × DLB × DIN(00))
                     + (REPL × DLDB × DIN(08))
                     + (REPL × DLHW × DIN(08))
                     + (REPL × DLW × DIN(40))]

+ (ROTATE EQ 1) ×    [(REPL × DIN(48))
                     + (REPL × DLB × DIN(08))
                     + (REPL × DLDB × DIN(16))
                     + (REPL × DLHW × DIN(16))
                     + (REPL × DLW × DIN(48))]

+ (ROTATE EQ 2) ×    [(REPL × DIN(56))
                     + (REPL × DLB × DIN(16))
                     + (REPL × DLDB × DIN(24))
                     + (REPL × DLHW × DIN(24))
```

```
            + (REPL × DLW × DIN(56))]
+ (ROTATE EQ 3) ×   [(REPL̄ × DIN(00))
                    + (REPL × DLB × DIN(24))
                    + (REPL × DLDB × DIN(32))
                    + (REPL × DLHW × DIN(32))
                    + (REPL × DLW × DIN(00))]
+ (ROTATE EQ 4) ×   [(REPL̄ × DIN(08))
                    + (REPL × DLB × DIN(32))
                    + (REPL × DLDB × DIN(40))
                    + (REPL × DLHW × DIN(40))
                    + (REPL × DLW × DIN(08))]
+ (ROTATE EQ 5) ×   [(REPL̄ × DIN(16))
                    + (REPL × DLB × DIN(40))
                    + (REPL × DLDB × DIN(48))
                    + (REPL × DLHW × DIN(48))
                    + (REPL × DLW × DIN(16))]
+ (ROTATE EQ 6) ×   [(REPL̄ × DIN(24))
                    + (REPL × DLB × DIN(48))
                    + (REPL × DLDB × DIN(56))
                    + (REPL × DLHW × DIN(56))
                    + (REPL × DLW × DIN(24))]
+ (ROTATE EQ 7) ×   [(REPL̄ × DIN(32))
                    + (REPL × DLB × DIN(56))
                    + (REPL × DLDB × DIN(00))
                    + (REPL × DLHW × DIN(00))
                    + (REPL × DLW × DIN(32))]
```

The equation for generating output bit 48 from the PLD 357 is as follows:

```
DOUT(48) =
(ROTATE EQ 0) ×     [(REPL̄ × DIN(48))
                    + (REPL × DLB × DIN(00))
                    + (REPL × DLDB × DIN(00))
                    + (REPL × DLHW × DIN(16))
                    + (REPL × DLW × DIN(48))]
+ (ROTATE EQ 1) ×   [(REPL̄ × DIN(56))
                    + (REPL × DLB × DIN(08))
                    + (REPL × DLDB × DIN(08))
                    + (REPL × DLHW × DIN(24))
                    + (REPL × DLW × DIN(56))]
+ (ROTATE EQ 2) ×   [(REPL̄ × DIN(00))
                    + (REPL × DLB × DIN(16))
                    + (REPL × DLDB × DIN(16))
                    + (REPL × DLHW × DIN(32))
                    + (REPL × DLW × DIN(00))]
+ (ROTATE EQ 3) ×   [(REPL̄ × DIN(08))
                    + (REPL × DLB × DIN(24))
                    + (REPL × DLDB × DIN(24))
                    + (REPL × DLHW × DIN(40))
                    + (REPL × DLW × DIN(08))]
+ (ROTATE EQ 4) ×   [(REPL̄ × DIN(16))
                    + (REPL × DLB × DIN(32))
                    + (REPL × DLDB × DIN(32))
                    + (REPL × DLHW × DIN(48))
                    + (REPL × DLW × DIN(16))]
+ (ROTATE EQ 5) ×   [(REPL̄ × DIN(24))
                    + (REPL × DLB × DIN(40))
                    + (REPL × DLDB × DIN(40))
                    + (REPL × DLHW × DIN(56))
                    + (REPL × DLW × DIN(24))]
+ (ROTATE EQ 6) ×   [(REPL̄ × DIN(32))
                    + (REPL × DLB × DIN(48))
                    + (REPL × DLDB × DIN(48))
                    + (REPL × DLHW × DIN(00))
                    + (REPL × DLW × DIN(32))]
+ (ROTATE EQ 7) ×   [(REPL̄ × DIN(40))
                    + (REPL × DLB × DIN(56))
                    + (REPL × DLDB × DIN(56))
                    + (REPL × DLHW × DIN(08))
                    + (REPL × DLW × DIN(40))]
```

The equation for generating output bit 56 from the PLD 357 is as follows:

```
DOUT(56) =
(ROTATE EQ 0) ×     [(REPL̄ × DIN(56))
                    + (REPL × DLB × DIN(00))
                    + (REPL × DLDB × DIN(08))
                    + (REPL × DLHW × DIN(24))
                    + (REPL × DLW × DIN(56))]
+ (ROTATE EQ 1) ×   [(REPL̄ × DIN(00))
                    + (REPL × DLB × DIN(08))
                    + (REPL × DLDB × DIN(16))
                    + (REPL × DLHW × DIN(32))
                    + (REPL × DLW × DIN(00))]
+ (ROTATE EQ 2) ×   [(REPL̄ × DIN(08))
                    + (REPL × DLB × DIN(16))
                    + (REPL × DLDB × DIN(24))
                    + (REPL × DLHW × DIN(40))
                    + (REPL × DLW × DIN(08))]
+ (ROTATE EQ 3) ×   [(REPL̄ × DIN(16))
                    + (REPL × DLB × DIN(24))
                    + (REPL × DLDB × DIN(32))
                    + (REPL × DLHW × DIN(48))
                    + (REPL × DLW × DIN(16))]
+ (ROTATE EQ 4) ×   [(REPL̄ × DIN(24))
                    + (REPL × DLB × DIN(32))
                    + (REPL × DLDB × DIN(40))
                    + (REPL × DLHW × DIN(56))
                    + (REPL × DLW × DIN(24))]
+ (ROTATE EQ 5) ×   [(REPL̄ × DIN(32))
                    + (REPL × DLB × DIN(40))
                    + (REPL × DLDB × DIN(48))
                    + (REPL × DLHW × DIN(00))
                    + (REPL × DLW × DIN(32))]
+ (ROTATE EQ 6) ×   [(REPL̄ × DIN(40))
                    + (REPL × DLB × DIN(48))
                    + (REPL × DLDB × DIN(56))
                    + (REPL × DLHW × DIN(08))
                    + (REPL × DLW × DIN(40))]
+ (ROTATE EQ 7) ×   [(REPL̄ × DIN(48))
                    + (REPL × DLB × DIN(56))
                    + (REPL × DLDB × DIN(00))
                    + (REPL × DLHW × DIN(16))
                    + (REPL × DLW × DIN(48))]
```

The equations for the other seven PLDs are identical to the foregoing equations. For example for the PLD 356, substitute 01 for each occurrence of 00, substitute 09 for each occurrence of 08, substitute 17 for each occurrence of 16, substitute 25 for each occurrence of 24, substitute 33 for each occurrence of 32, substitute 41 for each occurrence of 40, substitute 49 for each occurrence of 48, and substitute 57 for each occurrence of 56. Since the equations are identical, the PLDs can be constructed from identical circuits with the only difference being the data inputs and outputs connected to the respective PLDs.

Description of a Switch on First Hit and a Switch on First Miss Instruction

Figure 20A:
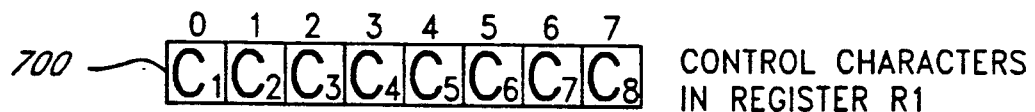
FIGS. 20a and 20 b illustrates a first register R1 having a plurality of control characters and a second register R2 having a replicated, data byte to be compared to the control characters.
Figure 20B:
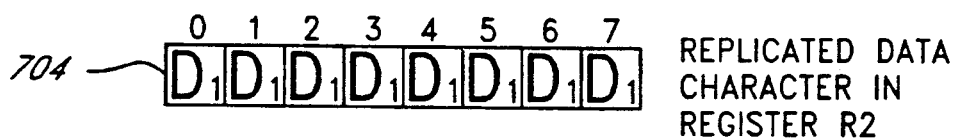

As discussed above the find first hit and miss instructions greatly improve the capabilities of the present invention in rapidly comparing an input data string to a predetermined byte, such as a control word. In the find first instructions, the result of the instruction is placed in a selected register. Thereafter, in subsequent instructions, the selected register can be used to direct an operation at the byte identified by the four-bit location value in the register. The instructions described hereinafter provide a single instruction in which the hit register is evaluated and a multi-way branch is performed based upon the result found in the hit register. By way of example, consider the two 64-bit words illustrated in FIGS. 20a and 20b. A first 64-bit word 700 contains eight bytes which advantageously correspond to eight possible control characters that may be present in an input data stream (e.g., a carriage return, a line feed, etc.). The control characters are represented as C1, C2, C3, C4, C5, C6, C7 and C8. A second 64-bit word 704 contains eight bytes which are identical. For example, the eight bytes may comprise eight copies of a character D1 in a data stream stored in memory or the like. The eight copies are advantageously produced using the load/replicate instruction and the rotate/replicate circuit 600 described above. In a typical prior art processor, it would be necessary to compare the data character with each of the eight control characters and branch if the data character compared. For example, an exemplary prior program segment would include the following instruction sequence:

| | | | |
|---|---|---|---|
| CMPI | 'C1' | R1 | Compare input data to C1 |
| BRCH | | C_ONE | Jump to instruction sequence based upon control character C1. Otherwise fall through to next instruction |
| CMPI | 'C2' | R1 | Compare input data to C2 |
| BRCH | | C_TWO | Jump to instruction sequence based upon control character C2. Otherwise fall through to next instruction |
| CMPI | 'C3' | R1 | Compare input data to C3 |
| BRCH | | C_THR | |
| CMPI | 'C4' | R1 | Compare input data to C4 |
| BRCH | | C_FOU | |
| CMPI | 'C5' | R1 | Compare input data to C3 |
| BRCH | | C_FIV | |
| CMPI | 'C6' | R1 | Compare input data to C4 |
| BRCH | | C_SIX | |
| CMPI | 'C7' | R1 | Compare input data to C3 |
| BRCH | | C_SEV | |
| CMPI | 'C8' | R1 | Compare input data to C4 |
| BRCH | | C_EIG | |
| [No control character found, perform default routine] | | | |

It can be seen that up to sixteen instructions have to be performed to determine whether or not a control character is in the input data stream. The Switch on First Hit instruction of the present invention allows the same determination to be made in three instructions as follows:

| | | | |
|---|---|---|---|
| LDR.B | MEM | R1 | Load replicated byte into R1 |
| CXOR | R1 | R2 | Where R2 contains the eight control characters |
| SWFH.B | S | ±d | Multi-way conditional branch on first hit |
| [Default instructions to be performed if no hit is found] | | | |

As indicated above, the Switch on First Hit instruction has the form "SWFH.x S ±d", where "x" is the width of the comparison to be made (B designating a byte width comparison, D designating a double-byte (two-byte) comparison, H designating a half-word (four-byte) comparison, and W designating a full-word (eight-byte) comparison; S is a scale factor of 2, 4, 8, 16 or 32, for example; and d is a displacement in bytes. As discussed above with respect to the find first instructions, if a single byte is compared, one byte of one register must compare with a byte in the other register in the corresponding byte location. If a double byte is compared, two adjacent bytes in one register must compare with two adjacent bytes in the corresponding locations in the other register. If a half word is compared, four adjacent bytes in one register must compare with four adjacent bytes in the corresponding locations in the other register. If a full word is compared, all eight bytes must compare.

Figure 21:
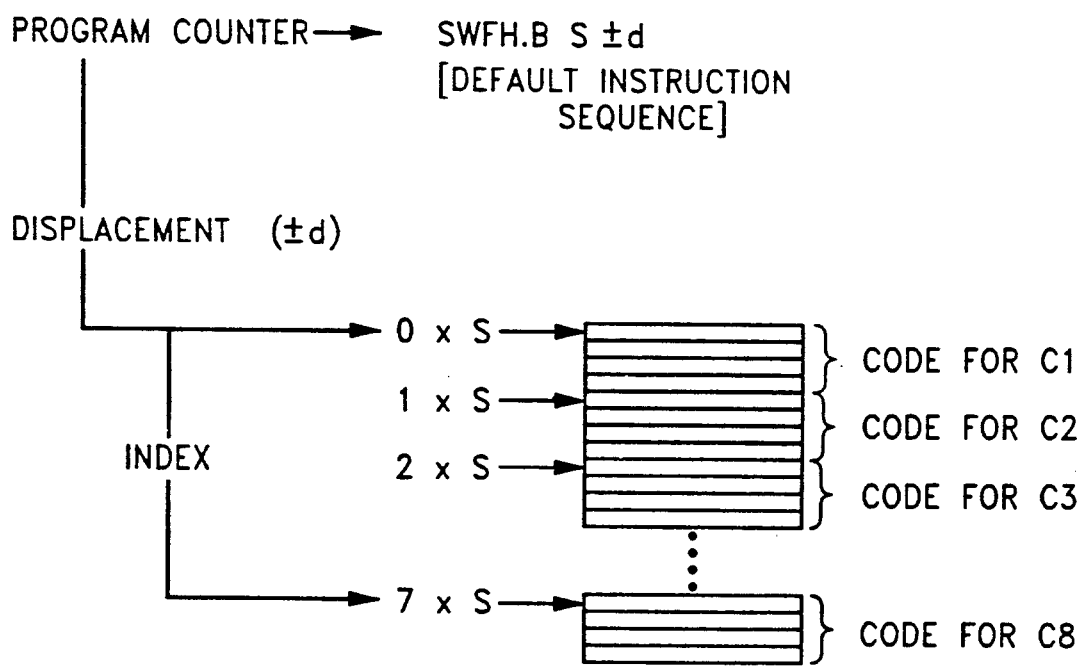
FIG. 21 illustrates an exemplary instruction sequence showing the displacement and scaling functions of the Switch on First Hit instruction.

As illustrated in FIG. 21, the displacement d determines the location of the beginning of a plurality of branch locations in the code segment containing the code to be executed or the address of the code to be executed if a hit occurs when the Switch on First Hit instruction is executed. A positive displacement d designates the number of bytes after the branch instruction and a negative displacement d indicates the number of bytes before the branch instruction. (It should be noted that the program counter will have advanced when the calculation is made. Thus, the displacement value will be based upon the first byte following the Switch on First Hit instruction.) The scale factor S determines where in the branch locations the next instruction will be taken if there is a successful comparison, and thus provides an index into a code table beginning at the displacement ±d. For example, if the scale factor S is 4, each possible branch location will be spaced apart by four bytes as illustrated in FIG. 21. Thus, if for example, the C6 control character in byte 5 is successfully compared to the data character replicated in the register R2, the Switch on First Hit instruction will branch to the location d+5S (i.e., d+20). The instruction code at the location d+20 will contain instructions specific to the control character C6. For example, if the control character C6 is a carriage return, the instruction sequence will execute instructions unique to the presence of a carriage return in the data stream. Generally, the instruction sequence in the code table will include a branch instruction to a longer code sequence elsewhere in the instructions stored in the memory of the processor.

Figure 22:
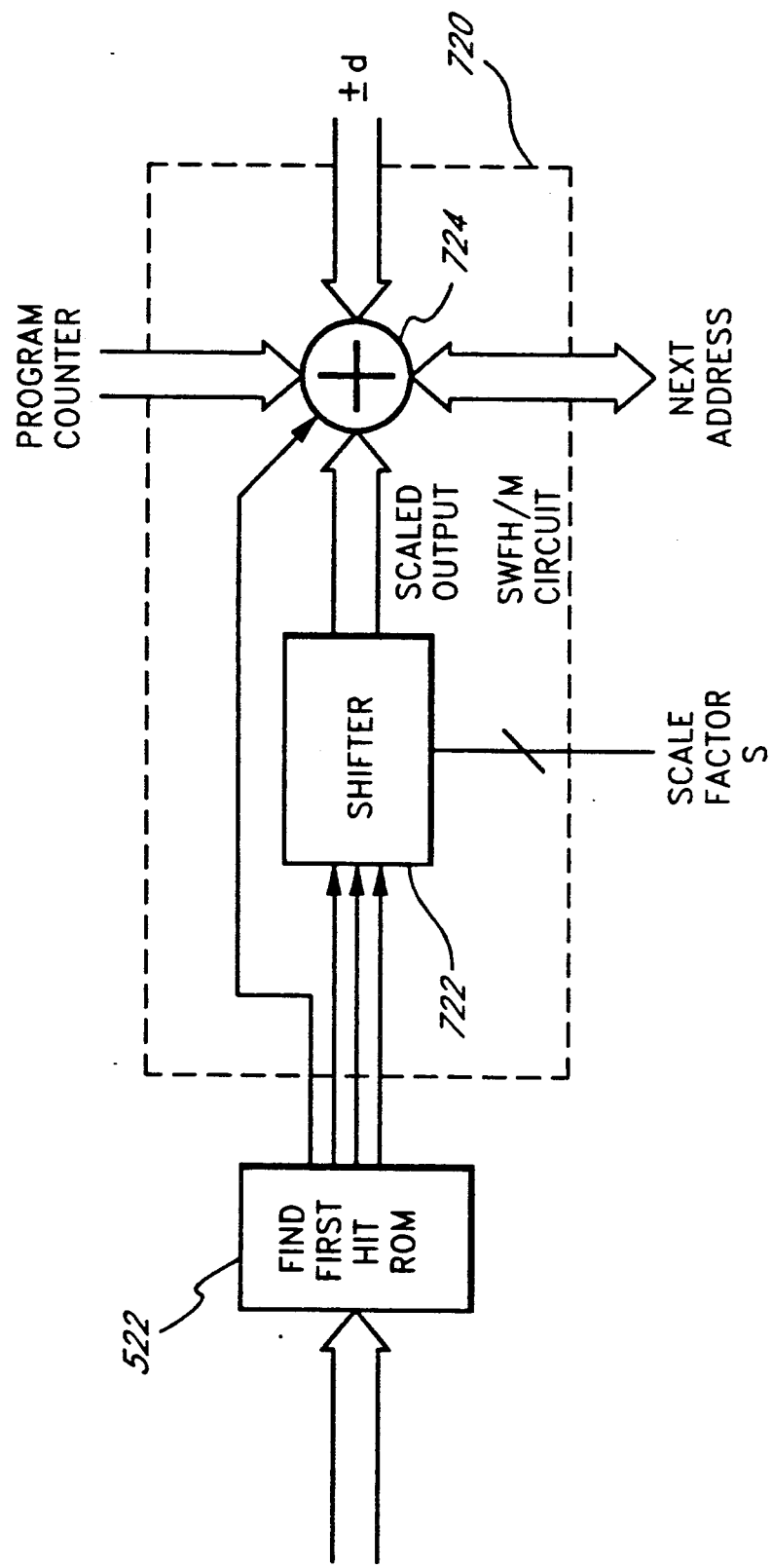
FIG. 22 illustrates an exemplary switch on first hit or miss circuit in accordance with the present invention.

The Switch on First Hit instruction is implemented by the Switch on First Hit or Miss circuit 720 illustrated in FIG. 22. As illustrated, the circuit 720 receives the four-bit output of the First Hit PROM 522 described above in connection with FIG. 10. When the Switch on First Hit instruction is decoded by the instruction decode circuit 536 (FIG. 10), the instruction register 504 applies the same address input lines to the PROM 522 as the corresponding Find First Hit instruction. The four output bits from the PROM 522 indicate which byte location has the first hit, or, if the most significant bit of the output is set, that there was no hit. The three least significant bits of the output of the PROM 522 are provided as inputs to a shifter 722 which shifts the bits left by 0, 1, 2, 3, 4 or 5 places to effect a multiplication of 0, 2, 4, 8, 16 or 32, respectively. The number of places shifted, and thus the magnitude of the multiplication is determined by the scale factor S provided a second input to the shifter 722. The shifted (i.e., multiplied) value is provided as an output from the shifter 722 and is provided as an input to an address adder 724. The address adder receives a second input from the program counter and a third input from the displacement value contained in the Switch on First Hit instruction. The three values are added together to provide an effective address output that is the sum of the program counter, the displacement and the scale factor times the byte location, as described above. The effective address output is the next address in memory from which the next instruction is retrieved when a direct addressing mode is used. If indirect addressing is used, the effective address defines a memory location where an address is stored. The stored address is the address of the next instruction.

The most significant output bit of the PROM 522 is shown as a control input to the adder 724 to disable the add function so that the output of the adder 724 is simply the current value of the program counter when no hit is found and the most significant bit is active. Thus, an unsuccessful Switch on First Hit instruction has the effect of an NOP (no operation) instruction.

It should be understood that the Switch on First Miss instruction has a similar format:
SWFM.x S ±d The Switch on First Miss instruction will cause a branch to the first miss, if any, found in the hit register 100 (FIG. 10). It should be understood that when the Switch on First Miss instruction is executed, the instruction register 504 (FIG. 10) applies an address to the PROM 522 to cause the PROM 522 to determine the first miss and provide the four output bits as described above with respect to the Find First Miss instruction.

Description of Clear Data and Clear Hit/Miss Instructions

The present invention includes eight other instructions that are advantageously used to process data in a character or integer data stream. One example of a frequently occurring operation in data processing is to parse the input data into text words. For example, the text words are typically separated by spaces, periods, carriage returns, or other known delimiters. Thus, when a sequence of eight bytes is evaluated, it is desired to search for a delimiter, for example, a space and save the bytes prior to the first space as a text word, or as the end of a text word if a text word has crossed a data word boundary. The presence of a space in the data word can be determined by the Find First Hit instruction or tho Switch on First Hit instruction as described above. For example, as illustrated in FIGS. 23a and 23b, a first register R1 750 contains a data string that includes the word "KEY", followed by two spaces (represented as "Sp"), and then followed by three characters that begin the next word. A second register R2 752 contains eight replicated bytes of the space character. Executing the compare exclusive-OR instruction (i.e., CXOR R1 R2) results in the hit register 100 having the bits corresponding to bytes 3 and 4 set. After determining that the first register R1 750 in FIG. 23a includes at least one space, it is desired to clear the register R1 beginning with the first space so that the register R! includes only the first word. The present invention includes a Clear Data From First Hit instruction that accomplishes this goal. The Clear Data From First Hit has the format:
CLRDFFH Ri The result of executing the Clear Data After First Hit on the register R1 is illustrated in FIG. 24 wherein the dashes in the five least significant byte positions indicate zeros which represent no characters in the byte locations. It should be understood that the hit register 100 will continue to have the same bit locations set until another compare exclusive-OR instruction is executed so that the Clear Data From First Hit instruction will operate based upon the previous compare exclusive-OR instruction.

Another useful instruction is a Clear Data To First Hit instruction which operates in a similar manner except that the data is cleared up to the location of the first hit. The Clear Data To First Hit instruction has the following format:
CLRDTFH Ri Using the register R1 750 and the register R2 752 of FIG. 23 as an example, the result of executing the Clear Data To First Hit instruction is illustrated in FIG. 25.

A Clear Data First Hit instruction has the format:
CLRDFH Ri

The operation of this instruction is to clear the data byte causing the first hit without disturbing the other data bytes as illustrated in FIG. 26 for the data in the register R1 750 and the register R2 752 in FIG. 23.

A Clear Data From First Miss instruction is included. The Clear Data From First Miss instruction has the format:
CLRDFFM Ri The operation of this instruction is illustrated by first referring to FIGS. 27a and 27b wherein the register R1 750 comprises an input data word containing three spaces, followed by the text word "KEY", followed by three spaces, and the register R2 752 contains replicated spaces. The result of executing the CXOR RI R2 instruction followed by the Clear Data From First Miss instruction is illustrated in FIG. 28 wherein it can be seen that the data characters following the third space characters have been cleared.

A Clear Data To First Miss instruction has the format:
CLRDTFM Ri

The operation of this instruction on the data in the R1 register in FIG. 27 following the compare exclusive-OR instruction is illustrated in FIG. 29 wherein it can be seen that the first three space characters are cleared A Clear Data First Miss instruction has the format:
CLRDFM Ri The operation of this instruction is to clear the byte that generated the first miss as illustrated by the clearing of the first non-space character in FIG. 30.

Figure 31A:
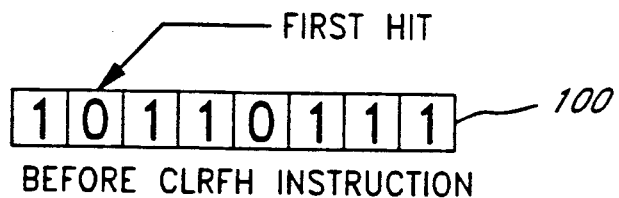
FIGS. 31a and 31b respectively illustrate the hit register before and after the Clear First Hit instruction.
Figure 31B:

One pair of instructions provided by the present invention relate to the hit register itself. Often it is desired to determine whether there has been more than one hit. Although the clear data instructions described above can be executed followed by a compare exclusive-OR instruction and a branch on hit instruction, the pair of hit register instructions described below reduce the number of instructions required to accomplish this goal. The first instruction is a Clear First Hit instruction having the format:
CLRFH Since the instruction operates on the hit register 100, it is not necessary to specify a register with the instruction. As illustrated in FIGS. 31a and 31b, the Clear First Hit instruction clears the first bit in the hit register without affecting any of the other bits in the hit register so that a Find First Hit instruction, or the like, will now find the next hit, if any, in the hit register. Note that a hit in the hit register 100 is represented by a zero and a miss in the hit register 100 is represented by a one.

Similarly, a Clear First Miss instruction has the format:
CLRFM

Figure 32A:
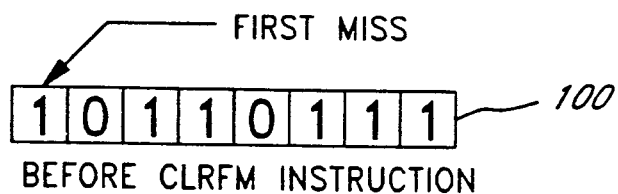
FIGS. 32a and 32b respectively illustrate the hit register before and after the Clear First Miss instruction.
Figure 32B:

As illustrated in FIGS. 32a and 32b, the Clear First Miss instruction clears the first miss/ in the hit register 100 (i.e., makes the miss look like a hit) so that subsequent Find First Miss instructions, or the like, will find the next miss, if any.

Figure 33:
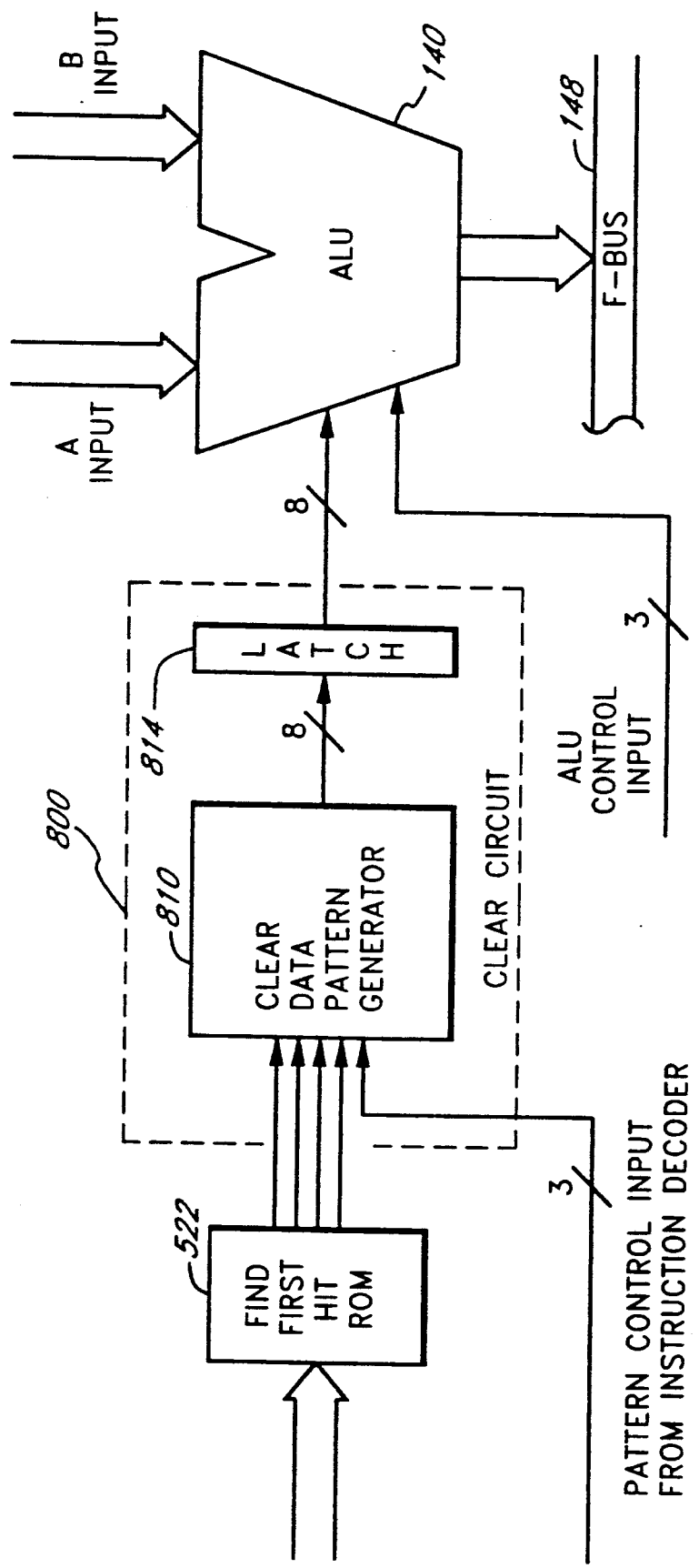
FIG. 33 illustrates an exemplary circuit that implements the Clear Data instructions and Clear Hit Register instructions of the present invention.

An exemplary circuit 800 that implements the Clear Data From First Hit, Clear Data To First Hit, Clear Data From First Miss, Clear Data To First Miss, Clear First Hit and Clear First Miss instructions is illustrated in FIG. 33. The circuit 800 receives data from the PROM 522 described above. When any of the just described eight instructions is executed, the appropriate decoded address signals are applied to the PROM 522 by the instruction register 504 (FIG. 10) to cause the PROM 522 to provide the four output bits to indicate the first hit or first miss in accordance with the instruction being executed. The four output bits from the PROM 522 are provided as an input to a pattern generator 810 which generates an eight-bit mask output to a latch 814. The latch 814 provides a corresponding latched eight-bit mask output. Each bit of the mask output from the latch 814 is provided to a respective control input of one byte of the ALU 140. These control inputs are enabled only when one of the eight clear instructions described above is being executed. Otherwise, the ALU 140 is controlled in a conventional manner. The mask output from the pattern generator 810 is responsive to a three-bit control input that varies in accordance with the Clear instruction being executed.

For the Clear Data instructions, if an output bit from the latch 814 is set the output of the corresponding byte of the ALU 140 is cleared to zero irrespective of the data input to the A input of the ALU. The remaining bytes on the A input to the ALU are transferred through without change. When one of the Clear Data instructions is executed, the A input is the designated register (e.g., R1 in the examples presented above), an the output of the ALU 140 will be the same as the input with the selected byte cleared. The output of the ALU is routed back to the designated register via the F-bus 148.

When the Clear First Hit or the Clear First Miss instruction is selected, the output of the hit register 100 is routed through the ALU 140 with one bit of the hit register 100 being routed through a corresponding byte of the ALU 140. If the instruction is the Clear First Hit instruction, the output of the latch 814 is a logical 1 only for the bit to be cleared. This bit is OR'ed with the respective bit of the hit register to set the hit register bit to a one to clear the hit. If the instruction is the Clear First Miss instruction, the output of the latch 814 is a one for all the bits except the bit to be cleared. The output of the latch 814 is AND'ed with the hit register bits so that the selected bit is set to a zero (i.e., the miss is cleared) and the remaining bits remain as they originally were. Each byte of the output of the ALU 140 is examined as if it were a Find First instruction and a bit corresponding to each output byte is stored in the hit register 100. This has the desired effect of clearing a hit or a miss.

The pattern in the pattern generator 810 is illustrated in FIG. 34. The leftmost column represents the number encoded by the four input bits from the PROM 522 and thus represent the position of the first hit or miss in accordance with the instruction being executed (an 8 again representing that a respective hit or miss was not found). The second column represents the pattern output for a Clear Data From First Hit or a Clear Data From First Miss instruction. The third column represents the pattern output for a Clear Data First Hit or a Clear Data First Miss instruction. The fourth column represents the pattern output for a Clear Data To First Hit or a Clear Data To First Miss instruction. The fifth column represents the pattern output for a Clear First Hit instruction. The sixth column represents the pattern output for a Clear First Miss instruction. The pattern generator can be implemented as a PROM or a programmable logic device (PLD).

Although the foregoing embodiments of the present invention have been described in connection with a 64-bit data width, it should be understood that the same advantages can be provided in machines having more or fewer bits per data word (e.g., 16-bit, 32-bit and 128-bit parallel processors). The differences between these embodiments include the data width of the buses, buffers, ALU, A and B latches, and registers. Otherwise, the operation of these additional embodiments is the same.

Modifications and alternative embodiments of the invention will be apparent to those skilled in the art in view of the foregoing description. Accordingly, this description is to be construed as illustrative only, and is for the purposes of teaching those skilled in the art the best mode of carrying out the invention. The details of the structure may be varied substantially without departing from the spirit of the invention, and the exclusive use of all modifications which come within the scope of the appended claims is reserved.

PARALLEL STRING PROCESSOR AND METHOD FOR A MINICOMPUTER

APPENDIX 1

© DAVIN COMPUTER CORPORATION 1987

```
module _D8C7L8;        flag '-r0';

title
'PAL16L8                     PAL DESIGN SPECIFICATION
 D8C7L8      U186            UN JAN 21, 1987
 ALU FUNCTION SELECT BYTE 0, 1
 DAVIN COMPUTER              IRVINE, CALIFORNIA
 -Translated by TOABEL-';

D8C7L8 device 'P16L8';

"declarations

TRUE,FALSE = 1,0;
     H,L = 1,0;
     X,Z,C = .X.,.Z.,.C.;

GND,VCC
          pin  10,20;

UALU0,UALU1,UALU2,WS0,WS1,DLB,!ICMPR,!UDIV,SHCY,UAS
          pin  1,2,3,4,5,6,8,9,11,7;

SOB1,S2B0
          pin  12,19;

!ASUBB,ALUSUB,S2B1,S1B1,S1B0,S0B0
          pin  13,14,15,16,17,18;

equations

!S0B0 = !UALU0 & !UDIV & !ICMPR
          # !UALU0 & !UDIV & ICMPR & !WS0
          # WS0 & !UDIV & ICMPR ;

"
     !S1B0 = !UALU1 & !UDIV & !ICMPR
          # !UALU1 & !UDIV & ICMPR & !WS1
          # WS0 & !UDIV & ICMPR
          # UDIV & !SHCY & !ICMPR ;

!S2B0 = !UALU2 & !UDIV & !ICMPR
          # !UALU2 & !UDIV & ICMPR & !WS2
          # WS2 & !UDIV & ICMPR
          # UDIV & !ICMPR ;

ASUBB = !UALU2 & !UALU1 & UALU0 ;

"UDIV    —>  CONTROL FUNCTION SHT GROUP DIV
     "ICMPR   —>  INSTRUCTION STATUS UPDATE CLASS 3, 4 OR MATCH ONLY
     !SOB1 = !UALU0 & !UDIV & !ICMPR
```

```
            # !UALU0 & !UDIV & ICMPR & !WS0
            # WS0 & !UDIV & ICMPR
            # DLB & !UAS & !ICMPR ;

!S1B1 = !UALU1 & !UDIV & !ICMPR
          # !UALU1 & !WS1 & !UDIV & ICMPR
          # WS1 & !UDIV & ICMPR
          # UDIV & !SHCY & !ICMPR
          # DLB & !UAS & !ICMPR ;

!S2B1 = !UALU2 & !UDIV & !ICMPR
          # !UALU2 & !WS2 & !UDIV & ICMPR
          # WS2 & !UDIV & ICMPR
          # UDIV & !ICMPR
          # DLB & !UAS ;

!ALUSUB = UALU2
            # !UALU2 & !UALU1 & !UALU0
            # !UALU2 & UALU1 & UALU0 ;

"UDIV    —>  CONTROL FUNCTION SHT GROUP DIV
    "ICMPR   —>  INSTRUCTION STATUS UPDATE CLASS 3, 4
end _D8C7L8;

module _D13C3R4;           flag '-r0';

title
'PAL16R4                        PAL DESIGN SPECIFICATION
D13C3R4         U29            UN MAY 23, 1987
Z, U BIT (PSR, USR)
DAVIN COMPUTER          IRVINE, CALIFORNIA
-Translated by TOABEL-';

D13C3R4 device 'P16R4';

"declarations

TRUE,FALSE = 1,0;
    H,L = 1,0;
    X,Z,C = .X.,.Z.,.C.;

VCC
        pin  20;

C1B,!FDPSR,F14,!ZL,!ZU,!UPDUSR,!UPDBZ,!ENUSET,UDATA3
        pin  1,2,3,6,7,8,9,4,5;

!ZERO,!USRZI,U,USRZ,ZBIT
        pin  13,14,15,16,17;

!UPDCZ,!RSTD,F32
        pin  12,18,19;

equations

!ZBIT :=  UPDBZ & !ZERO & !FDPSR
           #  FDPSR & !F14
           #  UPDCZ & ZERO & !ZBIT & !FDPSR
```

```
        # UPDCZ & !ZERO & ZBIT & !FDPSR
        # !UPDBZ & !FDPSR & !UPDCZ & !ZBIT ;

!USRZ :- UPDUSR & !ZERO
        # !UPDUSR & !USRZ ;

USRZI :- UPDUSR & ZERO
        # !UPDUSR & USRZI ;

!U    :- FDPSR & !F32 & !U
        # ENUSET & !UDATA3
        # RSTD
        # !FDPSR & !RSTD & !ENUSET & !U ;

end _D13C3R4;

module _D13B4L8;          flag '-r0';

title
'PAL16L8                          PAL DESIGN SPECIFICATION
D13B4L8        U27,U53           UN FEB 27, 1988
N BIT (HALF WORD, WORD) MICRO N
DAVIN COMPUTER               IRVINE, CALIFORNIA
-Translated by TOABEL-';

D13B4L8 device 'P16L8';

"declarations

TRUE,FALSE = 1,0;
    H,L = 1,0;
    X,Z,C = .X.,.Z.,.C.;

GND,VCC
        pin  10,20;

DLW,F63,AL63,BL63,COUT,DLHW,F31,AL31,BL31,CIN32
        pin  1,2,3,4,5,6,7,8,9,11;

!UNA,!UNB
        pin  12,19;

!ASUBB,!ZEROA,!ZEROB,N_C,!ZU,!ZL
        pin  13,14,15,16,17,18;

equations enable UNA = DLHW ;

UNA  = !AL31 & BL31 & ASUBB
        # !AL31 & !BL31 & !CIN32 & !ZL & ASUBB
        # AL31 & BL31 & CIN32 & !ZL & ASUBB
        # F31 & !ASUBB ;

"PIN 12
    enable UNB = DLW ;

UNB  = !AL63 & BL63 & ASUBB
        # !AL63 & !BL63 & !COUT & !ZL & !ZU & ASUBB
        # AL63 & BL63 & COUT & !ZL & !ZU & ASUBB
```

```
        # F63 & !ASUBB ;

enable  ZEROA - DLHW ;
    ZEROA   - DLHW & ZL ;

enable  ZEROB - DLW ;
    ZEROB   - DLW & ZL & ZU ;

"PIN 19
" SAME EQ AS B, DB
end _D13B4L8;
```

PARALLEL STRING PROCESSOR AND METHOD FOR A MINICOMPUTER

APPENDIX 2

© DAVIN COMPUTER CORPORATION 1987

```
module _JPAL;          flag '-r0';

title
'PAL16R4                    PAL DESIGN SPECIFICATION
JPALR4                      PAO AUG 07, 1986
SHIFTER J NUMBER 0 OF 31 (START WITH 0)
*** APPLY TO ALL SHIFTER J 16R4 ****
DAVIN COMPUTER        IRVINE CALIFORNIA
-Translated by TOABEL-';

JPAL device 'P16R4';

"declarations

TRUE,FALSE - 1,0;
    H,L - 1,0;
    X,Z,C - .X.,.Z.,.C.;

VCC
        pin 20;

JCLKA,JS0A,JS1A,JS2A,EN_JOUTA,!MULDIVA,JOSL,SHJO2,SHK56
        pin 1,2,3,4,5,6,7,8,9;

SHJ00,SHJ01,M0,M1
        pin 14,15,16,17;

G,SHK57,B0,B1
        pin 11,12,18,19;

JS - [JS2A , JS1A , JS0A] ;
    JCK - JCLKA;
    OUT - EN_JOUTA ;
    MUL - MULDIVA ;
``` equations

```
        enable B1 = EN_JOUTA  ;

!B1   = !JS2A & JS0A & !SHJ01 & !MULDIVA
              # JS1A & JS0A & !M1 & !MULDIVA
              # JS1A & !JS0A & !SHJ01 & !MULDIVA
              # !JS2A & JS1A & !JS0A & !SHJ00 & MULDIVA
              # JS2A & JS1A & !JS0A & !SHJ02 & MULDIVA
                # JS2A & JS1A & JS0A & !SHJ01 & !MULDIVA
              # JS1A & JS1A & JS0A & !M1 & !MULDIVA ;

"OUT J,BIT SCAN
        "BIT,BYT SCN /(MSK*SHJ01)
        "SHL J, SHR J
        "DIV
        "MUL
          "BYT SCAN enable B0 = EN_JOUTA  ;

!B0   = !JS2A & JS0A & !SHJ00 & !MULDIVA
              # JS1A & JS0A & !M0 & !MULDIVA
              # JS1A & !JS0A & !SHJ00 & !MULDIVA
              # !JS2A & JS1A & !JS0A & !JOSL & MULDIVA
              # JS2A & JS1A & !JS0A & !SHJ01 & MULDIVA
              # JS2A & JS1A & JS0A & !SHJ00 & !MULDIVA
              # JS1A & JS1A & JS0A & !M0 & !MULDIVA ;

"OUT J,BIT,BYT SCAN
        "BIT,BYT SCN /(MSK*SHJ00)
        "SHL J, SHR J
        "DIV
        "MUL
        "BYT SCAN

!M1   :=  JS2A & !JS1A & JS0A & !B1
              # !JS2A & !M1
              # JS1A & !M1
              # !JS0A & !M1 ;

"LD MASK
        "(ALL OTHER
        "CASE EQ
        "TO /M1)

!M0   := JS2A & !JS1A & JS0A & !B0
              # !JS2A & !M0
              # JS1A & !M0
              # !JS0A & !M0 ;

"LD MASK
        "(ALL OTHER
        "CASE EQ
        "TO /M0)

!SHJ01    := !JS2A & !JS1A & !SHJ01
                   # !JS2A & JS1A & !SHJ00
                   # JS2A & !JS1A & !JS0A & !B1
                   # JS2A & !JS1A & JS0A & !SHJ01
```

```
                # JS2A & JS1A & !JS0A & !SHJ02
                # JS2A & JS1A & JS0A & !SHK57 ;

"HOLD J, OUT J
    "SHL J, BIT SCAN
    "LOAD J
    "LD MSK,
    "SHR J
    "BYT SCAN

!SHJ00       := !JS2A & !JS1A & !SHJ00
                # !JS2A & JS1A & !JOSL
                # JS2A & !JS1A & !JS0A & !B0
                # JS2A & !JS1A & JS0A & !SHJ00
                # JS2A & JS1A & !JS0A & !SHJ01
                # JS2A & JS1A & JS0A & !SHK56 ;

"HOLD J, OUT J
    "SHL J, BIT SCAN
    "LOAD J
    "LD MSK,
    "SHR J
    "BYT SCAN

"       JS  = [JS2A , JS1A , JS0A] ;
"       JCK = JCLKA;
"       OUT = EN_JOUTA ;
"       MUL = MULDIVA ;

test_vectors
([JCK,G, JS,JOSL,SHJ02,SHK56,SHK57,!MUL,OUT,B0,B1]->[B0,B1,M0,M1,SHJ00,SHJ01])
 [ C ,H,^h5,  X , X  , X  , X  , H , L, L, L]->[ Z, Z, Z, Z, Z , Z ];
 [ C ,L,^h4,  X , X  , X  , X  , H , L, L, L]->[ Z, Z, L, L, L , L ];
 [ C ,L,^h4,  X , X  , X  , X  , H , L, H, H]->[ Z, Z, L, L, H , H ];
 [ C ,L,^h4,  X , X  , X  , X  , H , L, H, L]->[ Z, Z, L, L, H , L ];
 [ C ,L,^h4,  X , X  , X  , X  , H , L, L, H]->[ Z, Z, L, L, L , H ];
 [ C ,L,^h5,  X , X  , X  , X  , H , L, L, H]->[ Z, Z, L, H, L , H ];
 [ C ,L,^h5,  X , X  , X  , X  , H , L, H, L]->[ Z, Z, H, L, L , H ];
 [ C ,L,^h5,  X , X  , X  , X  , H , L, H, H]->[ Z, Z, H, H, L , H ];
 [ C ,L,^h0,  X , X  , X  , X  , H , L, H, H]->[ Z, Z, H, H, L , H ];
 [ C ,L,^h1,  X , X  , X  , X  , H , H, X, X]->[ L, H, H, H, L , H ];
 [ C ,L,^h2,  H , X  , X  , X  , H , H, X, X]->[ H, L, H, H, H , L ];
 [ C ,L,^h2,  L , X  , X  , X  , H , H, X, X]->[ L, H, H, H, L , H ];
 [ C ,L,^h2,  L , X  , X  , X  , H , H, X, X]->[ L, L, H, H, L , L ];
 [ C ,L,^h2,  H , X  , X  , X  , H , H, X, X]->[ H, L, H, H, H , L ];
 [ C ,L,^h2,  H , X  , X  , X  , H , H, X, X]->[ H, H, H, H, H , H ];
 [ C ,L,^h3,  L , X  , X  , X  , H , H, X, X]->[ L, H, H, H, L , H ];
 [ C ,L,^h3,  H , X  , X  , X  , H , H, X, X]->[ H, L, H, H, H , L ];
 [ C ,L,^h5,  X , X  , X  , X  , H , L, L, L]->[ Z, Z, L, L, H , L ];
 [ C ,L,^h3,  L , X  , X  , X  , H , H, X, X]->[ L, L, L, L, L , H ];
 [ C ,L,^h3,  H , X  , X  , X  , H , H, X, X]->[ L, L, L, L, H , L ];
 [ C ,L,^h5,  X , X  , X  , X  , H , L, H, L]->[ Z, Z, H, L, H , L ];
 [ C ,L,^h3,  L , X  , X  , X  , H , H, X, X]->[ L, L, H, L, L , H ];
 [ C ,L,^h3,  H , X  , X  , X  , H , H, X, X]->[ H, L, H, L, H , L ];
 [ C ,L,^h5,  X , X  , X  , X  , L , L, L, L]->[ Z, Z, L, L, H , L ];
 [ C ,L,^h6,  X , L  , X  , X  , H , H, X, X]->[ L, L, L, L, L , L ];
 [ C ,L,^h6,  X , H  , X  , X  , H , H, X, X]->[ L, H, L, L, L , H ];
 [ C ,L,^h6,  X , L  , X  , X  , H , H, X, X]->[ H, L, L, L, H , L ];
 [ C ,L,^h7,  X , X  , L  , L  , H , H, X, X]->[ L, L, L, L, L , L ];
 [ C ,L,^h7,  X , X  , L  , H  , H , H, X, X]->[ L, L, L, L, L , H ];
```

```
[ C ,L,^h7, X , X , H , L , H , H , X, X]->[ L, L, L, L, H , L ];
[ C ,L,^h7, X , X , H , H , H , H , X, X]->[ L, L, L, L, H , H ];
[ C ,L,^h5, X , X , X , X , H , L , H, H]->[ Z, Z, H, H, H , H ];
[ C ,L,^h7, X , X , L , L , H , H , X, X]->[ L, L, H, H, L , L ];
[ C ,L,^h7, X , X , L , H , H , H , X, X]->[ L, H, H, H, L , H ];
[ C ,L,^h7, X , X , H , L , H , H , X, X]->[ H, L, H, H, H , L ];
[ C ,L,^h7, X , X , H , H , H , H , X, X]->[ H, H, H, H, H , H ];
[ C ,L,^h5, X , X , X , X , H , L , H, L]->[ Z, Z, H, L, H , H ];
[ C ,L,^h7, X , X , L , L , H , H , X, X]->[ L, L, H, L, L , L ];
[ C ,L,^h7, X , X , L , H , H , H , X, X]->[ L, L, H, L, L , H ];
[ C ,L,^h7, X , X , H , L , H , H , X, X]->[ H, L, H, L, H , L ];
[ C ,L,^h7, X , X , H , H , H , H , X, X]->[ H, L, H, L, H , H ];
[ C ,L,^h6, H , H , X , X , L , H , X, X]->[ H, H, H, L, H , H ];
[ C ,L,^h4, X , X , X , X , L , L , H, L]->[ Z, Z, H, L, H , L ];
[ C ,L,^h6, L , H , X , X , L , H , X, X]->[ H, H, H, L, L , H ];
[ C ,L,^h4, X , X , X , X , L , L , L, H]->[ Z, Z, H, L, L , H ];
[ C ,L,^h6, L , L , X , X , L , H , X, X]->[ L, L, H, L, H , L ];
[ C ,L,^h4, X , X , X , X , L , L , H, L]->[ Z, Z, H, L, H , L ];
[ C ,L,^h2, L , H , X , X , L , H , X, X]->[ L, L, H, L, L , H ];
[ C ,L,^h4, X , X , X , X , L , L , L, L]->[ Z, Z, H, L, L , L ];
[ C ,L,^h2, H , L , X , X , L , H , X, X]->[ H, H, H, L, H , L ];
``` end _JPAL;

module _KPAL;          flag '-r0';

title
'PAL20R4                     PAL DESIGN SPECIFICATION
KPALR4                       PAO OCT 29, 1986
SHIFTER K NUMBER 15 OF 15 (START WITH 0) * APPLY TO SHK 2 TO 15 **
DAVIN COMPUTER      IRVINE CALIFORNIA
-Translated by TOABEL-';

KPAL device 'P20R4';

"declarations

TRUE,FALSE = 1,0;
    H,L = 1,0;
    X,Z,C = .X.,.Z.,.C.;

VCC
        pin 24;

KCLKB,!KS0B,!KS1B,!KS2B,!EN_KOUTB,!KCLRB
        pin 1,2,3,4,5,6;

SHK59,K63SR,SHK55,SHK54,SHK53,G,SHK52
        pin 7,8,9,10,11,13,14;

SHK60,SHK61,SHK62,SHK63
        pin 17,18,19,20;

B60,B61,B62,B63
        pin 15,16,21,22;

KC  = KCLKB ;
        KS  = [KS2B , KS1B , KS0B] ;
        O   = EN_KOUTB ;
        KL  = KCLRB ;

```
    K63   = SHK63;
    K62   = SHK62;
    K61   = SHK61;
    K60   = SHK60;
    K59   = SHK59;
    SR    = K63SR;
    K55   = SHK55;
    K54   = SHK54;
    K53   = SHK53;
    K52   = SHK52;
    BIN   = [B63,B62,B61,B60];
    BOUT  = [B63,B62,B61,B60];

equations enable B63 = EN_KOUTB  ;

!B63  = !SHK63 & !KCLRB
         # KCLRB ;

"OUT K
    enable B62 = EN_KOUTB  ;

!B62  = !SHK62 & !KCLRB
         # KCLRB ;

"OUT K
    enable B61 = EN_KOUTB  ;

!B61  = !SHK61 & !KCLRB
         # KCLRB ;

"OUT K
    enable B60 = EN_KOUTB  ;

!B60  = !SHK60 & !KCLRB
         # KCLRB ;

"OUT K
    !SHK63     := !KS0B & !SHK63
               # !KS2B & !KS1B & KS0B & !B63
               # !KS2B & KS1B & KS0B & !SHK62
               # KS2B & !KS1B & KS0B & !K63SR
               # KS2B & KS1B & KS0B & !SHK55  ;

"HOLD K,RESERVED
    "LOAD K
    "SH K LEFT
    "SH K RIGHT
    "BYT SCAN, SH K LEFT BYT
    "K CLEAR
    !SHK62     := !KS0B & !SHK62
               # !KS2B & !KS1B & KS0B & !B62
               # !KS2B & KS1B & KS0B & !SHK61
               # KS2B & !KS1B & KS0B & !SHK63
               # KS2B & KS1B & KS0B & !SHK54  ;

"HOLD K,RESERVED
    "LOAD K
    "SH K LEFT
```

```
"SH K RIGHT
"BYT SCAN, SH K LEFT BYT
"K CLEAR
!SHK61       := !KSOB & !SHK61
             # !KS2B & !KS1B & KSOB & !B61
             # !KS2B & KS1B & KSOB & !SHK60
             # KS2B & !KS1B & KSOB & !SHK62
             # KS2B & KS1B & KSOB & !SHK53   ;

"HOLD K,RESERVED
"LOAD K
"SH K LEFT
"SH K RIGHT
"BYT SCAN, SH K LEFT BYT
"K CLEAR
!SHK60       :- !KSOB & !SHK60
             # !KS2B & !KS1B & KSOB & !B60
             # !KS2B & KS1B & KSOB & !SHK59
             # KS2B & !KS1B & KSOB & !SHK61
             # KS2B & KS1B & KSOB & !SHK52   ;

"HOLD K,RESERVED
"LOAD K
"SH K LEFT
"SH K RIGHT
"BYT SCAN, SH K LEFT BYT
"K CLEAR

"        KC    = KCLKB ;
"        KS    = [KS2B , KS1B , KSOB] ;
"        O     = EN_KOUTB ;
"        KL    = KCLRB ;
"        K63   = SHK63;
"        K62   = SHK62;
"        K61   = SHK61;
"        K60   = SHK60;
"        K59   = SHK59;
"        SR    = K63SR;
"        K55   = SHK55;
"        K54   = SHK54;
"        K53   = SHK53;
"        K52   = SHK52;
"        BIN   = [B63,B62,B61,B60];
"        BOUT  = [B63,B62,B61,B60];

test_vectors
([KC,G,!KS,K59,SR,K55,K54,K53,K52,BIN,!O,!KL]->[ BOUT , K63 , K62 , K61 , K60])
[ C,H,^h7, X , X , X , X , X , X , X , H, H ]->[  Z  ,  Z  ,  Z  ,  Z  ,  Z  ];
[ C,L,^h6, X , X , X , X , X , X ,^h0, H, H ]->[  Z  ,  L  ,  L  ,  L  ,  L  ];
[ C,L,^h7, X , X , X , X , X , X ,^hF, H, H ]->[  Z  ,  L  ,  L  ,  L  ,  L  ];
[ C,L,^h6, X , X , X , X , X , X ,^hF, H, H ]->[  Z  ,  H  ,  H  ,  H  ,  H  ];
[ C,L,^h7, X , X , X , X , X , X ,^h0, H, H ]->[  Z  ,  H  ,  H  ,  H  ,  H  ];
[ C,L,^h6, X , X , X , X , X , X ,^hA, H, H ]->[  Z  ,  H  ,  L  ,  H  ,  L  ];
[ C,L,^h7, X , X , X , X , X , X ,^h5, H, H ]->[  Z  ,  H  ,  L  ,  H  ,  L  ];
[ C,L,^h5, X , X , X , X , X , X ,^h5, H, H ]->[  Z  ,  H  ,  L  ,  H  ,  L  ];
[ C,L,^h1, X , X , X , X , X , X ,^h5, H, H ]->[  Z  ,  H  ,  L  ,  H  ,  L  ];
[ C,L,^h6, X , X , X , X , X , X ,^hA, H, H ]->[  X  ,  H  ,  L  ,  H  ,  L  ];
[ C,L,^h7, X , X , X , X , X , X ,^h5, L, L ]->[ ^h0 ,  H  ,  L  ,  H  ,  L  ];
[ C,L,^h5, X , X , X , X , X , X ,^h5, L, H ]->[ ^hA ,  H  ,  L  ,  H  ,  L  ];
```

```
[ C,L,^h4, H , X, X , X , X , X , X , L, H ]->[ ^h5 , L , H , L , H ];
[ C,L,^h4, H , X, X , X , X , X , X , L, H ]->[ ^hB , H , L , H , H ];
[ C,L,^h4, L , X, X , X , X , X , X , L, H ]->[ ^h6 , L , H , H , L ];
[ C,L,^h3, L , X, X , X , X , X , X , L, H ]->[ ^h6 , L , H , H , L ];
[ C,L,^h2, X , H, X , X , X , X , X , L, H ]->[ ^hB , H , L , H , H ];
[ C,L,^h2, X , L, X , X , X , X , X , L, H ]->[ ^h5 , L , H , L , H ];
[ C,L,^h2, X , H, X , X , X , X , X , L, H ]->[ ^hA , H , L , H , L ];
[ C,L,^h1, X , H, X , X , X , X , X , L, H ]->[ ^hA , H , L , H , L ];
[ C,L,^h0, X , H, L , L , L , L , X , L, H ]->[ ^h0 , L , L , L , L ];
[ C,L,^h0, X , H, L , H , L , H , X , L, H ]->[ ^h5 , L , H , L , H ];
[ C,L,^h0, X , H, H , L , H , L , X , L, H ]->[ ^hA , H , L , H , L ];
[ C,L,^h0, X , H, H , H , H , H , X , L, H ]->[ ^hF , H , H , H , H ];
``` end _KPAL;

module _KPALS;          flag '-r0';

title
'PAL16R4                    PAL DESIGN SPECIFICATION
KPALSR4                     PAO OCT 29, 1986
SHIFTER K NUMBER 0 OF 15 (START WITH 0) >>> APPLY TO SHK 0 & 1 <<<
DAVIN COMPUTER        IRVINE CALIFORNIA
-Translated by TOABEL-';

KPALS device 'P16R4';

"declarations

TRUE,FALSE = 1,0;
    H,L = 1,0;
    X,Z,C = .X.,.Z.,.C.;

VCC
        pin 20;

KCLKA,!KS0A,!KS1A,!KS2A,!EN_KOUTA,!KCLRA,K0SL,SHK04
        pin 1,2,3,4,5,6,7,8;

SHK00,SHK01,SHK02,SHK03
        pin 14,15,16,17;

G,B0,B1,B2,B3
        pin 11,12,13,18,19;

KCK   = KCLKA ;
    KS    = [KS2A , KS1A , KS0A] ;
    OUT   = EN_KOUTA ;
    CLR   = KCLRA ;
    SK0   = SHK00;
    SK1   = SHK01;
    SK2   = SHK02;
    SK3   = SHK03;

equations enable B3 = EN_KOUTA ;
        !B3 = !SHK03 & !KCLRA
            # KCLRA ;

"OUT K

```
enable B2 = EN_KOUTA ;
      !B2 = !SHK02 & !KCLRA
         # KCLRA ;
```

"OUT K

```
enable B1 = EN_KOUTA ;
      !B1 = !SHK01 & !KCLRA
         # KCLRA ;
```

"OUT K

```
enable B0 = EN_KOUTA ;
      !B0 = !SHK00 & !KCLRA
         # KCLRA ;
```

"OUT K

```
!SHK03      := !KS0A & !SHK03
            # !KS2A & !KS1A & KS0A & !B3
            # !KS2A & KS1A & KS0A & !SHK02
            # KS2A & !KS1A & KS0A & !SHK04
            # KS2A & KS1A & KS0A  ;
```

"HOLD K,RESERVED
"LOAD K
"SH K LEFT
"SH K RIGHT
"BYT SCAN 0 IN
"K CLEAR

```
!SHK02      := !KS0A & !SHK02
            # !KS2A & !KS1A & KS0A & !B2
            # !KS2A & KS1A & KS0A & !SHK01
            # KS2A & !KS1A & KS0A & !SHK03
            # KS2A & KS1A & KS0A  ;
```

"HOLD K,RESERVED
"LOAD K
"SH K LEFT
"SH K RIGHT
"BYT SCAN 0 IN
"K CLEAR

```
!SHK01      := !KS0A & !SHK01
            # !KS2A & !KS1A & KS0A & !B1
            # !KS2A & KS1A & KS0A & !SHK00
            # KS2A & !KS1A & KS0A & !SHK02
            # KS2A & KS1A & KS0A  ;
```

"HOLD K,RESERVED
"LOAD K
"SH K LEFT
"SH K RIGHT
"BYT SCAN 0 IN
"K CLEAR

```
!SHK00      := !KS0A & !SHK00
```

```
              # !KS2A & !KS1A & KS0A & !B0
              # !KS2A &  KS1A & KS0A & !KOSL
              #  KS2A & !KS1A & KS0A & !SHK01
              #  KS2A &  KS1A & KS0A   ;

"HOLD K,RESERVED
     "LOAD K
     "SH K LEFT
     "SH K RIGHT
     "BYT SCAN 0 IN
     "K CLEAR

"        KCK   = KCLKA ;
"        KS    = [KS2A , KS1A , KS0A] ;
"        OUT   = EN_KOUTA ;
"        CLR   = KCLRA ;
"        SK0   = SHK00;
"        SK1   = SHK01;
"        SK2   = SHK02;
"        SK3   = SHK03;

test_vectors
([KCK,G, !KS ,KOSL,SHK04,B0,B1,B2,B3,!OUT,!CLR]->[B0,B1,B2,B3,SK0,SK1,SK2,SK3])
[ C ,H, ^h7 , X , X , X, X, X, X, H , H ]->[ Z, Z, Z, Z, Z , Z , Z , Z ];
[ C ,L, ^h6 , X , X , L, L, L, L, H , H ]->[ Z, Z, Z, Z, L , L , L , L ];
[ C ,L, ^h7 , X , X , H, H, H, H, H , H ]->[ Z, Z, Z, Z, L , L , L , L ];
[ C ,L, ^h6 , X , X , H, H, H, H, H , H ]->[ Z, Z, Z, Z, H , H , H , H ];
[ C ,L, ^h7 , X , X , L, L, L, L, H , H ]->[ Z, Z, Z, Z, H , H , H , H ];
[ C ,L, ^h6 , X , X , H, L, H, L, H , H ]->[ Z, Z, Z, Z, H , L , H , L ];
[ C ,L, ^h7 , X , X , L, H, L, H, H , H ]->[ Z, Z, Z, Z, H , L , H , L ];
[ C ,L, ^h5 , X , X , L, H, L, H, H , H ]->[ Z, Z, Z, Z, H , L , H , L ];
[ C ,L, ^h1 , X , X , L, H, L, H, H , H ]->[ Z, Z, Z, Z, H , L , H , L ];
[ C ,L, ^h6 , X , X , H, L, H, L, H , H ]->[ Z, Z, Z, Z, H , L , H , L ];
[ C ,L, ^h7 , X , X , X, X, X, X, L , L ]->[ L, L, L, L, H , L , H , L ];
[ C ,L, ^h5 , X , X , L, H, L, H, L , H ]->[ H, L, H, L, H , L , H , L ];
[ C ,L, ^h4 , L , X , X, X, X, X, L , H ]->[ L, H, L, H, L , H , L , H ];
[ C ,L, ^h4 , H , X , X, X, X, X, L , H ]->[ H, L, H, L, H , L , H , L ];
[ C ,L, ^h3 , X , X , X, X, X, X, L , H ]->[ H, L, H, L, H , L , H , L ];
[ C ,L, ^h2 , X , H , X, X, X, X, L , H ]->[ L, H, L, H, L , H , L , H ];
[ C ,L, ^h2 , X , L , X, X, X, X, L , H ]->[ H, L, H, L, H , L , H , L ];
[ C ,L, ^h1 , X , L , X, X, X, X, L , H ]->[ H, L, H, L, H , L , H , L ];
[ C ,L, ^h0 , X , X , X, X, X, X, L , H ]->[ L, L, L, L, L , L , L , L ];

end _KPALS;

module _SH12B5L8;        flag '-r0';

title
'PAL16L8                      PAL DESIGN SPECIFICATION
SH12B5L8                      PAO MAY 05, 1986
SHIFTER CARRY GENERATOR
DAVIN COMPUTER       IRVINE CALIFORNIA
-Translated by TOABEL-';

SH12B5L8 device 'P16L8';

"declarations

TRUE,FALSE = 1,0;
```

```
H,L = 1,0;
X,Z,C = .X.,.Z.,.C.;

GND,VCC
        pin  10,20;

!SHRIGHTX,!SHLEFT,SD1,SD0,!SHWAITRQ,!SHF_OP,SHK00,!MUL,!LONG,SHJ00
        pin  1,2,3,4,5,6,7,8,9,11;

!SHCYX
        pin  12;

SHJ07,SHJ15,SHJ31,SHJ63,!UCY
        pin  13,14,15,16,18;

SR  = SHRIGHTX ;
SL  = SHLEFT ;
J63 = SHJ63 ;
J31 = SHJ31 ;
J15 = SHJ15 ;
J7  = SHJ07 ;
J0  = SHJ00 ;
K0  = SHK00 ;
SD  = [ SD1 , SD0 ];

equations

SHCYX   = SHLEFT & SD1 & SD0 & SHJ63 & SHWAITRQ
            # SHLEFT & SD1 & !SD0 & SHJ31 & SHWAITRQ
            # SHLEFT & !SD1 & SD0 & SHJ15 & SHWAITRQ
            # SHLEFT & !SD1 & !SD0 & SHJ07 & SHWAITRQ
            # SHRIGHTX & !LONG & !MUL & SHJ00 & SHWAITRQ
            # SHRIGHTX & !LONG & MUL & SHK00 & SHWAITRQ
            # SHRIGHTX & LONG & SHK00 & SHWAITRQ;

"WORD & LONG LEFT
"HWORD LEFT
"DBYTE LEFT
"BYTE LEFT
"NOT LONG RIGHT NOT MUL
"NOT LONG RIGHT MUL
"LONG RIGHT
" ALL OF ABOVE ALSO QUALIFIED BY SHWAITRQ

"       SR  = SHRIGHTX ;
"       SL  = SHLEFT ;
"      J63  = SHJ63 ;
"      J31  = SHJ31 ;
"      J15  = SHJ15 ;
"       J7  = SHJ07 ;
"       J0  = SHJ00 ;
"       SD  = [ SD1 , SD0 ];
"       K0  = SHK00 ;
test_vectors
([SD,!SR,!SL,!SHF_OP,!MUL,!LONG,J63,J31,J15, J7, J0, K0,!UCY]->[!SHCYX])
 [^h0, H , L ,  X  , H , X , X , X , X , L , X , X , X ]->[ H ];
 [^h0, H , L ,  X  , H , X , X , X , X , H , X , X , X ]->[ L ];
 [^h1, H , L ,  X  , H , X , X , X , L , X , X , X , X ]->[ H ];
 [^h1, H , L ,  X  , H , X , X , X , H , X , X , X , X ]->[ L ];
```

```
[^h2, H , L ,  X  , H , X , X , L , X , X , X , X ,  X ]->[ H ];
[^h2, H , L ,  X  , H , X , X , H , X , X , X , X ,  X ]->[ L ];
[^h3, H , L ,  X  , H , X , L , X , X , X , X , X ,  X ]->[ H ];
[^h3, H , L ,  X  , H , X , H , X , X , X , X , X ,  X ]->[ L ];
[ X , L , H ,  X  , H , H , X , X , X , X , L , X ,  X ]->[ H ];
[ X , L , H ,  X  , H , H , X , X , X , X , H , X ,  X ]->[ L ];
[ X , L , H ,  X  , L , H , X , X , X , X , L , H ,  X ]->[ L ];
[ X , L , H ,  X  , L , H , X , X , X , X , H , L ,  X ]->[ H ];
[^h3, L , H ,  X  , H , L , X , X , X , X , X , L ,  X ]->[ H ];
[^h3, L , H ,  X  , H , L , X , X , X , X , X , H ,  X ]->[ L ];
``` end _SH12B5L8;

module _SH12B7R4;       flag '-r0';

title
'PAL16R4                         PAL DESIGN SPECIFICATION
SH12B7R4                         PAO MAY 12, 1987
BEGIN OF SHIFTER OPERATION INDICATER
DAVIN COMPUTER       IRVINE CALIFORNIA
-Translated by TOABEL-';

SH12B7R4 device 'P16R4';

"declarations

TRUE,FALSE = 1,0;
    H,L = 1,0;
    X,Z,C = .X.,.Z.,.C.;

VCC
         pin 20;

C2SHB,!SHRIGHTX,UGR2,UGR1,UGR0,!UDATA0X,!UDATA1X,!UDATA2X,!UDATA3X
         pin 1,2,3,4,5,6,7,8,9;

!SHF_OP,!SHCYX,!SHCYXD,DIVTST
         pin 17,16,15,14 ;

G,!GCTRCY,!JOSLB,!SHCY,C2SHBX
         pin 11,12,13,18,19;

C2 = C2SHB ;
      UGR = [UGR2 , UGR1 , UGR0 ];

equations

DIVTST := !GCTRCY & JOSLB
           # GCTRCY & DIVTST ;

SHCYX  := SHCY ;

SHCYXD := !UGR2 & UGR1 & UGR0 & SHCYX
           #  !( !UGR2 & UGR1 & UGR0 ) & SHCYXD ;

" WHEN IN SHIFTER GROUP UPDATE SHCYXD
       " WHEN NOT IN SHIFTER GROUP HAVE SHCYXD THE SAME

SHF_OP := !UGR2 & UGR1 & UGR0 ;

```
"         C2 = C2SHB ;
"         UGR = [UGR2 , UGR1 , UGR0 ];
test_vectors
([ C2, G , UGR ,!GCTRCY,!SHCY,!JOSLB] -> [!SHF_OP,!SHCYX,!SHCYXD,DIVTST])
 [ C , H , ^h0 ,  X    , H   , X    ] -> [  Z    ,  Z    ,   Z    ,  Z    ];
 [ C , L , ^h0 ,  X    , L   , X    ] -> [  H    ,  L    ,   X    ,  X    ];
 [ C , L , ^h3 ,  L    , H   , X    ] -> [  L    ,  H    ,   L    ,  X    ];
 [ C , L , ^h3 ,  H    , L   , H    ] -> [  L    ,  L    ,   H    ,  L    ];
 [ C , L , ^h3 ,  H    , H   , L    ] -> [  L    ,  H    ,   L    ,  H    ];
 [ C , L , ^h3 ,  H    , L   , H    ] -> [  L    ,  L    ,   H    ,  L    ];
 [ C , L , ^h2 ,  L    , H   , L    ] -> [  H    ,  H    ,   H    ,  L    ];
 [ C , L , ^h1 ,  L    , L   , H    ] -> [  H    ,  L    ,   H    ,  L    ];
 [ C , L , ^h0 ,  L    , H   , L    ] -> [  H    ,  H    ,   H    ,  L    ];

end _SH12B7R4;

module _SH11C7L8;       flag '-r0';

title
'PAL16L8                         PAL DESIGN SPECIFICATION
SH11C7L8                         PAO AUG 08, 1986
SHIFTER ENABLE, DIRECTION & DATA LENGTH CONTROL
DAVIN COMPUTER        IRVINE CALIFORNIA
-Translated by TOABEL-';

SH11C7L8 device 'P16L8';

"declarations

TRUE,FALSE = 1,0;
    H,L = 1,0;
    X,Z,C = .X.,.Z.,.C.;

GND,VCC
        pin 10,20;

UGR2,UGR1,UGR0,MEQ1,UDATA5,UDATA4,GCTRSGN,I5,I4,UDT0
        pin 1,2,3,4,5,6,7,8,9,11;

!SHLEFT,!SHRIGHTY
        pin 12,19;

UDT1,UDT2,SD0,SD1,!SHRIGHTX,!EN_SHIF
        pin 13,14,15,16,17,18;

UGR   = [UGR2 , UGR1 , UGR0 ];
    SHR   = [SHRIGHTX , SHRIGHTY ] ;
    SHL   = SHLEFT ;
    GSIGN = GCTRSGN ;
    UDT   = [UDT2,UDT1,UDT0.];

equations

"COMMENT:   SD0, SD1 ARE DECODED FROM U-CODE TO INDICATE THE
    "           DATA LENGTH.
    "
    "           SD1  SD0  LENGTH
    "           -------------------
    "            0    0   BYTE
```

```
"              0    1    DBYTE
"              1    0    HWORD
"              1    1    WORDè
         EN_SHIF = !UGR2 & UGR1 & UGR0 & !MEQ1 ;

"EN SHJK

SHRIGHTX = !UGR2 & UGR1 & UGR0 & !MEQ1 & UDATA5 & !UDATA4
                 # !UGR2 & UGR1 & UGR0 & !MEQ1 & !UDATA5 & UDATA4 & !GCTRSGN ;

"EN SHJK
"DIR RIGHT

SHRIGHTY = !UGR2 & UGR1 & UGR0 & !MEQ1 & UDATA5 & !UDATA4
                 # !UGR2 & UGR1 & UGR0 & !MEQ1 & !UDATA5 & UDATA4 & !GCTRSGN ;

"EN SHJK
"DIR RIGHT

SHLEFT = !UGR2 & UGR1 & UGR0 & !MEQ1 & UDATA5 & UDATA4
                 # !UGR2 & UGR1 & UGR0 & !MEQ1 & !UDATA5 & UDATA4 & GCTRSGN ;

"EN SHJK
"DIR LEFT

!SD0 = !UGR2 & UGR1 & UGR0 & !MEQ1 & !UDT2 & UDT1 & !UDT0
              # !UGR2 & UGR1 & UGR0 & !MEQ1 & UDT2 & I5 & !I4
              # !UGR2 & UGR1 & UGR0 & !MEQ1 & !UDT2 & !UDT1 & !UDT0
              # !UGR2 & UGR1 & UGR0 & !MEQ1 & UDT2 & !I5 & !I4 ;

"NOT HWORD
"& BYTE

!SD1 = !UGR2 & UGR1 & UGR0 & !MEQ1 & !UDT2 & !UDT1 & UDT0
              # !UGR2 & UGR1 & UGR0 & !MEQ1 & UDT2 & !I5 & I4
              # !UGR2 & UGR1 & UGR0 & !MEQ1 & !UDT2 & !UDT1 & !UDT0
              # !UGR2 & UGR1 & UGR0 & !MEQ1 & UDT2 & !I5 & !I4 ;

"NOT DBYTE
"& BYTE

"         UGR  = [UGR2 , UGR1 , UGR0 ];
"         SHR  = [SHRIGHTX , SHRIGHTY ] ;
"         SHL  = SHLEFT ;
"         GSIGN = GCTRSGN ;
"         UDT  = [UDT2,UDT1,UDT0];

test_vectors
([ UGR ,MEQ1,UDATA5,UDATA4,GSIGN, I5, I4, UDT ]->[!EN_SHIF,!SHR,!SHL,SD1,SD0])
 [ ^h0 , H  , X   , X   , X  , X , X , ^h0 ]->[ H   , ^h3, H , H , H ];
 [ ^h3 , L  , L   , L   , X  , X , X , ^h0 ]->[ L   , ^h3, H , L , L ];
 [ ^h3 , L  , H   , L   , X  , X , X , ^h1 ]->[ L   , ^h0, H , L , H ];
 [ ^h3 , L  , H   , H   , X  , X , X , ^h2 ]->[ L   , ^h3, L , H , L ];
 [ ^h3 , L  , L   , H   , L  , X , X , ^h3 ]->[ L   , ^h0, H , H , H ];
 [ ^h3 , L  , L   , H   , H  , L , L , ^h4 ]->[ L   , ^h3, L , L , L ];
 [ ^h3 , L  , L   , H   , H  , L , H , ^h5 ]->[ L   , ^h3, L , L , H ];
 [ ^h3 , L  , L   , H   , H  , H , L , ^h6 ]->[ L   , ^h3, L , H , L ];
 [ ^h3 , L  , L   , H   , H  , H , H , ^h7 ]->[ L   , ^h3, L , H , H ];
``` end _SH11C7L8;

module _SH12C1L8;         flag '-r0';

title
'PAL16L8                    PAL DESIGN SPECIFICATION
SH12C1L8                    PAO AUG 08, 1986
SHIFTER K FUNCTION CONTROL
DAVIN COMPUTER        IRVINE CALIFORNIA
-Translated by TOABEL-';

SH12C1L8 device 'P16L8';

"declarations

TRUE,FALSE = 1,0;
       H,L = 1,0;
       X,Z,C = .X.,.Z.,.C.;

GND,VCC
             pin 10,20;

!SHLEFT,!SHRIGHTX,ZFG,!GCTRCY
             pin 1,2,3,4;

!UDATA0X,!UDATA1X,!UDATA2X,!UDATA3X,!LD_SHK,!EN_SHIF
             pin 5,6,7,8,9,11;

!KS1B,!KS1A
             pin 12,19;

!KS2B,!KS2A,!KS0B,!KS0A
             pin 15,16,17,18;

SL   = SHLEFT ;
         SR   = SHRIGHTX ;
         GC   = GCTRCY ;
       UDATA  = [ UDATA3X , UDATA2X , UDATA1X , UDATA0X ];
         LDK  = LD_SHK;
        ENSH  = EN_SHIF;

equations

"NOTE SHLEFT,SHRIGHTX ARE ALSO USED AS QUALIFY SIGNAL FOR SHIFTER FUNCTION
       KS0A  = LD_SHK
             # !UDATA3X & !UDATA2X & UDATA1X & UDATA0X & EN_SHIF & !GCTRCY
             # !UDATA3X & UDATA2X & !UDATA1X & EN_SHIF & !GCTRCY
             # UDATA3X & !UDATA2X & !UDATA1X & EN_SHIF & !GCTRCY
             # UDATA3X & UDATA2X & !UDATA1X & !UDATA0X & SHLEFT & !GCTRCY
             # UDATA2X & UDATA1X & !UDATA0X & SHLEFT & !ZFG & !GCTRCY ;

"LOAD K
       "LOAG ROTATE LEFT,RIGHT
       "LONG LSH,ASH,LEFT,RIGHT
       "MUL,DIV
       "SHK LEFT BYTE
       "BIT,BYT SCAN

KS1A  = !UDATA3X & !UDATA2X & UDATA1X & UDATA0X & SHLEFT & !GCTRCY
              # !UDATA3X & UDATA2X & !UDATA1X & SHLEFT & !GCTRCY

```
        # UDATA3X & !UDATA2X & !UDATA1X & UDATA0X & SHLEFT & !GCTRCY
        # UDATA3X & UDATA2X & !UDATA1X & !UDATA0X & SHLEFT & !GCTRCY
        # UDATA2X & UDATA1X & !UDATA0X & SHLEFT & !ZFG & !GCTRCY ;
```

"LOAG ROTATE LEFT
"LONG LSH,ASH,LEFT
"DIV
"SHK LEFT BYTE
"BIT,BYT SCAN

```
KS2A    = !UDATA3X & !UDATA2X & UDATA1X & UDATA0X & SHRIGHTX & !GCTRCY
        # !UDATA3X & UDATA2X & !UDATA1X & SHRIGHTX & !GCTRCY
        # UDATA3X & !UDATA2X & !UDATA1X & !UDATA0X
            & SHRIGHTX & !GCTRCY
        # UDATA3X & UDATA2X & !UDATA1X & !UDATA0X & SHLEFT & !GCTRCY
        # UDATA3X & UDATA2X & UDATA1X & !UDATA0X
            & SHLEFT & !ZFG & !GCTRCY ;
```

"LOAG ROTATE RIGHT
"LONG LSH,ASH,RIGHT
"MUL
"SHK LEFT BYTE
"BYT SCAN

```
KS0B    = LD_SHK
        # !UDATA3X & !UDATA2X & UDATA1X & UDATA0X & EN_SHIF & !GCTRCY
        # !UDATA3X & UDATA2X & !UDATA1X & EN_SHIF & !GCTRCY
        # UDATA3X & !UDATA2X & !UDATA1X & EN_SHIF & !GCTRCY
        # UDATA3X & UDATA2X & !UDATA1X & !UDATA0X & SHLEFT & !GCTRCY
        # UDATA2X & UDATA1X & !UDATA0X & SHLEFT & !ZFG & !GCTRCY ;
```

"LOAD K
"LOAG ROTATE LEFT,RIGHT
"LONG LSH,ASH,LEFT,RIGHT
"MUL,DIV
"SHK LEFT BYTE
"BIT,BYT SCAN

```
KS1B    = !UDATA3X & !UDATA2X & UDATA1X & UDATA0X & SHLEFT & !GCTRCY
        # !UDATA3X & UDATA2X & !UDATA1X & SHLEFT & !GCTRCY
        # UDATA3X & !UDATA2X & !UDATA1X & UDATA0X & SHLEFT & !GCTRCY
        # UDATA3X & UDATA2X & !UDATA1X & !UDATA0X & SHLEFT & !GCTRCY
        # UDATA2X & UDATA1X & !UDATA0X & SHLEFT & !ZFG & !GCTRCY ;
```

"LOAG ROTATE LEFT
"LONG LSH,ASH,LEFT
"DIV
"SHK LEFT BYTE
"BIT,BYT SCAN

```
KS2B    = !UDATA3X & !UDATA2X & UDATA1X & UDATA0X & SHRIGHTX & !GCTRCY
        # !UDATA3X & UDATA2X & !UDATA1X & SHRIGHTX & !GCTRCY
        # UDATA3X & !UDATA2X & !UDATA1X & !UDATA0X
            & SHRIGHTX & !GCTRCY
        # UDATA3X & UDATA2X & !UDATA1X & !UDATA0X & SHLEFT & !GCTRCY
        # UDATA3X & UDATA2X & UDATA1X & !UDATA0X
            & SHLEFT & !ZFG & !GCTRCY ;
```

"LOAG ROTATE RIGHT
   "LONG LSH,ASH,RIGHT
   "MUL

"SHK LEFT BYTE
"BYT SCAN

```
"       SL    = SHLEFT ;
"       SR    = SHRIGHTX ;
"       GC    = GCTRCY ;
"       UDATA = [ UDATA3X , UDATA2X , UDATA1X , UDATA0X ];
"       LDK   = LD_SHK;
"       ENSH  = EN_SHIF;
test_vectors
([!UDATA,!SL,!SR,ZFG,!GC,!LDK,!ENSH]->[!KS0A,!KS0B,!KS1A,!KS1B,!KS2A,!KS2B])
 [ ^hF , H , H , X , X , H , H ]->[ H , H , H , H , H , H ];
 [ ^hF , H , H , X , X , L , H ]->[ L , L , H , H , H , H ];
 [ ^hF , L , L , X , H , H , L ]->[ H , H , H , H , H , H ];
 [ ^hE , L , L , X , H , H , L ]->[ H , H , H , H , H , H ];
 [ ^hD , L , L , X , H , H , L ]->[ H , H , H , H , H , H ];
 [ ^hC , L , H , X , H , H , L ]->[ L , L , L , L , H , H ];
 [ ^hC , L , H , X , L , H , L ]->[ H , H , H , H , H , H ];
 [ ^hC , H , L , X , H , H , L ]->[ L , L , H , H , L , L ];
 [ ^hC , H , L , X , L , H , L ]->[ H , H , H , H , H , H ];
 [ ^hB , L , H , X , H , H , L ]->[ L , L , L , L , H , H ];
 [ ^hB , L , H , X , L , H , L ]->[ H , H , H , H , H , H ];
 [ ^hB , H , L , X , H , H , L ]->[ L , L , H , H , L , L ];
 [ ^hB , H , L , X , L , H , L ]->[ H , H , H , H , H , H ];
 [ ^hA , L , H , X , H , H , L ]->[ L , L , L , L , H , H ];
 [ ^hA , L , H , X , L , H , L ]->[ H , H , H , H , H , H ];
 [ ^hA , H , L , X , H , H , L ]->[ L , L , H , H , L , L ];
 [ ^hA , H , L , X , L , H , L ]->[ H , H , H , H , H , H ];
 [ ^h9 , L , H , L , H , H , L ]->[ L , L , L , L , H , H ];
 [ ^h9 , L , H , L , L , H , L ]->[ H , H , H , H , H , H ];
 [ ^h9 , L , H , H , H , H , L ]->[ H , H , H , H , H , H ];
 [ ^h8 , L , H , X , H , H , L ]->[ H , H , H , H , H , H ];
 [ ^h7 , H , L , X , H , H , L ]->[ L , L , H , H , L , L ];
 [ ^h7 , H , L , X , L , H , L ]->[ H , H , H , H , H , H ];
 [ ^h6 , L , H , X , H , H , L ]->[ L , L , L , L , H , H ];
 [ ^h6 , L , H , X , L , H , L ]->[ H , H , H , H , H , H ];
 [ ^h5 , L , H , X , H , H , L ]->[ H , H , H , H , H , H ];
 [ ^h4 , L , H , X , H , H , L ]->[ H , H , H , H , H , H ];
 [ ^h3 , L , H , X , H , H , L ]->[ L , L , L , L , L , L ];
 [ ^h3 , L , H , X , L , H , L ]->[ H , H , H , H , H , H ];
 [ ^h2 , L , H , X , H , H , L ]->[ H , H , H , H , H , H ];
 [ ^h1 , L , H , X , H , H , L ]->[ L , L , L , L , L , L ];
 [ ^h1 , L , H , X , L , H , L ]->[ H , H , H , H , H , H ];
 [ ^h0 , L , H , X , H , H , L ]->[ H , H , H , H , H , H ];
``` end _SH12C1L8;

module _SH11C5L8;         flag '-r0';

title
'PAL16L8                       PAL DESIGN SPECIFICATION
SH11C5L8                       PAO MAY 07, 1987
SHIFTER K LINK CONTROL NUMBER 1 OF 2 (U50)
DAVIN COMPUTER         IRVINE CALIFORNIA
-Translated by TOABEL-';

SH11C5L8 device 'P16L8';

"declarations

```
TRUE,FALSE = 1,0;
H,L = 1,0;
X,Z,C = .X.,.Z.,.C.;

GND,VCC
     pin 10,20;

!UCY,!SHLEFT,!SHCYX,UDATA6,SHJ63,!SHRIGHTY
     pin 1,2,3,4,5,6;

!UDATA3X,!UDATA2X,!UDATA1X,!UDATA0X
       pin 7,8,9,11;

KOSL,!SHCYJ
     pin 12,19;

!MULDIVD,!MULDIVC,!MULDIVB,!MULDIVA,SHK00,!SHF_OP
     pin 13,14,15,16,17,18;

UDATA = [ UDATA3X , UDATA2X , UDATA1X , UDATA0X ];
      SL = SHLEFT ;
      SR = SHRIGHTY ;
MDABCD = [MULDIVA , MULDIVB , MULDIVC , MULDIVD];
      OP = SHF_OP ;
      KO = SHK00 ;

equations

!KOSL = SHLEFT & !UDATA6 & !SHJ63
         & !UDATA3X & !UDATA2X & UDATA1X & UDATA0X
       # SHLEFT & !UDATA3X & UDATA2X & !UDATA1X
       # SHLEFT & UDATA2X & UDATA1X & !UDATA0X
       # SHLEFT & UDATA3X & !UDATA2X & !UDATA1X & UDATA0X
         & !SHF_OP & !SHK00
       # SHLEFT & UDATA3X & !UDATA2X & !UDATA1X & UDATA0X
         & SHF_OP & UCY
       # !SHF_OP & SHLEFT & UDATA6 & !UCY
         & !UDATA3X & !UDATA2X & UDATA1X & UDATA0X
       # SHF_OP & SHLEFT & UDATA6 & !SHCYX
         & !UDATA3X & !UDATA2X & UDATA1X & UDATA0X ;

"LONG ROL, SHJ63
"LONG LOG,ARTH SHL, 0 IN
"BIT,BYT SCAN, 0 IN
"DIV 1ST CYC SHK00
"DIV REST CYC !UCY
"LONG ROL THRU CY FIRST CYCLE, KOSL = UCY
"LONG ROL THRU CY RESET OF CYCLE , KOSL = SHCYX

SHCYJ = SHF_OP & SHCYX
      # !SHF_OP & UCY ;

"DIV
"MUL

MULDIVA = UDATA3X & !UDATA2X & !UDATA1X & UDATA0X & SHLEFT
        # UDATA3X & !UDATA2X & !UDATA1X & !UDATA0X & SHRIGHTY ;

"DIV
```

```
"MUL

MULDIVB = UDATA3X & !UDATA2X & !UDATA1X &  UDATA0X & SHLEFT
        # UDATA3X & !UDATA2X & !UDATA1X & !UDATA0X & SHRIGHTY ;

"DIV
"MUL

MULDIVC = UDATA3X & !UDATA2X & !UDATA1X &  UDATA0X & SHLEFT
        # UDATA3X & !UDATA2X & !UDATA1X & !UDATA0X & SHRIGHTY ;

"DIV
"MUL

MULDIVD = UDATA3X & !UDATA2X & !UDATA1X &  UDATA0X & SHLEFT
        # UDATA3X & !UDATA2X & !UDATA1X & !UDATA0X & SHRIGHTY ;

"DIV
"MUL

"       UDATA = [ UDATA3X , UDATA2X , UDATA1X , UDATA0X ];
"          SL = SHLEFT ;
"          SR = SHRIGHTY ;
"       MDABCD = [MULDIVA , MULDIVB , MULDIVC , MULDIVD];
"          OP = SHF_OP ;
"          K0 = SHK00 ;
test_vectors
([!UDATA,!SL,!SR,UDATA6,SHJ63,!UCY,!SHCYX,!OP,K0]->[ K0SL , !SHCYJ , !MDABCD])
 [ ^hC , L , X , H , X , H , L , H ,X ]->[ L , H , ^hF ];
 [ ^hC , L , X , H , X , L , H , H ,X ]->[ H , L , ^hF ];
 [ ^hF , H , H , X , X , H , L , L ,X ]->[ H , L , ^hF ];
 [ ^hF , L , H , L , X , L , H , L ,X ]->[ H , H , ^hF ];
 [ ^hE , L , H , L , X , X , X , L ,X ]->[ H , X , ^hF ];
 [ ^hD , L , H , L , X , X , X , L ,X ]->[ H , X , ^hF ];
 [ ^hC , L , H , L , L , X , L , L ,X ]->[ L , X , ^hF ];
 [ ^hC , L , H , L , H , X , H , L ,X ]->[ H , X , ^hF ];
 [ ^hC , L , H , H , L , X , L , L ,X ]->[ H , X , ^hF ];
 [ ^hC , L , H , H , H , X , H , L ,X ]->[ L , X , ^hF ];
 [ ^hB , L , H , X , X , X , X , L ,X ]->[ L , X , ^hF ];
 [ ^hA , L , H , X , X , X , X , L ,X ]->[ L , X , ^hF ];
 [ ^h9 , L , H , X , X , X , X , L ,X ]->[ L , X , ^hF ];
 [ ^h8 , L , H , X , X , X , X , L ,X ]->[ H , X , ^hF ];
 [ ^h7 , H , L , X , X , X , X , L ,X ]->[ H , X , ^h0 ];
 [ ^h7 , L , H , X , X , X , X , L ,X ]->[ H , X , ^hF ];
 [ ^h6 , H , L , X , X , L , X , L ,X ]->[ H , X , ^hF ];
 [ ^h6 , L , H , X , X , X , X , H ,H ]->[ H , X , ^h0 ];
 [ ^h6 , L , H , X , X , X , X , H ,L ]->[ L , X , ^h0 ];
 [ ^h6 , L , H , X , X , L , X , L ,X ]->[ L , X , ^h0 ];
 [ ^h6 , L , H , X , X , H , X , L ,X ]->[ H , X , ^h0 ];
 [ ^h5 , L , H , X , X , X , X , L ,X ]->[ H , X , ^hF ];
 [ ^h4 , L , H , X , X , X , X , L ,X ]->[ H , X , ^hF ];
 [ ^h3 , L , H , X , X , X , X , L ,X ]->[ H , X , ^hF ];
 [ ^h2 , L , H , X , X , X , X , L ,X ]->[ H , X , ^hF ];
 [ ^h1 , L , H , X , X , X , X , L ,X ]->[ L , X , ^hF ];
 [ ^h0 , L , H , X , X , X , X , L ,X ]->[ H , X , ^hF ];

end _SH11C5L8;
```

```
module _SH11B3L8;        flag '-r0';

title
'PAL16L8                         PAL DESIGN SPECIFICATION
SH11B3L8                         PAO MAY 06, 1987
SHIFTER J LINK CONTROL (U63)
DAVIN COMPUTER        IRVINE CALIFORNIA
-Translated by TOABEL-';

SH11B3L8 device 'P16L8';

"declarations

TRUE,FALSE = 1,0;
     H,L = 1,0;
     X,Z,C = .X.,.Z.,.C.;

GND,VCC
            pin  10,20;

!SHRIGHTY,SD0,SD1,UDATA6,!UDATA0X,!UDATA1X,!UDATA2X,!UDATA3X,SHJ00,!SHCYX
            pin  1,2,3,4,5,6,7,8,9,11;

J15SR,J31SR
            pin  12,19;

!SHCYJ,SHJ31,SHJ15,!UCY,SHJ32,SHJ16
            pin  13,14,15,16,17,18;

SRY   = SHRIGHTY ;
      SD   = [ SD1 , SD0];
     UDATA = [ UDATA3X , UDATA2X , UDATA1X , UDATA0X ];
       J0  = SHJ00 ;
      J15  = SHJ15 ;
      J16  = SHJ16 ;
      J31  = SHJ31 ;
      J32  = SHJ32 ;

equations

!J15SR = SHRIGHTY & !SD1 & SD0 & !UDATA3X & !UDATA2X & !UDATA1X & !UDATA0X
            # SHRIGHTY & !SD1 & SD0 & !SHJ15 & !UDATA3X & !UDATA2X & !UDATA1X
              & UDATA0X
            # SHRIGHTY & !SD1 & SD0 & !UDATA6 & !SHJ00 & !UDATA3X & !UDATA2X
              & UDATA1X & !UDATA0X
            # SHRIGHTY & !SD1 & SD0 & UDATA6 & !SHCYJ & !UDATA3X & !UDATA2X
              & UDATA1X & !UDATA0X
            # SHRIGHTY & !SD1 & SD0 & UDATA3X & !UDATA2X & !UDATA1X & !UDATA0X
            # SHRIGHTY & !SHJ16 & SD1 ;

"LOG SHR DBYTE, 0 IN
     "ASH SHR DBYTE,MSB SELF
     "ROR DBYTE,SHJ00
     "RRC DBYTE,SHCYJ
     "MUL DBYTE,0 IN
     "DIR RIGHT W,HW , SHJ16
```

!J31SR = SHRIGHTY & SD1 & !SD0 & !UDATA3X & !UDATA2X & !UDATA1X & !UDATA0X
    # SHRIGHTY & SD1 & !SD0 & !SHJ31 & !UDATA3X & !UDATA2X & !UDATA1X
       & UDATA0X
    # SHRIGHTY & SD1 & !SD0 & !UDATA6 & !SHJ00 & !UDATA3X & !UDATA2X
       & UDATA1X & !UDATA0X
    # SHRIGHTY & SD1 & !SD0 & UDATA6 & !SHCYJ & !UDATA3X & !UDATA2X
       & UDATA1X & !UDATA0X
    # SHRIGHTY & SD1 & !SD0 & UDATA3X & !UDATA2X & !UDATA1X & !UDATA0X
    # SHRIGHTY & !SHJ32 & SD1 & SD0 ;

"LOG SHR HWORD, 0 IN
    "ASH SHR HWORD,MSB SELF
    "ROR HWORD,SHJ00
    "RRC HWORD,SHCYJ
    "MUL HWORD,0 IN
    "DIR RIGHT W,SHJ32

"       SRY = SHRIGHTY ;
"        SD = [ SD1 , SD0 ];
"      UDATA = [ UDATA3X , UDATA2X , UDATA1X , UDATA0X ];
"        J0 = SHJ00 ;
"       J15 = SHJ15 ;
"       J16 = SHJ16 ;
"       J31 = SHJ31 ;
"       J32 = SHJ32 ;

test_vectors
([!SRY, SD ,UDATA6,!UDATA, J0,J15,J16,J31,J32,!SHCYJ,!UCY]->[J15SR,J31SR])
[ H ,^h0 , X  , ^hF , X , X , X , X , X ,  X  , X ]->[ H , H ];
[ L ,^h0 , X  , ^hF , X , X , X , X , X ,  X  , X ]->[ H , H ];
[ L ,^h1 , X  , ^hF , X , X , H , X , X ,  X  , X ]->[ L , H ];
[ L ,^h2 , X  , ^hF , X , X , H , X , X ,  X  , X ]->[ H , L ];
[ L ,^h2 , X  , ^hF , X , X , L , X , X ,  X  , X ]->[ L , L ];
[ L ,^h3 , X  , ^hF , X , X , H , X , L ,  X  , X ]->[ H , L ];
[ L ,^h3 , X  , ^hF , X , X , L , X , H ,  X  , X ]->[ L , H ];
[ L ,^h0 , X  , ^hE , X , X , X , X , X ,  X  , X ]->[ H , H ];
[ L ,^h1 , X  , ^hE , X , H , X , X , X ,  X  , X ]->[ H , H ];
[ L ,^h1 , X  , ^hE , X , L , X , X , X ,  X  , X ]->[ L , H ];
[ L ,^h2 , X  , ^hE , X , X , H , L , X ,  X  , X ]->[ H , L ];
[ L ,^h2 , X  , ^hE , X , X , L , H , X ,  X  , X ]->[ L , H ];
[ L ,^h3 , X  , ^hE , X , X , H , X , L ,  X  , X ]->[ H , L ];
[ L ,^h3 , X  , ^hE , X , X , L , X , H ,  X  , X ]->[ L , H ];
[ L ,^h0 , X  , ^hD , X , X , X , X , X ,  X  , X ]->[ H , H ];
[ L ,^h1 , L  , ^hD , H , X , X , X , X ,  X  , X ]->[ H , H ];
[ L ,^h1 , L  , ^hD , L , X , X , X , X ,  X  , X ]->[ L , H ];
[ L ,^h1 , H  , ^hD , X , X , X , X , X ,  L  , X ]->[ H , H ];
[ L ,^h1 , H  , ^hD , X , X , X , X , X ,  H  , X ]->[ L , H ];
[ L ,^h2 , L  , ^hD , L , X , H , X , X ,  X  , X ]->[ H , L ];
[ L ,^h2 , L  , ^hD , H , X , L , X , X ,  X  , X ]->[ L , H ];
[ L ,^h2 , H  , ^hD , X , X , H , X , X ,  H  , X ]->[ H , L ];
[ L ,^h2 , H  , ^hD , X , X , L , X , X ,  L  , X ]->[ L , H ];
[ L ,^h3 , X  , ^hD , X , X , H , X , L ,  X  , X ]->[ H , L ];
[ L ,^h3 , X  , ^hD , H , X , L , X , H ,  X  , X ]->[ L , H ];
[ L ,^h3 , X  , ^hC , X , X , H , X , H ,  X  , X ]->[ H , H ];
[ L ,^h3 , X  , ^hC , X , X , L , X , L ,  X  , X ]->[ L , L ];
[ L ,^h3 , X  , ^hB , X , X , H , X , L ,  X  , X ]->[ H , L ];
[ L ,^h3 , X  , ^hB , X , X , L , X , H ,  X  , X ]->[ L , H ];
[ L ,^h3 , X  , ^hA , X , X , H , X , L ,  X  , X ]->[ H , L ];
[ L ,^h3 , X  , ^hA , X , X , L , X , H ,  X  , X ]->[ L , H ];

```
[ H ,^h3 , X  , ^h9 , X , X , H , L , X , X , X ]->[ H , H ];
[ H ,^h3 , X  , ^h8 , X , X , H , L , X , X , X ]->[ H , H ];
[ L ,^h0 , X  , ^h7 , X , X , L , X , X , X , H ]->[ H , H ];
[ L ,^h1 , X  , ^h7 , X , X , X , X , X , X , L ]->[ L , H ];
[ L ,^h1 , X  , ^h7 , X , X , X , X , X , X , H ]->[ L , H ];
[ L ,^h2 , X  , ^h7 , X , X , L , X , X , X , L ]->[ L , L ];
[ L ,^h2 , X  , ^h7 , X , X , H , X , X , X , H ]->[ H , L ];
[ L ,^h3 , X  , ^h7 , X , X , L , X , H , X , X ]->[ L , H ];
[ L ,^h3 , X  , ^h7 , X , X , H , X , L , X , X ]->[ H , L ];
[ H ,^h3 , X  , ^h6 , X , X , H , X , X , X , X ]->[ H , H ];
[ H ,^h3 , X  , ^h5 , X , X , X , X , X , X , X ]->[ H , H ];
[ H ,^h3 , X  , ^h4 , X , X , X , X , X , X , X ]->[ H , H ];
[ H ,^h3 , X  , ^h3 , X , X , X , X , X , X , X ]->[ H , H ];
[ H ,^h3 , X  , ^h2 , X , X , X , X , X , X , X ]->[ H , H ];
[ H ,^h3 , X  , ^h1 , X , X , X , X , X , X , X ]->[ H , H ];
[ H ,^h3 , X  , ^h0 , X , X , X , X , X , X , X ]->[ H , H ];

end _SH11B3L8;

module _SH11B1L8;         flag '-r0';

title
'PAL16L8                        PAL DESIGN SPECIFICATION
SH11B1L8                        PAO MAY 06, 1987
SHIFTER J LINK CONTROL (U62)
DAVIN COMPUTER      IRVINE CALIFORNIA
-Translated by TOABEL-';

SH11B1L8 device 'P16L8';

"declarations

TRUE,FALSE = 1,0;
    H,L = 1,0;
    X,Z,C = .X.,.Z.,.C.;

GND,VCC
         pin 10,20;

!SHRIGHTY,SD0,SD1,UDATA6,!UDATA0X,!UDATA1X,!UDATA2X,!UDATA3X,SHJ00,!SHCY
         pin 1,2,3,4,5,6,7,8,9,11;

J63SR,J7SR
         pin 12,19;

SHJ63,SHJ08,SHK00,!UCY,SHJ07,!SHCYJ
         pin 13,14,15,16,17,18;

SRY = SHRIGHTY ;
    SD  = [ SD1 , SD0];
UDATA = [ UDATA3X , UDATA2X , UDATA1X , UDATA0X ];
    J0  = SHJ00 ;
    J7  = SHJ07 ;
    J8  = SHJ08 ;
    J63 = SHJ63 ;
    K0  = SHK00 ;

equations
```

```
!J7SR = SHRIGHTY & !SD1 & !SD0 & !UDATA3X & !UDATA2X & !UDATA1X & !UDATA0X
      # SHRIGHTY & !SD1 & !SD0 & !SHJ07 & !UDATA3X & !UDATA2X & !UDATA1X
           & UDATA0X
      # SHRIGHTY & !SD1 & !SD0 & !UDATA6 & !SHJ00 & !UDATA3X & !UDATA2X
           & UDATA1X & !UDATA0X
      # SHRIGHTY & !SD1 & !SD0 & UDATA6 & !SHCYJ & !UDATA3X & !UDATA2X
           & UDATA1X & !UDATA0X
      # SHRIGHTY & !SD1 & !SD0 & UDATA3X & !UDATA2X & !UDATA1X & !UDATA0X
      # SHRIGHTY & !SHJ08 & SD1
      # SHRIGHTY & !SHJ08 & SD0 ;

"LOG SHR BYTE, 0 IN
"ASH SHR BYTE,MSB SELF
"ROR BYTE,SHJ00
"RRC BYTE,SHCYJ
"MUL BYTE,0 IN
"DIR RIGHT W,HW , SHJ08
"DIR RIGHT W,DB , SHJ08

!J63SR = SHRIGHTY & SD1 & SD0 & !UDATA3X & !UDATA1X & !UDATA0X
       # SHRIGHTY & SD1 & SD0 & !SHJ63 & !UDATA3X & !UDATA1X
            & UDATA0X
       # SHRIGHTY & SD1 & SD0 & !UDATA6 & !SHJ00 & !UDATA3X & !UDATA2X
            & UDATA1X & !UDATA0X
       # SHRIGHTY & SD1 & SD0 & !UDATA6 & !SHK00 & !UDATA3X & !UDATA2X
            & UDATA1X & UDATA0X
       # SHRIGHTY & SD1 & SD0 & UDATA6 & !SHCYJ & !UDATA3X & !UDATA2X
            & UDATA1X
       # SHRIGHTY & SD1 & SD0 & UDATA3X & !UDATA2X & !UDATA1X & !UDATA0X ;

"(LONG) LOGIC SHR WORD, 0 IN
"(LONG) ASH SHR WORD,MSB SELF
"ROR WORD,SHJ00
"LONG ROR WORD,SHJ00
"RRC,LRRC WORD,SHCYJ
"MUL WORD,0 IN

"      SRY = SHRIGHTY ;
"       SD = [ SD1 , SD0];
"     UDATA = [ UDATA3X , UDATA2X , UDATA1X , UDATA0X ];
"        J0 = SHJ00 ;
"        J7 = SHJ07 ;
"        J8 = SHJ08 ;
"       J63 = SHJ63 ;
"        K0 = SHK00 ;
test_vectors
([!SRY, SD ,UDATA6,!UDATA, J0, J7, J8,J63, K0,!SHCYJ,!UCY]->[J7SR,J63SR])
 [ H ,^h0 , X , ^hF , X , X , X , X , X ,  X , X ]->[ H , H ];
 [ L ,^h0 , X , ^hF , X , X , X , X , X ,  X , X ]->[ L , H ];
 [ L ,^h1 , X , ^hF , X , X , H , X , X ,  X , X ]->[ H , H ];
 [ L ,^h1 , X , ^hF , X , X , L , X , X ,  X , X ]->[ L , H ];
 [ L ,^h2 , X , ^hF , X , X , H , X , X ,  X , X ]->[ H , H ];
 [ L ,^h2 , X , ^hF , X , X , L , X , X ,  X , X ]->[ L , H ];
 [ L ,^h3 , X , ^hF , X , X , H , X , X ,  X , X ]->[ H , L ];
 [ L ,^h3 , X , ^hF , X , X , L , X , X ,  X , X ]->[ L , L ];
 [ L ,^h0 , X , ^hE , X , L , X , X , X ,  X , X ]->[ L , H ];
 [ L ,^h0 , X , ^hE , X , H , X , X , X ,  X , X ]->[ H , H ];
 [ L ,^h1 , X , ^hE , X , X , H , X , X ,  X , X ]->[ H , H ];
 [ L ,^h1 , X , ^hE , X , X , L , X , X ,  X , X ]->[ L , H ];
```

```
[ L ,^h2 , X  , ^hE , X , X , H , X , X , X , X ]->[ H , H ];
[ L ,^h2 , X  , ^hE , X , X , L , X , X , X , X ]->[ L , H ];
[ L ,^h3 , X  , ^hE , X , X , H , L , X , X , X ]->[ H , L ];
[ L ,^h3 , X  , ^hE , X , X , L , H , X , X , X ]->[ L , H ];
[ L ,^h0 , L  , ^hD , L , X , X , X , X , X , X ]->[ L , H ];
[ L ,^h0 , L  , ^hD , H , X , X , X , X , X , X ]->[ H , H ];
[ L ,^h0 , H  , ^hD , X , X , X , X , X , L , X ]->[ H , H ];
[ L ,^h0 , H  , ^hD , X , X , X , X , X , H , X ]->[ L , H ];
[ L ,^h1 , X  , ^hD , X , X , H , X , X , X , X ]->[ H , H ];
[ L ,^h1 , X  , ^hD , X , X , L , X , X , X , X ]->[ L , H ];
[ L ,^h2 , X  , ^hD , X , X , H , X , X , X , X ]->[ H , H ];
[ L ,^h2 , X  , ^hD , X , X , L , X , X , X , X ]->[ L , H ];
[ L ,^h3 , X  , ^hD , L , X , H , X , X , X , X ]->[ H , L ];
[ L ,^h3 , X  , ^hD , H , X , L , X , X , X , X ]->[ L , H ];
[ L ,^h0 , L  , ^hC , X , X , L , X , L , X , X ]->[ H , H ];
[ L ,^h1 , L  , ^hC , X , X , H , X , H , X , X ]->[ H , H ];
[ L ,^h2 , L  , ^hC , X , X , L , X , L , X , X ]->[ L , H ];

[ L ,^h3 , L  , ^hC , X , X , H , X , H , X , X ]->[ H , H ];
[ L ,^h3 , L  , ^hC , X , X , L , X , L , X , X ]->[ L , L ];
[ L ,^h3 , H  , ^hC , X , X , H , X , X , H , X ]->[ H , L ];
[ L ,^h3 , H  , ^hC , X , X , L , X , X , L , X ]->[ L , H ];
[ L ,^h0 , X  , ^hB , X , X , L , X , X , X , X ]->[ H , H ];
[ L ,^h1 , X  , ^hB , X , X , H , X , X , X , X ]->[ H , H ];
[ L ,^h2 , X  , ^hB , X , X , L , X , X , X , X ]->[ L , H ];
[ L ,^h3 , X  , ^hB , X , X , H , X , X , X , X ]->[ H , L ];
[ L ,^h0 , X  , ^hA , X , X , L , X , X , X , X ]->[ H , H ];
[ L ,^h1 , X  , ^hA , X , X , H , X , X , X , X ]->[ H , H ];
[ L ,^h2 , X  , ^hA , X , X , L , X , X , X , X ]->[ L , H ];
[ L ,^h3 , X  , ^hA , X , X , H , H , X , X , X ]->[ H , H ];
[ L ,^h3 , X  , ^hA , X , X , H , L , X , X , X ]->[ H , L ];
[ H ,^h3 , X  , ^h9 , X , X , H , L , X , X , X ]->[ H , H ];
[ H ,^h3 , X  , ^h8 , X , X , H , L , X , X , X ]->[ H , H ];
[ L ,^h0 , X  , ^h7 , X , X , H , X , X , X , L ]->[ L , H ];
[ L ,^h0 , X  , ^h7 , X , X , L , X , X , X , H ]->[ L , H ];
[ L ,^h1 , X  , ^h7 , X , X , H , X , X , X , L ]->[ H , H ];
[ L ,^h2 , X  , ^h7 , X , X , L , X , X , X , H ]->[ L , H ];
[ L ,^h3 , X  , ^h7 , X , X , H , X , X , X , L ]->[ H , L ];
[ L ,^h3 , X  , ^h7 , X , X , L , X , X , X , H ]->[ L , L ];
[ H ,^h3 , X  , ^h6 , X , X , X , X , X , X , X ]->[ H , H ];
[ H ,^h3 , X  , ^h5 , X , X , X , X , X , X , X ]->[ H , H ];
[ H ,^h3 , X  , ^h4 , X , X , X , X , X , X , X ]->[ H , H ];
[ H ,^h3 , X  , ^h3 , X , X , X , X , X , X , X ]->[ H , H ];
[ H ,^h3 , X  , ^h2 , X , X , X , X , X , X , X ]->[ H , H ];
[ H ,^h3 , X  , ^h1 , X , X , X , X , X , X , X ]->[ H , H ];
[ H ,^h3 , X  , ^h0 , X , X , X , X , X , X , X ]->[ H , H ];
``` end _SH11B1L8;

```
module _SH12C3L8;        flag '-r0';

title
'PAL16L8                       PAL DESIGN SPECIFICATION
SH12C3L8                       PAO OCT 28, 1986
SHIFTER FUNCTION I/O CONTROL (U8)
DAVIN COMPUTER      IRVINE CALIFORNIA
-Translated by TOABEL-';

SH12C3L8 device 'P16L8';

"declarations

TRUE,FALSE = 1,0;
    H,L = 1,0;
    X,Z,C = .X.,.Z.,.C.;

GND,VCC
        pin 10,20;

!SHLEFT,!SHCY,!SHCYX,!GCTRCY,ZFG
        pin 1,2,3,4,5;

!UDATA0X,!UDATA1X,!UDATA2X,!UDATA3X,C2SHB
          pin 6,7,8,9,11;

!SHWAITRQ,!ENA_JOUT
        pin 12,19;

UGR2,UGR1,UGR0,MEQ1
        pin 13,14,17,18;

SL = SHLEFT ;
      GC = GCTRCY ;
    UDATA = [UDATA3X , UDATA2X , UDATA1X , UDATA0X ];
      C2 = C2SHB ;
      UGR = [UGR2 , UGR1 , UGR0] ;

equations

"NOTE SHLEFT ARE USED AS ENABLE SIGNAL FOR SHIFTER FUNCTIONS

ENA_JOUT = UDATA2X & UDATA1X & !UDATA0X
            & SHLEFT & !ZFG & !GCTRCY & C2SHB
         # !MEQ1 & !UGR2 & UGR1 & UGR0
            & UDATA3X & !UDATA2X & !UDATA1X & !GCTRCY & C2SHB ;

"C2SHB*(BIT,BYT SCAN)
    "C2SHB*(MUL,DIV)

SHWAITRQ = !MEQ1 & !UGR2 & UGR1 & UGR0 & !UDATA3X & !UDATA2X & !GCTRCY
             # !MEQ1 & !UGR2 & UGR1 & UGR0 & !UDATA3X & !UDATA1X & !GCTRCY
             # !MEQ1 & !UGR2 & UGR1 & UGR0 & !UDATA2X & !UDATA1X & !GCTRCY
             # !MEQ1 & !UGR2 & UGR1 & UGR0
                & UDATA3X & UDATA2X & !UDATA1X & !UDATA0X & !GCTRCY
             # !MEQ1 & !UGR2 & UGR1 & UGR0
                & UDATA2X & UDATA1X & !UDATA0X & !GCTRCY & !ZFG
             # !MEQ1 & !UGR2 & UGR1 & UGR0
                & !UDATA3X & UDATA2X & UDATA1X & UDATA0X & !GCTRCY & !SHCYX ;
```

```
"LOGSHF,ARSHF,ROT
"LONG LOGSHF,ARSHF,ROT
"MUL,DIV
"SHK LEFT BYTE
"BIT BYT SCAN
"LOC LEAD
"1 BIT

"        SL   - SHLEFT ;
"        GC   - GCTRCY ;
"     UDATA   - [UDATA3X , UDATA2X , UDATA1X , UDATA0X ];
"        C2   - C2SHB ;
"       UGR   - [UGR2 , UGR1 , UGR0] ;

test_vectors
([MEQ1, UGR ,!UDATA,!SL,!SHCYX,!GC,ZFG, C2]->[!ENA_JOUT,!SHWAITRQ])
 [ H  , ^h3 ,  ^hF , H ,  H   , H , X , H ]->[    H    ,    H    ];
 [ L  , ^h3 ,  ^hF , X ,  X   , H , X , H ]->[    H    ,    L    ];
 [ L  , ^h3 ,  ^hF , X ,  X   , L , X , H ]->[    H    ,    H    ];
 [ L  , ^h3 ,  ^hE , X ,  X   , H , X , H ]->[    H    ,    L    ];
 [ L  , ^h3 ,  ^hE , X ,  X   , L , X , H ]->[    H    ,    H    ];
 [ L  , ^h3 ,  ^hD , X ,  X   , H , X , H ]->[    H    ,    L    ];
 [ L  , ^h3 ,  ^hD , X ,  X   , L , X , H ]->[    H    ,    H    ];
 [ L  , ^h3 ,  ^hC , X ,  X   , H , X , H ]->[    H    ,    L    ];
 [ L  , ^h3 ,  ^hC , X ,  X   , L , X , H ]->[    H    ,    H    ];
 [ L  , ^h3 ,  ^hB , X ,  X   , H , X , H ]->[    H    ,    L    ];
 [ L  , ^h3 ,  ^hB , X ,  X   , L , X , H ]->[    H    ,    H    ];
 [ L  , ^h3 ,  ^hA , X ,  X   , H , X , H ]->[    H    ,    L    ];
 [ L  , ^h3 ,  ^hA , X ,  X   , L , X , H ]->[    H    ,    H    ];
 [ L  , ^h3 ,  ^h9 , L ,  X   , H , L , H ]->[    L    ,    L    ];
 [ L  , ^h3 ,  ^h9 , L ,  X   , H , L , L ]->[    H    ,    L    ];
 [ L  , ^h3 ,  ^h9 , L ,  X   , H , H , H ]->[    H    ,    H    ];
 [ L  , ^h3 ,  ^h9 , L ,  X   , L , L , H ]->[    H    ,    H    ];
 [ L  , ^h3 ,  ^h8 , X ,  H   , H , X , H ]->[    H    ,    L    ];
 [ L  , ^h3 ,  ^h8 , X ,  L   , H , X , H ]->[    H    ,    H    ];
 [ L  , ^h3 ,  ^h8 , X ,  H   , L , X , H ]->[    H    ,    H    ];
 [ L  , ^h3 ,  ^h7 , X ,  X   , H , X , H ]->[    L    ,    L    ];
 [ L  , ^h3 ,  ^h7 , X ,  X   , H , X , L ]->[    H    ,    L    ];
 [ L  , ^h3 ,  ^h7 , X ,  X   , L , X , H ]->[    H    ,    H    ];
 [ L  , ^h3 ,  ^h6 , X ,  X   , H , X , H ]->[    L    ,    L    ];
 [ L  , ^h3 ,  ^h6 , X ,  X   , H , X , L ]->[    H    ,    L    ];
 [ L  , ^h3 ,  ^h6 , X ,  X   , L , X , H ]->[    H    ,    H    ];
 [ L  , ^h3 ,  ^h5 , X ,  X   , X , X , X ]->[    H    ,    H    ];
 [ L  , ^h3 ,  ^h4 , X ,  X   , X , X , X ]->[    H    ,    H    ];
 [ L  , ^h3 ,  ^h3 , X ,  X   , H , X , H ]->[    H    ,    L    ];
 [ L  , ^h3 ,  ^h3 , X ,  X   , L , X , H ]->[    H    ,    H    ];
 [ L  , ^h3 ,  ^h2 , X ,  X   , X , X , X ]->[    H    ,    H    ];
 [ L  , ^h3 ,  ^h1 , L ,  X   , H , L , H ]->[    L    ,    L    ];
 [ L  , ^h3 ,  ^h1 , L ,  X   , H , L , L ]->[    H    ,    L    ];
 [ L  , ^h3 ,  ^h1 , L ,  X   , H , H , H ]->[    H    ,    H    ];
 [ L  , ^h3 ,  ^h1 , L ,  X   , L , L , H ]->[    H    ,    H    ];
 [ L  , ^h3 ,  ^h0 , X ,  X   , X , X , X ]->[    H    ,    H    ];

end _SH12C3L8;
```

```
module _SH9B1R4;      flag '-r0';

title
'PAL16R4                              PAL DESIGN SPECIFICATION
SH9B1R4                               PAO MAY 07, 1987
SHIFTER K NUMBER 0 OF 15 (START WITH 0) >>> APPLY TO SHK 0 & 1 <<<
DAVIN COMPUTER        IRVINE CALIFORNIA
-Translated by TOABEL-';

SH9B1R4 device 'P16R4';

"declarations

TRUE,FALSE = 1,0;
    H,L = 1,0;
    X,Z,C = .X.,.Z.,.C.;

VCC
        pin 20;

KCLKA,!KS0A,!KS1A,!KS2A,!EN_KOUTA,!KCLRA,KOSL,SHK04,!MULDIV
        pin 1,2,3,4,5,6,7,8,9 ;

SHK00,SHK01,SHK02,SHK03
        pin 14,15,16,17;

G,B0,B1,B2,B3
        pin 11,12,13,18,19;

KC   = KCLKA ;
    KS   = [KS2A , KS1A , KS0A] ;
    OUT  = EN_KOUTA ;
    CLR  = KCLRA ;
    SK0  = SHK00;
    SK1  = SHK01;
    SK2  = SHK02;
    SK3  = SHK03;
    SK4  = SHK04;
    MD   = MULDIV ;

equations enable B3 = EN_KOUTA  ;
    !B3     = !SHK03 & !KCLRA
            # KCLRA ;

"OUT K enable B2 = EN_KOUTA  ;
    !B2     = !SHK02 & !KCLRA
            # KCLRA ;

"OUT K enable B1 = EN_KOUTA  ;
    !B1     = !SHK01 & !KCLRA
            # KCLRA ;

"OUT K
```

```
enable B0 = EN_KOUTA ;
!B0     = !SHK00 & !KCLRA
        # KCLRA ;

"OUT K

!SHK03 :=  !KS0A & !SHK03
        # !KS2A & !KS1A & KS0A & !B3
        # !KS2A &  KS1A & KS0A & !SHK02
        #  KS2A & !KS1A & KS0A & !SHK04
        #  KS2A &  KS1A & KS0A   ;

"HOLD K,RESERVED
"LOAD K
"SH K LEFT
"SH K RIGHT
"BYT SCAN 0 IN
"K CLEAR

!SHK02 :=  !KS0A & !SHK02
        # !KS2A & !KS1A & KS0A & !B2
        # !KS2A &  KS1A & KS0A & !SHK01
        #  KS2A & !KS1A & KS0A & !SHK03
        #  KS2A &  KS1A & KS0A   ;

"HOLD K,RESERVED
"LOAD K
"SH K LEFT
"SH K RIGHT
"BYT SCAN 0 IN
"K CLEAR

!SHK01 :=  !KS0A & !SHK01
        # !KS2A & !KS1A & KS0A & !B1
        # !KS2A &  KS1A & KS0A & !MULDIV & !SHK00
        # !KS2A &  KS1A & KS0A &  MULDIV & !KOSL
        #  KS2A & !KS1A & KS0A & !SHK02
        #  KS2A &  KS1A & KS0A   ;

"HOLD K,RESERVED
"LOAD K
"SH K LEFT NORMAL CASE
"SH K LEFT DIVID CASE
"SH K RIGHT
"BYT SCAN 0 IN
"K CLEAR

!SHK00 :=  !KS0A & !SHK00
        # !KS2A & !KS1A & KS0A & !B0
        # !KS2A &  KS1A & KS0A & !MULDIV & !KOSL
        # !KS2A &  KS1A & KS0A &  MULDIV
        #  KS2A & !KS1A & KS0A & !SHK01
        #  KS2A &  KS1A & KS0A   ;

"HOLD K,RESERVED
"LOAD K
"SH K LEFT NORMAL CASE FROM KOSL
"SH K LEFT DIVID CASE 0 IN
"SH K RIGHT
```

```
"BYT SCAN 0 IN
"K CLEAR

"     KC    = KCLKA ;
"     KS    = [KS2A , KS1A , KS0A] ;
"     OUT   = EN_KOUTA ;
"     CLR   = KCLRA ;
"     SK0   = SHK00;
"     SK1   = SHK01;
"     SK2   = SHK02;
"     SK3   = SHK03;
"     SK4   = SHK04;
"     MD    = MULDIV ;

test_vectors
([KC,G,!KS,K0SL,SK4,B0,B1,B2,B3,!OUT,!CLR,!MD]->[B0,B1,B2,B3,SK0,SK1,SK2,SK3])
 [C ,H,^h7 , X  , X , X, X, X, X, H , H , X ]->[ Z, Z, Z, Z, Z , Z , Z , Z ];
 [C ,L,^h6 , X  , X , L, L, L, L, H , H , X ]->[ Z, Z, Z, Z, L , L , L , L ];
 [C ,L,^h7 , X  , X , H, H, H, H, H , H , X ]->[ Z, Z, Z, Z, L , L , L , L ];
 [C ,L,^h6 , X  , X , H, H, H, H, H , H , X ]->[ Z, Z, Z, Z, H , H , H , H ];
 [C ,L,^h7 , X  , X , L, L, L, L, H , H , X ]->[ Z, Z, Z, Z, H , H , H , H ];
 [C ,L,^h6 , X  , X , H, L, H, L, H , H , X ]->[ Z, Z, Z, Z, H , L , H , L ];
 [C ,L,^h7 , X  , X , L, H, L, H, H , H , X ]->[ Z, Z, Z, Z, H , L , H , L ];
 [C ,L,^h5 , X  , X , L, H, L, H, H , H , X ]->[ Z, Z, Z, Z, H , L , H , L ];
 [C ,L,^h1 , X  , X , L, H, L, H, H , H , X ]->[ Z, Z, Z, Z, H , L , H , L ];
 [C ,L,^h6 , X  , X , H, L, H, L, H , H , X ]->[ Z, Z, Z, Z, H , L , H , L ];
 [C ,L,^h7 , X  , X , X, X, X, X, L , L , X ]->[ L, L, L, L, H , L , H , L ];
 [C ,L,^h5 , X  , X , L, H, L, H, L , H , X ]->[ H, L, H, L, H , L , H , L ];
 [C ,L,^h4 , L  , X , X, X, X, X, L , H , H ]->[ L, H, L, H, L , H , L , H ];
 [C ,L,^h4 , H  , X , X, X, X, X, L , H , H ]->[ H, L, H, L, H , L , H , L ];
 [C ,L,^h4 , L  , X , X, X, X, X, L , H , L ]->[ L, L, L, H, L , L , L , H ];
 [C ,L,^h4 , H  , X , X, X, X, X, L , H , L ]->[ L, H, L, L, L , H , L , L ];
 [C ,L,^h3 , X  , X , X, X, X, X, L , H , X ]->[ L, H, L, L, L , H , L , L ];
 [C ,L,^h2 , X  , H , X, X, X, X, L , H , X ]->[ H, L, L, H, H , L , L , H ];
 [C ,L,^h2 , X  , L , X, X, X, X, L , H , X ]->[ L, L, H, L, L , L , H , L ];
 [C ,L,^h1 , X  , L , X, X, X, X, L , H , X ]->[ L, L, H, L, L , L , H , L ];
 [C ,L,^h0 , X  , X , X, X, X, X, L , H , X ]->[ L, L, L, L, L , L , L , L ];

end _SH9B1R4;

module _SH12C7L8;        flag '-r0';

title
'PAL16L8                           PAL DESIGN SPECIFICATION
SH12C7L8                           PAO MAY 13, 1987
SHIFTER FUNCTION CONTROL
DAVIN COMPUTER       IRVINE CALIFORNIA
-Translated by TOABEL-';

SH12C7L8 device 'P16L8';

"declarations

TRUE,FALSE = 1,0;
    H,L = 1,0;
    X,Z,C = .X.,.Z.,.C.;

GND,VCC
        pin 10,20;
```

!SHLEFT,!SHRIGHTX,!SHCY,!GCTRCY,ZFG
    pin 1,2,3,4,5;

!UDATA0X,!UDATA1X,!UDATA2X,!UDATA3X,C2SHB,!SHCYX,!SHCYXD,!SHCYDLP
    pin 6,7,8,9,11,13,14,15 ;

!SHJS1B,!SHJS2A
    pin 12,19;

!SHJS1A,!SHJS0A
    pin 17,18;

SL = SHLEFT ;
    SR = SHRIGHTX ;
    GC = GCTRCY ;
 UDATA = [UDATA3X , UDATA2X , UDATA1X , UDATA0X] ;
    C2 = C2SHB ;

equations

"NOTE SHLEFT,SHRIGHTX ARE USED AS QUALIFY SIGNAL FOR SHIFTER FUNCTION

SHJS0A    = UDATA2X & UDATA1X & !UDATA0X & SHLEFT & !GCTRCY & !ZFG ;

"BIT,BYT SCAN

"ALL SHIFT RIGHT RELATED CASE ARE IN SH12B7R4.ABL

SHJS1A = !UDATA3X & !UDATA1X & SHLEFT & !GCTRCY
           # !UDATA3X & !UDATA2X & SHLEFT & !GCTRCY
           # !UDATA3X & UDATA2X & UDATA1X & UDATA0X
             & SHLEFT & !GCTRCY & !SHCY
           # UDATA3X & !UDATA2X & !UDATA1X & UDATA0X
             & SHLEFT & !GCTRCY & C2SHB
           # UDATA2X & UDATA1X & !UDATA0X & SHLEFT & !GCTRCY & !ZFG ;

"LOG SHL, ARTH SHL,ROL
    "(LONG & NO LONG)
    "LOC LEAD 1 BIT
    "DIV (2ND HALF CYC WILL
    "LOAD J FROM ALU)
    "BIT,BYT SCAN

SHJS2A = !UDATA3X & !UDATA1X & SHRIGHTX & !GCTRCY
           # !UDATA3X & !UDATA2X & SHRIGHTX & !GCTRCY
           # UDATA3X & !UDATA2X & !UDATA1X & !UDATA0X
             & SHRIGHTX & !GCTRCY & C2SHB
           # UDATA3X & !UDATA2X & !UDATA1X & !UDATA0X
             & SHRIGHTX & !GCTRCY & !C2SHB
           # UDATA3X & UDATA2X & UDATA1X & !UDATA0X
             & SHLEFT & !GCTRCY & !ZFG
           # UDATA3X & !UDATA2X & !UDATA1X & UDATA0X
             & SHLEFT & !GCTRCY & !C2SHB ;

"LOG SHR,ARTH SHR,ROR
    "(LONG & NO LONG)
    "MUL & 1ST HALF CYC
    "MUL & 2ND HALF CYC WILL BE LOAD J
    "LOAD J FROM ALU
    "BYT SCAN
    "DIVID 2ND CYC WILL BE LOAD J

```
SHJS1B = !UDATA3X & !UDATA1X & SHRIGHTX & !GCTRCY
      # !UDATA3X & !UDATA2X & SHRIGHTX & !GCTRCY
      #  UDATA3X & !UDATA2X & !UDATA1X & !UDATA0X
         & SHRIGHTX & !GCTRCY & C2SHB ;

"LOG SHR,ARTH SHR,ROR
"(LONG & NO LONG)
"MUL(2ND HALF CYC WILL
" LOAD DATA FROM ALU)

SHCYDLP = UDATA3X & !UDATA2X & !UDATA1X
            & SHCY
          # !( UDATA3X & !UDATA2X & !UDATA1X )
            & SHCYXD ;

"FOR MUL & DIV CASE CY TO DLOOP WILL BE NO DELAY
"ALL THE OTHER CASE CY TO DLOOP WILL BE DELAY BY 2 u-CYC

"     SL   = SHLEFT ;
"     SR   = SHRIGHTX ;
"     GC   = GCTRCY ;
"     UDATA = [UDATA3X , UDATA2X , UDATA1X , UDATA0X] ;
"     C2   = C2SHB ;
"     CARY = [ SHCY , SHCYX];
test_vectors
([!UDATA,!SL,!SR,SHCY,!GC,ZFG, C2]->[!SHJS2A,!SHJS1A,!SHJS0A,!SHJS1B])
[ ^hF , H , H , X , X , X , X ]->[  H ,  H ,  H ,  H ];
[ ^hF , L , H , X , H , X , X ]->[  H ,  L ,  H ,  H ];
[ ^hF , L , H , X , L , X , X ]->[  H ,  H ,  H ,  H ];
[ ^hF , H , L , X , H , X , X ]->[  L ,  H ,  H ,  L ];
[ ^hF , H , L , X , L , X , X ]->[  H ,  H ,  H ,  H ];
[ ^hE , L , H , X , H , X , X ]->[  H ,  L ,  H ,  H ];
[ ^hE , L , H , X , L , X , X ]->[  H ,  H ,  H ,  H ];
[ ^hE , H , L , X , H , X , X ]->[  L ,  H ,  H ,  L ];
[ ^hE , H , L , X , L , X , X ]->[  H ,  H ,  H ,  H ];
[ ^hD , L , H , X , H , X , X ]->[  H ,  L ,  H ,  H ];
[ ^hD , L , H , X , L , X , X ]->[  H ,  H ,  H ,  H ];
[ ^hD , H , L , X , H , X , X ]->[  L ,  H ,  H ,  L ];
[ ^hD , H , L , X , L , X , X ]->[  H ,  H ,  H ,  H ];
[ ^hC , L , H , X , H , X , X ]->[  H ,  L ,  H ,  H ];
[ ^hC , L , H , X , L , X , X ]->[  H ,  H ,  H ,  H ];
[ ^hC , H , L , X , H , X , X ]->[  L ,  H ,  H ,  L ];
[ ^hC , H , L , X , L , X , X ]->[  H ,  H ,  H ,  H ];
[ ^hB , L , H , X , H , X , X ]->[  H ,  L ,  H ,  H ];
[ ^hB , L , H , X , L , X , X ]->[  H ,  H ,  H ,  H ];
[ ^hB , H , L , X , H , X , X ]->[  L ,  H ,  H ,  L ];
[ ^hB , H , L , X , L , X , X ]->[  H ,  H ,  H ,  H ];
[ ^hA , L , H , X , H , X , X ]->[  H ,  L ,  H ,  H ];
[ ^hA , L , H , X , L , X , X ]->[  H ,  H ,  H ,  H ];
[ ^hA , H , L , X , H , X , X ]->[  L ,  H ,  H ,  L ];
[ ^hA , H , L , X , L , X , X ]->[  H ,  H ,  H ,  H ];
[ ^h9 , L , H , X , H , L , X ]->[  H ,  L ,  L ,  H ];
[ ^h9 , L , H , X , L , L , X ]->[  H ,  H ,  H ,  H ];
[ ^h9 , L , H , X , H , H , X ]->[  H ,  H ,  H ,  H ];
[ ^h8 , L , H , H , H , X , X ]->[  H ,  L ,  H ,  H ];
[ ^h8 , L , H , H , L , X , X ]->[  H ,  H ,  H ,  H ];
[ ^h8 , L , H , L , H , X , X ]->[  H ,  H ,  H ,  H ];
[ ^h7 , H , L , X , H , X , H ]->[  L ,  H ,  H ,  L ];
[ ^h7 , H , L , X , H , X , L ]->[  L ,  H ,  H ,  H ];
```

```
[ ^h7 , H , L , X , L , X , L ]->[  H  ,  H  ,  H  ,  H  ];
[ ^h6 , L , H , X , H , X , H ]->[  H  ,  L  ,  H  ,  H  ];
[ ^h6 , L , H , X , H , X , L ]->[  L  ,  H  ,  H  ,  H  ];
[ ^h6 , L , H , X , L , X , H ]->[  H  ,  H  ,  H  ,  H  ];
[ ^h5 , X , X , X , X , X , X ]->[  H  ,  H  ,  H  ,  H  ];
[ ^h4 , X , X , X , X , X , X ]->[  H  ,  H  ,  H  ,  H  ];
[ ^h3 , X , X , X , X , X , X ]->[  H  ,  H  ,  H  ,  H  ];
[ ^h2 , X , X , X , X , X , X ]->[  H  ,  H  ,  H  ,  H  ];
[ ^h1 , L , H , X , H , L , X ]->[  L  ,  L  ,  L  ,  H  ];
[ ^h1 , L , H , X , L , L , X ]->[  H  ,  H  ,  H  ,  H  ];
[ ^h1 , L , H , X , H , H , X ]->[  H  ,  H  ,  H  ,  H  ];
[ ^h0 , X , X , X , X , X , X ]->[  H  ,  H  ,  H  ,  H  ];
``` end _SH12C7L8;

module _SH11C3L8;        flag '-r0';

title
'PAL16L8                    PAL DESIGN SPECIFICATION
SH11C3L8                    PAO AUG 08, 1986
SHIFTER K LINK CONTROL NUMBER 2 OF 2 (U19)
DAVIN COMPUTER     IRVINE CALIFORNIA
-Translated by TOABEL-';

SH11C3L8 device 'P16L8';

"declarations

TRUE,FALSE = 1,0;
    H,L = 1,0;
    X,Z,C = .X.,.Z.,.C.;

GND,VCC
        pin 10,20;

!SHRIGHTY,!LONG,SHJ00,SD1,SD0,SHK08,SHK16,SHK32,!MUL
        pin 1,2,3,4,5,7,8,9,11;

K31SR,K15SR
        pin 12,19;

K63SR,K7SR
        pin 16,17;

SD = [ SD1 , SD0 ];
    SR = SHRIGHTY;
    J0 = SHJ00;
    K8 = SHK08;
    K16 = SHK16;
    K32 = SHK32;

equations

"***** NOTE: SHRIGHTY IS AN ENABLE SIGNAL FOR SHIFTER FUNCTION ALSO

```
!K7SR  = SHRIGHTY & LONG & !SHK08
       # SHRIGHTY & MUL & SD0 & !SHK08
       # SHRIGHTY & MUL & SD1 & !SHK08
       # SHRIGHTY & MUL & !SD1 & !SD0 & !SHJ00 ;

"LONG RIGHT, SHK08
"DBYTE,WORD MUL, SHK32
"HWORD,WORD MUL, SHK32
"BYTE MUL, SHJ00

!K15SR - SHRIGHTY & LONG & !SHK16
       # SHRIGHTY & MUL & SD1 & !SHK16
       # SHRIGHTY & MUL & !SD1 & SD0 & !SHJ00 ;

"LONG RIGHT, SHK16
"HWORD,WORD MUL, SHK16
"DBYTE MUL, SHJ00

!K31SR = SHRIGHTY & LONG & !SHK32
       # SHRIGHTY & MUL & SD1 & SD0 & !SHK32
       # SHRIGHTY & MUL & SD1 & !SD0 & !SHJ00 ;

"LONG RIGHT, SHK32
"WORD MUL, SHK32
"HWORD MUL, SHJ00

!K63SR = SHRIGHTY & LONG & !SHJ00
       # SHRIGHTY & MUL & SD1 & SD0 & !SHJ00 ;

"LONG RIGHT, SHJ00
"WORD MUL, SHJ00

"      SD = [ SD1 , SD0 ];
"      SR = SHRIGHTY;
"      J0 = SHJ00;
"      K8 = SHK08;
"      K16 = SHK16;
"      K32 = SHK32;
test_vectors
([ SD ,!SR,!LONG,!MUL, J0, K8,K16,K32] -> [ K7SR, K15SR, K31SR, K63SR])
 [^h0 , H , X  , X , X , X , X , X ] -> [ H ,  H ,  H ,  H ];
 [ X  , L , L  , H , H , H , H , H ] -> [ H ,  H ,  H ,  H ];
 [ X  , L , L  , H , L , L , L , L ] -> [ L ,  L ,  L ,  L ];
 [^h0 , L , H  , L , H , X , X , X ] -> [ H ,  H ,  H ,  H ];
 [^h0 , L , H  , L , L , X , X , X ] -> [ L ,  H ,  H ,  H ];
 [^h1 , L , H  , L , H , L , X , X ] -> [ L ,  H ,  H ,  H ];
 [^h1 , L , H  , L , L , H , X , X ] -> [ H ,  L ,  H ,  H ];
 [^h2 , L , H  , L , H , L , L , X ] -> [ L ,  L ,  H ,  H ];
 [^h2 , L , H  , L , L , H , H , X ] -> [ H ,  H ,  L ,  H ];
 [^h3 , L , H  , L , H , L , L , L ] -> [ L ,  L ,  L ,  H ];
 [^h3 , L , H  , L , L , H , H , H ] -> [ H ,  H ,  H ,  L ];

end _SH11C3L8;
```

```
module _SH11B5L8;        flag '-r0';

title
'PAL16L8                           PAL DESIGN SPECIFICATION
SH11B5L8                           PAO AUG 07, 1986
SHIFTER J LINK CONTROL NUMBER 1 OF 2
DAVIN COMPUTER         IRVINE CALIFORNIA
-Translated by TOABEL-';

SH11B5L8 device 'P16L8';

"declarations

TRUE,FALSE = 1,0;
     H,L = 1,0;
     X,Z,C = .X.,.Z.,.C.;

GND,VCC
          pin 10,20;

SHJ07,SD0,SD1,!SHLEFT,!UDATA0X,!UDATA1X,!UDATA2X,!UDATA3X,!UCY,SHK63
          pin 1,2,3,4,5,6,7,8,9,11;

!JOSLA,!JOSLAX
          pin 12,19;

SHJ63,SHJ31,SHJ15,UDATA6,!SHCY,!SHF_OP
          pin 13,14,15,16,17,18;

SL = SHLEFT;
       SD = [SD1 , SD0];
     UDATA = [UDATA3X , UDATA2X , UDATA1X , UDATA0X];
       J7 = SHJ07 ;
       J15 = SHJ15 ;
       J31 = SHJ31 ;
       J63 = SHJ63 ;
       K63 = SHK63 ;
        OP = SHF_OP ;

equations enable JOSLAX = UDATA6 ;

JOSLAX = !SHF_OP & !UDATA3X & !UDATA2X & UDATA1X & !UDATA0X & UCY
              & SHLEFT
            # SHF_OP & !UDATA3X & !UDATA2X & UDATA1X & !UDATA0X & SHCY
              & SHLEFT
            # SHLEFT & !UDATA3X & UDATA2X & !UDATA1X & SHK63
            # SHLEFT & !UDATA3X & !UDATA2X & UDATA1X & UDATA0X & SHK63 ;

"RLC FIRST CYCLE, JOSL = UCY
     "RLC REST CYCLE, JOSL = SHCY
     "LONG LEFT SHIFT, SHK63
     "LONG LEFT ROTATE, SHK63 enable JOSLA = !UDATA6 ;
```

```
    JOSLA = SHLEFT & SD1 & SD0 & SHJ63 & !UDATA3X & !UDATA2X
            & UDATA1X & !UDATA0X
          # SHLEFT & SD1 & !SD0 & SHJ31 & !UDATA3X & !UDATA2X
            & UDATA1X & !UDATA0X
          # SHLEFT & !SD1 & SD0 & SHJ15 & !UDATA3X & !UDATA2X
            & UDATA1X & !UDATA0X
          # SHLEFT & !SD1 & !SD0 & SHJ07 & !UDATA3X & !UDATA2X
            & UDATA1X & !UDATA0X
          # SHLEFT & !UDATA3X & UDATA2X & !UDATA1X & SHK63
          # SHLEFT & !UDATA3X & !UDATA2X & UDATA1X & UDATA0X & SHK63 ;

"WORD ROL, SHJ63
    "HWORD ROL, SHJ31
    "DBYTE ROL, SHJ15
    "BYTE ROL, SHJ07
    "LONG LEFT SHIFT, SHK63
    "LONG LEFT ROTATE, SHK63

"       SL   = SHLEFT
"       SD   = [SD1 , SD0]
"     UDATA  = [UDATA3X , UDATA2X , UDATA1X , UDATA0X]
"       J7   = SHJ07
"       J15  = SHJ15
"       J31  = SHJ31
"       J63  = SHJ63
"       K63  = SHK63
"       OP   = SHF_OP test_vectors
([!SL, SD, !UDATA,UDATA6, J7,J15,J31,J63,K63,!SHCY,!OP,!UCY] ->[!JOSLA,!JOSLAX])
 [ L , X , ^hD , H  , X , X , X , X , X , X , H , H ] ->[ Z , H ];
 [ L , X , ^hD , H  , X , X , X , X , X , X , H , L ] ->[ Z , L ];
 [ L , X , ^hD , H  , X , X , X , X , X , H , L , X ] ->[ Z , H ];
 [ L , X , ^hD , H  , X , X , X , X , X , L , L , X ] ->[ Z , L ];
 [ L , X , ^hC , H  , X , X , X , X , H , X , X , X ] ->[ Z , L ];
 [ L , X , ^hC , H  , X , X , X , X , L , X , X , X ] ->[ Z , H ];
 [ L , X , ^hC , H  , X , X , X , X , H , L , X , X ] ->[ Z , L ];
 [ L , X , ^hC , H  , X , X , X , X , L , H , X , X ] ->[ Z , H ];
 [ L ,^h0 , ^hB , H  , X , X , X , X , H , X , X , X ] ->[ Z , L ];
 [ L ,^h1 , ^hB , H  , X , X , X , X , L , X , X , X ] ->[ Z , H ];
 [ L ,^h2 , ^hB , H  , X , X , X , X , H , X , X , X ] ->[ Z , L ];
 [ L ,^h3 , ^hB , H  , X , X , X , X , L , X , X , X ] ->[ Z , H ];
 [ L ,^h0 , ^hA , H  , X , X , X , X , H , X , X , X ] ->[ Z , L ];
 [ L ,^h1 , ^hA , H  , X , X , X , X , L , X , X , X ] ->[ Z , H ];
 [ L ,^h2 , ^hA , H  , X , X , X , X , H , X , X , X ] ->[ Z , L ];
 [ L ,^h3 , ^hA , H  , X , X , X , X , L , X , X , X ] ->[ Z , H ];
 [ H , X , X   , L  , X , X , X , X , X , X , X , X ] ->[ H , Z ];
 [ L ,^h0 , ^hF , L  , X , X , X , X , X , X , X , X ] ->[ H , Z ];
 [ L ,^h1 , ^hF , L  , X , X , X , X , X , X , X , X ] ->[ H , Z ];
 [ L ,^h2 , ^hF , L  , X , X , X , X , X , X , X , X ] ->[ H , Z ];
 [ L ,^h3 , ^hF , L  , X , X , X , X , X , X , X , X ] ->[ H , Z ];
 [ L ,^h0 , ^hE , L  , X , X , X , X , X , X , X , X ] ->[ H , Z ];
 [ L ,^h1 , ^hE , L  , X , X , X , X , X , X , X , X ] ->[ H , Z ];
 [ L ,^h2 , ^hE , L  , X , X , X , X , X , X , X , X ] ->[ H , Z ];
 [ L ,^h3 , ^hE , L  , X , X , X , X , X , X , X , X ] ->[ H , Z ];
 [ L ,^h0 , ^hD , L  , H , X , X , X , X , X , X , X ] ->[ L , Z ];
 [ L ,^h0 , ^hD , L  , L , X , X , X , X , X , X , X ] ->[ H , Z ];
 [ L ,^h1 , ^hD , L  , X , H , X , X , X , X , X , X ] ->[ L , Z ];
```

```
[ L ,^h1 , ^hD ,   L    , X , L , X , X , X , X , X , X ] ->[   H  ,   Z   ];
[ L ,^h2 , ^hD ,   L    , X , X , H , X , X , X , X , X ] ->[   L  ,   Z   ];
[ L ,^h2 , ^hD ,   L    , X , X , L , X , X , X , X , X ] ->[   H  ,   Z   ];
[ L ,^h3 , ^hD ,   L    , X , X , X , H , X , X , X , X ] ->[   L  ,   Z   ];
[ L ,^h3 , ^hD ,   L    , X , X , X , L , X , X , X , X ] ->[   H  ,   Z   ];
[ L , X  , ^hC ,   L    , X , X , X , X , H , X , X , X ] ->[   L  ,   Z   ];
[ L , X  , ^hC ,   L    , X , X , X , X , L , X , X , X ] ->[   H  ,   Z   ];
[ L , X  , ^hC ,   L    , X , X , X , X , H , L , X , X ] ->[   L  ,   Z   ];
[ L , X  , ^hC ,   L    , X , X , X , X , L , H , X , X ] ->[   H  ,   Z   ];
[ L ,^h0 , ^hB ,   L    , X , X , X , X , H , X , X , X ] ->[   L  ,   Z   ];
[ L ,^h1 , ^hB ,   L    , X , X , X , X , L , X , X , X ] ->[   H  ,   Z   ];
[ L ,^h2 , ^hB ,   L    , X , X , X , X , H , X , X , X ] ->[   L  ,   Z   ];
[ L ,^h3 , ^hB ,   L    , X , X , X , X , L , X , X , X ] ->[   H  ,   Z   ];
[ L ,^h0 , ^hA ,   L    , X , X , X , X , H , X , X , X ] ->[   L  ,   Z   ];
[ L ,^h1 , ^hA ,   L    , X , X , X , X , L , X , X , X ] ->[   H  ,   Z   ];
[ L ,^h2 , ^hA ,   L    , X , X , X , X , H , X , X , X ] ->[   L  ,   Z   ];
[ L ,^h3 , ^hA ,   L    , X , X , X , X , L , X , X , X ] ->[   H  ,   Z   ];
[ L ,^h0 , ^h9 ,   L    , X , X , X , X , X , X , X , X ] ->[   H  ,   Z   ];
[ L ,^h1 , ^h9 ,   L    , X , X , X , X , X , X , X , X ] ->[   H  ,   Z   ];
[ L ,^h2 , ^h9 ,   L    , X , X , X , X , X , X , X , X ] ->[   H  ,   Z   ];
[ L ,^h3 , ^h9 ,   L    , X , X , X , X , X , X , X , X ] ->[   H  ,   Z   ];
[ L ,^h0 , ^h8 ,   L    , X , X , X , X , X , X , X , X ] ->[   H  ,   Z   ];
[ L ,^h1 , ^h8 ,   L    , X , X , X , X , X , X , X , X ] ->[   H  ,   Z   ];
[ L ,^h2 , ^h8 ,   L    , X , X , X , X , X , X , X , X ] ->[   H  ,   Z   ];
[ L ,^h3 , ^h8 ,   L    , X , X , X , X , X , X , X , X ] ->[   H  ,   Z   ];
[ L ,^h0 , ^h7 ,   L    , X , X , X , X , X , X , X , X ] ->[   H  ,   Z   ];
[ L ,^h1 , ^h7 ,   L    , X , X , X , X , X , X , X , X ] ->[   H  ,   Z   ];
[ L ,^h2 , ^h7 ,   L    , X , X , X , X , X , X , X , X ] ->[   H  ,   Z   ];
[ L ,^h3 , ^h7 ,   L    , X , X , X , X , X , X , X , X ] ->[   H  ,   Z   ];
[ L ,^h0 , ^h6 ,   L    , X , X , X , X , X , X , X , X ] ->[   H  ,   Z   ];
[ L ,^h1 , ^h6 ,   L    , X , X , X , X , X , X , X , X ] ->[   H  ,   Z   ];
[ L ,^h2 , ^h6 ,   L    , X , X , X , X , X , X , X , X ] ->[   H  ,   Z   ];
[ L ,^h3 , ^h6 ,   L    , X , X , X , X , X , X , X , X ] ->[   H  ,   Z   ];
[ L ,^h0 , ^h5 ,   L    , X , X , X , X , X , X , X , X ] ->[   H  ,   Z   ];
[ L ,^h1 , ^h5 ,   L    , X , X , X , X , X , X , X , X ] ->[   H  ,   Z   ];
[ L ,^h2 , ^h5 ,   L    , X , X , X , X , X , X , X , X ] ->[   H  ,   Z   ];
[ L ,^h3 , ^h5 ,   L    , X , X , X , X , X , X , X , X ] ->[   H  ,   Z   ];
[ L ,^h0 , ^h4 ,   L    , X , X , X , X , X , X , X , X ] ->[   H  ,   Z   ];
[ L ,^h1 , ^h4 ,   L    , X , X , X , X , X , X , X , X ] ->[   H  ,   Z   ];
[ L ,^h2 , ^h4 ,   L    , X , X , X , X , X , X , X , X ] ->[   H  ,   Z   ];
[ L ,^h3 , ^h4 ,   L    , X , X , X , X , X , X , X , X ] ->[   H  ,   Z   ];
[ L ,^h0 , ^h3 ,   L    , X , X , X , X , X , X , X , X ] ->[   H  ,   Z   ];
[ L ,^h1 , ^h3 ,   L    , X , X , X , X , X , X , X , X ] ->[   H  ,   Z   ];
[ L ,^h2 , ^h3 ,   L    , X , X , X , X , X , X , X , X ] ->[   H  ,   Z   ];
[ L ,^h3 , ^h3 ,   L    , X , X , X , X , X , X , X , X ] ->[   H  ,   Z   ];
[ L ,^h0 , ^h2 ,   L    , X , X , X , X , X , X , X , X ] ->[   H  ,   Z   ];
[ L ,^h1 , ^h2 ,   L    , X , X , X , X , X , X , X , X ] ->[   H  ,   Z   ];
[ L ,^h2 , ^h2 ,   L    , X , X , X , X , X , X , X , X ] ->[   H  ,   Z   ];
[ L ,^h3 , ^h2 ,   L    , X , X , X , X , X , X , X , X ] ->[   H  ,   Z   ];
[ L ,^h0 , ^h1 ,   L    , X , X , X , X , X , X , X , X ] ->[   H  ,   Z   ];
[ L ,^h1 , ^h1 ,   L    , X , X , X , X , X , X , X , X ] ->[   H  ,   Z   ];
[ L ,^h2 , ^h1 ,   L    , X , X , X , X , X , X , X , X ] ->[   H  ,   Z   ];
[ L ,^h3 , ^h1 ,   L    , X , X , X , X , X , X , X , X ] ->[   H  ,   Z   ];
[ L ,^h0 , ^h0 ,   L    , X , X , X , X , X , X , X , X ] ->[   H  ,   Z   ];
[ L ,^h1 , ^h0 ,   L    , X , X , X , X , X , X , X , X ] ->[   H  ,   Z   ];
[ L ,^h2 , ^h0 ,   L    , X , X , X , X , X , X , X , X ] ->[   H  ,   Z   ];
[ L ,^h3 , ^h0 ,   L    , X , X , X , X , X , X , X , X ] ->[   H  ,   Z   ];

end _SH11B5L8;
```

```
module _SH11B7L8;        flag '-r0';

title
'PAL16L8                         PAL DESIGN SPECIFICATION
SH11B7L8                         PAO DEC 19, 1986
MULTIPLY, DIVISION, & BIT SCAN LINK CONTROL FOR JOSL (U17)
DAVIN COMPUTER         IRVINE CALIFORNIA
-Translated by TOABEL-';

SH11B7L8 device 'P16L8';

"declarations

TRUE,FALSE = 1,0;
     H,L = 1,0;
     X,Z,C = .X.,.Z.,.C.;

GND,VCC
         pin  10,20;

!UDATA3X,!UDATA2X,!UDATA1X,!UDATA0X,SD1,SD0,SHK07,SHK15,SHK31,SHK63
         pin  1,2,3,4,5,6,7,8,9,11;

!ARSH,!JOSLB
         pin  12,19;

!SHLEFT,!SHF_OP,!MUL,!LONG
         pin  13,14,17,18;

UDATA = [UDATA3X,UDATA2X,UDATA1X,UDATA0X];
        SD = [SD1,SD0];
        K7 = SHK07;
       K15 = SHK15;
       K31 = SHK31;
       K63 = SHK63;
        SL = SHLEFT;

equations
     " COMMENT:  1    BIT SCAN WILL BE IN WORD ONLY

JOSLB = SHLEFT & !UDATA3X & UDATA2X & UDATA1X & !UDATA0X
             & SD1 & SD0 & SHK63
           # SHLEFT & UDATA3X & !UDATA2X & !UDATA1X & UDATA0X
             & SD1 & SD0 & SHK63
           # SHLEFT & UDATA3X & !UDATA2X & !UDATA1X & UDATA0X
             & SD1 & !SD0 & SHK31
           # SHLEFT & UDATA3X & !UDATA2X & !UDATA1X & UDATA0X
             & !SD1 & SD0 & SHK15
           # SHLEFT & UDATA3X & !UDATA2X & !UDATA1X & UDATA0X
             & !SD1 & !SD0 & SHK07 ;

"BIT SCAN, SHK63
     "WORD DIV
     "HWORD DIV
     "DBYTE DIV
     "BYTE DIV

ARSH = !UDATA3X & !UDATA1X & UDATA0X ;
```

"ARITH SH,LONG ARITH SH

LONG = !UDATA3X & !UDATA2X & UDATA1X & UDATA0X
     # !UDATA3X & UDATA2X & !UDATA1X ;

"LONG ROTATE
"LONG LOGIC AND
"ARITHMETIC SHIFT

MUL = UDATA3X & !UDATA2X & !UDATA1X & !UDATA0X ;

"MULTIPLY

"       UDATA = [UDATA3X,UDATA2X,UDATA1X,UDATA0X];
"          SD = [SD1,SD0];
"          K7 = SHK07;
"         K15 = SHK15;
"         K31 = SHK31;
"         K63 = SHK63;
"          SL = SHLEFT;

```
test_vectors
([!UDATA, SD, !SL, K7,K15,K31,K63,!SHF_OP]  -> [!JOSLB,!ARSH,!LONG,!MUL])
 [ ^hF  , X ,  X , X , X , X , X ,    L   ] -> [  H  ,  H  ,  H  ,  H ];
 [ ^hF  , X ,  X , X , X , X , X ,    L   ] -> [  H  ,  H  ,  H  ,  H ];
 [ ^hE  , X ,  X , X , X , X , X ,    H   ] -> [  H  ,  L  ,  H  ,  H ];
 [ ^hE  , X ,  X , X , X , X , X ,    L   ] -> [  H  ,  L  ,  H  ,  H ];
 [ ^hD  , X ,  X , X , X , X , X ,    L   ] -> [  H  ,  H  ,  H  ,  H ];
 [ ^hC  , X ,  X , X , X , X , X ,    L   ] -> [  H  ,  H  ,  L  ,  H ];
 [ ^hB  , X ,  X , X , X , X , X ,    L   ] -> [  H  ,  H  ,  L  ,  H ];
 [ ^hA  , X ,  X , X , X , X , X ,    H   ] -> [  H  ,  L  ,  L  ,  H ];
 [ ^hA  , X ,  X , X , X , X , X ,    L   ] -> [  H  ,  L  ,  L  ,  H ];
 [ ^h9  ,^h0,  H , X , X , X , L ,    L   ] -> [  H  ,  H  ,  H  ,  H ];
 [ ^h9  ,^h0,  L , X , X , X , L ,    L   ] -> [  H  ,  H  ,  H  ,  H ];
 [ ^h9  ,^h1,  L , X , X , X , L ,    L   ] -> [  H  ,  H  ,  H  ,  H ];
 [ ^h9  ,^h2,  L , X , X , X , L ,    L   ] -> [  H  ,  H  ,  H  ,  H ];
 [ ^h9  ,^h3,  L , X , X , X , L ,    L   ] -> [  H  ,  H  ,  H  ,  H ];
 [ ^h9  ,^h3,  L , X , X , X , H ,    L   ] -> [  L  ,  H  ,  H  ,  H ];
 [ ^h8  , X ,  X , X , X , X , X ,    L   ] -> [  H  ,  H  ,  H  ,  H ];
 [ ^h7  , X ,  X , X , X , X , X ,    L   ] -> [  H  ,  H  ,  H  ,  L ];
 [ ^h6  ,^h0,  H , H , X , X , X ,    L   ] -> [  H  ,  H  ,  H  ,  H ];
 [ ^h6  ,^h0,  L , H , X , X , X ,    L   ] -> [  L  ,  H  ,  H  ,  H ];
 [ ^h6  ,^h0,  L , L , X , X , X ,    L   ] -> [  H  ,  H  ,  H  ,  H ];
 [ ^h6  ,^h1,  H , X , H , X , X ,    L   ] -> [  H  ,  H  ,  H  ,  H ];
 [ ^h6  ,^h1,  L , X , H , X , X ,    L   ] -> [  L  ,  H  ,  H  ,  H ];
 [ ^h6  ,^h1,  L , X , L , X , X ,    L   ] -> [  H  ,  H  ,  H  ,  H ];
 [ ^h6  ,^h2,  H , X , X , H , X ,    L   ] -> [  H  ,  H  ,  H  ,  H ];
 [ ^h6  ,^h2,  L , X , X , H , X ,    L   ] -> [  L  ,  H  ,  H  ,  H ];
 [ ^h6  ,^h2,  L , X , X , L , X ,    L   ] -> [  H  ,  H  ,  H  ,  H ];
 [ ^h6  ,^h3,  H , X , X , X , H ,    L   ] -> [  H  ,  H  ,  H  ,  H ];
 [ ^h6  ,^h3,  L , X , X , X , H ,    L   ] -> [  L  ,  H  ,  H  ,  H ];
 [ ^h6  ,^h3,  L , X , X , X , L ,    L   ] -> [  H  ,  H  ,  H  ,  H ];
 [ ^h5  , X ,  X , X , X , X , X ,    L   ] -> [  H  ,  H  ,  H  ,  H ];
 [ ^h4  , X ,  X , X , X , X , X ,    L   ] -> [  H  ,  H  ,  H  ,  H ];
 [ ^h3  , X ,  X , X , X , X , X ,    L   ] -> [  H  ,  H  ,  H  ,  H ];
 [ ^h2  , X ,  X , X , X , X , X ,    L   ] -> [  H  ,  H  ,  H  ,  H ];
 [ ^h1  , X ,  X , X , X , X , X ,    L   ] -> [  H  ,  H  ,  H  ,  H ];
 [ ^h0  , X ,  X , X , X , X , X ,    L   ] -> [  H  ,  H  ,  H  ,  H ];
end _SH11B7L8;
```

```
module _SH12B3R4;        flag '-r0';

title
'PAL16R4                        PAL DESIGN SPECIFICATION
SH12B3R4                        PAO DEC 23, 1986
OVERFLOW FLAG GENERATOR (U41)
DAVIN COMPUTER        IRVINE CALIFORNIA
-Translated by TOABEL-';

SH12B3R4 device 'P16R4';

"declarations

TRUE,FALSE = 1,0;
      H,L = 1,0;
      X,Z,C = .X.,.Z.,.C.;

GND,VCC
            pin  10,20;

C2,!SHLEFT,SD1,SD0,!ARSH,SHJ63,SHJ31,SHJ15,SHJ07,G
            pin  1,2,3,4,5,6,7,8,9,11;

!SHAROV,Q1,!SHWAITRQD,Q0
            pin  17,15,16,14;

!OVFL2,!OVFL1,!SHWAITRQ,!SHCYX
            pin  12,13,18,19;

SL  = SHLEFT ;
       J63  = SHJ63 ;
       J31  = SHJ31 ;
       J15  = SHJ15 ;
        J7  = SHJ07 ;
        SD  = [SD1 , SD0 ];
      SHRV  = SHAROV ;
      SHCX  = SHCYX ;
        SW  = SHWAITRQ ;
       SWD  = SHWAITRQD ;
        V1  = OVFL1 ;
        V2  = OVFL2 ;
        SV  = SHAROV ;

" States
      S0 = ^b11;
      S1 = ^b10;
      S2 = ^b00;

equations

OVFL2 = ARSH & SHLEFT & SHWAITRQD & SD1 & SD0 & SHJ63 & !SHCYX
                  # ARSH & SHLEFT & SHWAITRQD & SD1 & SD0 & !SHJ63 & SHCYX
                  # ARSH & SHLEFT & SHWAITRQD & SD1 & !SD0 & SHJ31 & !SHCYX
                  # ARSH & SHLEFT & SHWAITRQD & SD1 & !SD0 & !SHJ31 & SHCYX ;

OVFL1 = ARSH & SHLEFT & SHWAITRQD & !SD1 & SD0 & SHJ15 & !SHCYX
                  # ARSH & SHLEFT & SHWAITRQD & !SD1 & SD0 & !SHJ15 & SHCYX
                  # ARSH & SHLEFT & SHWAITRQD & !SD1 & !SD0 & SHJ07 & !SHCYX
                  # ARSH & SHLEFT & SHWAITRQD & !SD1 & !SD0 & !SHJ07 & SHCYX ;
```

```
"ASHL WORD,LONG WORD
"ASHL HWORD
"ASHL DBYTE
"ASHL BYTE

SHWAITRQD := SHWAITRQ ;

SHAROV :- !Q0
        # !SHWAITRQD & Q1 & Q0 & SHAROV
        # SHWAITRQD & Q1 & Q0 & ( OVFL2 # OVFL1 ) ;

state_diagram [Q1,Q0]

State S0:   IF SHLEFT & ARSH & SHWAITRQD & (OVFL1 # OVFL2) THEN S1
                    ELSE S0 ;

State S1:   IF SHWAITRQD THEN S1
                    ELSE S2 ;

State S2:   GOTO S0 ;

"       SL  = SHLEFT ;
"       J63 = SHJ63 ;
"       J31 = SHJ31 ;
"       J15 = SHJ15 ;
"       J7  = SHJ07 ;
"       SD  = [SD1 , SD0 ];
"     SHRV  = SHAROV ;
"     SHCX  = SHCYX ;
"       SW  = SHWAITRQ ;
"      SWD  = SHWAITRQD ;
"       V1  = OVFL1 ;
"       V2  = OVFL2 ;
"       SV  = SHAROV ;
test_vectors
([C2 ,G, SD ,!SL,!ARSH,!SW,!SHCX,J63,J31,J15, J7]->[!SWD,!V2,!V1, Q0,!SV])
[ C ,H, ^h0 , H , X  , X , X  , X , X , X , X ]->[ X , H , H , Z , Z ];
[ C ,L, ^h0 , H , L  , H , X  , X , X , X , X ]->[ H , H , H , H , X ];
[ C ,L, ^h0 , L , H  , H , X  , X , X , X , X ]->[ H , H , H , H , X ];
[ C ,L, ^h0 , L , L  , H , X  , X , X , X , X ]->[ H , H , H , H , X ];
[ C ,L, ^h0 , L , L  , L , H  , X , X , X , L ]->[ L , H , H , H , X ];
[ C ,L, ^h0 , L , L  , L , H  , X , X , X , H ]->[ L , H , L , L , X ];
[ C ,L, ^h0 , L , L  , L , L  , X , X , X , L ]->[ L , H , L , L , L ];
[ C ,L, ^h0 , L , L  , L , L  , X , X , X , H ]->[ L , H , H , L , L ];
[ C ,L, ^h1 , L , L  , L , H  , X , X , L , X ]->[ L , H , H , L , L ];
[ C ,L, ^h1 , L , L  , L , H  , X , X , H , X ]->[ L , H , L , L , L ];
[ C ,L, ^h1 , L , L  , L , L  , X , X , L , X ]->[ L , H , L , L , L ];
[ C ,L, ^h1 , L , L  , L , L  , X , X , H , X ]->[ L , H , H , L , L ];
[ C ,L, ^h2 , L , L  , L , H  , X , L , X , X ]->[ L , H , H , L , L ];
[ C ,L, ^h2 , L , L  , L , H  , X , H , X , X ]->[ L , L , H , L , L ];
[ C ,L, ^h2 , L , L  , L , L  , X , L , X , X ]->[ L , L , H , L , L ];
[ C ,L, ^h2 , L , L  , L , L  , X , H , X , X ]->[ L , H , H , L , L ];
[ C ,L, ^h3 , L , L  , L , H  , L , X , X , X ]->[ L , H , H , L , L ];
[ C ,L, ^h3 , L , L  , L , H  , H , X , X , X ]->[ L , L , H , L , L ];
[ C ,L, ^h3 , L , L  , L , L  , L , X , X , X ]->[ L , L , H , L , L ];
[ C ,L, ^h3 , L , L  , L , L  , H , X , X , X ]->[ L , H , H , L , L ];
[ C ,L, ^h3 , L , L  , H , L  , H , X , X , X ]->[ H , H , H , L , L ];
[ C ,L, ^h3 , H , H  , H , L  , L , X , X , X ]->[ H , H , H , L , L ];
[ C ,L, ^h3 , H , H  , H , L  , H , X , X , X ]->[ H , H , H , H , L ];
```

```
test_vectors
([C2 ,G,  SD  ,!SL,!ARSH,!SW,!SHCX,J63,J31,J15, J7]->[!SWD,!V2,!V1, Q0,!SV])
 [ C ,H, ^h2 , H , X  , X , X , X , X , X , X ]->[ X , H , H , Z , X ];
 [ C ,L, ^h2 , H , H  , H , X , X , X , X , X ]->[ H , H , H , H , X ];
 [ C ,L, ^h2 , L , L  , L , X , H , X , X , X ]->[ L , H , H , H , X ];
 [ C ,L, ^h2 , L , L  , L , H , X , H , X , X ]->[ L , L , H , L , X ];
 [ C ,L, ^h2 , L , L  , H , H , X , H , X , X ]->[ H , H , H , L , L ];
 [ C ,L, ^h2 , H , L  , H , H , X , H , X , X ]->[ H , H , H , L , L ];
 [ C ,L, ^h2 , H , L  , H , H , X , H , X , X ]->[ H , H , H , H , L ];

end _SH12B3R4;

module _SH12C5L8;        flag '-r0';

title
'PAL16L8                      PAL DESIGN SPECIFICATION
SH12C5L8                      PAO JAN 13, 1987
SHIFTER IN/OUT CONTROL (U9)
DAVIN COMPUTER       IRVINE CALIFORNIA
-Translated by TOABEL-';

SH12C5L8 device 'P16L8';

"declarations

TRUE,FALSE = 1,0;
     H,L = 1,0;
     X,Z,C = .X.,.Z.,.C.;

GND,VCC
          pin 10,20;

UFD0,UFD1,UFD2,UFD3,UBS0,UBS1,UBS2,UBS3,C2SHB
          pin 1,2,3,4,5,6,7,8,11;

!EN_KOUTA,!ENB_JOUT
          pin 12,19;

!KCLRA,!KCLRB,!LD_SHK,!EN_KOUTB,!SHJS2B,!SHJS0B
          pin 13,14,15,16,17,18;

UFD = [UFD3 , UFD2 , UFD1 , UFD0];
     UBS = [UBS3 , UBS2 , UBS1 , UBS0];
      C2 = C2SHB;
      KC = [KCLRA , KCLRB];

equations
```

```
    SHJSOB    = !UBS3 & UBS2 & !UBS1 & UBS0 & C2SHB
              # UFD3 & UFD2 & UFD1 & !UFD0 & !C2SHB ;

"OUT J FIRST HALF
"ALU FD E,(LD MASK) SECOND HALF

SHJS2B    = ( UFD  -  ^h5 ) & !C2SHB
              # ( UFD  -  ^h8 ) & !C2SHB
              # ( UFD  -  ^hC ) & !C2SHB
              # ( UFD  -  ^hD ) & !C2SHB
              # ( UFD  -  ^hE ) & !C2SHB
              # ( UFD  -  ^hF ) & !C2SHB ;

"ALU FD5,8,C,D,E,F (LD J) LOAD J 2ND HALF

ENB_JOUT  = !UBS3 & UBS2 & !UBS1 & UBS0 & C2SHB ;

"ALU B BUS SOURCE AT
"1ST HALF CYC

EN_KOUTA  = !UBS3 & UBS2 & UBS1 & !UBS0 & C2SHB
              # UBS3 & !UBS2 & !UBS1 & UBS0 & C2SHB ;

"ALU B BUS SOURCE
"ALU B BUS 0 SOURCE

EN_KOUTB  = !UBS3 & UBS2 & UBS1 & !UBS0 & C2SHB
              # UBS3 & !UBS2 & !UBS1 & UBS0 & C2SHB ;

"ALU B BUS SOURCE
"ALU B BUS 0 SOURCE

LD_SHK    = !UFD3 & UFD2 & UFD1 & !UFD0 & !C2SHB
              # UFD3 & !UFD2 & !UFD1 & UFD0 & !C2SHB ;

"LOAD K 2ND HALF AND ALU FD6,9

KCLRA     = UBS3 & !UBS2 & !UBS1 & UBS0;

"ALU B BUS 0 SOURCE

KCLRB     = UBS3 & !UBS2 & !UBS1 & UBS0;

"ALU B BUS 0 SOURCE

"       UFD = [UFD3 , UFD2 , UFD1 , UFD0];
"       UBS = [UBS3 , UBS2 , UBS1 , UBS0];
"       C2  = C2SHB;
"       KC  = [KCLRA , KCLRB];
test_vectors
([ UBS , UFD ,C2]->[!SHJSOB,!SHJS2B,!ENB_JOUT,!EN_KOUTA,!EN_KOUTB,!LD_SHK,!KC])
 [ ^hF , ^h0 , H]->[   H   ,   H   ,    H    ,    H    ,    H    ,   H   ,^h3];
 [ ^hE , ^h1 , H]->[   H   ,   H   ,    H    ,    H    ,    H    ,   H   ,^h3];
 [ ^hD , ^h2 , H]->[   H   ,   H   ,    H    ,    H    ,    H    ,   H   ,^h3];
 [ ^hC , ^h3 , H]->[   H   ,   H   ,    H    ,    H    ,    H    ,   H   ,^h3];
 [ ^hB , ^h4 , H]->[   H   ,   H   ,    H    ,    H    ,    H    ,   H   ,^h3];
 [ ^hA , ^h5 , H]->[   H   ,   H   ,    H    ,    H    ,    H    ,   H   ,^h3];
 [ ^hA , ^h5 , L]->[   H   ,   L   ,    H    ,    H    ,    H    ,   H   ,^h3];
```

```
[ ^h9 , ^h6 , H]->[   H  ,   H  ,   H  ,   L  ,   L  ,   H  ,^h0];
[ ^h9 , ^h6 , L]->[   H  ,   H  ,   H  ,   H  ,   H  ,   L  ,^h0];
[ ^h9 , ^h7 , L]->[   H  ,   H  ,   H  ,   H  ,   H  ,   H  ,^h0];
[ ^h8 , ^h8 , H]->[   H  ,   H  ,   H  ,   H  ,   H  ,   H  ,^h3];
[ ^h8 , ^h8 , L]->[   H  ,   L  ,   H  ,   H  ,   H  ,   H  ,^h3];
[ ^h7 , ^h9 , H]->[   H  ,   H  ,   H  ,   H  ,   H  ,   H  ,^h3];
[ ^h7 , ^h9 , L]->[   H  ,   H  ,   H  ,   H  ,   H  ,   L  ,^h3];
[ ^h6 , ^hA , H]->[   H  ,   H  ,   H  ,   L  ,   L  ,   H  ,^h3];
[ ^h6 , ^hB , H]->[   H  ,   H  ,   H  ,   L  ,   L  ,   H  ,^h3];
[ ^h6 , ^hB , L]->[   H  ,   H  ,   H  ,   H  ,   H  ,   H  ,^h3];
[ ^h5 , ^hC , H]->[   L  ,   H  ,   L  ,   H  ,   H  ,   H  ,^h3];
[ ^h5 , ^hC , L]->[   H  ,   L  ,   H  ,   H  ,   H  ,   H  ,^h3];
[ ^h5 , ^hD , H]->[   L  ,   H  ,   L  ,   H  ,   H  ,   H  ,^h3];
[ ^h5 , ^hD , L]->[   H  ,   L  ,   H  ,   H  ,   H  ,   H  ,^h3];
[ ^h4 , ^hE , H]->[   H  ,   H  ,   H  ,   H  ,   H  ,   H  ,^h3];
[ ^h4 , ^hE , L]->[   L  ,   L  ,   H  ,   H  ,   H  ,   H  ,^h3];
[ ^h3 , ^hF , H]->[   H  ,   H  ,   H  ,   H  ,   H  ,   H  ,^h3];
[ ^h3 , ^hF , L]->[   H  ,   L  ,   H  ,   H  ,   H  ,   H  ,^h3];
[ ^h2 , ^hF , H]->[   H  ,   H  ,   H  ,   H  ,   H  ,   H  ,^h3];
[ ^h2 , ^hF , L]->[   H  ,   L  ,   H  ,   H  ,   H  ,   H  ,^h3];
[ ^h1 , ^hF , H]->[   H  ,   H  ,   H  ,   H  ,   H  ,   H  ,^h3];
[ ^h1 , ^hF , L]->[   H  ,   L  ,   H  ,   H  ,   H  ,   H  ,^h3];
[ ^h0 , ^hF , H]->[   H  ,   H  ,   H  ,   H  ,   H  ,   H  ,^h3];
[ ^h0 , ^hF , L]->[   H  ,   L  ,   H  ,   H  ,   H  ,   H  ,^h3];

end _SH12C5L8;
```

PARALLEL STRING PROCESSOR AND METHOD FOR A MINICOMPUTER

APPENDIX 3

© DAVIN COMPUTER CORPORATION 1987

FFH LOOKUP TABLE (FUNC: FFH, DATA LENGTH: BYTE)

Page 1 of 16

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| 000 | 0 | 040 | 0 | 080 | 0 | 0C0 | 0 |
| 001 | 1 | 041 | 1 | 081 | 1 | 0C1 | 1 |
| 002 | 0 | 042 | 0 | 082 | 0 | 0C2 | 0 |
| 003 | 2 | 043 | 2 | 083 | 2 | 0C3 | 2 |
| 004 | 0 | 044 | 0 | 084 | 0 | 0C4 | 0 |
| 005 | 1 | 045 | 1 | 085 | 1 | 0C5 | 1 |
| 006 | 0 | 046 | 0 | 086 | 0 | 0C6 | 0 |
| 007 | 3 | 047 | 3 | 087 | 3 | 0C7 | 3 |
| 008 | 0 | 048 | 0 | 088 | 0 | 0C8 | 0 |
| 009 | 1 | 049 | 1 | 089 | 1 | 0C9 | 1 |
| 00A | 0 | 04A | 0 | 08A | 0 | 0CA | 0 |
| 00B | 2 | 04B | 2 | 08B | 2 | 0CB | 2 |
| 00C | 0 | 04C | 0 | 08C | 0 | 0CC | 0 |
| 00D | 1 | 04D | 1 | 08D | 1 | 0CD | 1 |
| 00E | 0 | 04E | 0 | 08E | 0 | 0CE | 0 |
| 00F | 4 | 04F | 4 | 08F | 4 | 0CF | 4 |
| 010 | 0 | 050 | 0 | 090 | 0 | 0D0 | 0 |
| 011 | 1 | 051 | 1 | 091 | 1 | 0D1 | 1 |
| 012 | 0 | 052 | 0 | 092 | 0 | 0D2 | 0 |
| 013 | 2 | 053 | 2 | 093 | 2 | 0D3 | 2 |
| 014 | 0 | 054 | 0 | 094 | 0 | 0D4 | 0 |
| 015 | 1 | 055 | 1 | 095 | 1 | 0D5 | 1 |
| 016 | 0 | 056 | 0 | 096 | 0 | 0D6 | 0 |
| 017 | 3 | 057 | 3 | 097 | 3 | 0D7 | 3 |
| 018 | 0 | 058 | 0 | 098 | 0 | 0D8 | 0 |
| 019 | 1 | 059 | 1 | 099 | 1 | 0D9 | 1 |
| 01A | 0 | 05A | 0 | 09A | 0 | 0DA | 0 |
| 01B | 2 | 05B | 2 | 09B | 2 | 0DB | 2 |
| 01C | 0 | 05C | 0 | 09C | 0 | 0DC | 0 |
| 01D | 1 | 05D | 1 | 09D | 1 | 0DD | 1 |
| 01E | 0 | 05E | 0 | 09E | 0 | 0DE | 0 |
| 01F | 5 | 05F | 5 | 09F | 5 | 0DF | 5 |
| 020 | 0 | 060 | 0 | 0A0 | 0 | 0E0 | 0 |
| 021 | 1 | 061 | 1 | 0A1 | 1 | 0E1 | 1 |
| 022 | 0 | 062 | 0 | 0A2 | 0 | 0E2 | 0 |
| 023 | 2 | 063 | 2 | 0A3 | 2 | 0E3 | 2 |
| 024 | 0 | 064 | 0 | 0A4 | 0 | 0E4 | 0 |
| 025 | 1 | 065 | 1 | 0A5 | 1 | 0E5 | 1 |
| 026 | 0 | 066 | 0 | 0A6 | 0 | 0E6 | 0 |
| 027 | 3 | 067 | 3 | 0A7 | 3 | 0E7 | 3 |
| 028 | 0 | 068 | 0 | 0A8 | 0 | 0E8 | 0 |
| 029 | 1 | 069 | 1 | 0A9 | 1 | 0E9 | 1 |
| 02A | 0 | 06A | 0 | 0AA | 0 | 0EA | 0 |
| 02B | 2 | 06B | 2 | 0AB | 2 | 0EB | 2 |
| 02C | 0 | 06C | 0 | 0AC | 0 | 0EC | 0 |
| 02D | 1 | 06D | 1 | 0AD | 1 | 0ED | 1 |
| 02E | 0 | 06E | 0 | 0AE | 0 | 0EE | 0 |
| 02F | 4 | 06F | 4 | 0AF | 4 | 0EF | 4 |
| 030 | 0 | 070 | 0 | 0B0 | 0 | 0F0 | 0 |
| 031 | 1 | 071 | 1 | 0B1 | 1 | 0F1 | 1 |
| 032 | 0 | 072 | 0 | 0B2 | 0 | 0F2 | 0 |
| 033 | 2 | 073 | 2 | 0B3 | 2 | 0F3 | 2 |
| 034 | 0 | 074 | 0 | 0B4 | 0 | 0F4 | 0 |
| 035 | 1 | 075 | 1 | 0B5 | 1 | 0F5 | 1 |
| 036 | 0 | 076 | 0 | 0B6 | 0 | 0F6 | 0 |
| 037 | 3 | 077 | 3 | 0B7 | 3 | 0F7 | 3 |
| 038 | 0 | 078 | 0 | 0B8 | 0 | 0F8 | 0 |
| 039 | 1 | 079 | 1 | 0B9 | 1 | 0F9 | 1 |
| 03A | 0 | 07A | 0 | 0BA | 0 | 0FA | 0 |
| 03B | 2 | 07B | 2 | 0BB | 2 | 0FB | 2 |
| 03C | 0 | 07C | 0 | 0BC | 0 | 0FC | 0 |
| 03D | 1 | 07D | 1 | 0BD | 1 | 0FD | 1 |
| 03E | 0 | 07E | 0 | 0BE | 0 | 0FE | 0 |
| 03F | 6 | 07F | 7 | 0BF | 6 | 0FF | 8 |

FFH LOOKUP TABLE (FUNC: FFH, DATA LENGTH: DOUBLE-BYTE)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| 100 | 0 | 140 | 0 | 180 | 0 | 1C0 | 0 |
| 101 | 2 | 141 | 2 | 181 | 2 | 1C1 | 2 |
| 102 | 2 | 142 | 2 | 182 | 2 | 1C2 | 2 |
| 103 | 2 | 143 | 2 | 183 | 2 | 1C3 | 2 |
| 104 | 0 | 144 | 0 | 184 | 0 | 1C4 | 0 |
| 105 | 4 | 145 | 4 | 185 | 4 | 1C5 | 4 |
| 106 | 4 | 146 | 4 | 186 | 4 | 1C6 | 4 |
| 107 | 4 | 147 | 4 | 187 | 4 | 1C7 | 4 |
| 108 | 0 | 148 | 0 | 188 | 0 | 1C8 | 0 |
| 109 | 4 | 149 | 4 | 189 | 4 | 1C9 | 4 |
| 10A | 4 | 14A | 4 | 18A | 4 | 1CA | 4 |
| 10B | 4 | 14B | 4 | 18B | 4 | 1CB | 4 |
| 10C | 0 | 14C | 0 | 18C | 0 | 1CC | 0 |
| 10D | 4 | 14D | 4 | 18D | 4 | 1CD | 4 |
| 10E | 4 | 14E | 4 | 18E | 4 | 1CE | 4 |
| 10F | 4 | 14F | 4 | 18F | 4 | 1CF | 4 |
| 110 | 0 | 150 | 0 | 190 | 0 | 1D0 | 0 |
| 111 | 2 | 151 | 2 | 191 | 2 | 1D1 | 2 |
| 112 | 2 | 152 | 2 | 192 | 2 | 1D2 | 2 |
| 113 | 2 | 153 | 2 | 193 | 2 | 1D3 | 2 |
| 114 | 0 | 154 | 0 | 194 | 0 | 1D4 | 0 |
| 115 | 6 | 155 | 8 | 195 | 8 | 1D5 | 8 |
| 116 | 6 | 156 | 8 | 196 | 8 | 1D6 | 8 |
| 117 | 6 | 157 | 8 | 197 | 8 | 1D7 | 8 |
| 118 | 0 | 158 | 0 | 198 | 0 | 1D8 | 0 |
| 119 | 6 | 159 | 8 | 199 | 8 | 1D9 | 8 |
| 11A | 6 | 15A | 8 | 19A | 8 | 1DA | 8 |
| 11B | 6 | 15B | 8 | 19B | 8 | 1DB | 8 |
| 11C | 0 | 15C | 0 | 19C | 0 | 1DC | 0 |
| 11D | 6 | 15D | 8 | 19D | 8 | 1DD | 8 |
| 11E | 6 | 15E | 8 | 19E | 8 | 1DE | 8 |
| 11F | 6 | 15F | 8 | 19F | 8 | 1DF | 8 |
| 120 | 0 | 160 | 0 | 1A0 | 0 | 1E0 | 0 |
| 121 | 2 | 161 | 2 | 1A1 | 2 | 1E1 | 2 |
| 122 | 2 | 162 | 2 | 1A2 | 2 | 1E2 | 2 |
| 123 | 2 | 163 | 2 | 1A3 | 2 | 1E3 | 2 |
| 124 | 0 | 164 | 0 | 1A4 | 0 | 1E4 | 0 |
| 125 | 6 | 165 | 8 | 1A5 | 8 | 1E5 | 8 |
| 126 | 6 | 166 | 8 | 1A6 | 8 | 1E6 | 8 |
| 127 | 6 | 167 | 8 | 1A7 | 8 | 1E7 | 8 |
| 128 | 0 | 168 | 0 | 1A8 | 0 | 1E8 | 0 |
| 129 | 6 | 169 | 8 | 1A9 | 8 | 1E9 | 8 |
| 12A | 6 | 16A | 8 | 1AA | 8 | 1EA | 8 |
| 12B | 6 | 16B | 8 | 1AB | 8 | 1EB | 8 |
| 12C | 0 | 16C | 0 | 1AC | 0 | 1EC | 0 |
| 12D | 6 | 16D | 8 | 1AD | 8 | 1ED | 8 |
| 12E | 6 | 16E | 8 | 1AE | 8 | 1EE | 8 |
| 12F | 6 | 16F | 8 | 1AF | 8 | 1EF | 8 |
| 130 | 0 | 170 | 0 | 1B0 | 0 | 1F0 | 0 |
| 131 | 2 | 171 | 2 | 1B1 | 2 | 1F1 | 2 |
| 132 | 2 | 172 | 2 | 1B2 | 2 | 1F2 | 2 |
| 133 | 2 | 173 | 2 | 1B3 | 2 | 1F3 | 2 |
| 134 | 0 | 174 | 0 | 1B4 | 0 | 1F4 | 0 |
| 135 | 6 | 175 | 8 | 1B5 | 8 | 1F5 | 8 |
| 136 | 6 | 176 | 8 | 1B6 | 8 | 1F6 | 8 |
| 137 | 6 | 177 | 8 | 1B7 | 8 | 1F7 | 8 |
| 138 | 0 | 178 | 0 | 1B8 | 0 | 1F8 | 0 |
| 139 | 6 | 179 | 8 | 1B9 | 8 | 1F9 | 8 |
| 13A | 6 | 17A | 8 | 1BA | 8 | 1FA | 8 |
| 13B | 6 | 17B | 8 | 1BB | 8 | 1FB | 8 |
| 13C | 0 | 17C | 0 | 1BC | 0 | 1FC | 0 |
| 13D | 6 | 17D | 8 | 1BD | 8 | 1FD | 8 |
| 13E | 6 | 17E | 8 | 1BE | 8 | 1FE | 8 |
| 13F | 6 | 17F | 8 | 1BF | 8 | 1FF | 8 |

FFH LOOKUP TABLE  (FUNC: FFH, DATA LENGTH: HALF-WORD)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| 200 | 0 | 240 | 0 | 280 | 0 | 2C0 | 0 |
| 201 | 4 | 241 | 8 | 281 | 8 | 2C1 | 8 |
| 202 | 4 | 242 | 8 | 282 | 8 | 2C2 | 8 |
| 203 | 4 | 243 | 8 | 283 | 8 | 2C3 | 8 |
| 204 | 4 | 244 | 8 | 284 | 8 | 2C4 | 8 |
| 205 | 4 | 245 | 8 | 285 | 8 | 2C5 | 8 |
| 206 | 4 | 246 | 8 | 286 | 8 | 2C6 | 8 |
| 207 | 4 | 247 | 8 | 287 | 8 | 2C7 | 8 |
| 208 | 4 | 248 | 8 | 288 | 8 | 2C8 | 8 |
| 209 | 4 | 249 | 8 | 289 | 8 | 2C9 | 8 |
| 20A | 4 | 24A | 8 | 28A | 8 | 2CA | 8 |
| 20B | 4 | 24B | 8 | 28B | 8 | 2CB | 8 |
| 20C | 4 | 24C | 8 | 28C | 8 | 2CC | 8 |
| 20D | 4 | 24D | 8 | 28D | 8 | 2CD | 8 |
| 20E | 4 | 24E | 8 | 28E | 8 | 2CE | 8 |
| 20F | 4 | 24F | 8 | 28F | 8 | 2CF | 8 |
| 210 | 0 | 250 | 0 | 290 | 0 | 2D0 | 0 |
| 211 | 8 | 251 | 8 | 291 | 8 | 2D1 | 8 |
| 212 | 8 | 252 | 8 | 292 | 8 | 2D2 | 8 |
| 213 | 8 | 253 | 8 | 293 | 8 | 2D3 | 8 |
| 214 | 8 | 254 | 8 | 294 | 8 | 2D4 | 8 |
| 215 | 8 | 255 | 8 | 295 | 8 | 2D5 | 8 |
| 216 | 8 | 256 | 8 | 296 | 8 | 2D6 | 8 |
| 217 | 8 | 257 | 8 | 297 | 8 | 2D7 | 8 |
| 218 | 8 | 258 | 8 | 298 | 8 | 2D8 | 8 |
| 219 | 8 | 259 | 8 | 299 | 8 | 2D9 | 8 |
| 21A | 8 | 25A | 8 | 29A | 8 | 2DA | 8 |
| 21B | 8 | 25B | 8 | 29B | 8 | 2DB | 8 |
| 21C | 8 | 25C | 8 | 29C | 8 | 2DC | 8 |
| 21D | 8 | 25D | 8 | 29D | 8 | 2DD | 8 |
| 21E | 8 | 25E | 8 | 29E | 8 | 2DE | 8 |
| 21F | 8 | 25F | 8 | 29F | 8 | 2DF | 8 |
| 220 | 0 | 260 | 0 | 2A0 | 0 | 2E0 | 0 |
| 221 | 8 | 261 | 8 | 2A1 | 8 | 2E1 | 8 |
| 222 | 8 | 262 | 8 | 2A2 | 8 | 2E2 | 8 |
| 223 | 8 | 263 | 8 | 2A3 | 8 | 2E3 | 8 |
| 224 | 8 | 264 | 8 | 2A4 | 8 | 2E4 | 8 |
| 225 | 8 | 265 | 8 | 2A5 | 8 | 2E5 | 8 |
| 226 | 8 | 266 | 8 | 2A6 | 8 | 2E6 | 8 |
| 227 | 8 | 267 | 8 | 2A7 | 8 | 2E7 | 8 |
| 228 | 8 | 268 | 8 | 2A8 | 8 | 2E8 | 8 |
| 229 | 8 | 269 | 8 | 2A9 | 8 | 2E9 | 8 |
| 22A | 8 | 26A | 8 | 2AA | 8 | 2EA | 8 |
| 22B | 8 | 26B | 8 | 2AB | 8 | 2EB | 8 |
| 22C | 8 | 26C | 8 | 2AC | 8 | 2EC | 8 |
| 22D | 8 | 26D | 8 | 2AD | 8 | 2ED | 8 |
| 22E | 8 | 26E | 8 | 2AE | 8 | 2EE | 8 |
| 22F | 8 | 26F | 8 | 2AF | 8 | 2EF | 8 |
| 230 | 0 | 270 | 0 | 2B0 | 0 | 2F0 | 0 |
| 231 | 8 | 271 | 8 | 2B1 | 8 | 2F1 | 8 |
| 232 | 8 | 272 | 8 | 2B2 | 8 | 2F2 | 8 |
| 233 | 8 | 273 | 8 | 2B3 | 8 | 2F3 | 8 |
| 234 | 8 | 274 | 8 | 2B4 | 8 | 2F4 | 8 |
| 235 | 8 | 275 | 8 | 2B5 | 8 | 2F5 | 8 |
| 236 | 8 | 276 | 8 | 2B6 | 8 | 2F6 | 8 |
| 237 | 8 | 277 | 8 | 2B7 | 8 | 2F7 | 8 |
| 238 | 8 | 278 | 8 | 2B8 | 8 | 2F8 | 8 |
| 239 | 8 | 279 | 8 | 2B9 | 8 | 2F9 | 8 |
| 23A | 8 | 27A | 8 | 2BA | 8 | 2FA | 8 |
| 23B | 8 | 27B | 8 | 2BB | 8 | 2FB | 8 |
| 23C | 8 | 27C | 8 | 2BC | 8 | 2FC | 8 |
| 23D | 8 | 27D | 8 | 2BD | 8 | 2FD | 8 |
| 23E | 8 | 27E | 8 | 2BE | 8 | 2FE | 8 |
| 23F | 8 | 27F | 8 | 2BF | 8 | 2FF | 8 |

FFH LOOKUP TABLE  (FUNC: FFH, DATA LENGTH: WORD)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| 300 | 0 | 340 | 8 | 380 | 8 | 3C0 | 8 |
| 301 | 8 | 341 | 8 | 381 | 8 | 3C1 | 8 |
| 302 | 8 | 342 | 8 | 382 | 8 | 3C2 | 8 |
| 303 | 8 | 343 | 8 | 383 | 8 | 3C3 | 8 |
| 304 | 8 | 344 | 8 | 384 | 8 | 3C4 | 8 |
| 305 | 8 | 345 | 8 | 385 | 8 | 3C5 | 8 |
| 306 | 8 | 346 | 8 | 386 | 8 | 3C6 | 8 |
| 307 | 8 | 347 | 8 | 387 | 8 | 3C7 | 8 |
| 308 | 8 | 348 | 8 | 388 | 8 | 3C8 | 8 |
| 309 | 8 | 349 | 8 | 389 | 8 | 3C9 | 8 |
| 30A | 8 | 34A | 8 | 38A | 8 | 3CA | 8 |
| 30B | 8 | 34B | 8 | 38B | 8 | 3CB | 8 |
| 30C | 8 | 34C | 8 | 38C | 8 | 3CC | 8 |
| 30D | 8 | 34D | 8 | 38D | 8 | 3CD | 8 |
| 30E | 8 | 34E | 8 | 38E | 8 | 3CE | 8 |
| 30F | 8 | 34F | 8 | 38F | 8 | 3CF | 8 |
| 310 | 8 | 350 | 8 | 390 | 8 | 3D0 | 8 |
| 311 | 8 | 351 | 8 | 391 | 8 | 3D1 | 8 |
| 312 | 8 | 352 | 8 | 392 | 8 | 3D2 | 8 |
| 313 | 8 | 353 | 8 | 393 | 8 | 3D3 | 8 |
| 314 | 8 | 354 | 8 | 394 | 8 | 3D4 | 8 |
| 315 | 8 | 355 | 8 | 395 | 8 | 3D5 | 8 |
| 316 | 8 | 356 | 8 | 396 | 8 | 3D6 | 8 |
| 317 | 8 | 357 | 8 | 397 | 8 | 3D7 | 8 |
| 318 | 8 | 358 | 8 | 398 | 8 | 3D8 | 8 |
| 319 | 8 | 359 | 8 | 399 | 8 | 3D9 | 8 |
| 31A | 8 | 35A | 8 | 39A | 8 | 3DA | 8 |
| 31B | 8 | 35B | 8 | 39B | 8 | 3DB | 8 |
| 31C | 8 | 35C | 8 | 39C | 8 | 3DC | 8 |
| 31D | 8 | 35D | 8 | 39D | 8 | 3DD | 8 |
| 31E | 8 | 35E | 8 | 39E | 8 | 3DE | 8 |
| 31F | 8 | 35F | 8 | 39F | 8 | 3DF | 8 |
| 320 | 8 | 360 | 8 | 3A0 | 8 | 3E0 | 8 |
| 321 | 8 | 361 | 8 | 2A1 | 8 | 3E1 | 8 |
| 322 | 8 | 362 | 8 | 3A2 | 8 | 3E2 | 8 |
| 323 | 8 | 363 | 8 | 3A3 | 8 | 3E3 | 8 |
| 324 | 8 | 364 | 8 | 3A4 | 8 | 3E4 | 8 |
| 325 | 8 | 365 | 8 | 3A5 | 8 | 3E5 | 8 |
| 326 | 8 | 366 | 8 | 3A6 | 8 | 3E6 | 8 |
| 327 | 8 | 367 | 8 | 3A7 | 8 | 3E7 | 8 |
| 328 | 8 | 368 | 8 | 3A8 | 8 | 3E8 | 8 |
| 329 | 8 | 369 | 8 | 3A9 | 8 | 3E9 | 8 |
| 32A | 8 | 36A | 8 | 3AA | 8 | 3EA | 8 |
| 32B | 8 | 36B | 8 | 3AB | 8 | 3EB | 8 |
| 32C | 8 | 36C | 8 | 3AC | 8 | 3EC | 8 |
| 32D | 8 | 36D | 8 | 3AD | 8 | 3ED | 8 |
| 32E | 8 | 36E | 8 | 3AE | 8 | 3EE | 8 |
| 32F | 8 | 36F | 8 | 3AF | 8 | 3EF | 8 |
| 330 | 8 | 370 | 8 | 3B0 | 8 | 3F0 | 8 |
| 331 | 8 | 371 | 8 | 3B1 | 8 | 3F1 | 8 |
| 332 | 8 | 372 | 8 | 3B2 | 8 | 3F2 | 8 |
| 333 | 8 | 373 | 8 | 3B3 | 8 | 3F3 | 8 |
| 334 | 8 | 374 | 8 | 3B4 | 8 | 3F4 | 8 |
| 335 | 8 | 375 | 8 | 3B5 | 8 | 3F5 | 8 |
| 336 | 8 | 376 | 8 | 3B6 | 8 | 3F6 | 8 |
| 337 | 8 | 377 | 8 | 3B7 | 8 | 3F7 | 8 |
| 338 | 8 | 378 | 8 | 3B8 | 8 | 3F8 | 8 |
| 339 | 8 | 379 | 8 | 3B9 | 8 | 3F9 | 8 |
| 33A | 8 | 37A | 8 | 3BA | 8 | 3FA | 8 |
| 33B | 8 | 37B | 8 | 3BB | 8 | 3FB | 8 |
| 33C | 8 | 37C | 8 | 3BC | 8 | 3FC | 8 |
| 33D | 8 | 37D | 8 | 3BD | 8 | 3FD | 8 |
| 33E | 8 | 37E | 8 | 3BE | 8 | 3FE | 8 |
| 33F | 8 | 37F | 8 | 3BF | 8 | 3FF | 8 |

FFH LOOKUP TABLE     (FUNC: FFM, DATA LENGTH: BYTE)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| 400 | 8 | 440 | 6 | 480 | 7 | 4C0 | 6 |
| 401 | 0 | 441 | 0 | 481 | 0 | 4C1 | 0 |
| 402 | 1 | 442 | 1 | 482 | 1 | 4C2 | 1 |
| 403 | 0 | 443 | 0 | 483 | 0 | 4C3 | 0 |
| 404 | 2 | 444 | 2 | 484 | 2 | 4C4 | 2 |
| 405 | 0 | 445 | 0 | 485 | 0 | 4C5 | 0 |
| 406 | 1 | 446 | 1 | 486 | 1 | 4C6 | 1 |
| 407 | 0 | 447 | 0 | 487 | 0 | 4C7 | 0 |
| 408 | 3 | 448 | 3 | 488 | 3 | 4C8 | 3 |
| 409 | 0 | 449 | 0 | 489 | 0 | 4C9 | 0 |
| 40A | 1 | 44A | 1 | 48A | 1 | 4CA | 1 |
| 40B | 0 | 44B | 0 | 48B | 0 | 4CB | 0 |
| 40C | 2 | 44C | 2 | 48C | 2 | 4CC | 2 |
| 40D | 0 | 44D | 0 | 48D | 0 | 4CD | 0 |
| 40E | 1 | 44E | 1 | 48E | 1 | 4CE | 1 |
| 40F | 0 | 44F | 0 | 48F | 0 | 4CF | 0 |
| 410 | 4 | 450 | 4 | 490 | 4 | 4D0 | 4 |
| 411 | 0 | 451 | 0 | 491 | 0 | 4D1 | 0 |
| 412 | 1 | 452 | 1 | 492 | 1 | 4D2 | 1 |
| 413 | 0 | 453 | 0 | 493 | 0 | 4D3 | 0 |
| 414 | 2 | 454 | 2 | 494 | 2 | 4D4 | 2 |
| 415 | 0 | 455 | 0 | 495 | 0 | 4D5 | 0 |
| 416 | 1 | 456 | 1 | 496 | 1 | 4D6 | 1 |
| 417 | 0 | 457 | 0 | 497 | 0 | 4D7 | 0 |
| 418 | 3 | 458 | 3 | 498 | 3 | 4D8 | 3 |
| 419 | 0 | 459 | 0 | 499 | 0 | 4D9 | 0 |
| 41A | 1 | 45A | 1 | 49A | 1 | 4DA | 1 |
| 41B | 0 | 45B | 0 | 49B | 0 | 4DB | 0 |
| 41C | 2 | 45C | 2 | 49C | 2 | 4DC | 2 |
| 41D | 0 | 45D | 0 | 49D | 0 | 4DD | 0 |
| 41E | 1 | 45E | 1 | 49E | 1 | 4DE | 1 |
| 41F | 0 | 45F | 0 | 49F | 0 | 4DF | 0 |
| 420 | 5 | 460 | 5 | 4A0 | 5 | 4E0 | 5 |
| 421 | 0 | 461 | 0 | 4A1 | 0 | 4E1 | 0 |
| 422 | 1 | 462 | 1 | 4A2 | 1 | 4E2 | 1 |
| 423 | 0 | 463 | 0 | 4A3 | 0 | 4E3 | 0 |
| 424 | 2 | 464 | 2 | 4A4 | 2 | 4E4 | 2 |
| 425 | 0 | 465 | 0 | 4A5 | 0 | 4E5 | 0 |
| 426 | 1 | 466 | 1 | 4A6 | 1 | 4E6 | 1 |
| 427 | 0 | 467 | 0 | 4A7 | 0 | 4E7 | 0 |
| 428 | 3 | 468 | 3 | 4A8 | 3 | 4E8 | 3 |
| 429 | 0 | 469 | 0 | 4A9 | 0 | 4E9 | 0 |
| 42A | 1 | 46A | 1 | 4AA | 1 | 4EA | 1 |
| 42B | 0 | 46B | 0 | 4AB | 0 | 4EB | 0 |
| 42C | 2 | 46C | 2 | 4AC | 2 | 4EC | 2 |
| 42D | 0 | 46D | 0 | 4AD | 0 | 4ED | 0 |
| 42E | 1 | 46E | 1 | 4AE | 1 | 4EE | 1 |
| 42F | 0 | 46F | 0 | 4AF | 0 | 4EF | 0 |
| 430 | 4 | 470 | 4 | 4B0 | 4 | 4F0 | 4 |
| 431 | 0 | 471 | 0 | 4B1 | 0 | 4F1 | 0 |
| 432 | 1 | 472 | 1 | 4B2 | 1 | 4F2 | 1 |
| 433 | 0 | 473 | 0 | 4B3 | 0 | 4F3 | 0 |
| 434 | 2 | 474 | 2 | 4B4 | 2 | 4F4 | 2 |
| 435 | 0 | 475 | 0 | 4B5 | 0 | 4F5 | 0 |
| 436 | 1 | 476 | 1 | 4B6 | 1 | 4F6 | 1 |
| 437 | 0 | 477 | 0 | 4B7 | 0 | 4F7 | 0 |
| 438 | 3 | 478 | 3 | 4B8 | 3 | 4F8 | 3 |
| 439 | 0 | 479 | 0 | 4B9 | 0 | 4F9 | 0 |
| 43A | 1 | 47A | 1 | 4BA | 1 | 4FA | 1 |
| 43B | 0 | 47B | 0 | 4BB | 0 | 4FB | 0 |
| 43C | 2 | 47C | 2 | 4BC | 2 | 4FC | 2 |
| 43D | 0 | 47D | 0 | 4BD | 0 | 4FD | 0 |
| 43E | 1 | 47E | 1 | 4BE | 1 | 4FE | 1 |
| 43F | 0 | 47F | 0 | 4BF | 0 | 4FF | 0 |

FFH LOOKUP TABLE  (FUNC: FFM, DATA LENGTH: DOUBLE-BYTE)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| 500 | 8 | 540 | 6 | 580 | 6 | 5C0 | 6 |
| 501 | 0 | 541 | 0 | 581 | 0 | 5C1 | 0 |
| 502 | 0 | 542 | 0 | 582 | 0 | 5C2 | 0 |
| 503 | 0 | 543 | 0 | 583 | 0 | 5C3 | 0 |
| 504 | 2 | 544 | 2 | 584 | 2 | 5C4 | 2 |
| 505 | 0 | 545 | 0 | 585 | 0 | 5C5 | 0 |
| 506 | 0 | 546 | 0 | 586 | 0 | 5C6 | 0 |
| 507 | 0 | 547 | 0 | 587 | 0 | 5C7 | 0 |
| 508 | 2 | 548 | 2 | 588 | 2 | 5C8 | 2 |
| 509 | 0 | 549 | 0 | 589 | 0 | 5C9 | 0 |
| 50A | 0 | 54A | 0 | 58A | 0 | 5CA | 0 |
| 50B | 0 | 54B | 0 | 58B | 0 | 5CB | 0 |
| 50C | 2 | 54C | 2 | 58C | 2 | 5CC | 2 |
| 50D | 0 | 54D | 0 | 58D | 0 | 5CD | 0 |
| 50E | 0 | 54E | 0 | 58E | 0 | 5CE | 0 |
| 50F | 0 | 54F | 0 | 58F | 0 | 5CF | 0 |
| 510 | 4 | 550 | 4 | 590 | 4 | 5D0 | 4 |
| 511 | 0 | 551 | 0 | 591 | 0 | 5D1 | 0 |
| 512 | 0 | 552 | 0 | 592 | 0 | 5D2 | 0 |
| 513 | 0 | 553 | 0 | 593 | 0 | 5D3 | 0 |
| 514 | 2 | 554 | 2 | 594 | 2 | 554 | 2 |
| 515 | 0 | 555 | 0 | 595 | 0 | 555 | 0 |
| 516 | 0 | 556 | 0 | 596 | 0 | 556 | 0 |
| 517 | 0 | 557 | 0 | 597 | 0 | 557 | 0 |
| 518 | 2 | 558 | 2 | 598 | 2 | 5D8 | 2 |
| 519 | 0 | 559 | 0 | 599 | 0 | 5D9 | 0 |
| 51A | 0 | 55A | 0 | 59A | 0 | 5DA | 0 |
| 51B | 0 | 55B | 0 | 59B | 0 | 5DB | 0 |
| 51C | 2 | 55C | 2 | 59C | 2 | 5DC | 2 |
| 51D | 0 | 55D | 0 | 59D | 0 | 5DD | 0 |
| 51E | 0 | 55E | 0 | 59E | 0 | 5DE | 0 |
| 51F | 0 | 55F | 0 | 59F | 0 | 5DF | 0 |
| 520 | 4 | 560 | 4 | 5A0 | 4 | 5E0 | 4 |
| 521 | 0 | 561 | 0 | 5A1 | 0 | 5E1 | 0 |
| 522 | 0 | 562 | 0 | 5A2 | 0 | 5E2 | 0 |
| 523 | 0 | 563 | 0 | 5A3 | 0 | 5E3 | 0 |
| 524 | 2 | 564 | 2 | 5A4 | 2 | 5E4 | 2 |
| 525 | 0 | 565 | 0 | 5A5 | 0 | 5E5 | 0 |
| 526 | 0 | 566 | 0 | 5A6 | 0 | 5E6 | 0 |
| 527 | 0 | 567 | 0 | 5A7 | 0 | 5E7 | 0 |
| 528 | 2 | 568 | 2 | 5A8 | 2 | 5E8 | 2 |
| 529 | 0 | 569 | 0 | 5A9 | 0 | 5E9 | 0 |
| 52A | 0 | 56A | 0 | 5AA | 0 | 5EA | 0 |
| 52B | 0 | 56B | 0 | 5AB | 0 | 5EB | 0 |
| 52C | 2 | 56C | 2 | 5AC | 2 | 5EC | 2 |
| 52D | 0 | 56D | 0 | 5AD | 0 | 5ED | 0 |
| 52E | 0 | 56E | 0 | 5AE | 0 | 5EE | 0 |
| 52F | 0 | 56F | 0 | 5AF | 0 | 5EF | 0 |
| 530 | 4 | 570 | 4 | 5B0 | 4 | 5F0 | 4 |
| 531 | 0 | 571 | 0 | 5B1 | 0 | 5F1 | 0 |
| 532 | 0 | 572 | 0 | 5B2 | 0 | 5F2 | 0 |
| 533 | 0 | 573 | 0 | 5B3 | 0 | 5F3 | 0 |
| 534 | 2 | 574 | 2 | 5B4 | 2 | 5F4 | 2 |
| 535 | 0 | 575 | 0 | 5B5 | 0 | 5F5 | 0 |
| 536 | 0 | 576 | 0 | 5B6 | 0 | 5F6 | 0 |
| 537 | 0 | 577 | 0 | 5B7 | 0 | 5F7 | 0 |
| 538 | 2 | 578 | 2 | 5B8 | 2 | 5F8 | 2 |
| 539 | 0 | 579 | 0 | 5B9 | 0 | 5F9 | 0 |
| 53A | 0 | 57A | 0 | 5BA | 0 | 5FA | 0 |
| 53B | 0 | 57B | 0 | 5BB | 0 | 5FB | 0 |
| 53C | 2 | 57C | 2 | 5BC | 2 | 5FC | 2 |
| 53D | 0 | 57D | 0 | 5BD | 0 | 5FD | 0 |
| 53E | 0 | 57E | 0 | 5BE | 0 | 5FE | 0 |
| 53F | 0 | 57F | 0 | 5BF | 0 | 5FF | 0 |

FFH LOOKUP TABLE   (FUNC: FFM, DATA LENGTH: HALF-WORD)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| 600 | 8 | 640 | 4 | 680 | 4 | 6C0 | 4 |
| 601 | 0 | 641 | 0 | 681 | 0 | 6C1 | 0 |
| 602 | 0 | 642 | 0 | 682 | 0 | 6C2 | 0 |
| 603 | 0 | 643 | 0 | 683 | 0 | 6C3 | 0 |
| 604 | 0 | 644 | 0 | 684 | 0 | 6C4 | 0 |
| 605 | 0 | 645 | 0 | 685 | 0 | 6C5 | 0 |
| 606 | 0 | 646 | 0 | 686 | 0 | 6C6 | 0 |
| 607 | 0 | 647 | 0 | 687 | 0 | 6C7 | 0 |
| 608 | 0 | 648 | 0 | 688 | 0 | 6C8 | 0 |
| 609 | 0 | 649 | 0 | 689 | 0 | 6C9 | 0 |
| 60A | 0 | 64A | 0 | 68A | 0 | 6CA | 0 |
| 60B | 0 | 64B | 0 | 68B | 0 | 6CB | 0 |
| 60C | 0 | 64C | 0 | 68C | 0 | 6CC | 0 |
| 60D | 0 | 64D | 0 | 68D | 0 | 6CD | 0 |
| 60E | 0 | 64E | 0 | 68E | 0 | 6CE | 0 |
| 60F | 0 | 64F | 0 | 68F | 0 | 6CF | 0 |
| 610 | 4 | 650 | 4 | 690 | 4 | 6D0 | 4 |
| 611 | 0 | 651 | 0 | 691 | 0 | 6D1 | 0 |
| 612 | 0 | 652 | 0 | 692 | 0 | 6D2 | 0 |
| 613 | 0 | 653 | 0 | 693 | 0 | 6D3 | 0 |
| 614 | 0 | 654 | 0 | 694 | 0 | 654 | 0 |
| 615 | 0 | 655 | 0 | 695 | 0 | 655 | 0 |
| 616 | 0 | 656 | 0 | 696 | 0 | 656 | 0 |
| 617 | 0 | 657 | 0 | 697 | 0 | 657 | 0 |
| 618 | 0 | 658 | 0 | 698 | 0 | 6D8 | 0 |
| 619 | 0 | 659 | 0 | 699 | 0 | 6D9 | 0 |
| 61A | 0 | 65A | 0 | 69A | 0 | 6DA | 0 |
| 61B | 0 | 65B | 0 | 69B | 0 | 6DB | 0 |
| 61C | 0 | 65C | 0 | 69C | 0 | 6DC | 0 |
| 61D | 0 | 65D | 0 | 69D | 0 | 6DD | 0 |
| 61E | 0 | 65E | 0 | 69E | 0 | 6DE | 0 |
| 61F | 0 | 65F | 0 | 69F | 0 | 6DF | 0 |
| 620 | 4 | 660 | 4 | 6A0 | 4 | 6E0 | 4 |
| 621 | 0 | 661 | 0 | 6A1 | 0 | 6E1 | 0 |
| 622 | 0 | 662 | 0 | 6A2 | 0 | 6E2 | 0 |
| 623 | 0 | 663 | 0 | 6A3 | 0 | 6E3 | 0 |
| 624 | 0 | 664 | 0 | 6A4 | 0 | 6E4 | 0 |
| 625 | 0 | 665 | 0 | 6A5 | 0 | 6E5 | 0 |
| 626 | 0 | 666 | 0 | 6A6 | 0 | 6E6 | 0 |
| 627 | 0 | 667 | 0 | 6A7 | 0 | 6E7 | 0 |
| 628 | 0 | 668 | 0 | 6A8 | 0 | 6E8 | 0 |
| 629 | 0 | 669 | 0 | 6A9 | 0 | 6E9 | 0 |
| 62A | 0 | 66A | 0 | 6AA | 0 | 6EA | 0 |
| 62B | 0 | 66B | 0 | 6AB | 0 | 6EB | 0 |
| 62C | 0 | 66C | 0 | 6AC | 0 | 6EC | 0 |
| 62D | 0 | 66D | 0 | 6AD | 0 | 6ED | 0 |
| 62E | 0 | 66E | 0 | 6AE | 0 | 6EE | 0 |
| 62F | 0 | 66F | 0 | 6AF | 0 | 6EF | 0 |
| 630 | 4 | 670 | 4 | 6B0 | 4 | 6F0 | 4 |
| 631 | 0 | 671 | 0 | 6B1 | 0 | 6F1 | 0 |
| 632 | 0 | 672 | 0 | 6B2 | 0 | 6F2 | 0 |
| 633 | 0 | 673 | 0 | 6B3 | 0 | 6F3 | 0 |
| 634 | 0 | 674 | 0 | 6B4 | 0 | 6F4 | 0 |
| 635 | 0 | 675 | 0 | 6B5 | 0 | 6F5 | 0 |
| 636 | 0 | 676 | 0 | 6B6 | 0 | 6F6 | 0 |
| 637 | 0 | 677 | 0 | 6B7 | 0 | 6F7 | 0 |
| 638 | 0 | 678 | 0 | 6B8 | 0 | 6F8 | 0 |
| 639 | 0 | 679 | 0 | 6B9 | 0 | 6F9 | 0 |
| 63A | 0 | 67A | 0 | 6BA | 0 | 6FA | 0 |
| 63B | 0 | 67B | 0 | 6BB | 0 | 6FB | 0 |
| 63C | 0 | 67C | 0 | 6BC | 0 | 6FC | 0 |
| 63D | 0 | 67D | 0 | 6BD | 0 | 6FD | 0 |
| 63E | 0 | 67E | 0 | 6BE | 0 | 6FE | 0 |
| 63F | 0 | 67F | 0 | 6BF | 0 | 6FF | 0 |

FFH LOOKUP TABLE  (FUNC: FFM, DATA LENGTH: WORD)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| 700 | 8 | 740 | 0 | 780 | 0 | 7C0 | 0 |
| 701 | 0 | 741 | 0 | 781 | 0 | 7C1 | 0 |
| 702 | 0 | 742 | 0 | 782 | 0 | 7C2 | 0 |
| 703 | 0 | 743 | 0 | 783 | 0 | 7C3 | 0 |
| 704 | 0 | 744 | 0 | 784 | 0 | 7C4 | 0 |
| 705 | 0 | 745 | 0 | 785 | 0 | 7C5 | 0 |
| 706 | 0 | 746 | 0 | 786 | 0 | 7C6 | 0 |
| 707 | 0 | 747 | 0 | 787 | 0 | 7C7 | 0 |
| 708 | 0 | 748 | 0 | 788 | 0 | 7C8 | 0 |
| 709 | 0 | 749 | 0 | 789 | 0 | 7C9 | 0 |
| 70A | 0 | 74A | 0 | 78A | 0 | 7CA | 0 |
| 70B | 0 | 74B | 0 | 78B | 0 | 7CB | 0 |
| 70C | 0 | 74C | 0 | 78C | 0 | 7CC | 0 |
| 70D | 0 | 74D | 0 | 78D | 0 | 7CD | 0 |
| 70E | 0 | 74E | 0 | 78E | 0 | 7CE | 0 |
| 70F | 0 | 74F | 0 | 78F | 0 | 7CF | 0 |
| 710 | 0 | 750 | 0 | 790 | 0 | 7D0 | 0 |
| 711 | 0 | 751 | 0 | 791 | 0 | 7D1 | 0 |
| 712 | 0 | 752 | 0 | 792 | 0 | 7D2 | 0 |
| 713 | 0 | 753 | 0 | 793 | 0 | 7D3 | 0 |
| 714 | 0 | 754 | 0 | 794 | 0 | 754 | 0 |
| 715 | 0 | 755 | 0 | 795 | 0 | 755 | 0 |
| 716 | 0 | 756 | 0 | 796 | 0 | 756 | 0 |
| 717 | 0 | 757 | 0 | 797 | 0 | 757 | 0 |
| 718 | 0 | 758 | 0 | 798 | 0 | 7D8 | 0 |
| 719 | 0 | 759 | 0 | 799 | 0 | 7D9 | 0 |
| 71A | 0 | 75A | 0 | 79A | 0 | 7DA | 0 |
| 71B | 0 | 75B | 0 | 79B | 0 | 7DB | 0 |
| 71C | 0 | 75C | 0 | 79C | 0 | 7DC | 0 |
| 71D | 0 | 75D | 0 | 79D | 0 | 7DD | 0 |
| 71E | 0 | 75E | 0 | 79E | 0 | 7DE | 0 |
| 71F | 0 | 75F | 0 | 79F | 0 | 7DF | 0 |
| 720 | 0 | 760 | 0 | 7A0 | 0 | 7E0 | 0 |
| 721 | 0 | 761 | 0 | 7A1 | 0 | 7E1 | 0 |
| 722 | 0 | 762 | 0 | 7A2 | 0 | 7E2 | 0 |
| 723 | 0 | 763 | 0 | 7A3 | 0 | 7E3 | 0 |
| 724 | 0 | 764 | 0 | 7A4 | 0 | 7E4 | 0 |
| 725 | 0 | 765 | 0 | 7A5 | 0 | 7E5 | 0 |
| 726 | 0 | 766 | 0 | 7A6 | 0 | 7E6 | 0 |
| 727 | 0 | 767 | 0 | 7A7 | 0 | 7E7 | 0 |
| 728 | 0 | 768 | 0 | 7A8 | 0 | 7E8 | 0 |
| 729 | 0 | 769 | 0 | 7A9 | 0 | 7E9 | 0 |
| 72A | 0 | 76A | 0 | 7AA | 0 | 7EA | 0 |
| 72B | 0 | 76B | 0 | 7AB | 0 | 7EB | 0 |
| 72C | 0 | 76C | 0 | 7AC | 0 | 7EC | 0 |
| 72D | 0 | 76D | 0 | 7AD | 0 | 7ED | 0 |
| 72E | 0 | 76E | 0 | 7AE | 0 | 7EE | 0 |
| 72F | 0 | 76F | 0 | 7AF | 0 | 7EF | 0 |
| 730 | 0 | 770 | 0 | 7B0 | 0 | 7F0 | 0 |
| 731 | 0 | 771 | 0 | 7B1 | 0 | 7F1 | 0 |
| 732 | 0 | 772 | 0 | 7B2 | 0 | 7F2 | 0 |
| 733 | 0 | 773 | 0 | 7B3 | 0 | 7F3 | 0 |
| 734 | 0 | 774 | 0 | 7B4 | 0 | 7F4 | 0 |
| 735 | 0 | 775 | 0 | 7B5 | 0 | 7F5 | 0 |
| 736 | 0 | 776 | 0 | 7B6 | 0 | 7F6 | 0 |
| 737 | 0 | 777 | 0 | 7B7 | 0 | 7F7 | 0 |
| 738 | 0 | 778 | 0 | 7B8 | 0 | 7F8 | 0 |
| 739 | 0 | 779 | 0 | 7B9 | 0 | 7F9 | 0 |
| 73A | 0 | 77A | 0 | 7BA | 0 | 7FA | 0 |
| 73B | 0 | 77B | 0 | 7BB | 0 | 7FB | 0 |
| 73C | 0 | 77C | 0 | 7BC | 0 | 7FC | 0 |
| 73D | 0 | 77D | 0 | 7BD | 0 | 7FD | 0 |
| 73E | 0 | 77E | 0 | 7BE | 0 | 7FE | 0 |
| 73F | 0 | 77F | 0 | 7BF | 0 | 7FF | 0 |

FFH LOOKUP TABLE (FUNC: FFHAFM, DATA LENGTH: BYTE)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| 800 | 8 | 840 | 7 | 880 | 8 | 8C0 | 8 |
| 801 | 1 | 841 | 1 | 881 | 1 | 8C1 | 1 |
| 802 | 2 | 842 | 2 | 882 | 2 | 8C2 | 2 |
| 803 | 2 | 843 | 2 | 883 | 2 | 8C3 | 2 |
| 804 | 3 | 844 | 3 | 884 | 3 | 8C4 | 3 |
| 805 | 1 | 845 | 1 | 885 | 1 | 8C5 | 1 |
| 806 | 3 | 846 | 3 | 886 | 3 | 8C6 | 3 |
| 807 | 3 | 847 | 3 | 887 | 3 | 8C7 | 3 |
| 808 | 4 | 848 | 4 | 888 | 4 | 8C8 | 4 |
| 809 | 1 | 849 | 1 | 889 | 1 | 8C9 | 1 |
| 80A | 2 | 84A | 2 | 88A | 2 | 8CA | 2 |
| 80B | 2 | 84B | 2 | 88B | 2 | 8CB | 2 |
| 80C | 4 | 84C | 4 | 88C | 4 | 8CC | 4 |
| 80D | 1 | 84D | 1 | 88D | 1 | 8CD | 1 |
| 80E | 4 | 84E | 4 | 88E | 4 | 8CE | 4 |
| 80F | 4 | 84F | 4 | 88F | 4 | 8CF | 4 |
| 810 | 5 | 850 | 5 | 890 | 5 | 8D0 | 5 |
| 811 | 1 | 851 | 1 | 891 | 1 | 8D1 | 1 |
| 812 | 2 | 852 | 2 | 892 | 2 | 0D2 | 2 |
| 813 | 2 | 853 | 2 | 893 | 2 | 8D3 | 2 |
| 814 | 3 | 854 | 3 | 894 | 3 | 8D4 | 3 |
| 815 | 1 | 855 | 1 | 895 | 1 | 8D5 | 1 |
| 816 | 3 | 856 | 3 | 896 | 3 | 8D6 | 3 |
| 817 | 3 | 057 | 3 | 897 | 3 | 8D7 | 3 |
| 818 | 5 | 858 | 5 | 898 | 5 | 8D8 | 5 |
| 819 | 1 | 859 | 1 | 899 | 1 | 8D9 | 1 |
| 81A | 2 | 85A | 2 | 89A | 2 | 8DA | 2 |
| 81B | 2 | 85B | 2 | 89B | 2 | 8DB | 2 |
| 81C | 5 | 85C | 5 | 89C | 5 | 8DC | 5 |
| 81D | 1 | 85D | 1 | 89D | 1 | 8DD | 1 |
| 81E | 5 | 85E | 5 | 89E | 5 | 8DE | 5 |
| 81F | 5 | 85F | 5 | 89F | 5 | 8DF | 5 |
| 820 | 6 | 860 | 7 | 8A0 | 6 | 8E0 | 8 |
| 821 | 1 | 861 | 1 | 8A1 | 1 | 8E1 | 1 |
| 822 | 2 | 862 | 2 | 8A2 | 2 | 8E2 | 2 |
| 823 | 2 | 863 | 2 | 8A3 | 2 | 8E3 | 2 |
| 824 | 3 | 864 | 3 | 8A4 | 3 | 8E4 | 3 |
| 825 | 1 | 865 | 1 | 8A5 | 1 | 8E5 | 1 |
| 826 | 3 | 866 | 3 | 8A6 | 3 | 8E6 | 3 |
| 827 | 3 | 867 | 3 | 8A7 | 3 | 8E7 | 3 |
| 828 | 4 | 868 | 4 | 8A8 | 4 | 8E8 | 4 |
| 829 | 1 | 869 | 1 | 8A9 | 1 | 8E9 | 1 |
| 82A | 2 | 86A | 2 | 8AA | 2 | 8EA | 2 |
| 82B | 2 | 86B | 2 | 8AB | 2 | 8EB | 2 |
| 82C | 4 | 86C | 4 | 8AC | 4 | 8EC | 4 |
| 82D | 1 | 86D | 1 | 8AD | 1 | 8ED | 1 |
| 82E | 4 | 86E | 4 | 8AE | 4 | 8EE | 4 |
| 82F | 4 | 86F | 4 | 8AF | 4 | 8EF | 4 |
| 830 | 6 | 870 | 7 | 8B0 | 6 | 8F0 | 8 |
| 831 | 1 | 871 | 1 | 8B1 | 1 | 8F1 | 1 |
| 832 | 2 | 872 | 2 | 8B2 | 2 | 0F2 | 2 |
| 833 | 2 | 873 | 2 | 8B3 | 2 | 8F3 | 2 |
| 834 | 3 | 874 | 3 | 8B4 | 3 | 8F4 | 3 |
| 835 | 1 | 875 | 1 | 8B5 | 1 | 8F5 | 1 |
| 836 | 3 | 876 | 3 | 8B6 | 3 | 8F6 | 3 |
| 837 | 3 | 877 | 3 | 8B7 | 3 | 8F7 | 3 |
| 838 | 6 | 878 | 7 | 8B8 | 6 | 8F8 | 8 |
| 839 | 1 | 879 | 1 | 8B9 | 1 | 8F9 | 1 |
| 83A | 2 | 87A | 2 | 8BA | 2 | 8FA | 2 |
| 83B | 2 | 87B | 2 | 8BB | 2 | 8FB | 2 |
| 83C | 6 | 87C | 7 | 8BC | 6 | 8FC | 8 |
| 83D | 1 | 87D | 1 | 8BD | 1 | 8FD | 1 |
| 83E | 6 | 87E | 7 | 8BE | 6 | 8FE | 8 |
| 83F | 6 | 87F | 7 | 8BF | 6 | 8FF | 8 |

FFH LOOKUP TABLE (FUNC: FFHAFM, DATA LENGTH: DOUBLE-BYTE)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| 900 | 8 | 940 | 8 | 980 | 8 | 9C0 | 8 |
| 901 | 2 | 941 | 2 | 981 | 2 | 9C1 | 2 |
| 902 | 2 | 942 | 2 | 982 | 2 | 9C2 | 2 |
| 903 | 2 | 943 | 2 | 983 | 2 | 9C3 | 2 |
| 904 | 4 | 944 | 4 | 984 | 4 | 9C4 | 4 |
| 905 | 4 | 945 | 4 | 985 | 4 | 9C5 | 4 |
| 906 | 4 | 946 | 4 | 986 | 4 | 9C6 | 4 |
| 907 | 4 | 947 | 4 | 987 | 4 | 9C7 | 4 |
| 908 | 4 | 948 | 4 | 988 | 4 | 9C8 | 4 |
| 909 | 4 | 949 | 4 | 989 | 4 | 9C9 | 4 |
| 90A | 4 | 94A | 4 | 98A | 4 | 9CA | 4 |
| 90B | 4 | 94B | 4 | 98B | 4 | 9CB | 4 |
| 90C | 4 | 94C | 4 | 98C | 4 | 9CC | 4 |
| 90D | 4 | 94D | 4 | 98D | 4 | 9CD | 4 |
| 90E | 4 | 94E | 4 | 98E | 4 | 9CE | 4 |
| 90F | 4 | 94F | 4 | 98F | 4 | 9CF | 4 |
| 910 | 6 | 950 | 8 | 990 | 8 | 9D0 | 8 |
| 911 | 2 | 951 | 2 | 991 | 2 | 9D1 | 2 |
| 912 | 2 | 952 | 2 | 992 | 2 | 9D2 | 2 |
| 913 | 2 | 953 | 2 | 993 | 2 | 9D3 | 2 |
| 914 | 6 | 954 | 8 | 994 | 8 | 9D4 | 8 |
| 915 | 6 | 955 | 8 | 995 | 8 | 9D5 | 8 |
| 916 | 6 | 956 | 8 | 996 | 8 | 9D6 | 8 |
| 917 | 6 | 957 | 8 | 997 | 8 | 9D7 | 8 |
| 918 | 6 | 958 | 8 | 998 | 8 | 9D8 | 8 |
| 919 | 6 | 959 | 8 | 999 | 8 | 9D9 | 8 |
| 91A | 6 | 95A | 8 | 99A | 8 | 9DA | 8 |
| 91B | 6 | 95B | 8 | 99B | 8 | 9DB | 8 |
| 91C | 6 | 95C | 8 | 99C | 8 | 9DC | 8 |
| 91D | 6 | 95D | 8 | 99D | 8 | 9DD | 8 |
| 91E | 6 | 95E | 8 | 99E | 8 | 9DE | 8 |
| 91F | 6 | 95F | 8 | 99F | 8 | 9DF | 8 |
| 920 | 6 | 960 | 8 | 9A0 | 8 | 9E0 | 8 |
| 921 | 2 | 961 | 2 | 9A1 | 2 | 9E1 | 2 |
| 922 | 2 | 962 | 2 | 9A2 | 2 | 9E2 | 2 |
| 923 | 2 | 963 | 2 | 9A3 | 2 | 9E3 | 2 |
| 924 | 6 | 964 | 8 | 9A4 | 8 | 9E4 | 8 |
| 925 | 6 | 965 | 8 | 9A5 | 8 | 9E5 | 8 |
| 926 | 6 | 966 | 8 | 9A6 | 8 | 9E6 | 8 |
| 927 | 6 | 967 | 8 | 9A7 | 8 | 9E7 | 8 |
| 928 | 6 | 968 | 8 | 9A8 | 8 | 9E8 | 8 |
| 929 | 6 | 969 | 8 | 9A9 | 8 | 9E9 | 8 |
| 92A | 6 | 96A | 8 | 9AA | 8 | 9EA | 8 |
| 92B | 6 | 96B | 8 | 9AB | 8 | 9EB | 8 |
| 92C | 6 | 96C | 8 | 9AC | 8 | 9EC | 8 |
| 92D | 6 | 96D | 8 | 9AD | 8 | 9ED | 8 |
| 92E | 6 | 96E | 8 | 9AE | 8 | 9EE | 8 |
| 92F | 6 | 96F | 8 | 9AF | 8 | 9EF | 8 |
| 930 | 6 | 970 | 8 | 9B0 | 8 | 9F0 | 8 |
| 931 | 2 | 971 | 2 | 9B1 | 2 | 9F1 | 2 |
| 932 | 2 | 972 | 2 | 9B2 | 2 | 9F2 | 2 |
| 933 | 2 | 973 | 2 | 9B3 | 2 | 9F3 | 2 |
| 934 | 6 | 974 | 8 | 9B4 | 8 | 9F4 | 8 |
| 935 | 6 | 975 | 8 | 9B5 | 8 | 9F5 | 8 |
| 936 | 6 | 976 | 8 | 9B6 | 8 | 9F6 | 8 |
| 937 | 6 | 977 | 8 | 9B7 | 8 | 9F7 | 8 |
| 938 | 6 | 978 | 8 | 9B8 | 8 | 9F8 | 8 |
| 939 | 6 | 979 | 8 | 9B9 | 8 | 9F9 | 8 |
| 93A | 6 | 97A | 8 | 9BA | 8 | 9FA | 8 |
| 93B | 6 | 97B | 8 | 9BB | 8 | 9FB | 8 |
| 93C | 6 | 97C | 8 | 9BC | 8 | 9FC | 8 |
| 93D | 6 | 97D | 8 | 9BD | 8 | 9FD | 8 |
| 93E | 6 | 97E | 8 | 9BE | 8 | 9FE | 8 |
| 93F | 6 | 97F | 8 | 9BF | 8 | 9FF | 8 |

FFH LOOKUP TABLE (FUNC: FFHAFM, DATA LENGTH: HALF-WORD)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| A00 | 8 | A40 | 8 | A80 | 8 | AC0 | 8 |
| A01 | 4 | A41 | 8 | A81 | 8 | AC1 | 8 |
| A02 | 4 | A42 | 8 | A82 | 8 | AC2 | 8 |
| A03 | 4 | A43 | 8 | A83 | 8 | AC3 | 8 |
| A04 | 4 | A44 | 8 | A84 | 8 | AC4 | 8 |
| A05 | 4 | A45 | 8 | A85 | 8 | AC5 | 8 |
| A06 | 4 | A46 | 8 | A86 | 8 | AC6 | 8 |
| A07 | 4 | A47 | 8 | A87 | 8 | AC7 | 8 |
| A08 | 4 | A48 | 8 | A88 | 8 | AC8 | 8 |
| A09 | 4 | A49 | 8 | A89 | 8 | AC9 | 8 |
| A0A | 4 | A4A | 8 | A8A | 8 | ACA | 8 |
| A0B | 4 | A4B | 8 | A8B | 8 | ACB | 8 |
| A0C | 4 | A4C | 8 | A8C | 8 | ACC | 8 |
| A0D | 4 | A4D | 8 | A8D | 8 | ACD | 8 |
| A0E | 4 | A4E | 8 | A8E | 8 | ACE | 8 |
| A0F | 4 | A4F | 8 | A8F | 8 | ACF | 8 |
| A10 | 8 | A50 | 8 | A90 | 8 | AD0 | 8 |
| A11 | 8 | A51 | 8 | A91 | 8 | AD1 | 8 |
| A12 | 8 | A52 | 8 | A92 | 8 | AD2 | 8 |
| A13 | 8 | A53 | 8 | A93 | 8 | AD3 | 8 |
| A14 | 8 | A54 | 8 | A94 | 8 | AD4 | 8 |
| A15 | 8 | A55 | 8 | A95 | 8 | AD5 | 8 |
| A16 | 8 | A56 | 8 | A96 | 8 | AD6 | 8 |
| A17 | 8 | A57 | 8 | A97 | 8 | AD7 | 8 |
| A18 | 8 | A58 | 8 | A98 | 8 | AD8 | 8 |
| A19 | 8 | A59 | 8 | A99 | 8 | AD9 | 8 |
| A1A | 8 | A5A | 8 | A9A | 8 | ADA | 8 |
| A1B | 8 | A5B | 8 | A9B | 8 | ADB | 8 |
| A1C | 8 | A5C | 8 | A9C | 8 | ADC | 8 |
| A1D | 8 | A5D | 8 | A9D | 8 | ADD | 8 |
| A1E | 8 | A5E | 8 | A9E | 8 | ADE | 8 |
| A1F | 8 | A5F | 8 | A9F | 8 | ADF | 8 |
| A20 | 8 | A60 | 8 | AA0 | 8 | AE0 | 8 |
| A21 | 8 | A61 | 8 | AA1 | 8 | AE1 | 8 |
| A22 | 8 | A62 | 8 | AA2 | 8 | AE2 | 8 |
| A23 | 8 | A63 | 8 | AA3 | 8 | AE3 | 8 |
| A24 | 8 | A64 | 8 | AA4 | 8 | AE4 | 8 |
| A25 | 8 | A65 | 8 | AA5 | 8 | AE5 | 8 |
| A26 | 8 | A66 | 8 | AA6 | 8 | AE6 | 8 |
| A27 | 8 | A67 | 8 | AA7 | 8 | AE7 | 8 |
| A28 | 8 | A68 | 8 | AA8 | 8 | AE8 | 8 |
| A29 | 8 | A69 | 8 | AA9 | 8 | AE9 | 8 |
| A2A | 8 | A6A | 8 | AAA | 8 | AEA | 8 |
| A2B | 8 | A6B | 8 | AAB | 8 | AEB | 8 |
| A2C | 8 | A6C | 8 | AAC | 8 | AEC | 8 |
| A2D | 8 | A6D | 8 | AAD | 8 | AED | 8 |
| A2E | 8 | A6E | 8 | AAE | 8 | AEE | 8 |
| A2F | 8 | A6F | 8 | AAF | 8 | AEF | 8 |
| A30 | 8 | A70 | 8 | AB0 | 8 | AF0 | 8 |
| A31 | 8 | A71 | 8 | AB1 | 8 | AF1 | 8 |
| A32 | 8 | A72 | 8 | AB2 | 8 | AF2 | 8 |
| A33 | 8 | A73 | 8 | AB3 | 8 | AF3 | 8 |
| A34 | 8 | A74 | 8 | AB4 | 8 | AF4 | 8 |
| A35 | 8 | A75 | 8 | AB5 | 3 | AF5 | 8 |
| A36 | 8 | A76 | 8 | AB6 | 8 | AF6 | 8 |
| A37 | 8 | A77 | 8 | AB7 | 8 | AF7 | 8 |
| A38 | 8 | A78 | 8 | AB8 | 8 | AF8 | 8 |
| A39 | 8 | A79 | 8 | AB9 | 8 | AF9 | 8 |
| A3A | 8 | A7A | 8 | ABA | 8 | AFA | 8 |
| A3B | 8 | A7B | 8 | ABB | 8 | AFB | 8 |
| A3C | 8 | A7C | 8 | ABC | 8 | AFC | 8 |
| A3D | 8 | A7D | 8 | ABD | 8 | AFD | 8 |
| A3E | 8 | A7E | 8 | ABE | 8 | AFE | 8 |
| A3F | 8 | A7F | 8 | ABF | 8 | AFF | 8 |

FFH LOOKUP TABLE (FUNC: FFHAFM, DATA LENGTH: WORD)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| B00 | 8 | B40 | 8 | B80 | 8 | BC0 | 8 |
| B01 | 8 | B41 | 8 | B81 | 8 | BC1 | 8 |
| B02 | 8 | B42 | 8 | B82 | 8 | BC2 | 8 |
| B03 | 8 | B43 | 8 | B83 | 8 | BC3 | 8 |
| B04 | 8 | B44 | 8 | B84 | 8 | BC4 | 8 |
| B05 | 8 | B45 | 8 | B85 | 8 | BC5 | 8 |
| B06 | 8 | B46 | 8 | B86 | 8 | BC6 | 8 |
| B07 | 8 | B47 | 8 | B87 | 8 | BC7 | 8 |
| B08 | 8 | B48 | 8 | B88 | 8 | BC8 | 8 |
| B09 | 8 | B49 | 8 | B89 | 8 | BC9 | 8 |
| B0A | 8 | B4A | 8 | B8A | 8 | BCA | 8 |
| B0B | 8 | B4B | 8 | B8B | 8 | BCB | 8 |
| B0C | 8 | B4C | 8 | B8C | 8 | BCC | 8 |
| B0D | 8 | B4D | 8 | B8D | 8 | BCD | 8 |
| B0E | 8 | B4E | 8 | B8E | 8 | BCE | 8 |
| B0F | 8 | B4F | 8 | B8F | 8 | BCF | 8 |
| B10 | 8 | B50 | 8 | B90 | 8 | BD0 | 8 |
| B11 | 8 | B51 | 8 | B91 | 8 | BD1 | 8 |
| B12 | 8 | B52 | 8 | B92 | 8 | BD2 | 8 |
| B13 | 8 | B53 | 8 | B93 | 8 | BD3 | 8 |
| B14 | 8 | B54 | 8 | B94 | 8 | BD4 | 8 |
| B15 | 8 | B55 | 8 | B95 | 8 | BD5 | 8 |
| B16 | 8 | B56 | 8 | B96 | 8 | BD6 | 8 |
| B17 | 8 | B57 | 8 | B97 | 8 | BD7 | 8 |
| B18 | 8 | B58 | 8 | B98 | 8 | BD8 | 8 |
| B19 | 8 | B59 | 8 | B99 | 8 | BD9 | 8 |
| B1A | 8 | B5A | 8 | B9A | 8 | BDA | 8 |
| B1B | 8 | B5B | 8 | B9B | 8 | BDB | 8 |
| B1C | 8 | B5C | 8 | B9C | 8 | BDC | 8 |
| B1D | 8 | B5D | 8 | B9D | 8 | BDD | 8 |
| B1E | 8 | B5E | 8 | B9E | 8 | BDE | 8 |
| B1F | 8 | B5F | 8 | B9F | 8 | BDF | 8 |
| B20 | 8 | B60 | 8 | BA0 | 8 | BE0 | 8 |
| B21 | 8 | B61 | 8 | BA1 | 8 | BE1 | 8 |
| B22 | 8 | B62 | 8 | BA2 | 8 | BE2 | 8 |
| B23 | 8 | B63 | 8 | BA3 | 8 | BE3 | 8 |
| B24 | 8 | B64 | 8 | BA4 | 8 | BE4 | 8 |
| B25 | 8 | B65 | 8 | BA5 | 8 | BE5 | 8 |
| B26 | 8 | B66 | 8 | BA6 | 8 | BE6 | 8 |
| B27 | 8 | B67 | 8 | BA7 | 8 | BE7 | 8 |
| B28 | 8 | B68 | 8 | BA8 | 8 | BE8 | 8 |
| B29 | 8 | B69 | 8 | BA9 | 8 | BE9 | 8 |
| B2A | 8 | B6A | 8 | BAA | 8 | BEA | 8 |
| B2B | 8 | B6B | 8 | BAB | 8 | BEB | 8 |
| B2C | 8 | B6C | 8 | BAC | 8 | BEC | 8 |
| B2D | 8 | B6D | 8 | BAD | 8 | BED | 8 |
| B2E | 8 | B6E | 8 | BAE | 8 | BEE | 8 |
| B2F | 8 | B6F | 8 | BAF | 8 | BEF | 8 |
| B30 | 8 | B70 | 8 | BB0 | 8 | BF0 | 8 |
| B31 | 8 | B71 | 8 | BB1 | 8 | BF1 | 8 |
| B32 | 8 | B72 | 8 | BB2 | 8 | BF2 | 8 |
| B33 | 8 | B73 | 8 | BB3 | 8 | BF3 | 8 |
| B34 | 8 | B74 | 8 | BB4 | 8 | BF4 | 8 |
| B35 | 8 | B75 | 8 | BB5 | 3 | BF5 | 8 |
| B36 | 8 | B76 | 8 | BB6 | 8 | BF6 | 8 |
| B37 | 8 | B77 | 8 | BB7 | 8 | BF7 | 8 |
| B38 | 8 | B78 | 8 | BB8 | 8 | BF8 | 8 |
| B39 | 8 | B79 | 8 | BB9 | 8 | BF9 | 8 |
| B3A | 8 | B7A | 8 | BBA | 8 | BFA | 8 |
| B3B | 8 | B7B | 8 | BBB | 8 | BFB | 8 |
| B3C | 8 | B7C | 8 | BBC | 8 | BFC | 8 |
| B3D | 8 | B7D | 8 | BBD | 8 | BFD | 8 |
| B3E | 8 | B7E | 8 | BBE | 8 | BFE | 8 |
| B3F | 8 | B7F | 8 | BBF | 8 | BFF | 8 |

FFH LOOKUP TABLE (FUNC: FFMAFH, DATA LENGTH: BYTE)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| C00 | 8 | C40 | 6 | C80 | 7 | CC0 | 6 |
| C01 | 8 | C41 | 6 | C81 | 7 | CC1 | 6 |
| C02 | 1 | C42 | 1 | C82 | 1 | CC2 | 1 |
| C03 | 8 | C43 | 6 | C83 | 7 | CC3 | 6 |
| C04 | 2 | C44 | 2 | C84 | 2 | CC4 | 2 |
| C05 | 2 | C45 | 2 | C85 | 2 | CC5 | 2 |
| C06 | 1 | C46 | 1 | C86 | 1 | CC6 | 1 |
| C07 | 8 | C47 | 6 | C87 | 7 | CC7 | 6 |
| C08 | 3 | C48 | 3 | C88 | 3 | CC8 | 3 |
| C09 | 3 | C49 | 3 | C89 | 3 | CC9 | 3 |
| C0A | 1 | C4A | 1 | C8A | 1 | CCA | 1 |
| C0B | 3 | C4B | 3 | C8B | 3 | CCB | 3 |
| C0C | 2 | C4C | 2 | C8C | 2 | CCC | 2 |
| C0D | 2 | C4D | 2 | C8D | 2 | CCD | 2 |
| C0E | 1 | C4E | 1 | C8E | 1 | CCE | 1 |
| C0F | 8 | C4F | 6 | C8F | 7 | CCF | 6 |
| C10 | 4 | C50 | 4 | C90 | 4 | CD0 | 4 |
| C11 | 4 | C51 | 4 | C91 | 4 | CD1 | 4 |
| C12 | 1 | C52 | 1 | C92 | 1 | CD2 | 1 |
| C13 | 4 | C53 | 4 | C93 | 4 | CD3 | 4 |
| C14 | 2 | C54 | 2 | C94 | 2 | CD4 | 2 |
| C15 | 2 | C55 | 2 | C95 | 2 | CD5 | 2 |
| C16 | 1 | C56 | 1 | C96 | 1 | CD6 | 1 |
| C17 | 4 | C57 | 4 | C97 | 4 | CD7 | 4 |
| C18 | 3 | C58 | 3 | C98 | 3 | CD8 | 3 |
| C19 | 3 | C59 | 3 | C99 | 3 | CD9 | 3 |
| C1A | 1 | C5A | 1 | C9A | 1 | CDA | 1 |
| C1B | 3 | C5B | 3 | C9B | 3 | CDB | 3 |
| C1C | 2 | C5C | 2 | C9C | 2 | CDC | 2 |
| C1D | 2 | C5D | 2 | C9D | 2 | CDD | 2 |
| C1E | 1 | C5E | 1 | C9E | 1 | CDE | 1 |
| C1F | 8 | C5F | 6 | C9F | 7 | CDF | 6 |
| C20 | 5 | C60 | 5 | CA0 | 5 | CE0 | 5 |
| C21 | 5 | C61 | 5 | CA1 | 5 | CE1 | 5 |
| C22 | 1 | C62 | 1 | CA2 | 1 | CE2 | 1 |
| C23 | 5 | C63 | 5 | CA3 | 5 | CE3 | 5 |
| C24 | 2 | C64 | 2 | CA4 | 2 | CE4 | 2 |
| C25 | 2 | C65 | 2 | CA5 | 2 | CE5 | 2 |
| C26 | 1 | C66 | 1 | CA6 | 1 | CE6 | 1 |
| C27 | 5 | C67 | 5 | CA7 | 5 | CE7 | 5 |
| C28 | 3 | C68 | 3 | CA8 | 3 | CE8 | 3 |
| C29 | 3 | C69 | 3 | CA9 | 3 | CE9 | 3 |
| C2A | 1 | C6A | 1 | CAA | 1 | CEA | 1 |
| C2B | 3 | C6B | 3 | CAB | 3 | CEB | 3 |
| C2C | 2 | C6C | 2 | CAC | 2 | CEC | 2 |
| C2D | 2 | C6D | 2 | CAD | 2 | CED | 2 |
| C2E | 1 | C6E | 1 | CAE | 1 | CEE | 1 |
| C2F | 5 | C6F | 5 | CAF | 5 | CEF | 5 |
| C30 | 4 | C70 | 4 | CB0 | 4 | CF0 | 4 |
| C31 | 4 | C71 | 4 | CB1 | 4 | CF1 | 4 |
| C32 | 1 | C72 | 1 | CB2 | 1 | CF2 | 1 |
| C33 | 4 | C73 | 4 | CB3 | 4 | CF3 | 4 |
| C34 | 2 | C74 | 2 | CB4 | 2 | CF4 | 2 |
| C35 | 2 | C75 | 2 | CB5 | 2 | CF5 | 2 |
| C36 | 1 | C76 | 1 | CB6 | 1 | CF6 | 1 |
| C37 | 4 | C77 | 4 | CB7 | 4 | CF7 | 4 |
| C38 | 3 | C78 | 3 | CB8 | 3 | CF8 | 3 |
| C39 | 3 | C79 | 3 | CB9 | 3 | CF9 | 3 |
| C3A | 1 | C7A | 1 | CBA | 1 | CFA | 1 |
| C3B | 3 | C7B | 3 | CBB | 3 | CFB | 3 |
| C3C | 2 | C7C | 2 | CBC | 2 | CFC | 2 |
| C3D | 2 | C7D | 2 | CBD | 2 | CFD | 2 |
| C3E | 1 | C7E | 1 | CBE | 1 | CFE | 1 |
| C3F | 8 | C7F | 8 | CBF | 7 | CFF | 8 |

FFH LOOKUP TABLE (FUNC:FFMAFH, DATA LENGTH: DOUBLE-BYTE)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| D00 | 8 | D40 | 6 | D80 | 6 | DC0 | 6 |
| D01 | 8 | D41 | 6 | D81 | 6 | DC1 | 6 |
| D02 | 8 | D42 | 6 | D82 | 6 | DC2 | 6 |
| D03 | 8 | D43 | 6 | D83 | 6 | DC3 | 6 |
| D04 | 2 | D44 | 2 | D84 | 2 | DC4 | 2 |
| D05 | 8 | D45 | 6 | D85 | 6 | DC5 | 6 |
| D06 | 8 | D46 | 6 | D86 | 6 | DC6 | 6 |
| D07 | 8 | D47 | 6 | D87 | 6 | DC7 | 6 |
| D08 | 2 | D48 | 2 | D88 | 2 | DC8 | 2 |
| D09 | 8 | D49 | 6 | D89 | 6 | DC9 | 6 |
| D0A | 8 | D4A | 6 | D8A | 6 | DCA | 6 |
| D0B | 8 | D4B | 6 | D8B | 6 | DCB | 6 |
| D0C | 2 | D4C | 2 | D8C | 2 | DCC | 2 |
| D0D | 8 | D4D | 6 | D8D | 6 | DCD | 6 |
| D0E | 8 | D4E | 6 | D8E | 6 | DCE | 6 |
| D0F | 8 | D4F | 6 | D8F | 6 | DCF | 6 |
| D10 | 4 | D50 | 4 | D90 | 4 | DD0 | 4 |
| D11 | 4 | D51 | 4 | D91 | 4 | DD1 | 4 |
| D12 | 4 | D52 | 4 | D92 | 4 | DD2 | 4 |
| D13 | 4 | D53 | 4 | D93 | 4 | DD3 | 4 |
| D14 | 2 | D54 | 2 | D94 | 2 | DD4 | 2 |
| D15 | 8 | D55 | 8 | D95 | 8 | DD5 | 8 |
| D16 | 8 | D56 | 8 | D96 | 8 | DD6 | 8 |
| D17 | 8 | D57 | 8 | D97 | 8 | DD7 | 8 |
| D18 | 2 | D58 | 2 | D98 | 2 | DD8 | 2 |
| D19 | 8 | D59 | 8 | D99 | 8 | DD9 | 8 |
| D1A | 8 | D5A | 8 | D9A | 8 | DDA | 8 |
| D1B | 8 | D5B | 8 | D9B | 8 | DDB | 8 |
| D1C | 2 | D5C | 2 | D9C | 2 | DDC | 2 |
| D1D | 8 | D5D | 8 | D9D | 8 | DDD | 8 |
| D1E | 8 | D5E | 8 | D9E | 8 | DDE | 8 |
| D1F | 8 | D5F | 8 | D9F | 8 | DDF | 8 |
| D20 | 4 | D60 | 4 | DA0 | 4 | DE0 | 4 |
| D21 | 4 | D61 | 4 | DA1 | 4 | DE1 | 4 |
| D22 | 4 | D62 | 4 | DA2 | 4 | DE2 | 4 |
| D23 | 4 | D63 | 4 | DA3 | 4 | DE3 | 4 |
| D24 | 2 | D64 | 2 | DA4 | 2 | DE4 | 2 |
| D25 | 8 | D65 | 8 | DA5 | 8 | DE5 | 8 |
| D26 | 8 | D66 | 8 | DA6 | 8 | DE6 | 8 |
| D27 | 8 | D67 | 8 | DA7 | 8 | DE7 | 8 |
| D28 | 2 | D68 | 2 | DA8 | 2 | DE8 | 2 |
| D29 | 8 | D69 | 8 | DA9 | 8 | DE9 | 8 |
| D2A | 8 | D6A | 8 | DAA | 8 | DEA | 8 |
| D2B | 8 | D6B | 8 | DAB | 8 | DEB | 8 |
| D2C | 2 | D6C | 2 | DAC | 2 | DEC | 2 |
| D2D | 8 | D6D | 8 | DAD | 8 | DED | 8 |
| D2E | 8 | D6E | 8 | DAE | 8 | DEE | 8 |
| D2F | 8 | D6F | 8 | DAF | 8 | DEF | 8 |
| D30 | 4 | D70 | 4 | DB0 | 4 | DF0 | 4 |
| D31 | 4 | D71 | 4 | DB1 | 4 | DF1 | 4 |
| D32 | 4 | D72 | 4 | DB2 | 4 | DF2 | 4 |
| D33 | 4 | D73 | 4 | DB3 | 4 | DF3 | 4 |
| D34 | 2 | D74 | 2 | DB4 | 2 | DF4 | 2 |
| D35 | 8 | D75 | 8 | DB5 | 8 | DF5 | 8 |
| D36 | 8 | D76 | 8 | DB6 | 8 | DF6 | 8 |
| D37 | 8 | D77 | 8 | DB7 | 8 | DF7 | 8 |
| D38 | 2 | D78 | 2 | DB8 | 2 | DF8 | 2 |
| D39 | 8 | D79 | 8 | DB9 | 8 | DF9 | 8 |
| D3A | 8 | D7A | 8 | DBA | 8 | DFA | 8 |
| D3B | 8 | D7B | 8 | DBB | 8 | DFB | 8 |
| D3C | 2 | D7C | 2 | DBC | 2 | DFC | 2 |
| D3D | 8 | D7D | 8 | DBD | 8 | DFD | 8 |
| D3E | 8 | D7E | 8 | DBE | 8 | DFE | 8 |
| D3F | 8 | D7F | 8 | DBF | 8 | DFF | 8 |

FFH LOOKUP TABLE  (FUNC: FFMAFH, DATA LENGTH: HALF-WORD)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| E00 | 8 | E40 | 4 | E80 | 4 | EC0 | 4 |
| E01 | 8 | E41 | 8 | E81 | 8 | EC1 | 8 |
| E02 | 8 | E42 | 8 | E82 | 8 | EC2 | 8 |
| E03 | 8 | E43 | 8 | E83 | 8 | EC3 | 8 |
| E04 | 8 | E44 | 8 | E84 | 8 | EC4 | 8 |
| E05 | 8 | E45 | 8 | E85 | 8 | EC5 | 8 |
| E06 | 8 | E46 | 8 | E86 | 8 | EC6 | 8 |
| E07 | 8 | E47 | 8 | E87 | 8 | EC7 | 8 |
| E08 | 8 | E48 | 8 | E88 | 8 | EC8 | 8 |
| E09 | 8 | E49 | 8 | E89 | 8 | EC9 | 8 |
| E0A | 8 | E4A | 8 | E8A | 8 | ECA | 8 |
| E0B | 8 | E4B | 8 | E8B | 8 | ECB | 8 |
| E0C | 8 | E4C | 8 | E8C | 8 | ECC | 8 |
| E0D | 8 | E4D | 8 | E8D | 8 | ECD | 8 |
| E0E | 8 | E4E | 8 | E8E | 8 | ECE | 8 |
| E0F | 8 | E4F | 8 | E8F | 8 | ECF | 8 |
| E10 | 4 | E50 | 4 | E90 | 4 | ED0 | 4 |
| E11 | 8 | E51 | 8 | E91 | 8 | ED1 | 8 |
| E12 | 8 | E52 | 8 | E92 | 8 | ED2 | 8 |
| E13 | 8 | E53 | 8 | E93 | 8 | ED3 | 8 |
| E14 | 8 | E54 | 8 | E94 | 8 | ED4 | 8 |
| E15 | 8 | E55 | 8 | E95 | 8 | ED5 | 8 |
| E16 | 8 | E56 | 8 | E96 | 8 | ED6 | 8 |
| E17 | 8 | E57 | 8 | E97 | 8 | ED7 | 8 |
| E18 | 8 | E58 | 8 | E98 | 8 | ED8 | 8 |
| E19 | 8 | E59 | 8 | E99 | 8 | ED9 | 8 |
| E1A | 8 | E5A | 8 | E9A | 8 | EDA | 8 |
| E1B | 8 | E5B | 8 | E9B | 8 | EDB | 8 |
| E1C | 8 | E5C | 8 | E9C | 8 | EDC | 8 |
| E1D | 8 | E5D | 8 | E9D | 8 | EDD | 8 |
| E1E | 8 | E5E | 8 | E9E | 8 | EDE | 8 |
| E1F | 8 | E5F | 8 | E9F | 8 | EDF | 8 |
| E20 | 4 | E60 | 4 | EA0 | 4 | EE0 | 4 |
| E21 | 8 | E61 | 8 | EA1 | 8 | EE1 | 8 |
| E22 | 8 | E62 | 8 | EA2 | 8 | EE2 | 8 |
| E23 | 8 | E63 | 8 | EA3 | 8 | EE3 | 8 |
| E24 | 8 | E64 | 8 | EA4 | 8 | EE4 | 8 |
| E25 | 8 | E65 | 8 | EA5 | 8 | EE5 | 8 |
| E26 | 8 | E66 | 8 | EA6 | 8 | EE6 | 8 |
| E27 | 8 | E67 | 8 | EA7 | 8 | EE7 | 8 |
| E28 | 8 | E68 | 8 | EA8 | 8 | EE8 | 8 |
| E29 | 8 | E69 | 8 | EA9 | 8 | EE9 | 8 |
| E2A | 8 | E6A | 8 | EAA | 8 | EEA | 8 |
| E2B | 8 | E6B | 8 | EAB | 8 | EEB | 8 |
| E2C | 8 | E6C | 8 | EAC | 8 | EEC | 8 |
| E2D | 8 | E6D | 8 | EAD | 8 | EED | 8 |
| E2E | 8 | E6E | 8 | EAE | 8 | EEE | 8 |
| E2F | 8 | E6F | 8 | EAF | 8 | EEF | 8 |
| E30 | 4 | E70 | 4 | EB0 | 4 | EF0 | 4 |
| E31 | 8 | E71 | 8 | EB1 | 8 | EF1 | 8 |
| E32 | 8 | E72 | 8 | EB2 | 8 | EF2 | 8 |
| E33 | 8 | E73 | 8 | EB3 | 8 | EF3 | 8 |
| E34 | 8 | E74 | 8 | EB4 | 8 | EF4 | 8 |
| E35 | 8 | E75 | 8 | EB5 | 3 | EF5 | 8 |
| E36 | 8 | E76 | 8 | EB6 | 8 | EF6 | 8 |
| E37 | 8 | E77 | 8 | EB7 | 8 | EF7 | 8 |
| E38 | 8 | E78 | 8 | EB8 | 8 | EF8 | 8 |
| E39 | 8 | E79 | 8 | EB9 | 8 | EF9 | 8 |
| E3A | 8 | E7A | 8 | EBA | 8 | EFA | 8 |
| E3B | 8 | E7B | 8 | EBB | 8 | EFB | 8 |
| E3C | 8 | E7C | 8 | EBC | 8 | EFC | 8 |
| E3D | 8 | E7D | 8 | EBD | 8 | EFD | 8 |
| E3E | 8 | E7E | 8 | EBE | 8 | EFE | 8 |
| E3F | 8 | E7F | 8 | EBF | 8 | EFF | 8 |

FFH LOOKUP TABLE  (FUNC: FFMAFH, DATA LENGTH: WORD)

| ADDR. (HEX) | OUTPUT (HEX) | ADDR. (HEX) | OUTPUT (HEX) | ADDR. (HEX) | OUTPUT (HEX) | ADDR. (HEX) | OUTPUT (HEX) |
|---|---|---|---|---|---|---|---|
| F00 | 8 | F40 | 8 | F80 | 8 | FC0 | 8 |
| F01 | 8 | F41 | 8 | F81 | 8 | FC1 | 8 |
| F02 | 8 | F42 | 8 | F82 | 8 | FC2 | 8 |
| F03 | 8 | F43 | 8 | F83 | 8 | FC3 | 8 |
| F04 | 8 | F44 | 8 | F84 | 8 | FC4 | 8 |
| F05 | 8 | F45 | 8 | F85 | 8 | FC5 | 8 |
| F06 | 8 | F46 | 8 | F86 | 8 | FC6 | 8 |
| F07 | 8 | F47 | 8 | F87 | 8 | FC7 | 8 |
| F08 | 8 | F48 | 8 | F88 | 8 | FC8 | 8 |
| F09 | 8 | F49 | 8 | F89 | 8 | FC9 | 8 |
| F0A | 8 | F4A | 8 | F8A | 8 | FCA | 8 |
| F0B | 8 | F4B | 8 | F8B | 8 | FCB | 8 |
| F0C | 8 | F4C | 8 | F8C | 8 | FCC | 8 |
| F0D | 8 | F4D | 8 | F8D | 8 | FCD | 8 |
| F0E | 8 | F4E | 8 | F8E | 8 | FCE | 8 |
| F0F | 8 | F4F | 8 | F8F | 8 | FCF | 8 |
| F10 | 8 | F50 | 8 | F90 | 8 | FD0 | 8 |
| F11 | 8 | F51 | 8 | F91 | 8 | FD1 | 8 |
| F12 | 8 | F52 | 8 | F92 | 8 | FD2 | 8 |
| F13 | 8 | F53 | 8 | F93 | 8 | FD3 | 8 |
| F14 | 8 | F54 | 8 | F94 | 8 | FD4 | 8 |
| F15 | 8 | F55 | 8 | F95 | 8 | FD5 | 8 |
| F16 | 8 | F56 | 8 | F96 | 8 | FD6 | 8 |
| F17 | 8 | F57 | 8 | F97 | 8 | FD7 | 8 |
| F18 | 8 | F58 | 8 | F98 | 8 | FD8 | 8 |
| F19 | 8 | F59 | 8 | F99 | 8 | FD9 | 8 |
| F1A | 8 | F5A | 8 | F9A | 8 | FDA | 8 |
| F1B | 8 | F5B | 8 | F9B | 8 | FDB | 8 |
| F1C | 8 | F5C | 8 | F9C | 8 | FDC | 8 |
| F1D | 8 | F5D | 8 | F9D | 8 | FDD | 8 |
| F1E | 8 | F5E | 8 | F9E | 8 | FDE | 8 |
| F1F | 8 | F5F | 8 | F9F | 8 | FDF | 8 |
| F20 | 8 | F60 | 8 | FA0 | 8 | FE0 | 8 |
| F21 | 8 | F61 | 8 | FA1 | 8 | FE1 | 8 |
| F22 | 8 | F62 | 8 | FA2 | 8 | FE2 | 8 |
| F23 | 8 | F63 | 8 | FA3 | 8 | FE3 | 8 |
| F24 | 8 | F64 | 8 | FA4 | 8 | FE4 | 8 |
| F25 | 8 | F65 | 8 | FA5 | 8 | FE5 | 8 |
| F26 | 8 | F66 | 8 | FA6 | 8 | FE6 | 8 |
| F27 | 8 | F67 | 8 | FA7 | 8 | FE7 | 8 |
| F28 | 8 | F68 | 8 | FA8 | 8 | FE8 | 8 |
| F29 | 8 | F69 | 8 | FA9 | 8 | FE9 | 8 |
| F2A | 8 | F6A | 8 | FAA | 8 | FEA | 8 |
| F2B | 8 | F6B | 8 | FAB | 8 | FEB | 8 |
| F2C | 8 | F6C | 8 | FAC | 8 | FEC | 8 |
| F2D | 8 | F6D | 8 | FAD | 8 | FED | 8 |
| F2E | 8 | F6E | 8 | FAE | 8 | FEE | 8 |
| F2F | 8 | F6F | 8 | FAF | 8 | FEF | 8 |
| F30 | 8 | F70 | 8 | FB0 | 8 | FF0 | 8 |
| F31 | 8 | F71 | 8 | FB1 | 8 | FF1 | 8 |
| F32 | 8 | F72 | 8 | FB2 | 8 | FF2 | 8 |
| F33 | 8 | F73 | 8 | FB3 | 8 | FF3 | 8 |
| F34 | 8 | F74 | 8 | FB4 | 8 | FF4 | 8 |
| F35 | 8 | F75 | 8 | FB5 | 3 | FF5 | 8 |
| F36 | 8 | F76 | 8 | FB6 | 8 | FF6 | 8 |
| F37 | 8 | F77 | 8 | FB7 | 8 | FF7 | 8 |
| F38 | 8 | F78 | 8 | FB8 | 8 | FF8 | 8 |
| F39 | 8 | F79 | 8 | FB9 | 8 | FF9 | 8 |
| F3A | 8 | F7A | 8 | FBA | 8 | FFA | 8 |
| F3B | 8 | F7B | 8 | FBB | 8 | FFB | 8 |
| F3C | 8 | F7C | 8 | FBC | 8 | FFC | 8 |
| F3D | 8 | F7D | 8 | FBD | 8 | FFD | 8 |
| F3E | 8 | F7E | 8 | FBE | 8 | FFE | 8 |
| F3F | 8 | F7F | 8 | FBF | 8 | FFF | 8 |

What is claimed is:

1. A parallel byte string processor that finds the location of matching bytes in first and second data words, each data word having a predetermined number of data bytes, said parallel byte processor comprising:
a first circuit that performs an exclusive-OR operation on said first and second data words on a byte-by-byte basis, and provides an output bit corresponding to each byte of said first data word, each said output bit having first and second logic levels such that an output bit has said first logic level when the corresponding byte in said first data word matches the corresponding byte in said second data word and has said second logic level when the corresponding byte in said first data word does not match the corresponding byte in said second data word; and
a second circuit that receives said output bits from said first circuit, said second circuit providing a digital output value that identifies the location of an output bit from said first circuit that has a predetermined positional characteristic with respect to the other output bits from said first circuit, said identified bit indicating the location of a byte in said first data word that has a selected matching or non-matching characteristic with respect to the byte in the corresponding location of said second data word.

2. The parallel byte processor as defined in claim 1, wherein said second circuit comprises a programmable read only memory.

3. The parallel byte processor as defined in claim 1, further including means to perform a multi-way conditional branch upon identifying the most significant byte of said first data word that matches the corresponding byte of said second data word.

4. The parallel byte processor as defined in claim 1, further including means to perform a multi-way conditional branch upon identifying the most significant byte of said first data word that does not match the corresponding byte of said second data word.

5. The parallel byte processor as defined in claim 1, further including means to clear the byte positions in said first data word from the location of the most significant byte of said first data word that matches the corresponding byte of said second data word to the least significant byte of said first data word.

6. The parallel byte processor as defined in claim 1, further including means to clear the byte positions of said first data word from the most significant byte of said first data word up to the location of the most significant byte of said first data word that matches the corresponding byte of said second data word.

7. The parallel byte processor as defined in claim 1, further including means to clear the most significant byte of said first data word that matches the corresponding byte of said second data word.

8. The parallel byte processor as defined in claim 1, further including means to clear the byte positions of said first data word from the location of the most significant byte of said first data word that does not match the corresponding byte of said second data word to the least significant byte of said first data word.

9. The parallel byte processor as defined in claim 1, further including means to clear the byte positions of said first data word from the most significant byte of said first data word up to the location of the most significant byte of said first data word that does not match the corresponding byte of said second data word.

10. The parallel byte processor as defined in claim 1, further including means to clear the most significant byte of said first data word that does not match the corresponding byte of said second data word.

11. The parallel byte processor as defined in claim 1, further including means to clear the output bit from said first circuit corresponding to the location of the most significant byte of said first data word that matches the corresponding byte of said second data word.

12. The parallel byte processor as defined in claim 1, further including means to clear the output bit from said first circuit corresponding to the location of the most significant byte of said first data word that does not match the corresponding byte of said second data word.

13. A parallel byte string processor that finds the location of matching bytes in first and second data words, each data word having a predetermined number of data bytes, said parallel byte processor comprising:
a first circuit that performs an exclusive-OR operation on said first and second data words on a byte-by-byte basis, and provides an output bit corresponding to each byte of said first data word, each said output bit having first and second logic levels such that an output bit has said first logic level when the corresponding byte in said first data word matches the corresponding byte in said second data word and has said second logic level when the corresponding byte in said first data word does not match the corresponding byte in said second data word; and
a second circuit that receives said output bits from said first circuit, said second circuit providing a digital output value that identifies the location of an output bit from said first circuit that has a predetermined positional characteristic with respect to the other output bits from said first circuit which is the location of the most significant bit of said output bits having said first logic level, thus identifying the most significant byte of said first data word that matches the corresponding byte of said second data word.

14. A parallel byte string processor that finds the location of matching bytes in first and second data words, each data word having a predetermined number of data bytes, said parallel byte processor comprising:
a first circuit that performs an exclusive-OR operation on said first and second data words on a byte-by-byte basis, and provides an output bit corresponding to each byte of said first data word, each said output bit having first and second logic levels such that an output bit has said first logic level when the corresponding byte in said first data word matches the corresponding byte in said second data word and has said second logic level when the corresponding byte in said first data word does not match the corresponding byte in said second data word; and
a second circuit that receives said output bits from said first circuit, said second circuit providing a digital output value that identifies the location of an output bit from said first circuit that has a predetermined positional characteristic with respect to the other output bits from said first circuit which is the location of the most significant bit of said output bits having said second logic level, thus identifying the most significant byte of said first data word that does not match the corresponding byte of said second data word.

15. A parallel byte string processor that finds the location of matching bytes in first and second data words, each data word having a predetermined number of data bytes, said parallel byte processor comprising:
- a first circuit that performs an exclusive-OR operation on said first and second data words on a byte-by-byte basis, and provides an output bit corresponding to each byte of said first data word, each said output bit having first and second logic levels such that an output bit has said first logic level when the corresponding byte in said first data word matches the corresponding byte in said second data word and has said second logic level when the corresponding byte in said first data word does not match the corresponding byte in said second data word; and
- a second circuit that receives said output bits from said first circuit, said second circuit providing a digital output value that identifies the location of an output bit from said first circuit that has a predetermined positional characteristic with respect to the other output bits from said first circuit which is the location of the most significant bit of said output bits having said first logic level that is less significant than a bit of said output bits having said second logic level, thus identifying the most significant byte of said first data word that does not match the corresponding byte of said second data word that is less significant than a byte of said first data word that matches the corresponding byte of said second data word.

16. A parallel byte string processor that finds the location of matching bytes in first and second data words, each data word having a predetermined number of data bytes, said parallel byte processor comprising:
- a first circuit that performs an exclusive-OR operation on said first and second data words on a byte-by-byte basis, and provides an output bit corresponding to each byte of said first data word, each said output bit having first and second logic levels such that an output bit has said first logic level when the corresponding byte in said first data word matches the corresponding byte in said second data word and has said second logic level when the corresponding byte in said first data word does not match the corresponding byte in said second data word; and
- a second circuit that receives said output bits from said first circuit, said second circuit providing a digital output value that identifies the location of an output bit from said first circuit that has a predetermined positional characteristic with respect to the other output bits from said first circuit which is the location of the most significant bit of said output bits having said second logic level that is less significant than a bit of said output bits having said first logic level, thus identifying the most significant byte of said first data word that matches the corresponding byte of said second data word that is less significant than a byte of said first data word that does not match the corresponding byte of said second data word.

17. A parallel byte string processor that finds the location of matching bytes in first and second data words, each data word having a predetermined number of data bytes, said parallel byte processor comprising:
- a first circuit that performs an exclusive-OR operation on said first and second data words on a byte-by-byte basis, and provides an output bit corresponding to each byte of said first data word, each said output bit having first and second logic levels such that an output bit has said first logic level when the corresponding byte in said first data word matches the corresponding byte in said second data word and has said second logic level when the corresponding byte in said first data word does not match the corresponding byte in said second data word; and
- a second circuit that receives said output bits from said first circuit, said second circuit providing a digital output value that identifies the location of an output bit from said first circuit that has a predetermined positional characteristic with respect to the other output bits from said first circuit, said identified bit indicating the location of a byte in said first data word that has a selected matching or non-matching characteristic with respect to the byte in the corresponding location of said second data word wherein said bit having said characteristic is the first of at least two adjacent bits having said characteristic.

18. A parallel byte string processor that finds the location of matching bytes in first and second data words, each data word having a predetermined number of data bytes, wherein said second data word comprises a plurality of identical bytes, said parallel byte processor comprising:
- a first circuit that performs an exclusive-OR operation on said first and second data words on a byte-by-byte basis, and provides an output bit corresponding to each byte of said first data word, each said output bit having first and second logic levels such that an output bit has said first logic level when the corresponding byte in said first data word matches the corresponding byte in said second data word and has said second logic level when the corresponding byte in said first data word does not match the corresponding byte in said second data word; and
- a second circuit that receives said output bits from said first circuit, said second circuit providing a digital output value that identifies the location of an output bit from said first circuit that has a predetermined positional characteristic with respect to the other output bits from said first circuit, said identified bit indicating the location of a byte in said first data word that has a selected matching or non-matching characteristic with respect to the byte in the corresponding location of said second data word; and
- a replication circuit, said replication circuit receiving a single byte input and generating said predetermined number of bytes as outputs, each of said predetermined number of bytes being identical to said input byte.

19. A parallel byte string processor that performs a data manipulation operation on each of the bytes of a first multiple-byte data word having data of unknown content in said bytes and that finds the location of a byte in said first multiple-byte data word having a selected content characteristic and a selected positional characteristic with respect to other bytes in said first multiple-bytes data word, comprising:
- a first circuit that provides an output signal for each byte of said first multiple-byte data word, wherein for each byte, the respective output signal has a first logic level when the byte has said selected content characteristic and has a second logic level when the byte does not have said selected content characteristic; and
- a second circuit that receives the output signals from said first circuit, said second circuit providing a digital output value that identifies the location of an output signal from said first circuit that has a selected one of said first and second logic levels and that corresponds to a byte in said first multiple-byte data word having said selected positional characteristic.

20. The parallel byte processor as defined in claim 19, further including means to perform a multi-way conditional branch upon identifying the most significant byte of said first multiple-byte data word having said selected content characteristic.

21. The parallel byte processor as defined in claim 19, further including means to perform a multi-way conditional branch upon identifying the most significant byte of said first multiple-byte data word not having said selected content characteristic.

22. The parallel byte processor as defined in claim 19, further including means to clear the byte positions in said first multiple-byte data word from the location of the most significant byte of said first multiple-byte data word having said selected content characteristic to the least significant byte of said first multiple-byte data word.

23. The parallel byte processor as defined in claim 19, further including means to clear the byte positions of said first multiple-byte data word from the most significant byte of said first multiple-byte data word up to the location of the most significant byte of said first multiple-byte data word having said selected content characteristic.

24. The parallel byte processor as defined in claim 19, further including means to clear the most significant byte of said first multiple-byte data word having said selected content characteristic.

25. The parallel byte processor as defined in claim 19, further including means to clear the byte positions of said first multiple-type data word from the location of the most significant byte of said first multiple-byte data word not having said selected content characteristic to the least significant byte of said first multiple-byte data word.

26. The parallel byte processor as defined in claim 19, further including means to clear the byte positions of said first multiple-byte data word from the most significant byte of said first multiple-byte data word up to the location of the most significant byte of said first multiple-byte data work not having said selected content characteristic.

27. The parallel byte processor as defined in claim 19, further including means to clear the most significant byte of said first multiple-byte data word not having said selected content characteristic.

28. The parallel byte processor as defined in claim 19, further including means to clear the output bit from said first circuit corresponding to the location of the most significant byte of said first multiple-byte data word having said selected content characteristic.

29. The parallel byte processor as defined in claim 19, further including means to clear the output bit from said first circuit corresponding to the location of the most significant byte of said first multiple-byte data word not having said selected content characteristic.

30. A parallel byte string processor that performs a data manipulation operation on each of the bytes of a first multiple-byte data word and that finds the location of a byte in said first data word having a selected content characteristic and a selected positional characteristic with respect to other bytes in said first data word, comprising:
- a first circuit that provides an output signal for each byte of said first data word, wherein for each byte, the respective output signal has a first logic level when the byte has said selected content characteristic and has a second logic level when the byte does not have said selected content characteristic; and
- a second circuit that receives the output signals from said first circuit, said second circuit providing a digital output value that identifies the location of an output signal from said first circuit that has a selected one of said first and second logic levels and that corresponds to a byte in said first data word having said selected positional characteristic, and wherein said selected content characteristic of a byte in said first data word is equal to the corresponding byte of said second data word.

31. A parallel byte string processor that performs a data manipulation operation on each of the bytes of a first multiple-byte data word and that finds the location of a byte in said first data word having a selected content characteristic and a selected positional characteristic with respect to other bytes in said first data word, comprising:
- a first circuit that provides an output signal for each byte of said first data word, wherein for each byte, the respective output signal has a first logic level when the byte has said selected content characteristic and has a second logic level when the byte does not have said selected content characteristic; and
- a second circuit that receives the output signals from said first circuit, said second circuit providing a digital output value that identifies the location of an output signal from said first circuit that has a selected one of said first and second logic levels and that corresponds to a byte in said first data word having said selected positional characteristic, wherein said selected positional characteristic is the most significant byte having said selected content characteristic.

32. A parallel byte string processor that performs a data manipulation operation on each of the bytes of a first multiple-byte data word and that finds the location of a byte in said first data word having a selected content characteristic and a selected positional characteristic with respect to other bytes in said first data word, comprising:
- a first circuit that provides an output signal for each byte of said first data word, wherein for each byte, the respective output signal has a first logic level when the byte has said selected content characteristic and has a second logic level when the byte does not have said selected content characteristic; and a second circuit that receives the output signals from said first circuit, said second circuit providing a digital output value that identifies the location of an output signal from said first circuit that has a selected one of said first and second logic levels and that corresponds to a byte in said first data word having said selected positional characteristic, wherein said selected positional characteristic is the most significant byte not having said selected content characteristic.

33. A parallel byte string processor that performs a data manipulation operation on each of the bytes of a first multiple-byte data word and that finds the location of a byte in said first data word having a selected content characteristic and a selected positional characteristic with respect to other bytes in said first data word, comprising:

a first circuit that provides an output signal for each byte of said first data word, wherein for each byte, the respective output signal has a first logic level when the byte has said selected content characteristic and has a second logic level when the byte does not have said selected content characteristic; and a second circuit that receives the output signals from said first circuit, said second circuit providing a digital output value that identifies the location of an output signal from said first circuit that has a selected one of said first and second logic levels and that corresponds to a byte in said first data word having said selected positional characteristic, wherein said selected positional characteristic is the most significant byte having said selected content characteristic that is less significant than the most significant byte not having said selected content characteristic.

34. A parallel byte string processor that performs a data manipulation operation on each of the bytes of a first multiple-byte data word and that finds the location of a byte in said first data word having a selected content characteristic and a selected positional characteristic with respect to other bytes in said first data word, comprising:

a first circuit that provides an output signal for each byte of said first data word, wherein for each byte, the respective output signal has a first logic level when the byte has said selected content characteristic and has a second logic level when the byte does not have said selected content characteristic; and a second circuit that receives the output signals from said first circuit, said second circuit providing a digital output value that identifies the location of an output signal from said first circuit that has a selected one of said first and second logic levels and that corresponds to a byte in said first data word having said selected positional characteristic, wherein said selected positional characteristic is the most significant byte not having said selected content characteristic that is less significant than the most significant byte having said selected content characteristic.

* * * * *

UNITED STATES PATENT AND TRADEMARK OFFICE
CERTIFICATE OF CORRECTION

PATENT NO. : 5,073,864

DATED : December 17, 1991

INVENTOR(S) : David H. Methvin, et al.

It is certified that error appears in the above-identified patent and that said Letters Patent is hereby corrected as shown below:

In the last line of the Abstract, change "of instruments" to
--of instructions--.

In Column 21, at line 45, after "a" insert --semicolon--.

In Column 21, at line 47, change "delimiter to be in accordance with" to --delimiter to be evaluated in accordance with--.

In Column 24, at line 13, delete the "0" between "B:" and "7".

In Column 173, at line 51, change "multiple-type data" to
-- multiple-byte data--.

Signed and Sealed this

Seventeenth Day of August, 1993

Attest:

BRUCE LEHMAN

*Attesting Officer*      *Commissioner of Patents and Trademarks*